FIG. 1 PRIORITY SEQUENCING CONTROL
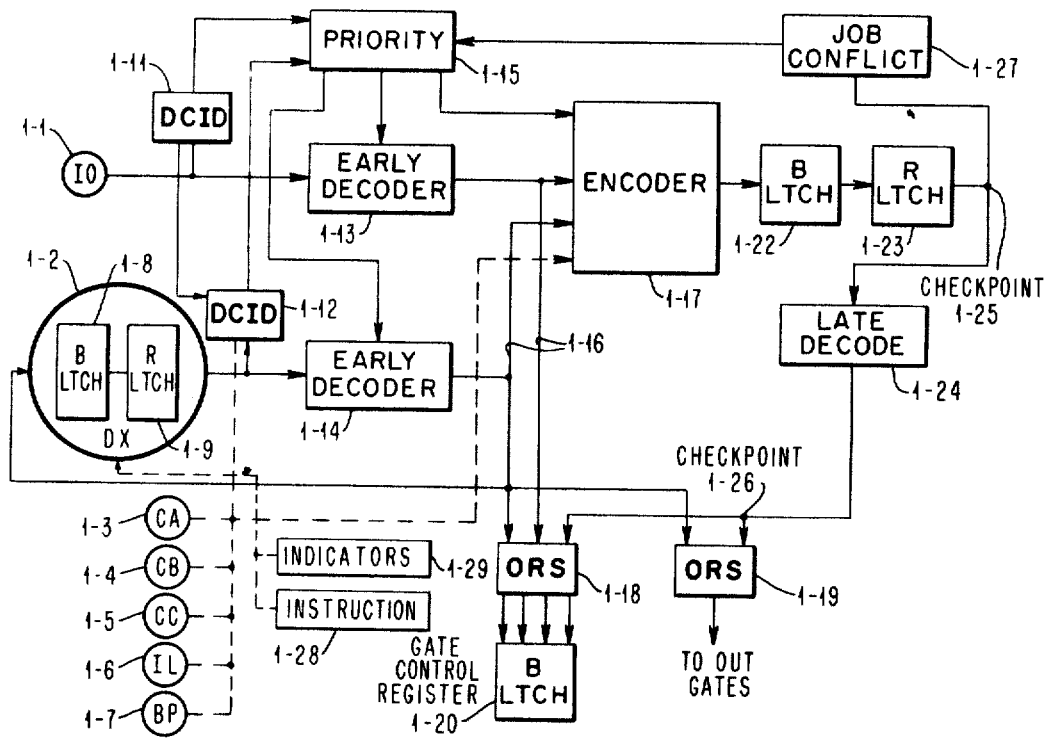
FIG. 2 EXAMPLE
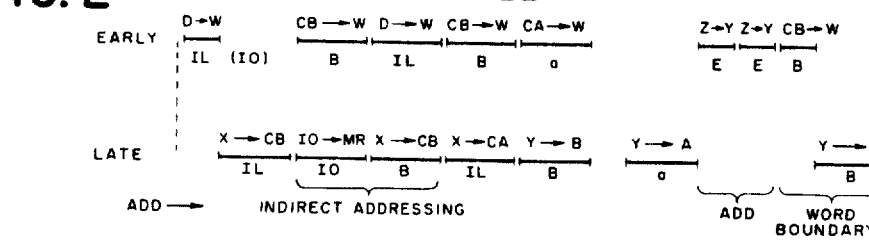
IL INSTRUCTION LOAD
E INSTRUCTION EXECUTION
a OPERAND a
B OPERAND B
IO INPUT-OUTPUT
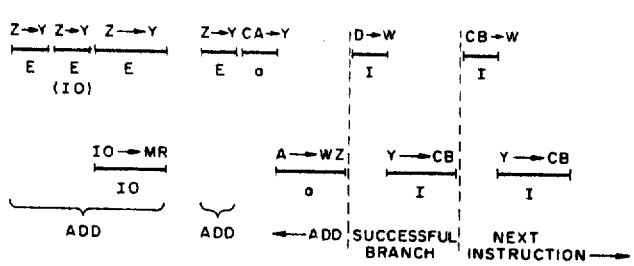
INVENTORS
GERRIT A. BLAAUW
WILLIAM V. WRIGHT
RUSSELL H. LARSON
BY Carl C. Kling
ATTORNEY

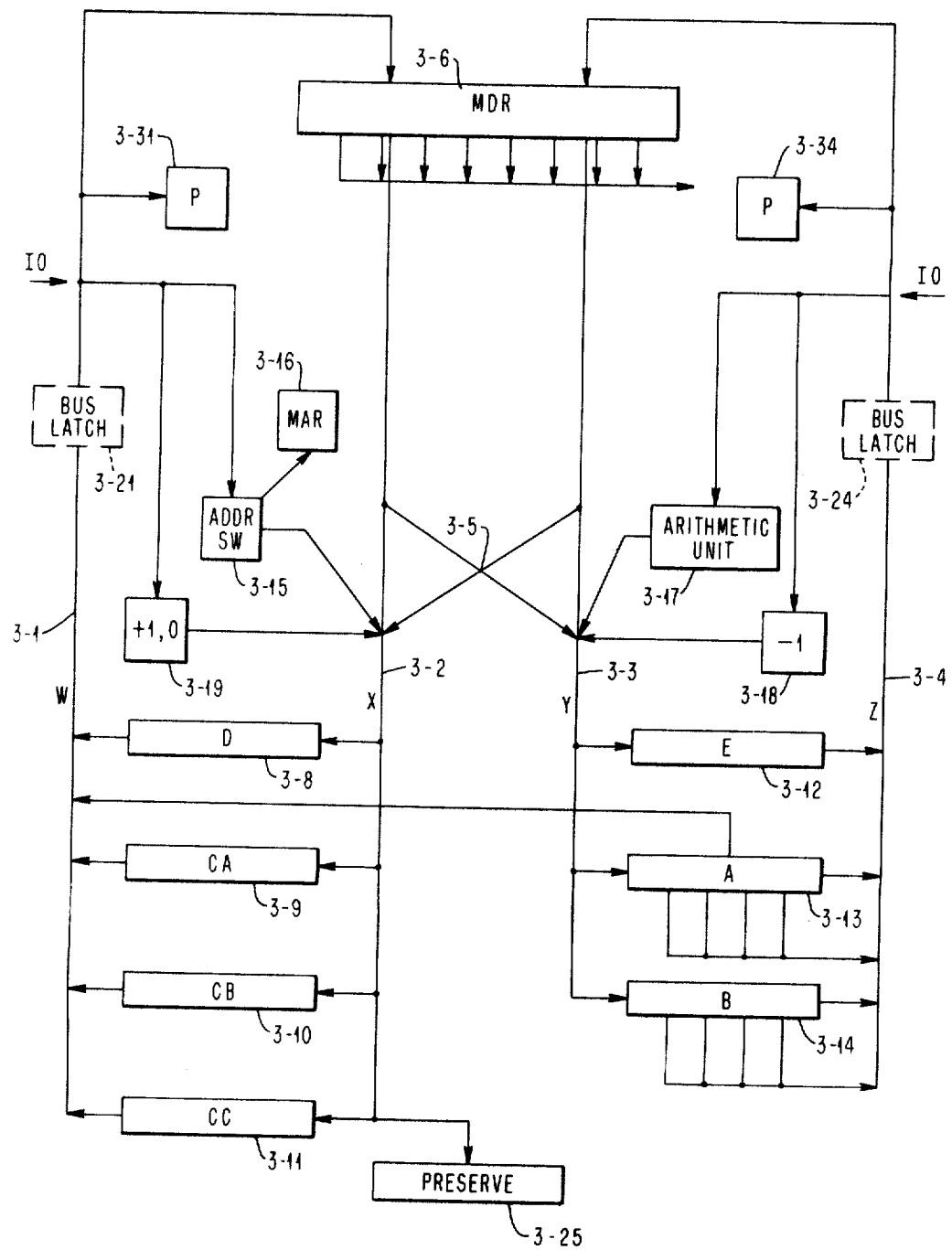
FIG. 3  DATA PATHS

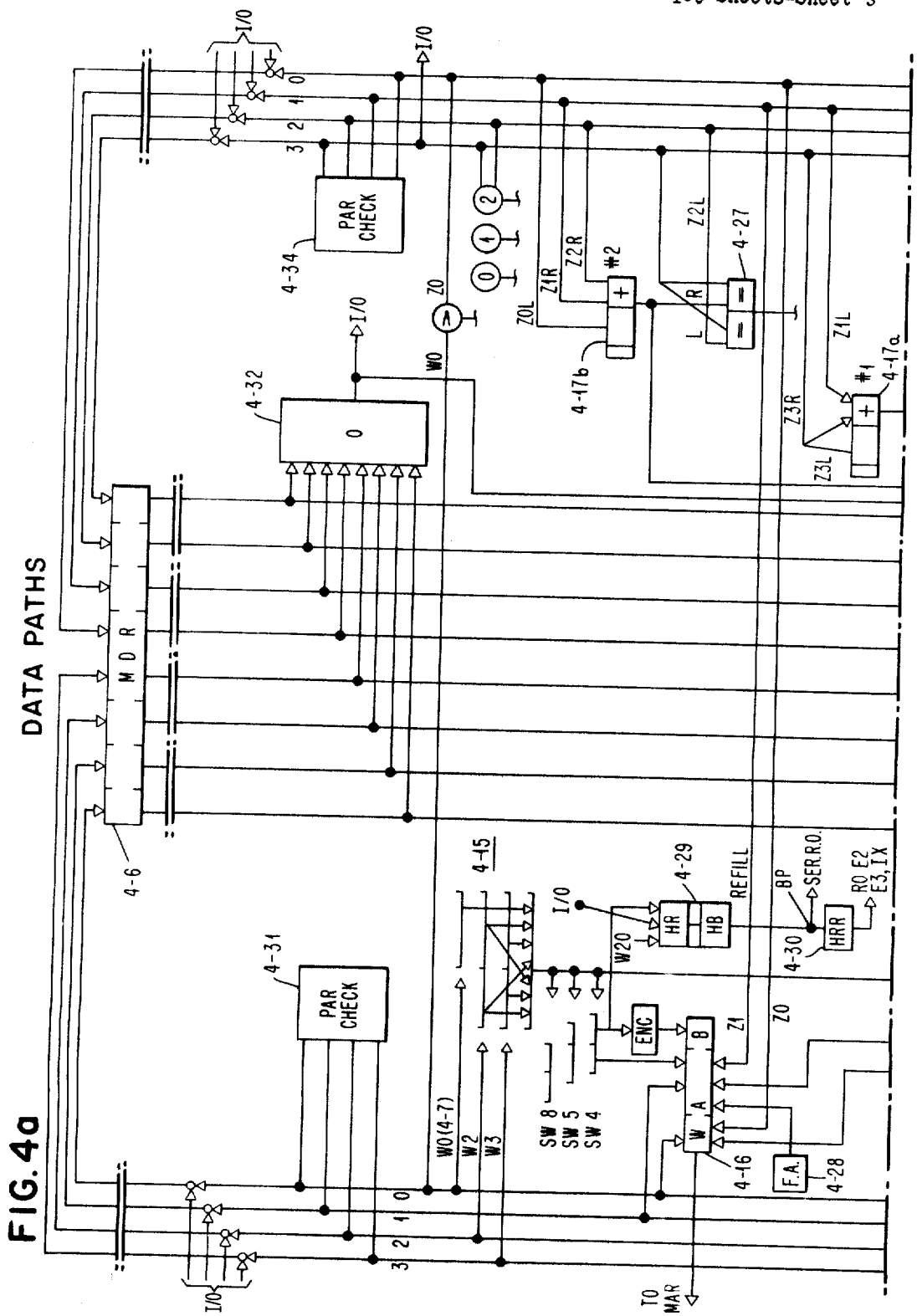

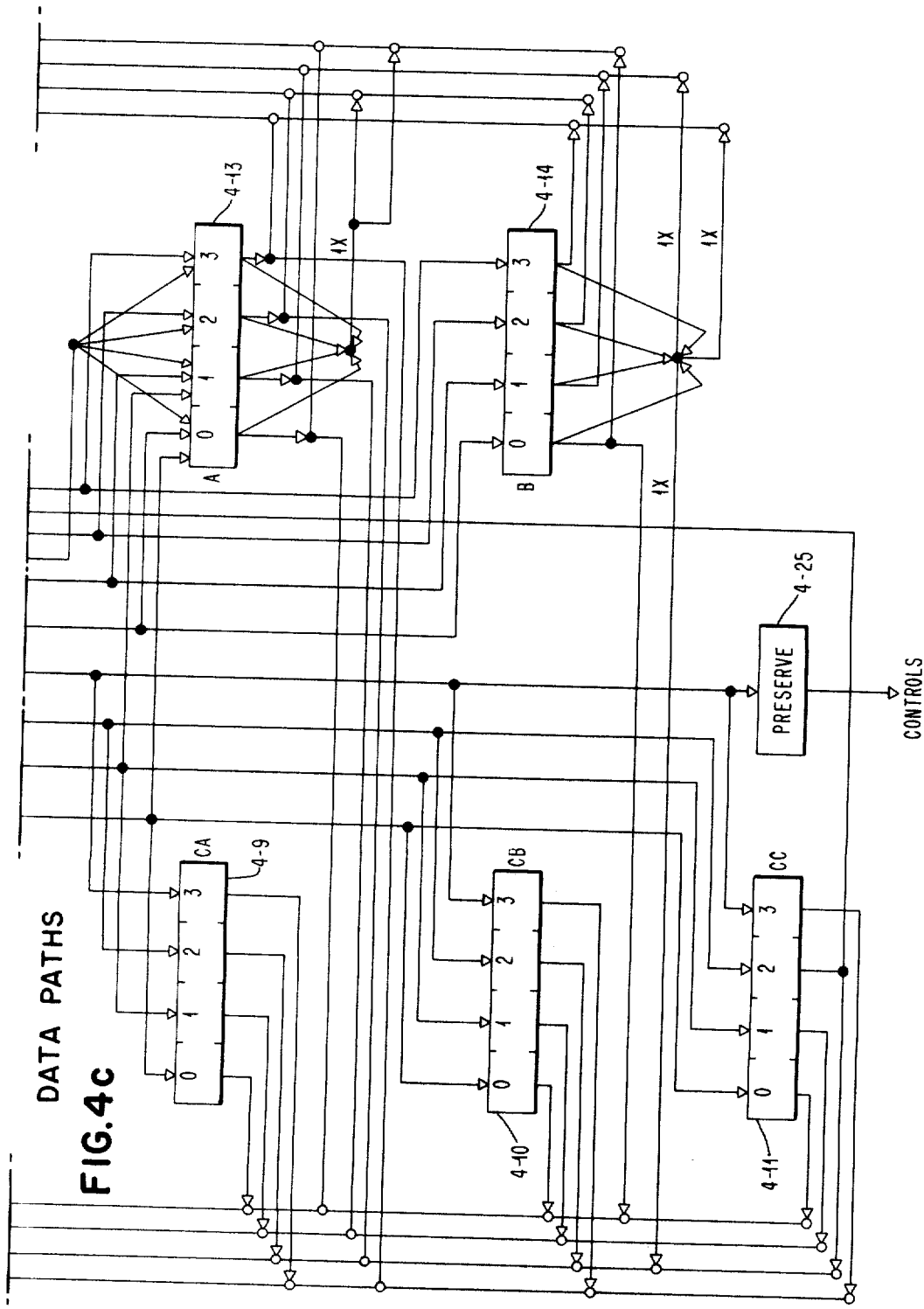

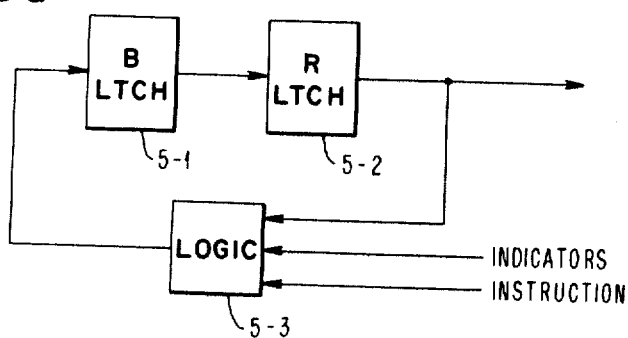
FIG. 5a REQUEST RING
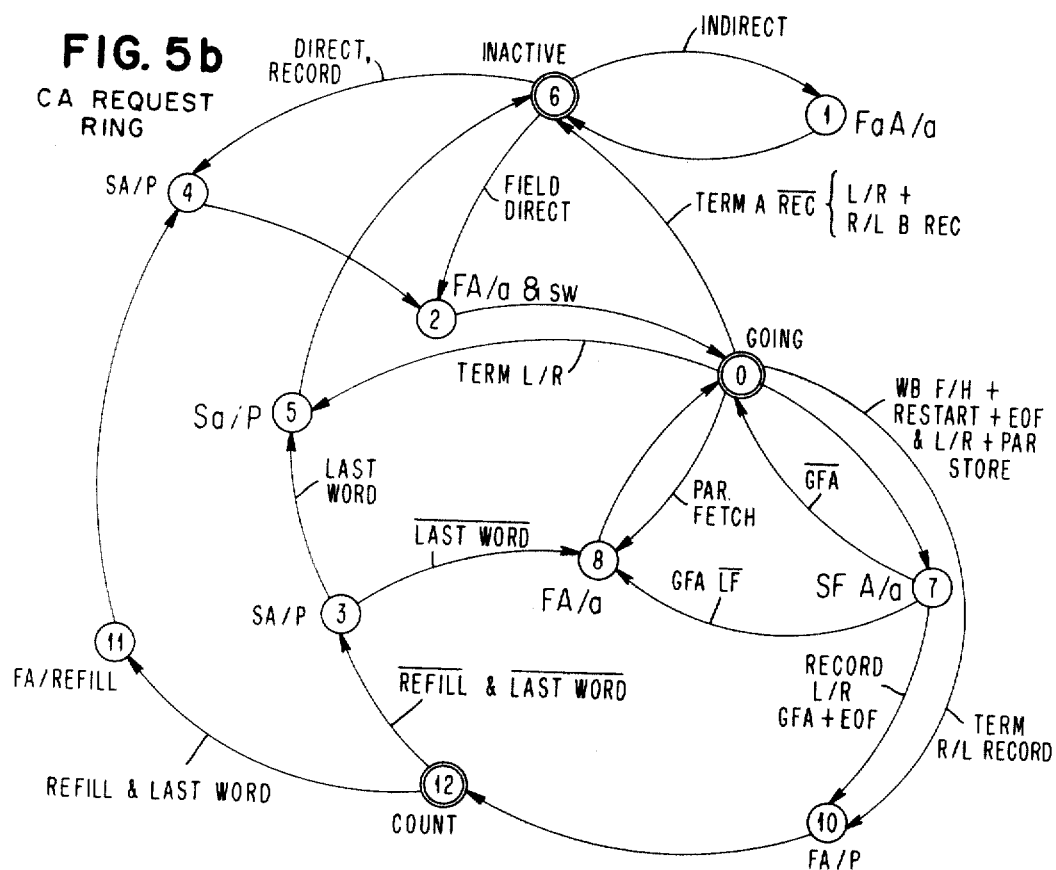
FIG. 5b CA REQUEST RING

FIG.6 X BUS BYTE 0
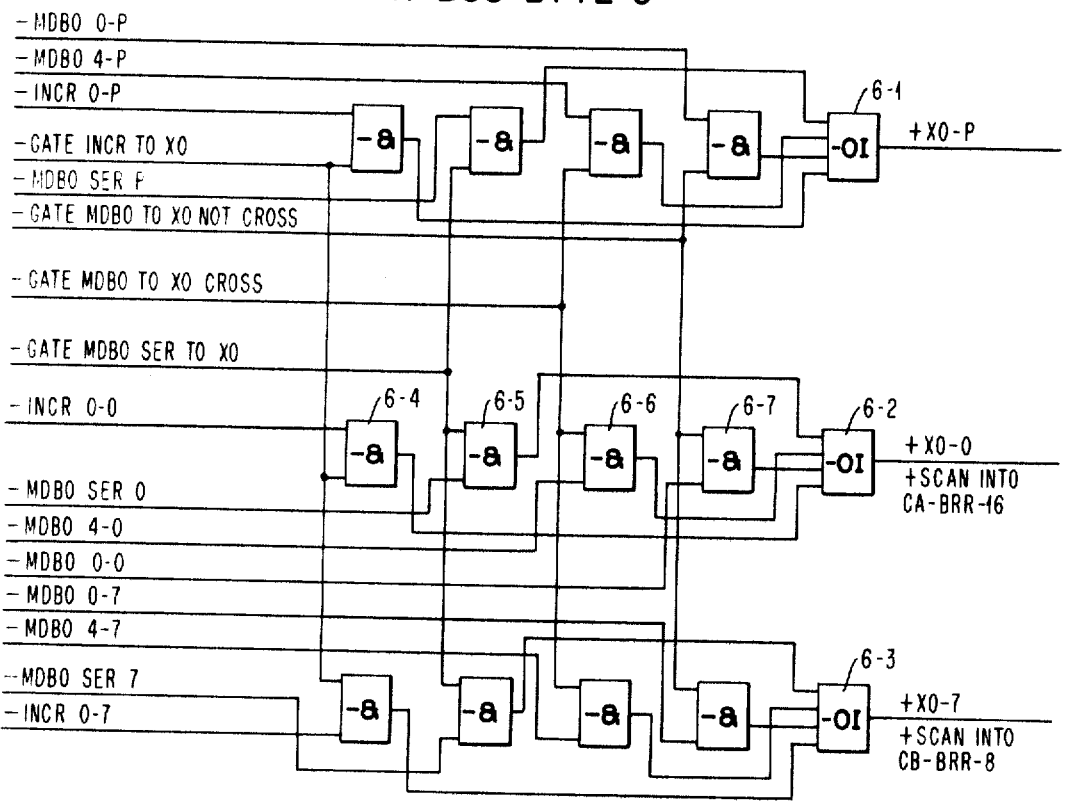
FIG.7 ADDRESS INVALID
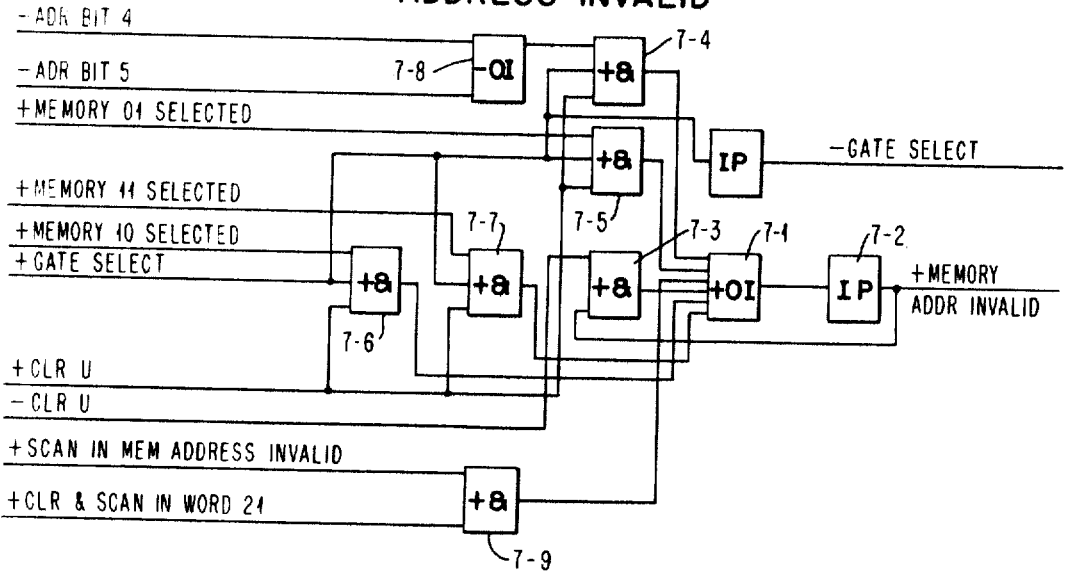

June 27, 1967  G. A. BLAAUW ET AL  3,328,771
PRIORITY SEQUENCE CONTROL
Filed June 30, 1964  155 Sheets-Sheet 9

FIG. 8b MAR 1, 3, A, B, C AND D STORE ENCODER
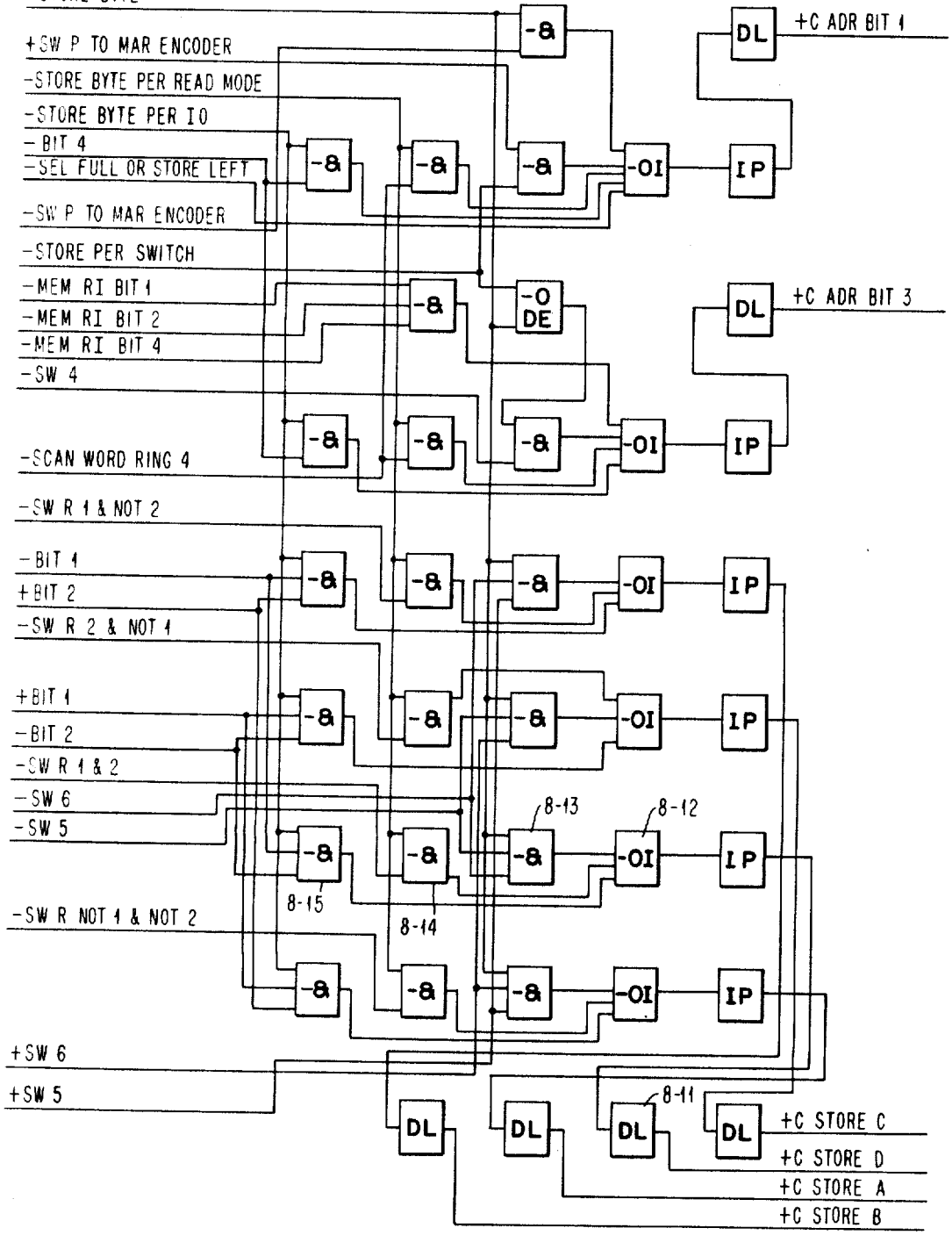

June 27, 1967 G. A. BLAAUW ET AL 3,328,771
PRIORITY SEQUENCE CONTROL
Filed June 30, 1964 153 Sheets-Sheet 11
FIG. 9 MEMORY SELECT
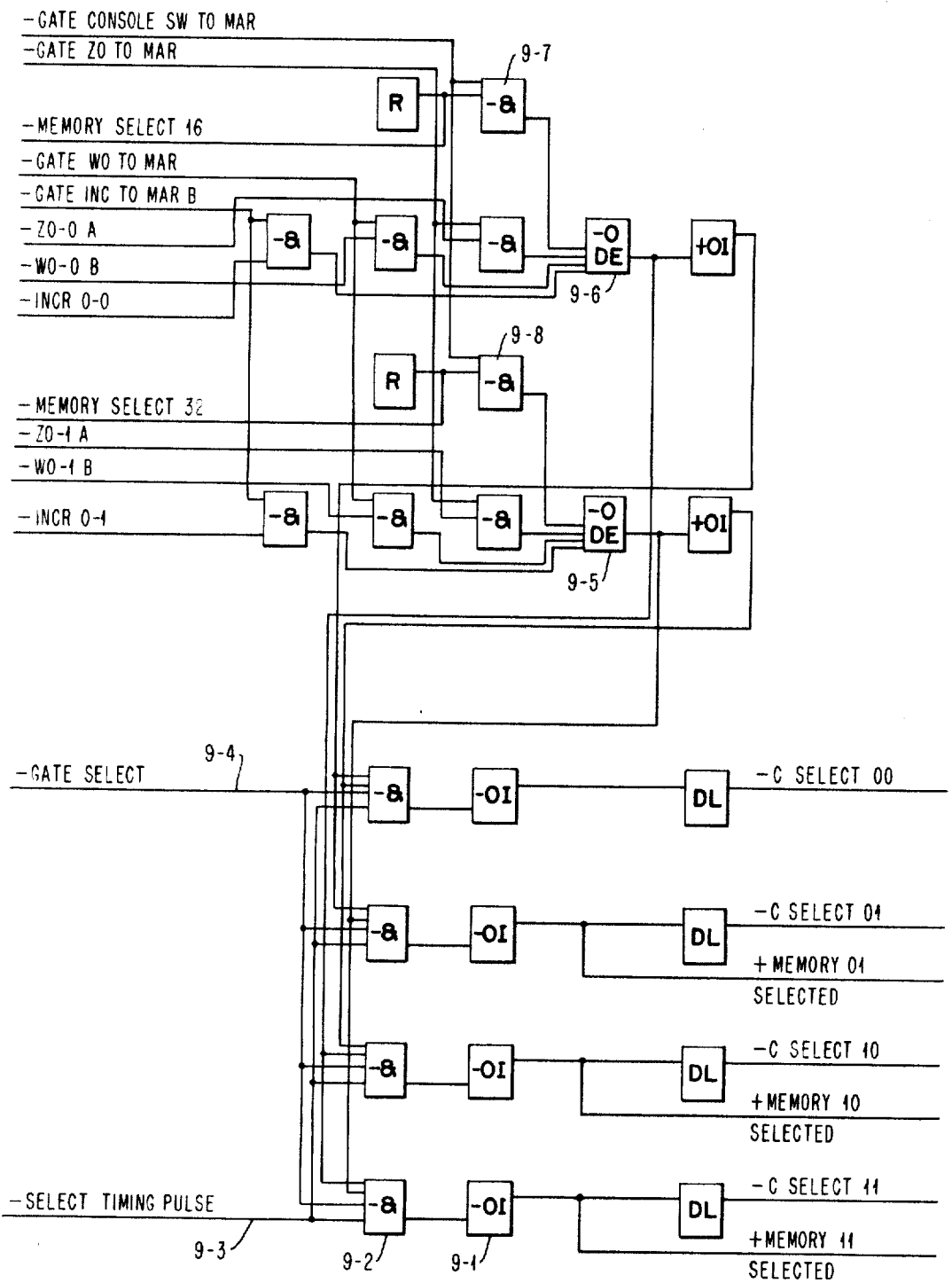

June 27, 1967
G. A. BLAAUW ET AL
3,328,771
PRIORITY SEQUENCE CONTROL
Filed June 30, 1964
153 Sheets-Sheet 12
FIG. 10  CA REGISTER BYTE 0
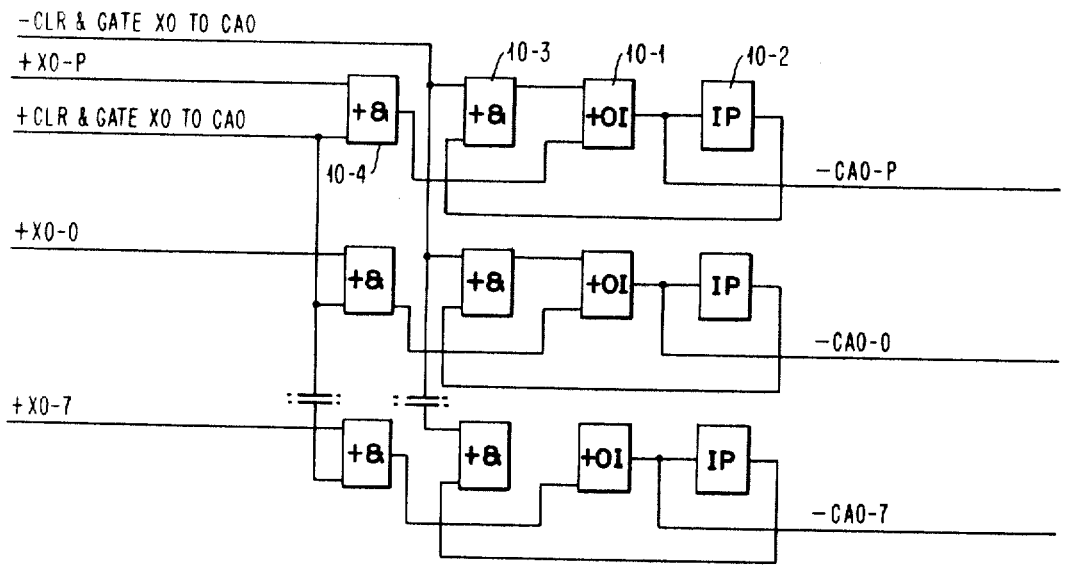
FIG. 11  D REGISTER BYTE 0
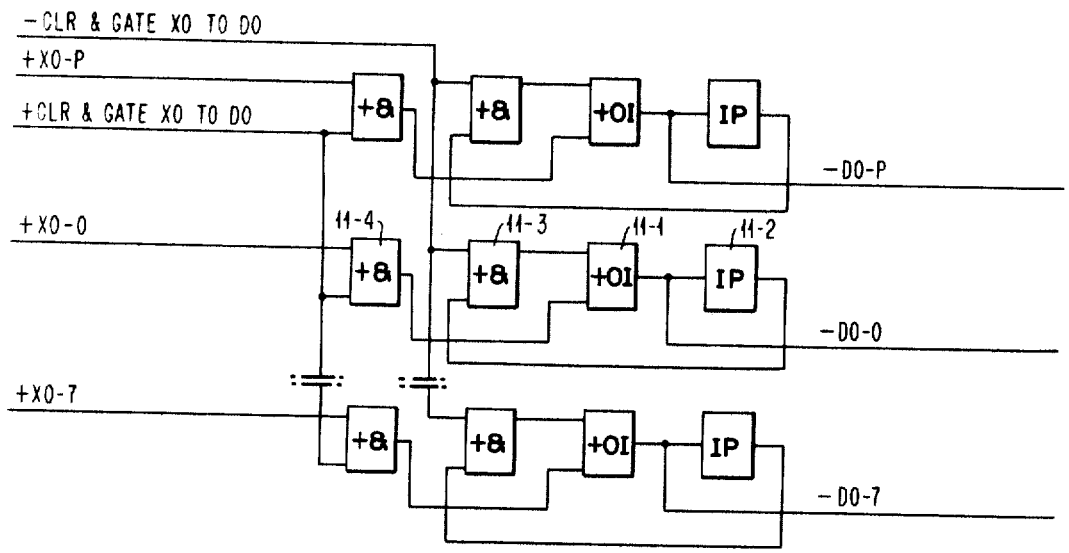

FIG.42 A REGISTER BYTE 0
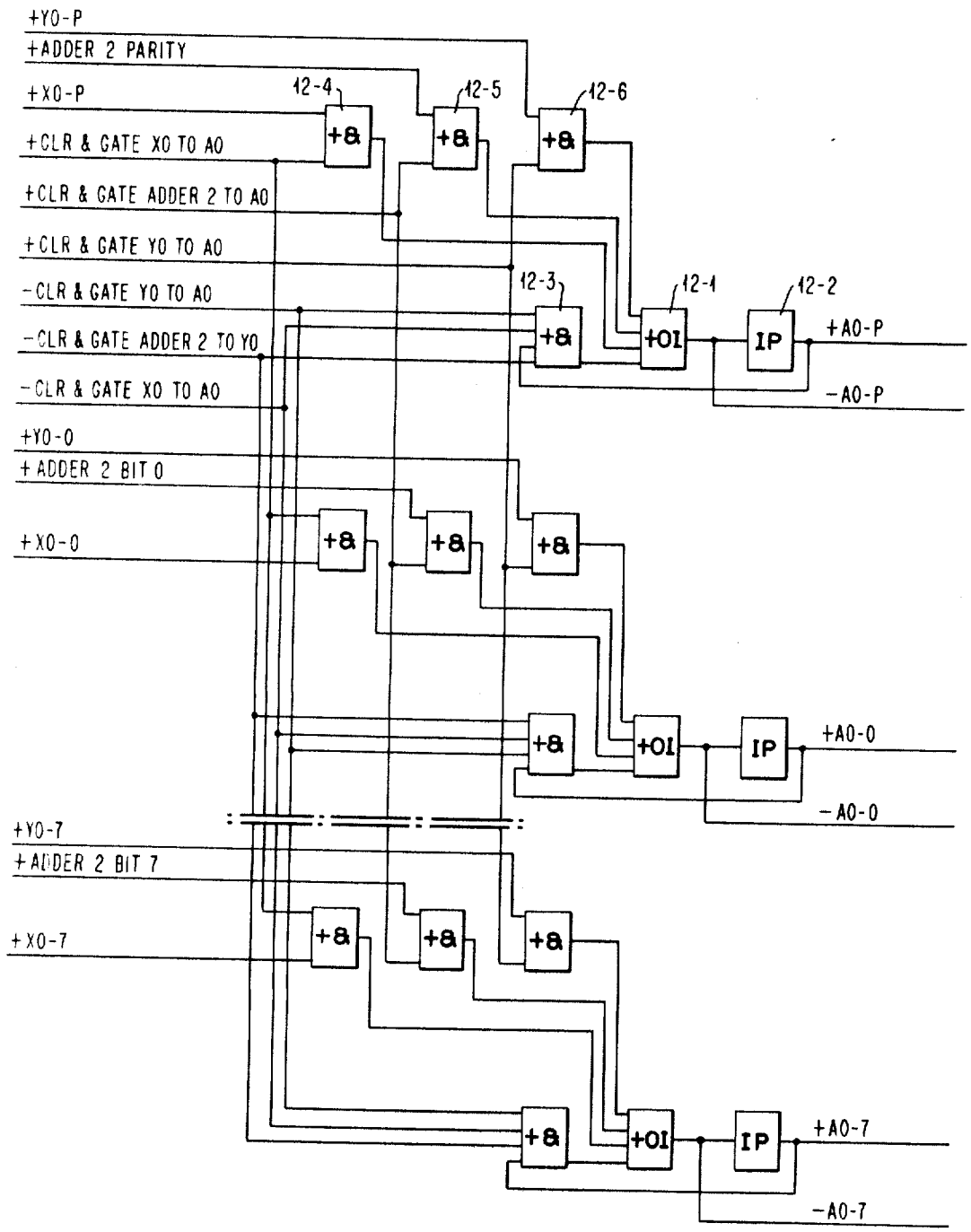

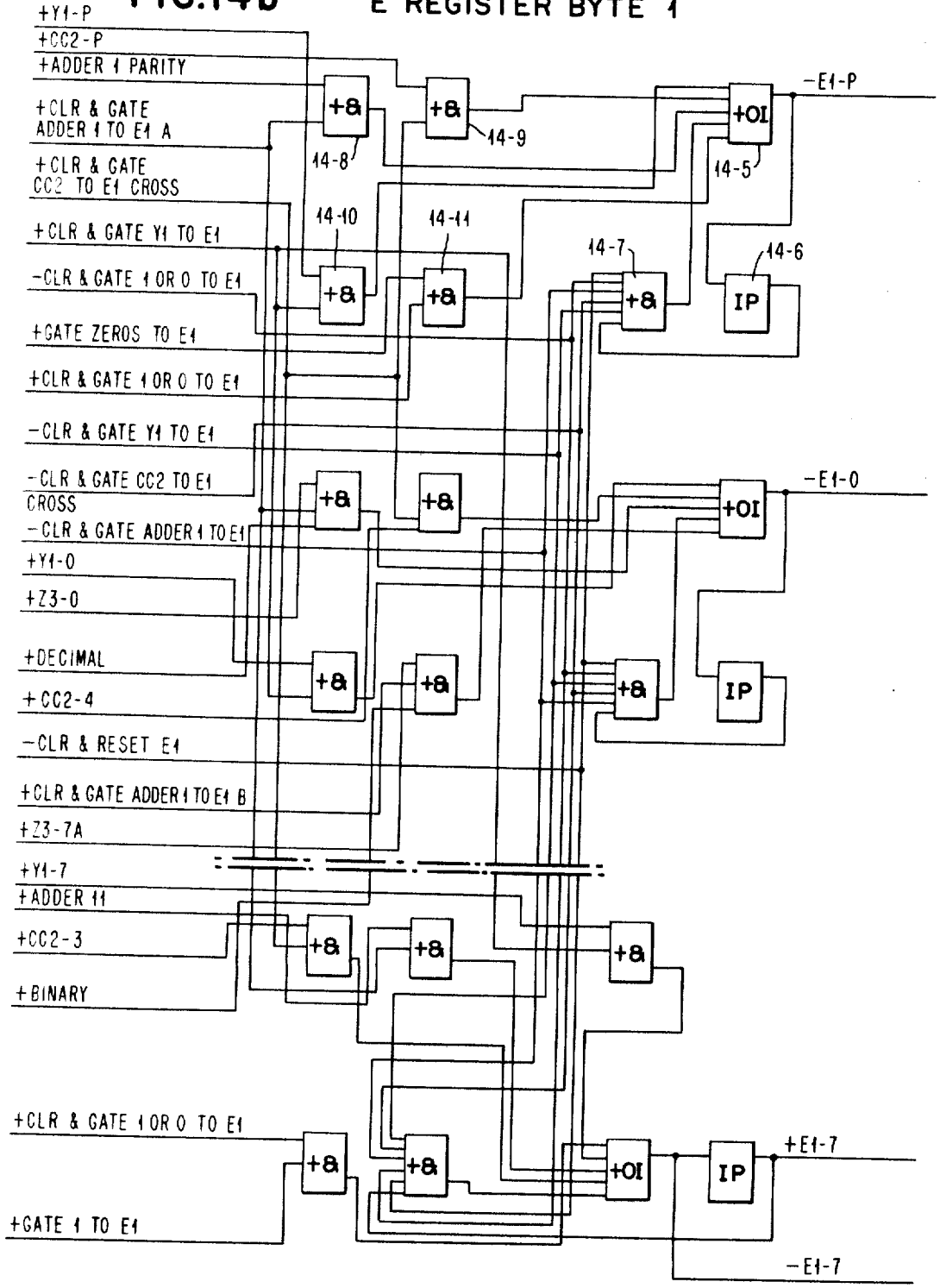
FIG.14b  E REGISTER BYTE 1

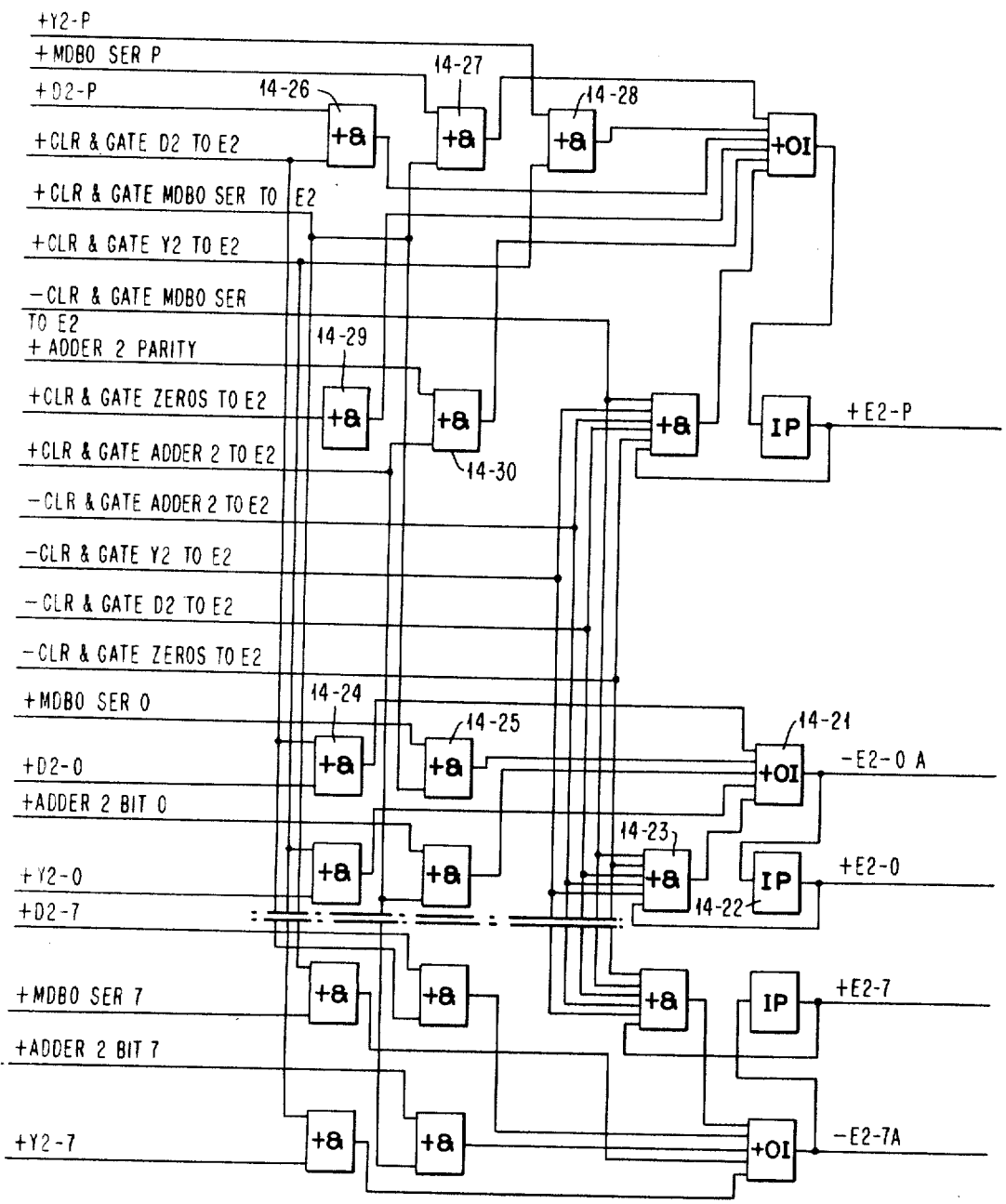
FIG.14c  E REGISTER BYTE 2

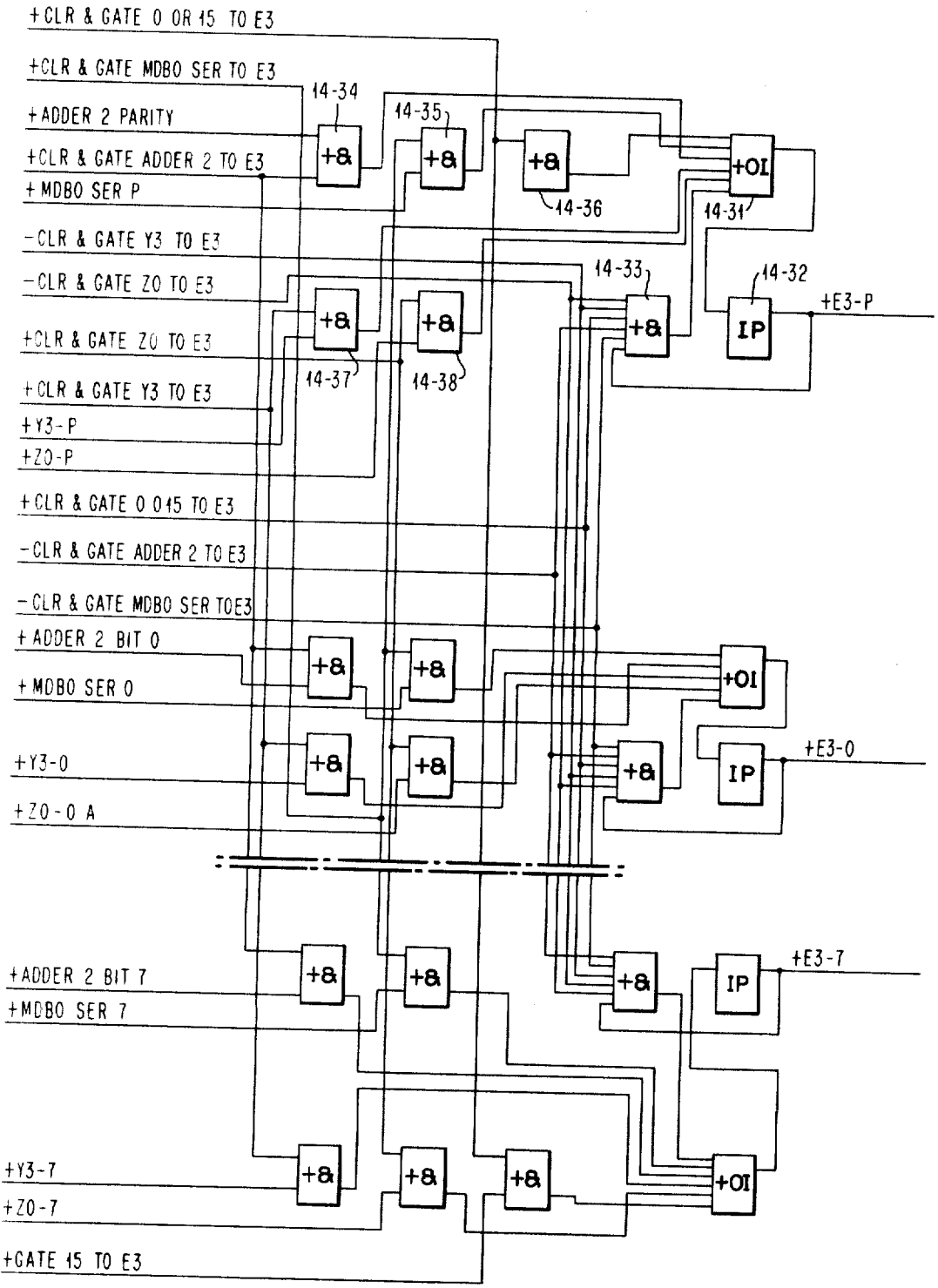
FIG.14d    E REGISTER BYTE 3

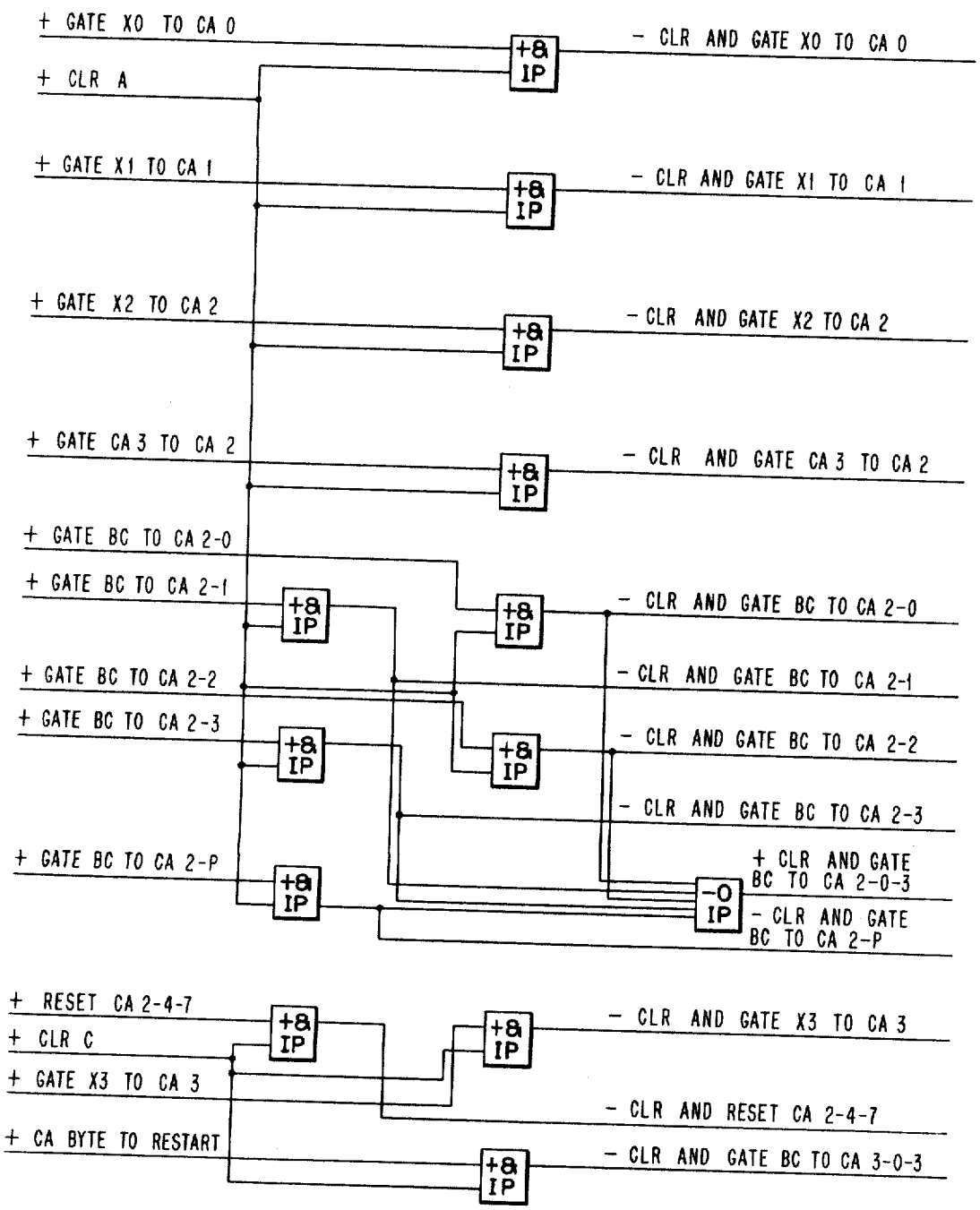
FIG.15 CA REGISTER SET AND RESET

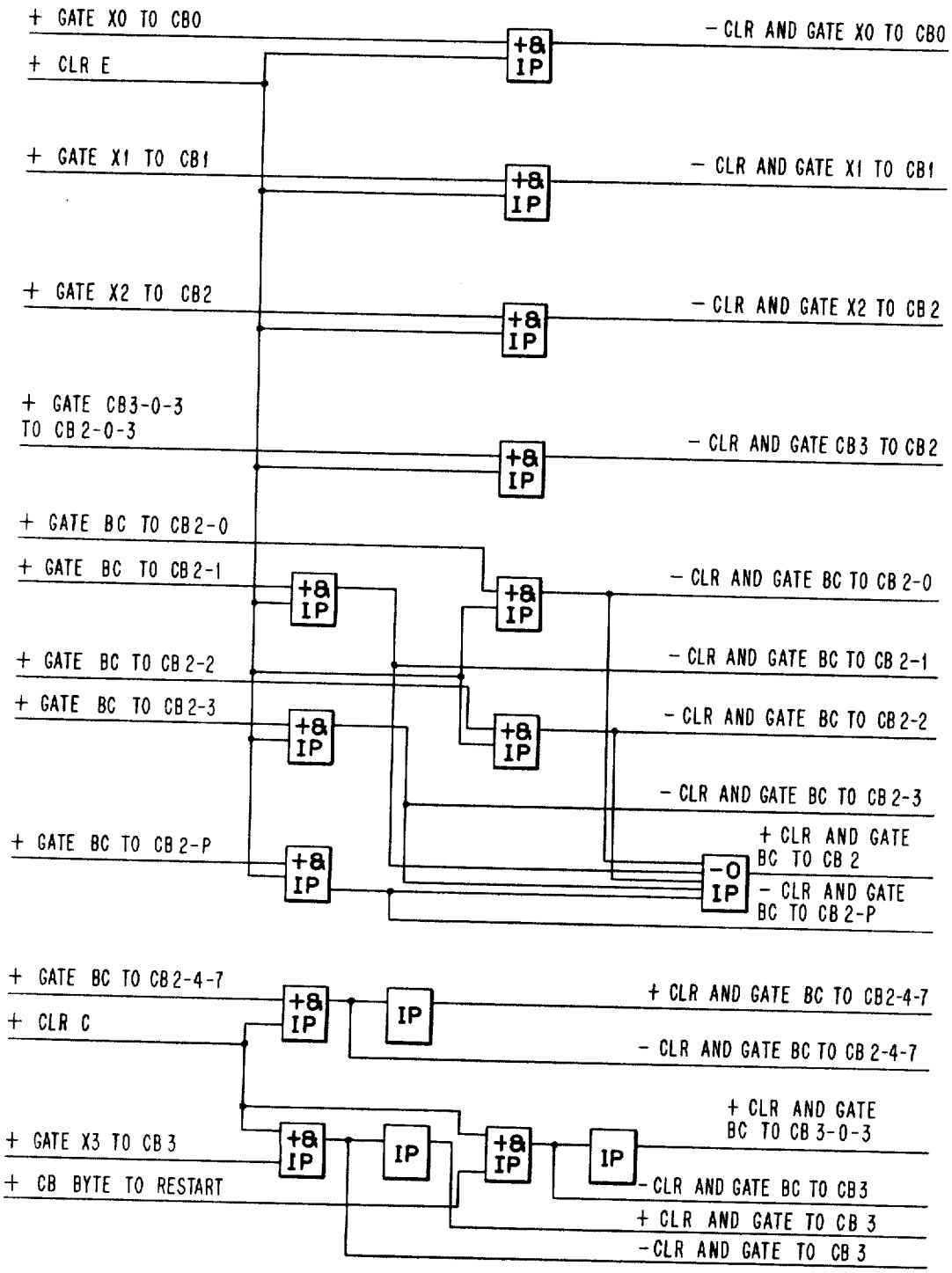
FIG. 16  CB REGISTER SET AND RESET

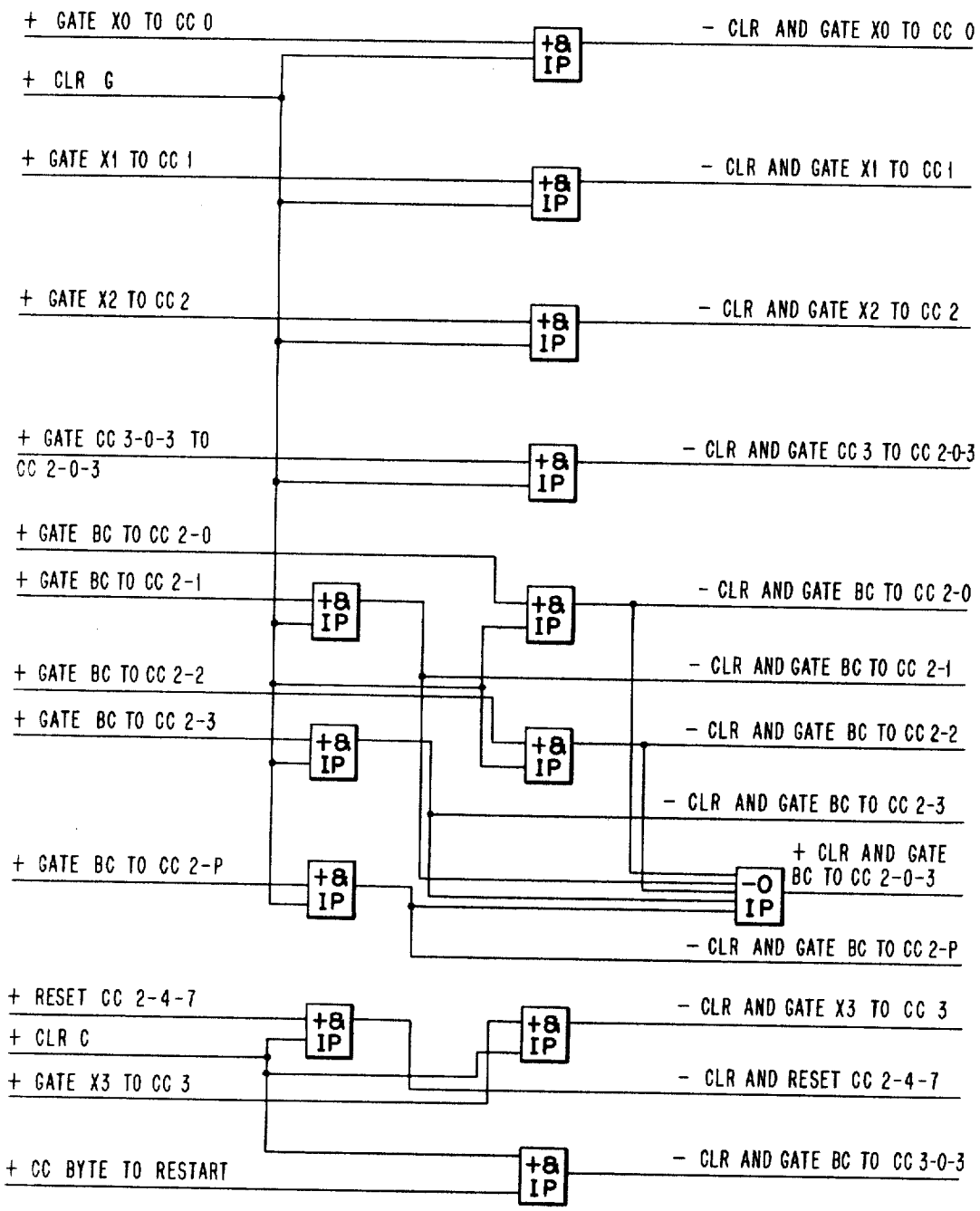
FIG. 17 CC REGISTER SET AND RESET

FIG. 18 — D REGISTER SET AND RESET
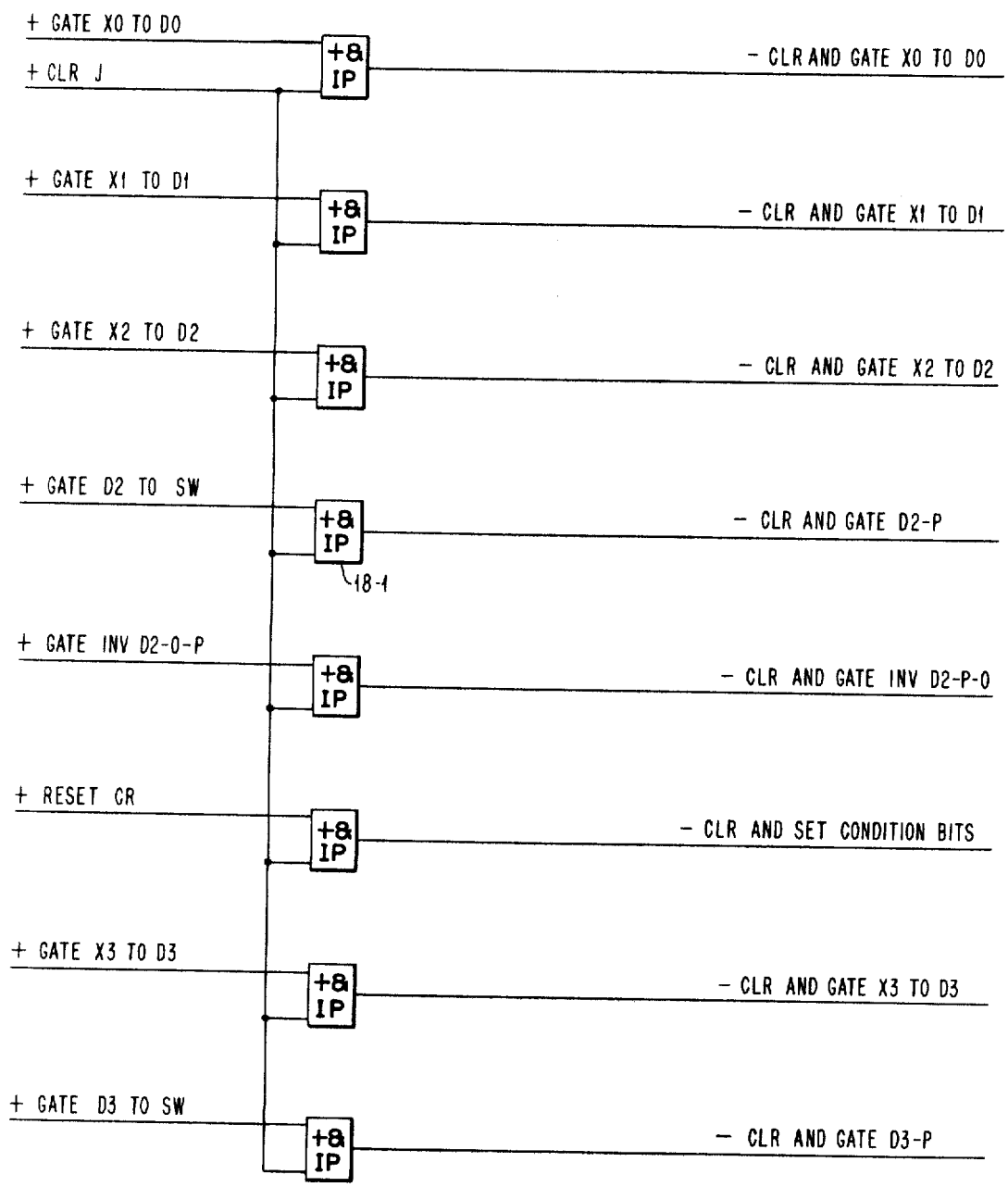

June 27, 1967  G. A. BLAAUW ET AL  3,328,771
PRIORITY SEQUENCE CONTROL
Filed June 30, 1964  155 Sheets-Sheet 22
FIG.19  A REGISTER SET AND RESET
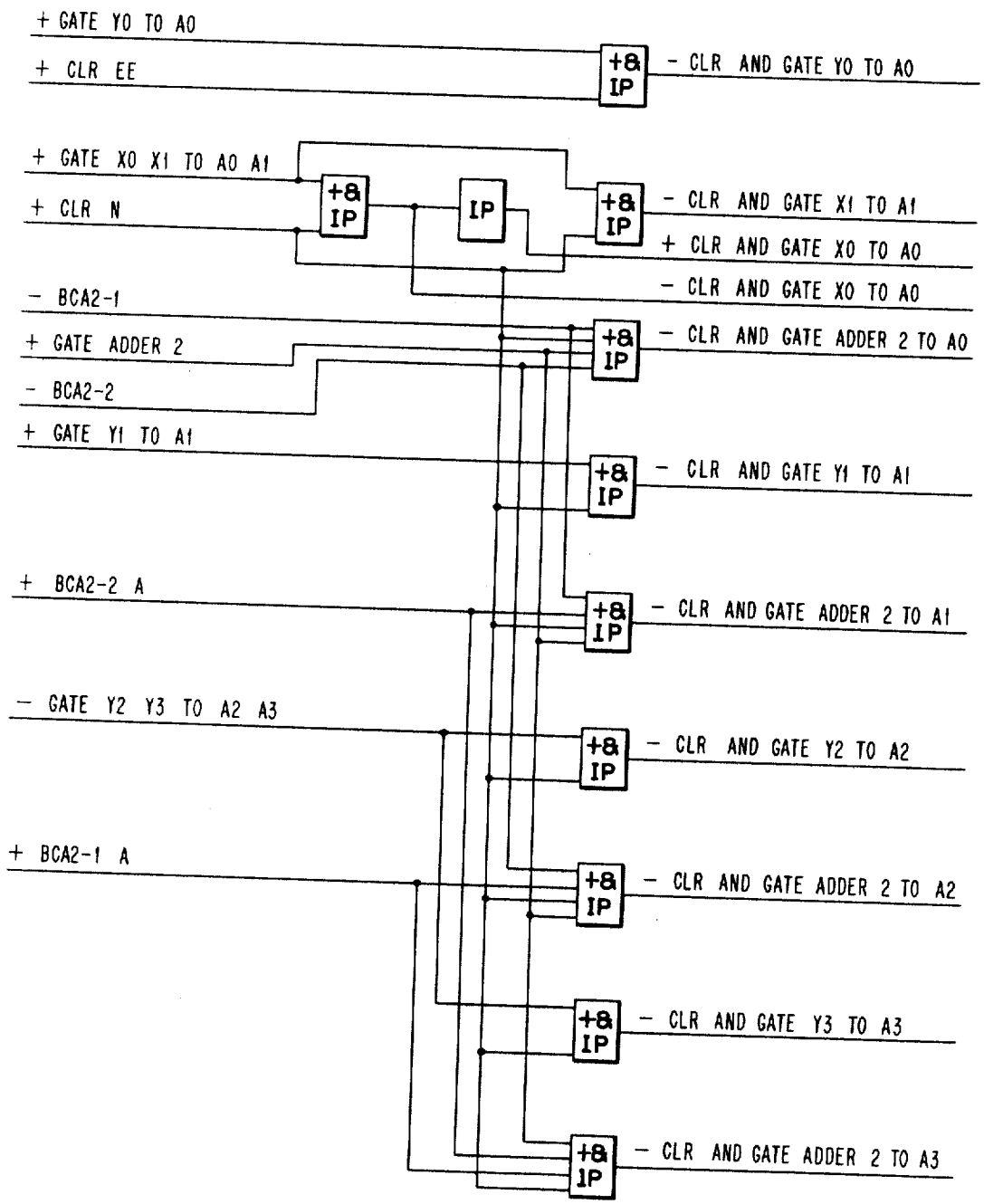

June 27, 1967 G. A. BLAAUW ET AL 3,328,771
PRIORITY SEQUENCE CONTROL
Filed June 30, 1964 153 Sheets-Sheet 23
FIG. 20   B REGISTER SET AND RESET
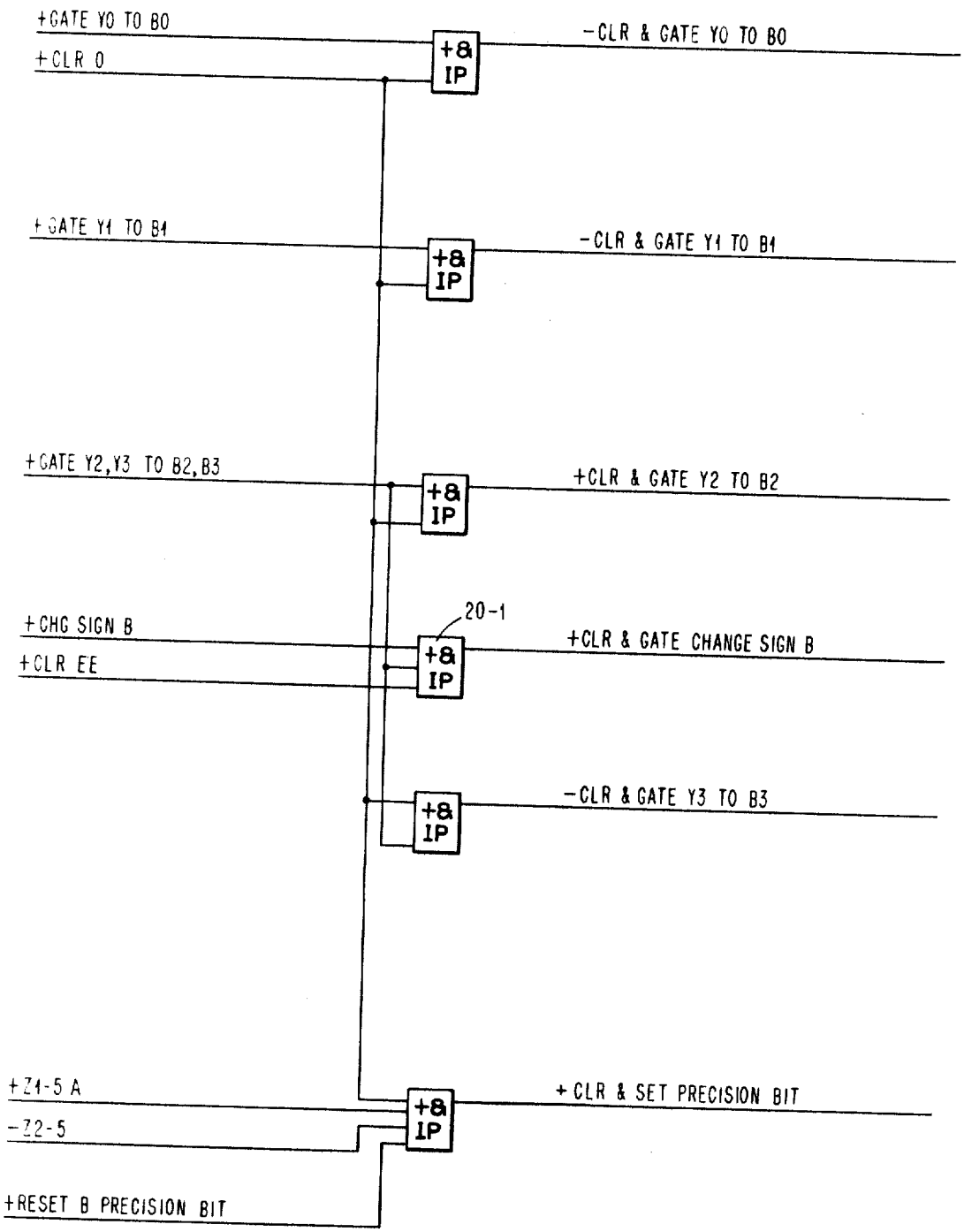

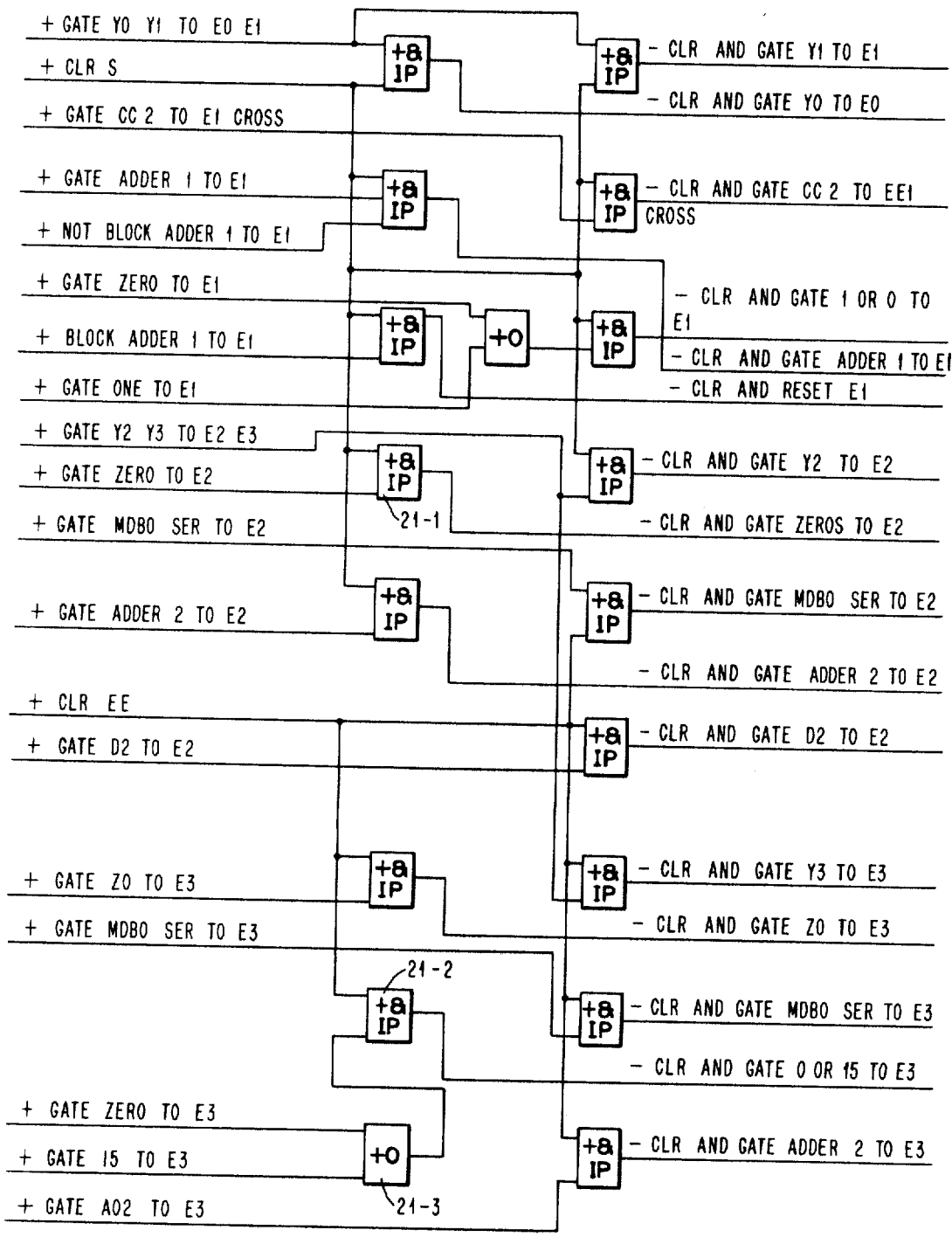
FIG. 24 E REGISTER SET AND RESET

June 27, 1967  G. A. BLAAUW ET AL  3,328,771
PRIORITY SEQUENCE CONTROL
Filed June 30, 1964  153 Sheets-Sheet 25

IO ADDRESS CHANGE

June 27, 1967 — G. A. BLAAUW ET AL — 3,328,771
PRIORITY SEQUENCE CONTROL
Filed June 30, 1964 — 153 Sheets-Sheet 27

FIG.24 INSTRUCTION LOAD GATES

June 27, 1967

G. A. BLAAUW ET AL 3,328,771

PRIORITY SEQUENCE CONTROL

Filed June 30, 1964

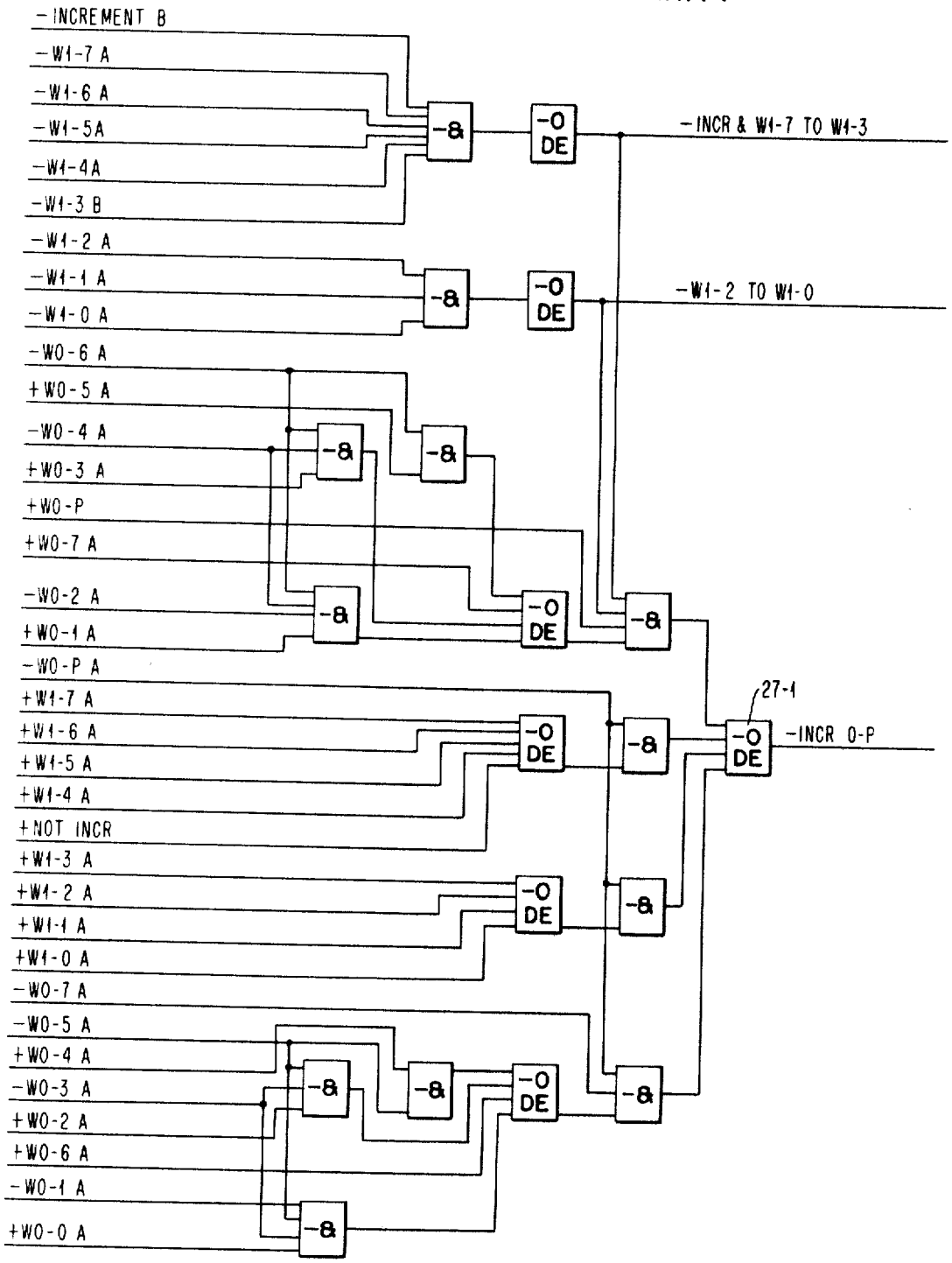

FIG. 28 MDBI BYTE 0
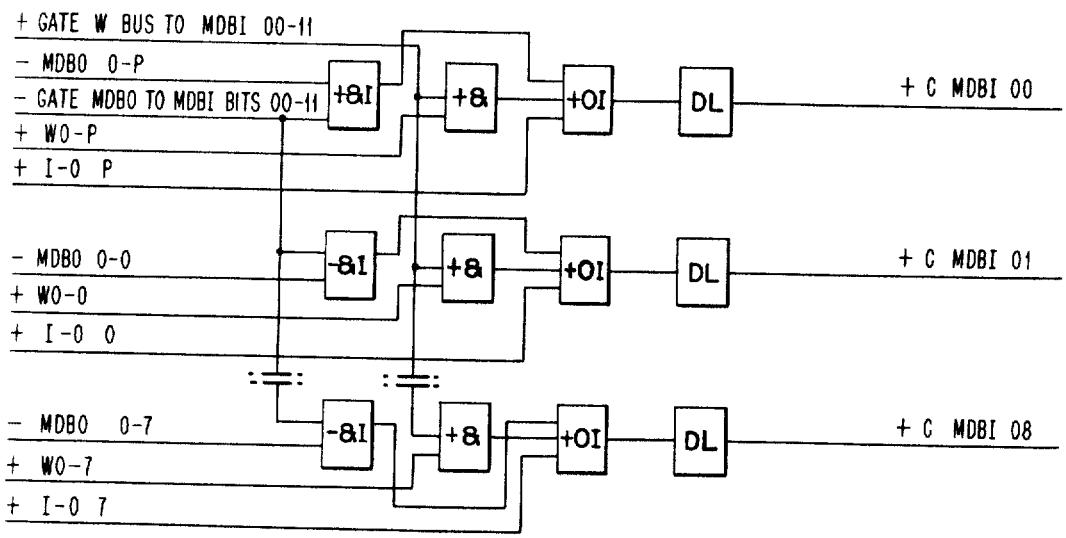
FIG. 28a W BUS SET & RESET
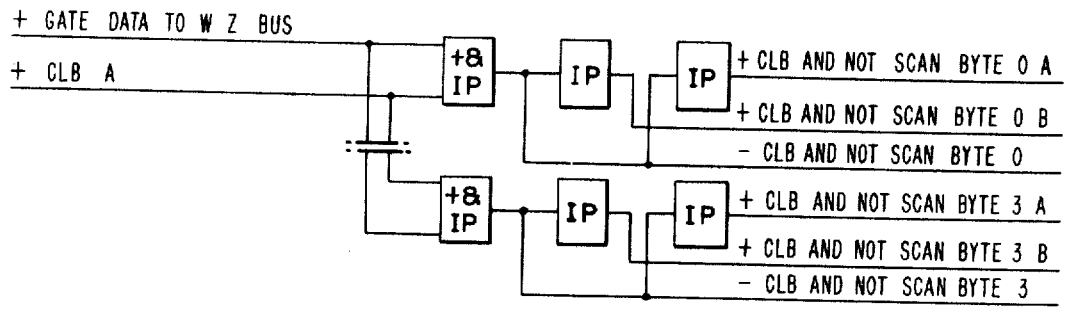
FIG. 28b PARITY & Z BUS SET & RESET
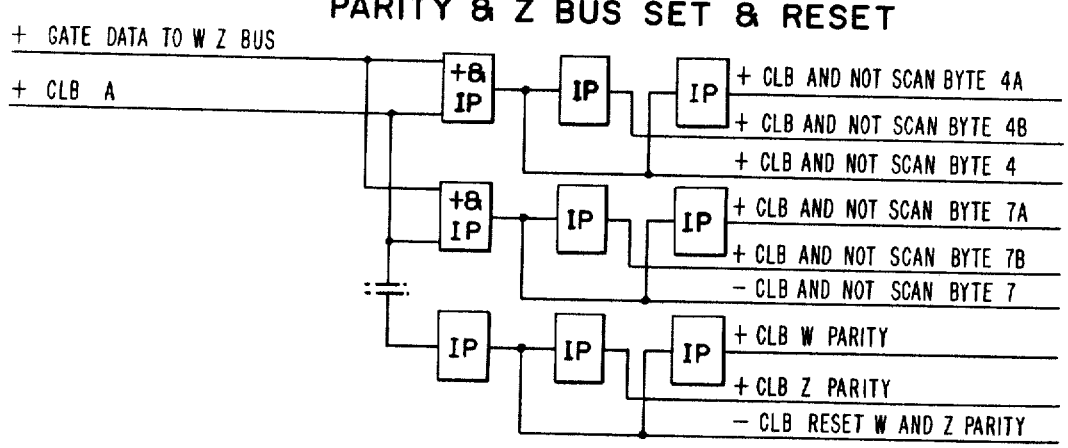

June 27, 1967 G. A. BLAAUW ET AL 3,328,771
PRIORITY SEQUENCE CONTROL
Filed June 30, 1964 155 Sheets-Sheet 32
FIG. 29 — INCREMENT BYTE 1 PARITY
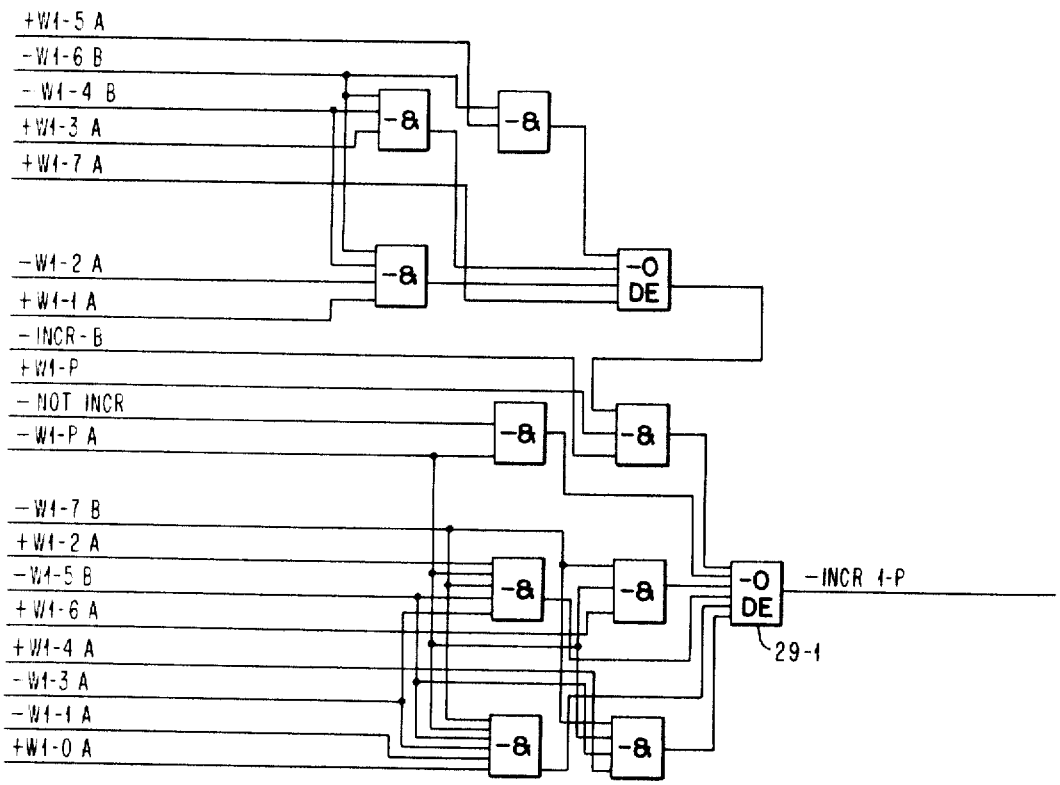
FIG. 29a — 255 CARRY LATCH
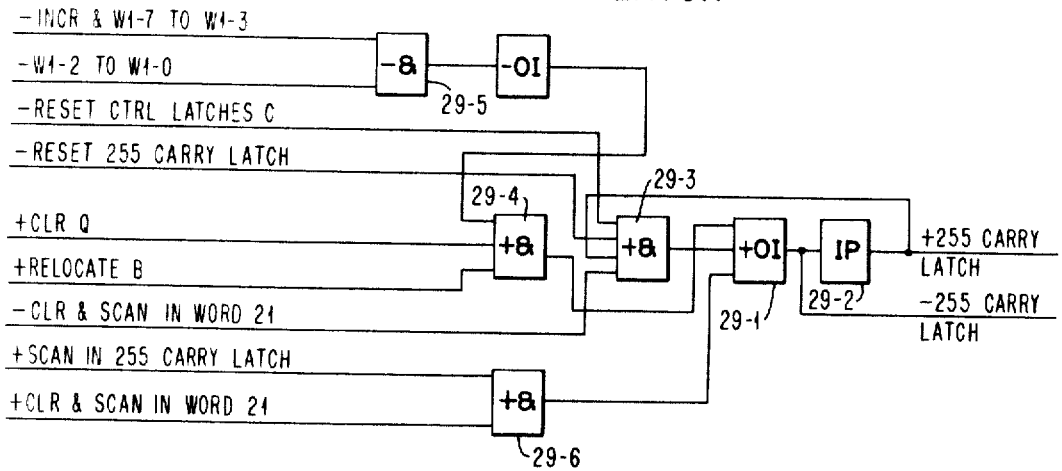

FIG. 30 DECREMENTER PARITY
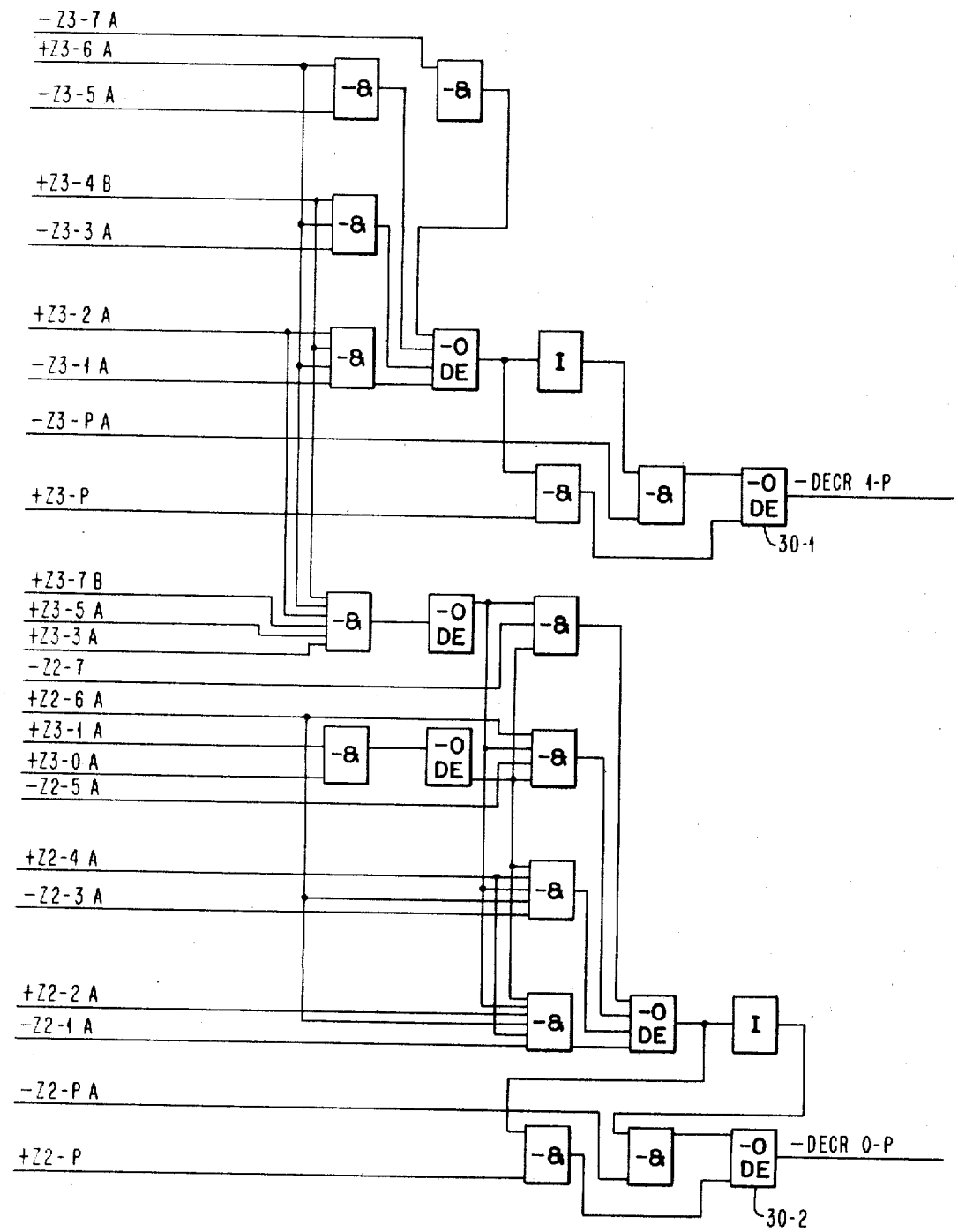

June 27, 1967 G. A. BLAAUW ET AL 3,328,771
PRIORITY SEQUENCE CONTROL
Filed June 30, 1964 153 Sheets-Sheet 34
FIG.34 PARITY CHECK BYTE WO
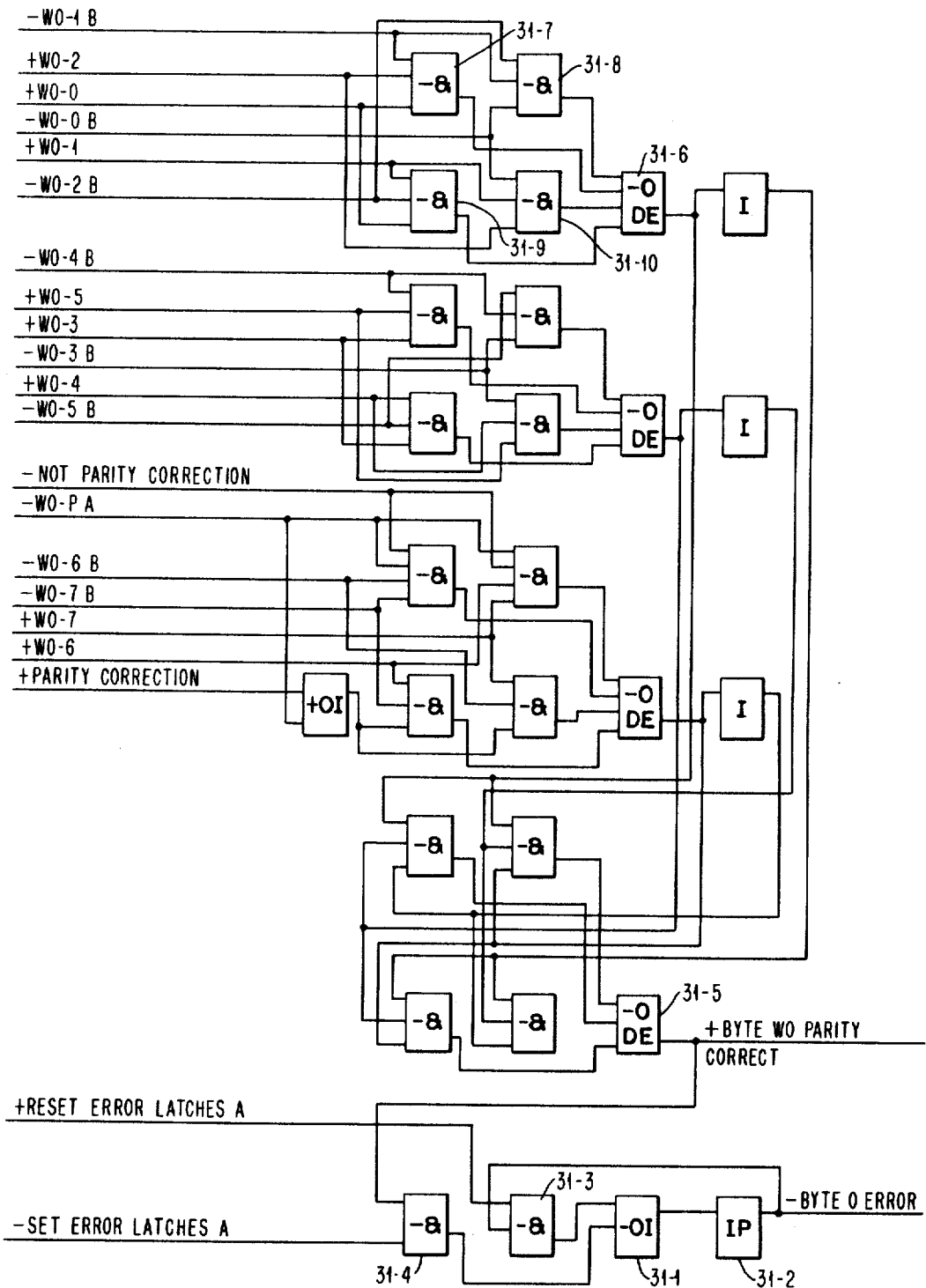

FIG. 32 PARITY ERROR
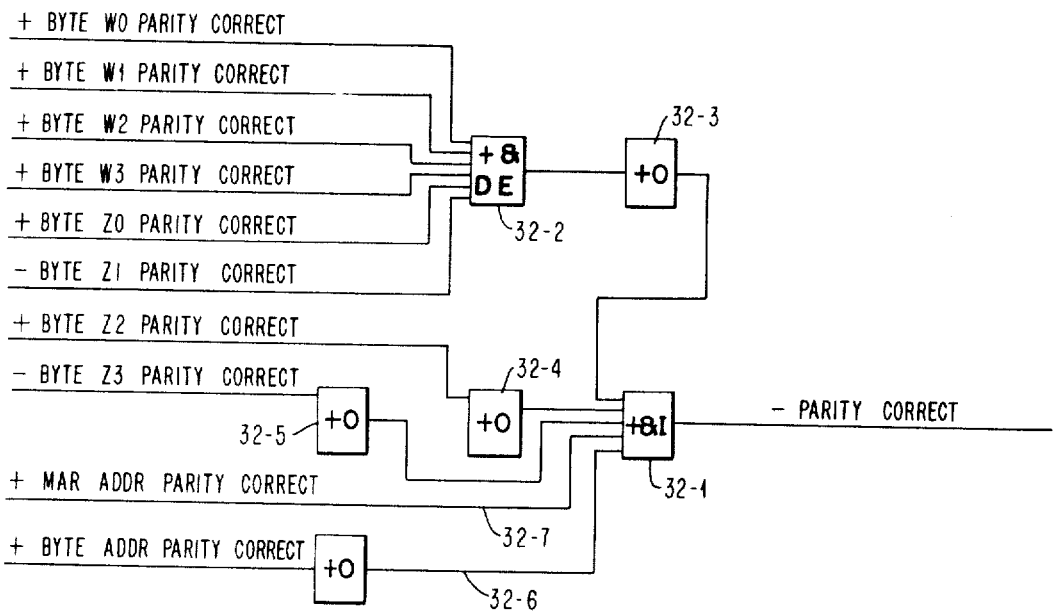
FIG. 33 SET ERROR LATCHES
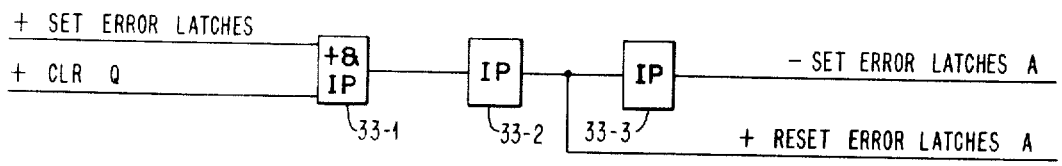
FIG. 34 PARITY CORRECT
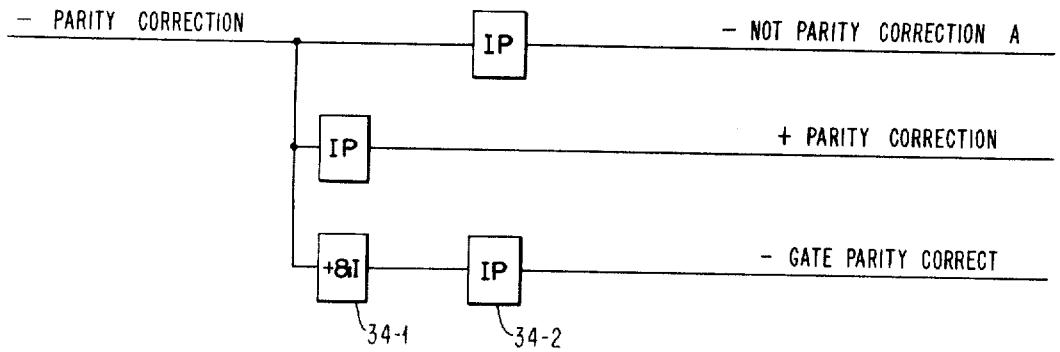

June 27, 1967   G. A. BLAAUW ET AL   3,328,771
PRIORITY SEQUENCE CONTROL
Filed June 30, 1964                              153 Sheets-Sheet 36

FIG. 35a   PRG PROT W0-W1 GTR THAN Z0-Z1 +1

FIG.35b PRG PROT W0-W1 GREATER THAN Z0-Z1+1
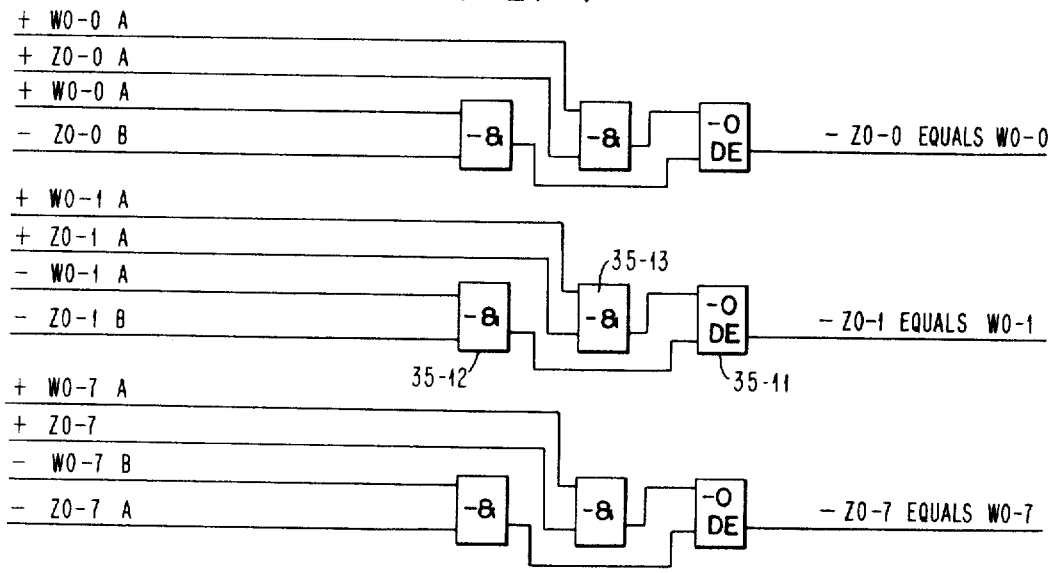
FIG.36a A REGISTER SERIAL OUTPUT
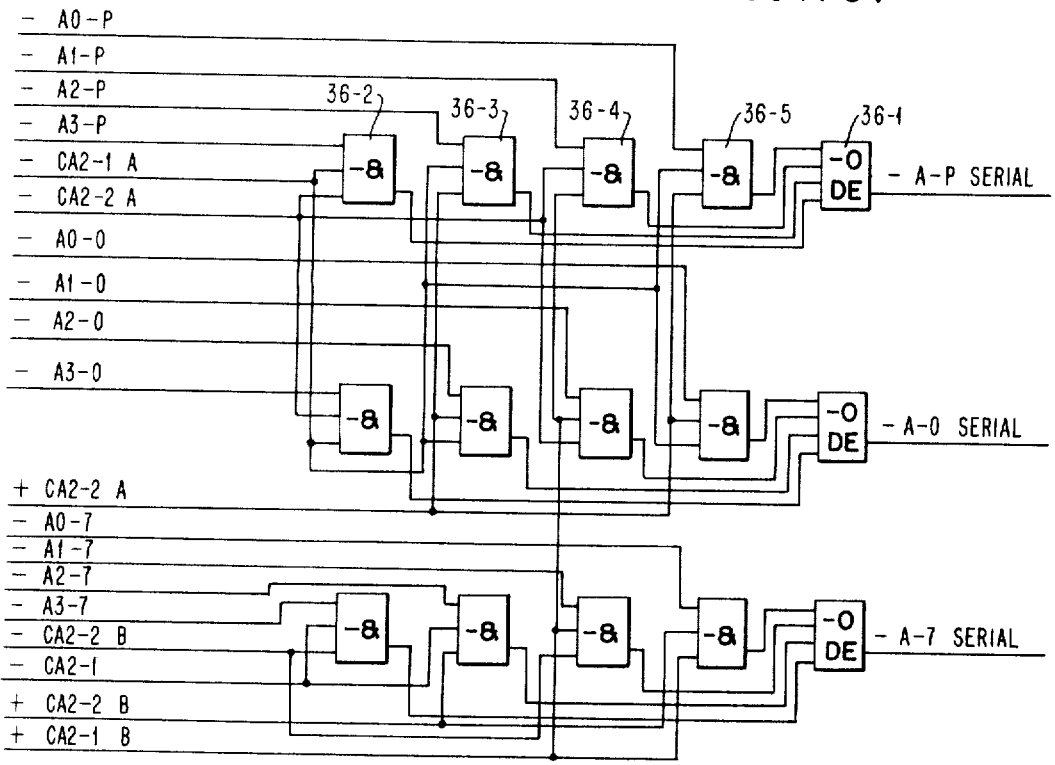

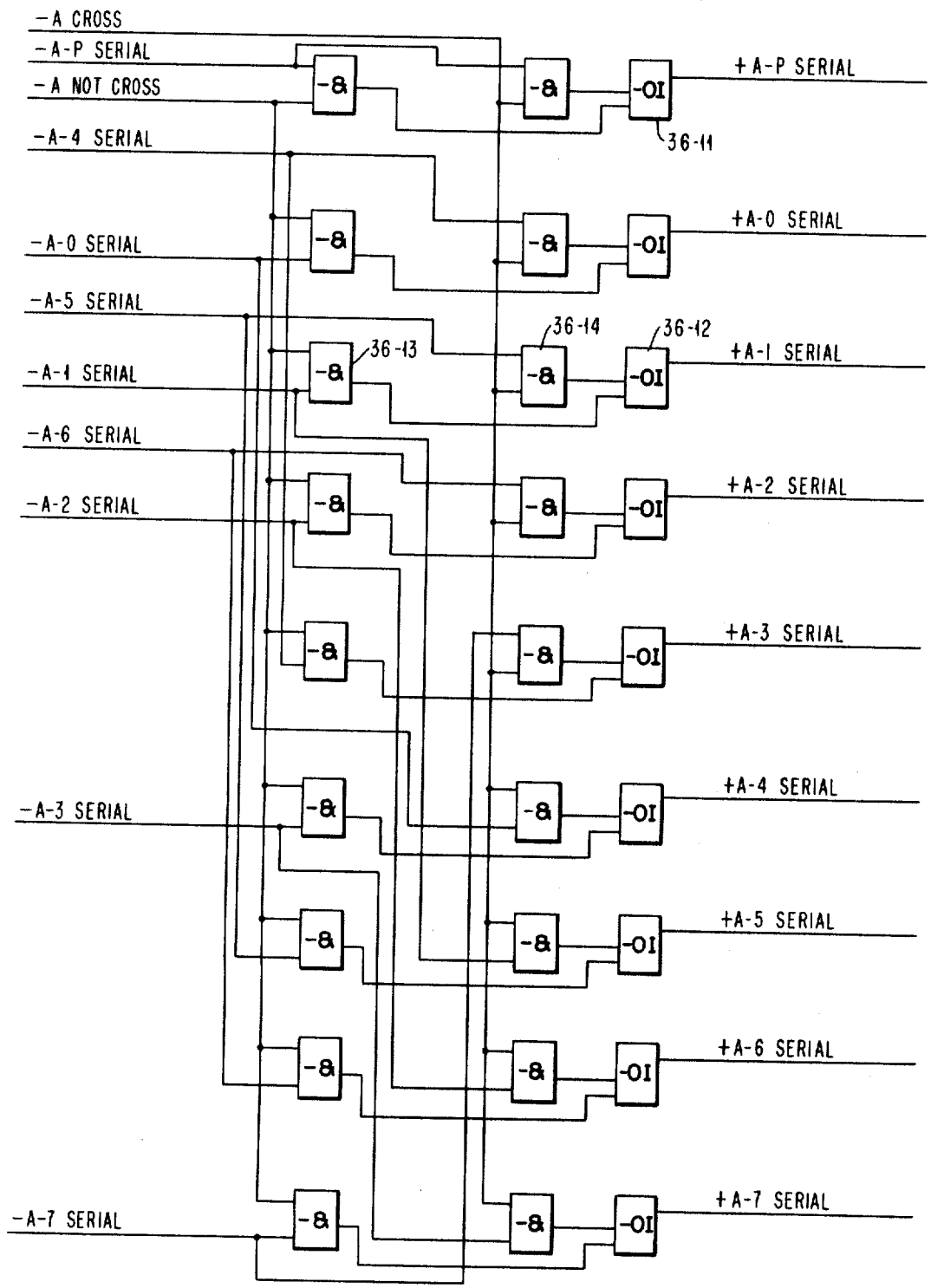

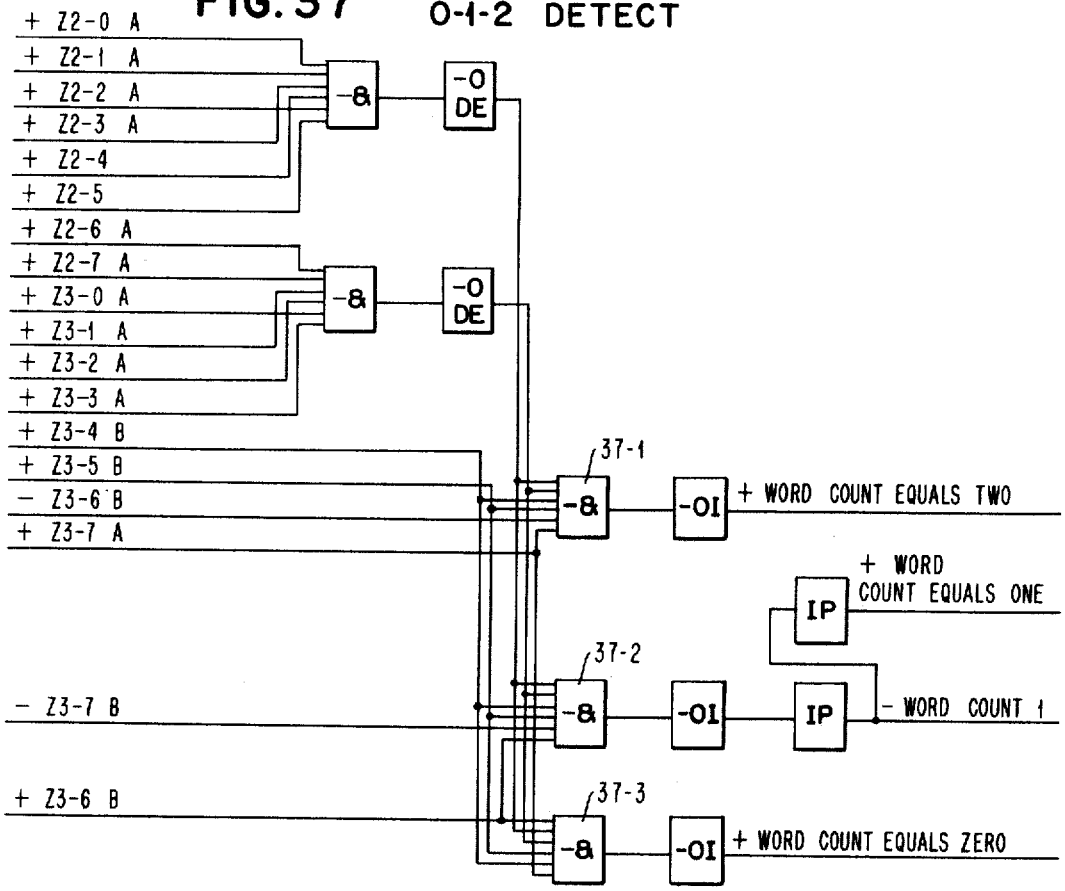
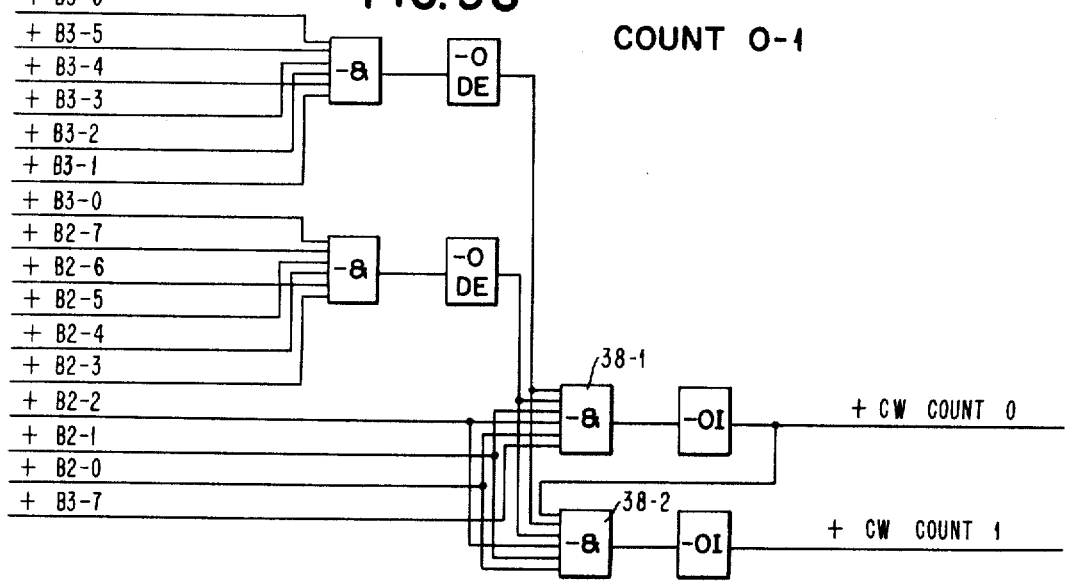

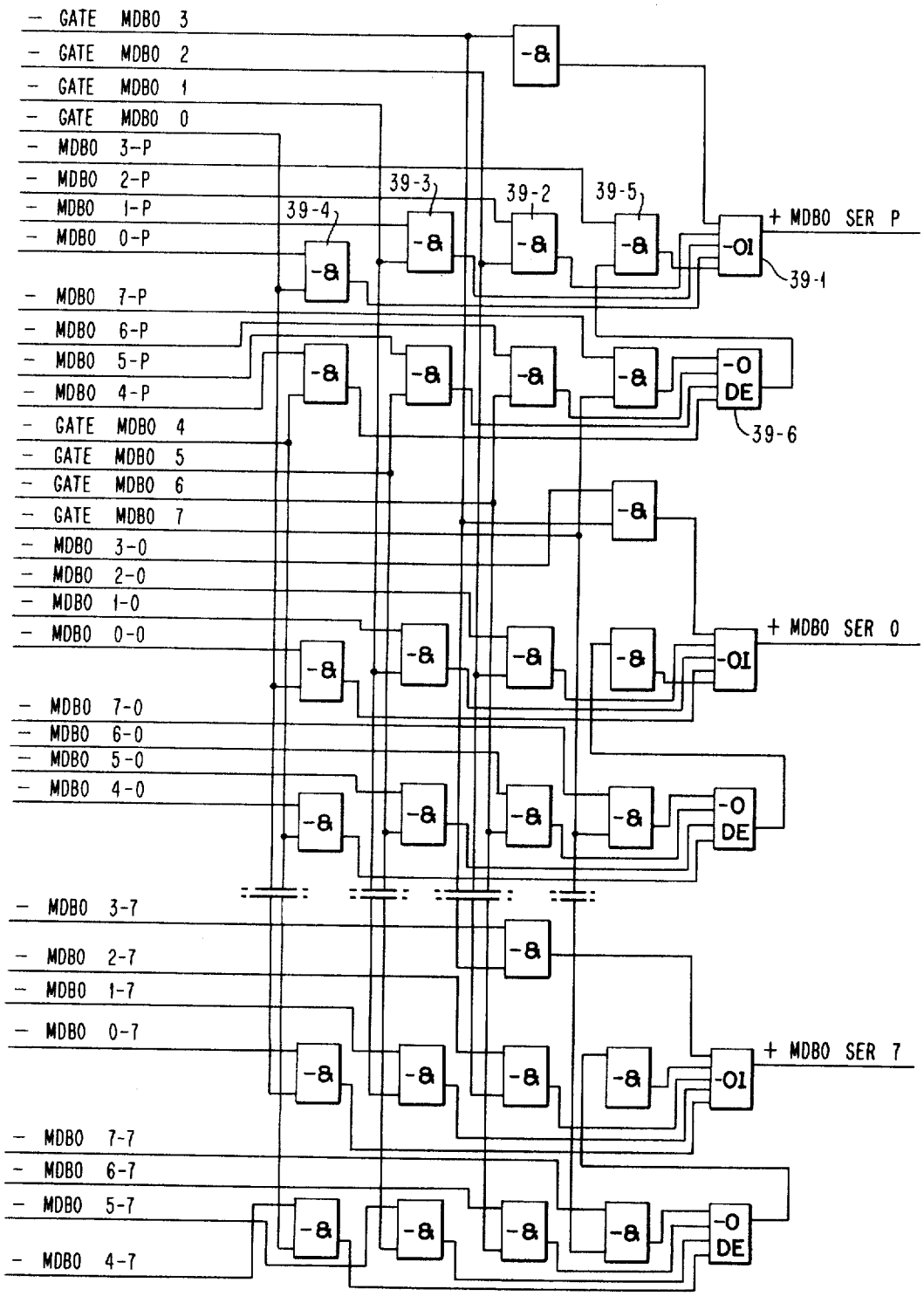
FIG. 39 MDBO SERIAL BITS

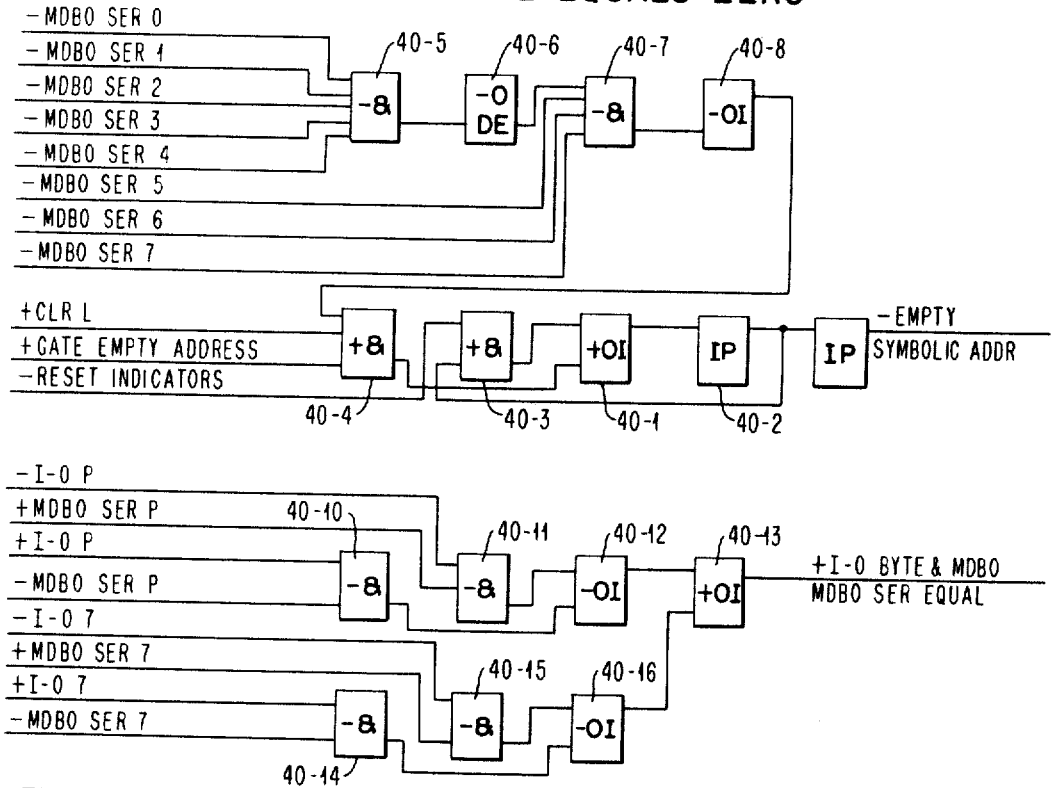
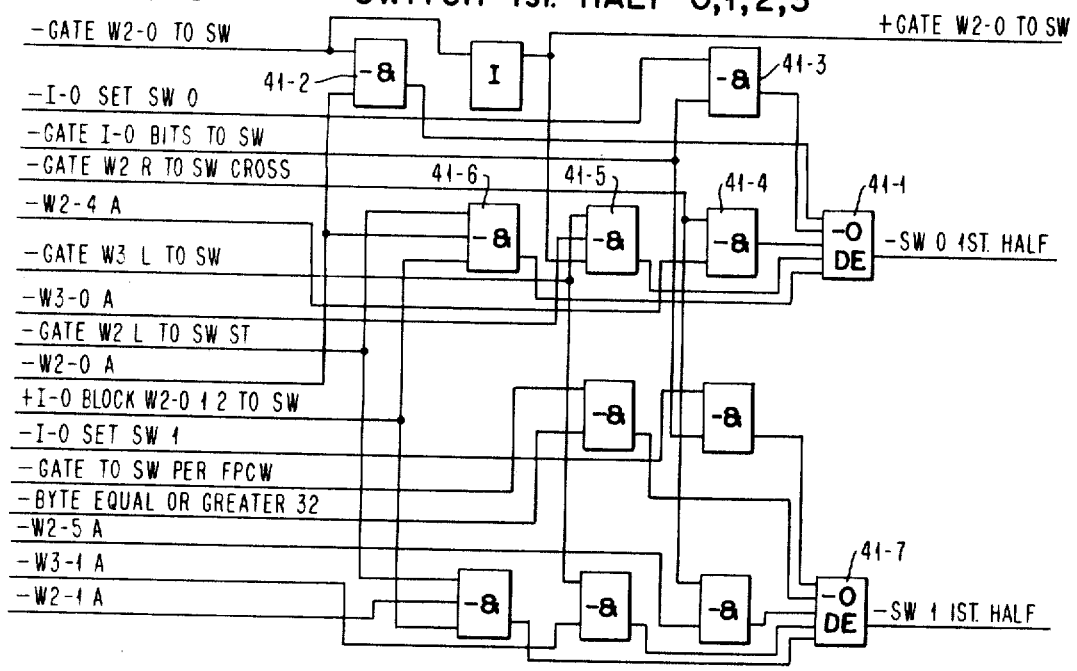

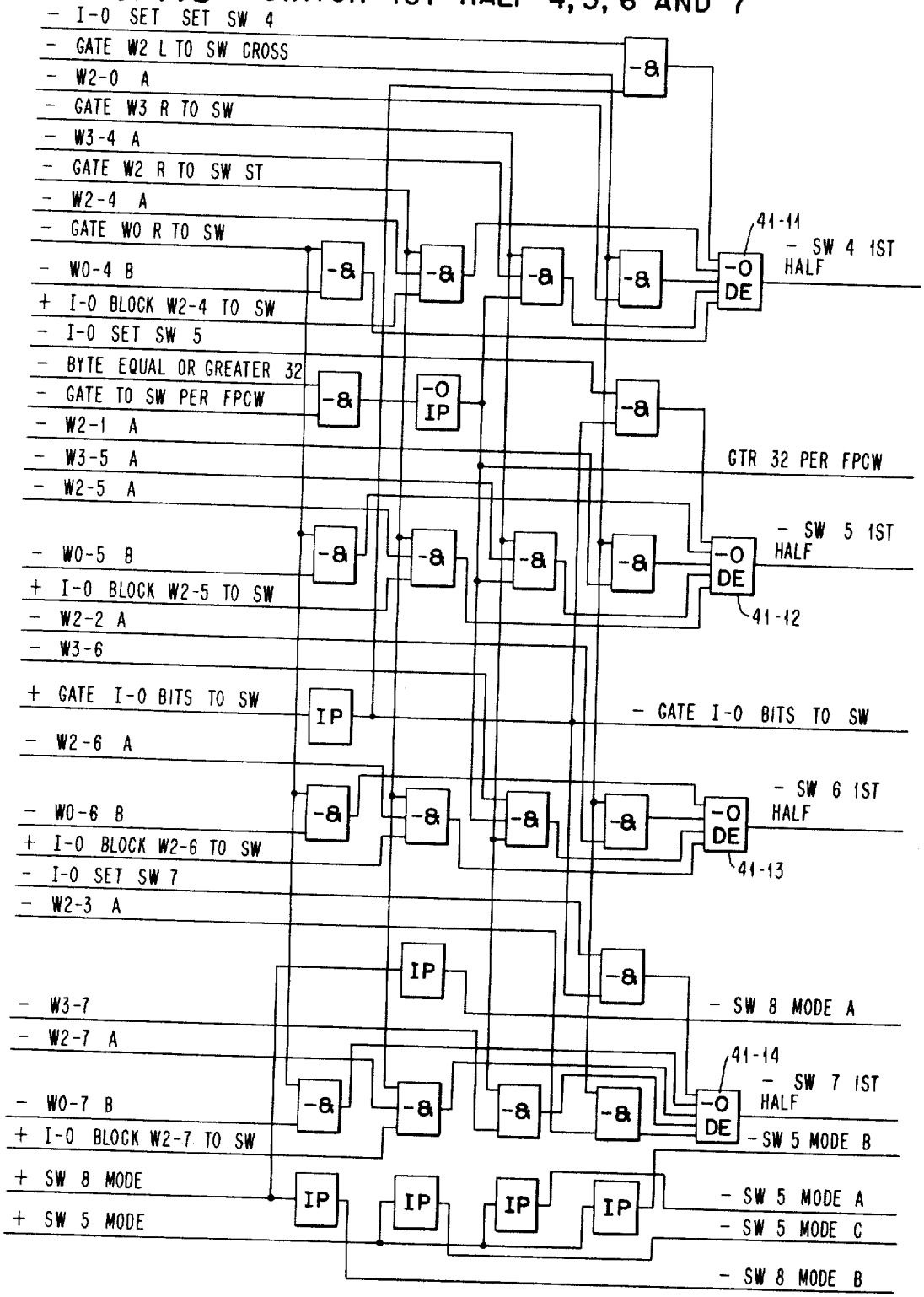
FIG.41b SWITCH 1ST HALF 4, 5, 6 AND 7

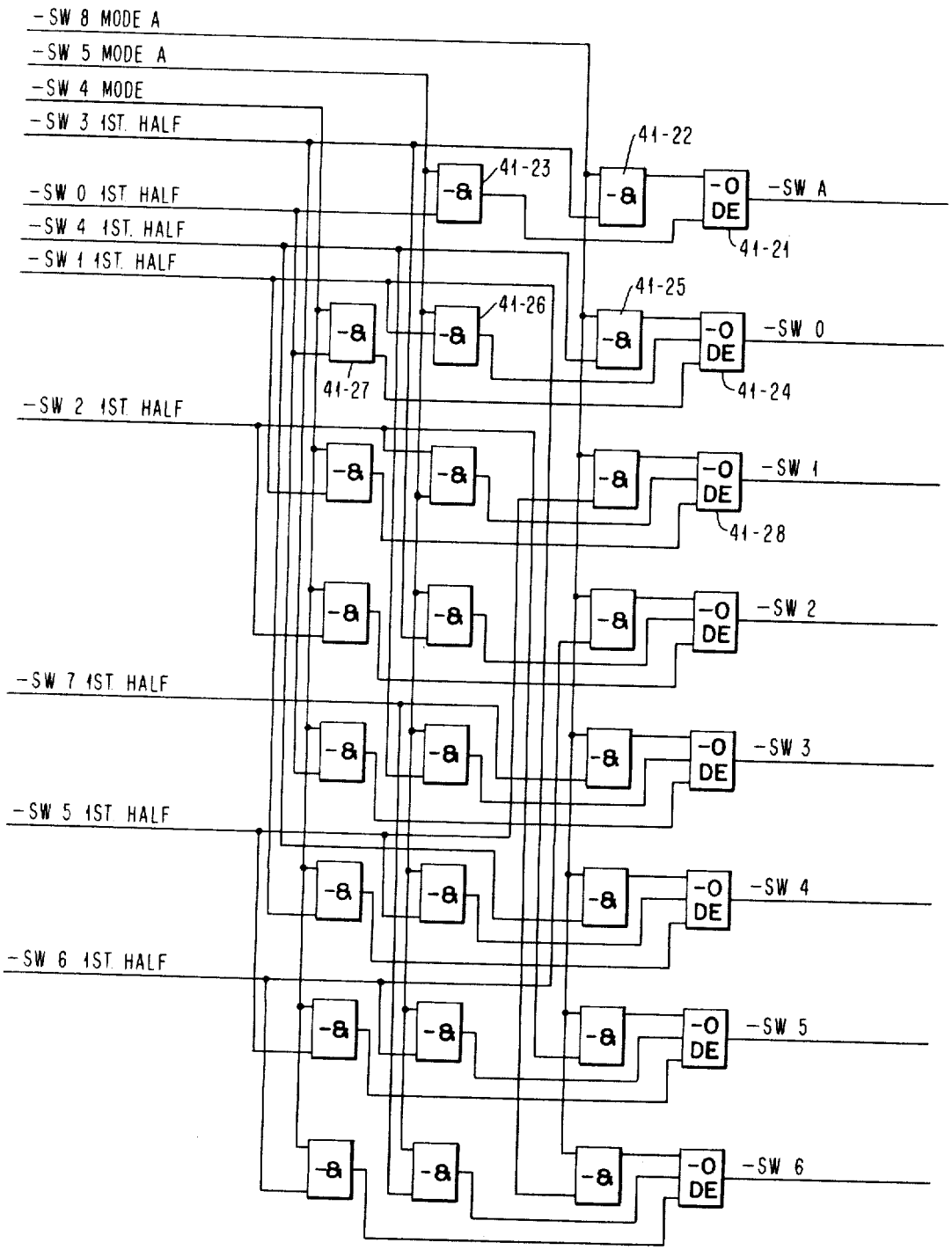
FIG. 41c   SWITCH 2nd. HALF

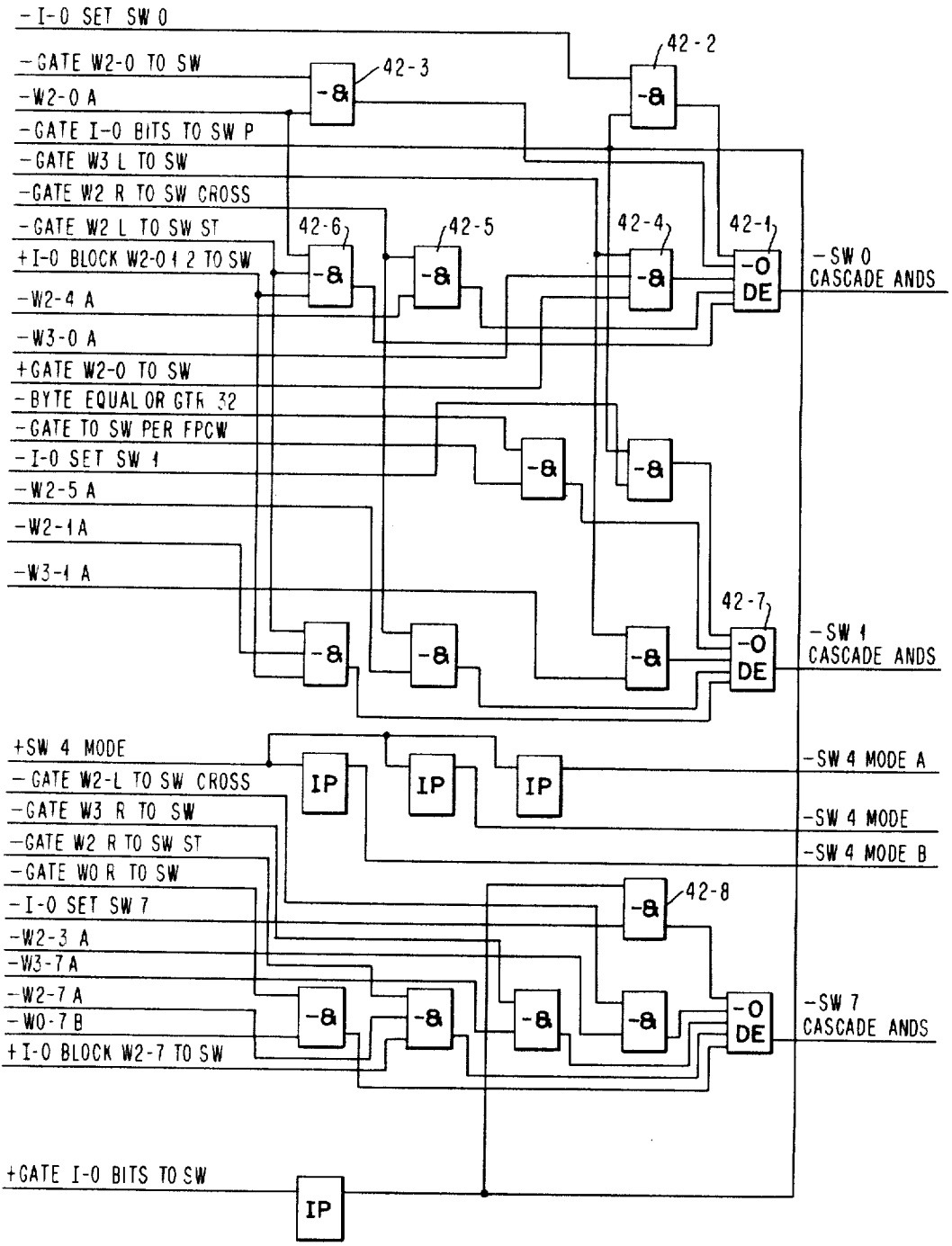
FIG. 42 SWITCH PARITY CASCADE ANDS

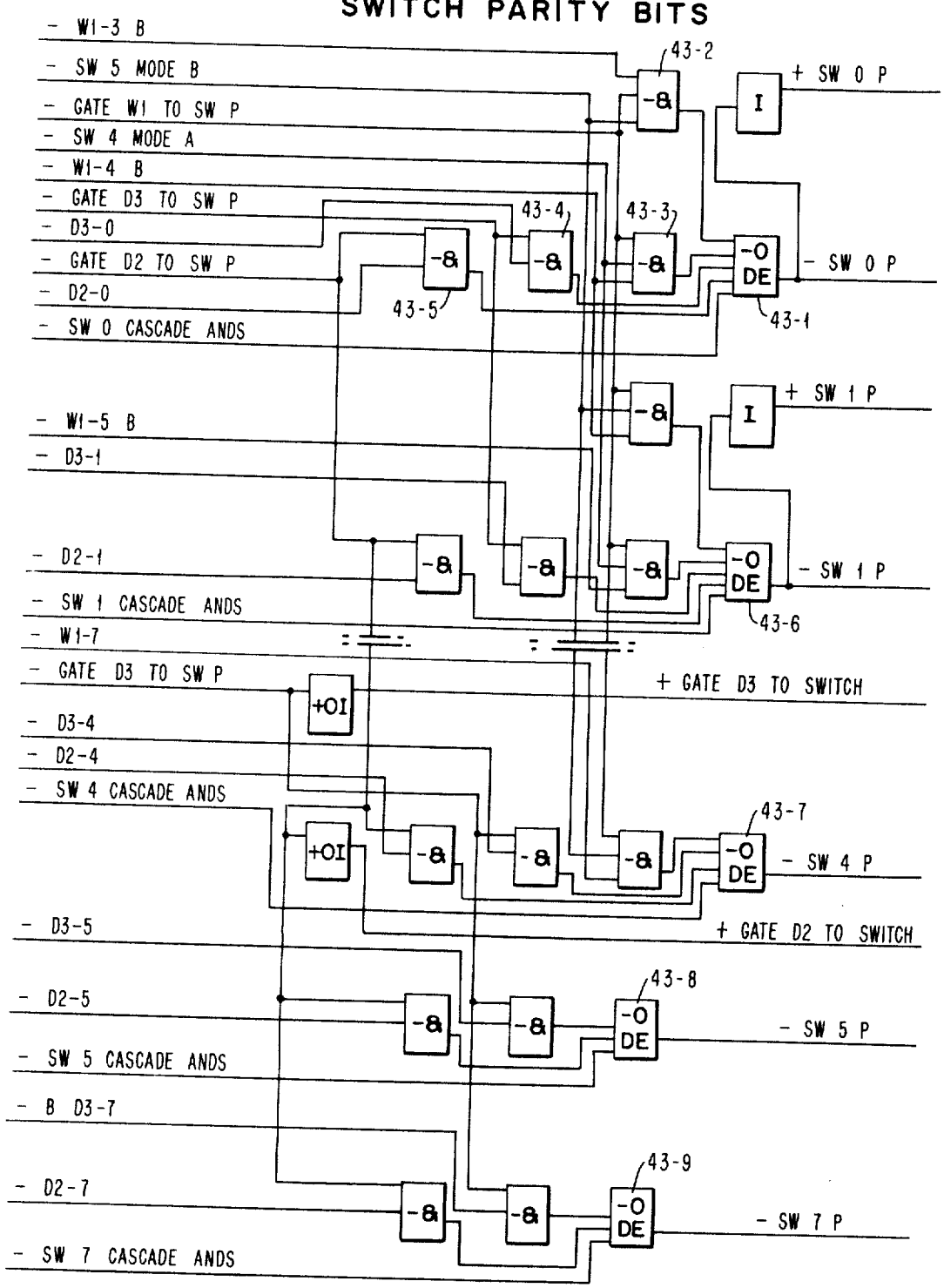
FIG.43 SWITCH PARITY BITS

June 27, 1967

G. A. BLAAUW ET AL 3,328,771

PRIORITY SEQUENCE CONTROL

Filed June 30, 1964

MAR ENCODER PARITY

June 27, 1967   G. A. BLAAUW ET AL   3,328,771
PRIORITY SEQUENCE CONTROL
Filed June 30, 1964   155 Sheets-Sheet 48

MDBO TO X AND Y CONTROLS

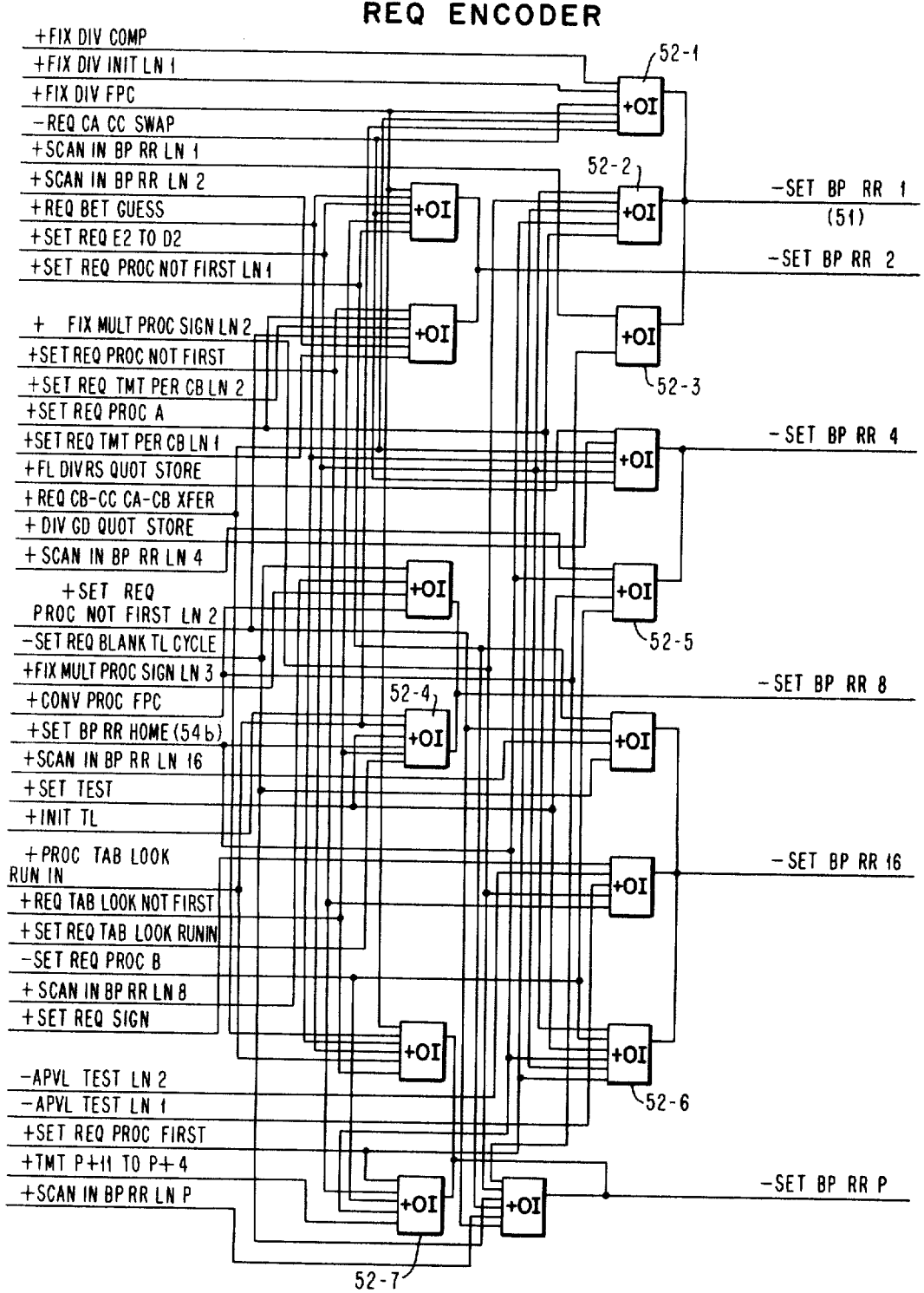

June 27, 1967

G. A. BLAAUW ET AL 3,328,771

PRIORITY SEQUENCE CONTROL

Filed June 30, 1964

BYTE PROCESS DECODER

BYTE PROCESS DECODER

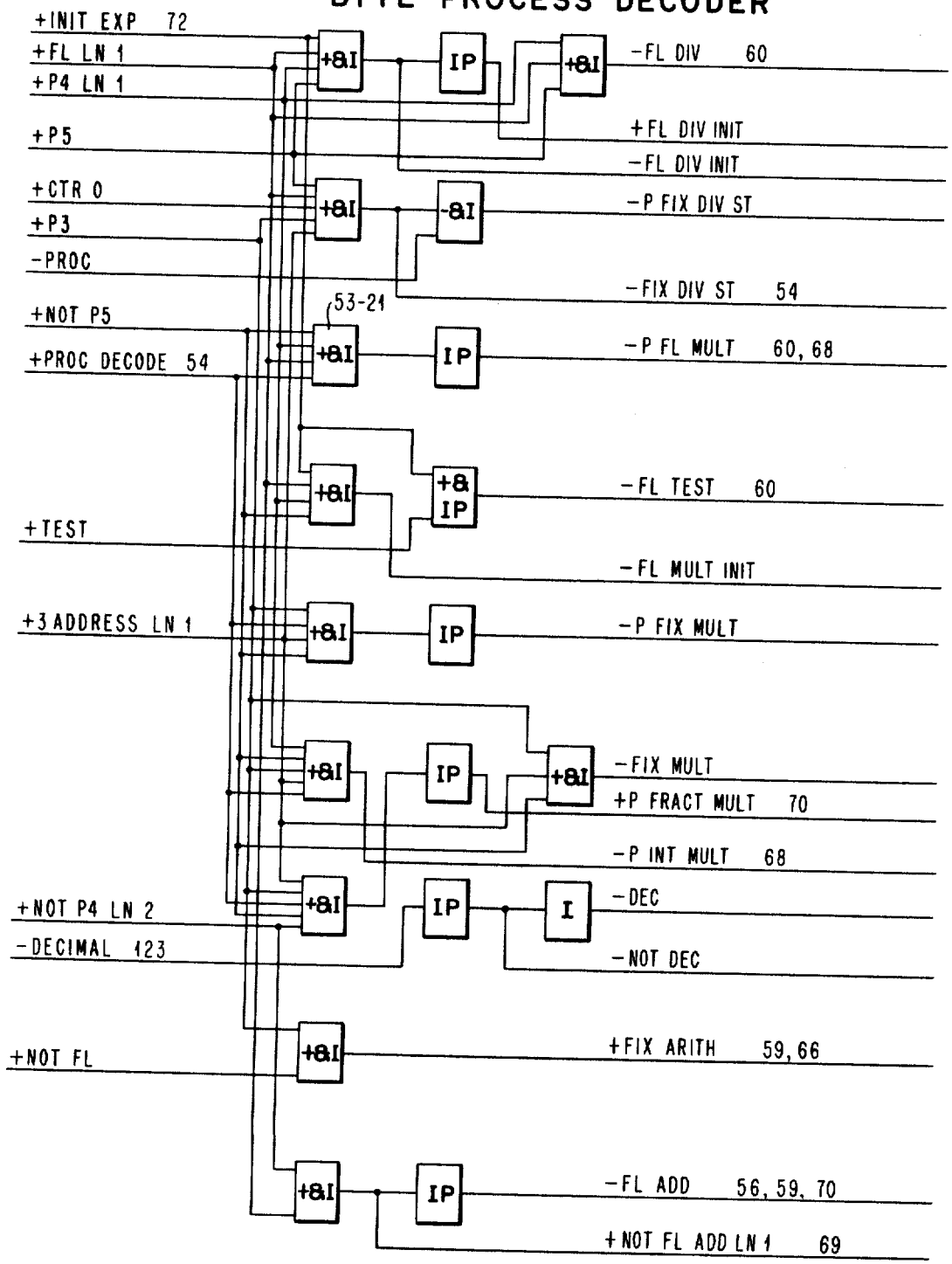

June 27, 1967  G. A. BLAAUW ET AL  3,328,771
PRIORITY SEQUENCE CONTROL
Filed June 30, 1964  153 Sheets-Sheet 58

BYTE PROCESS DECODER

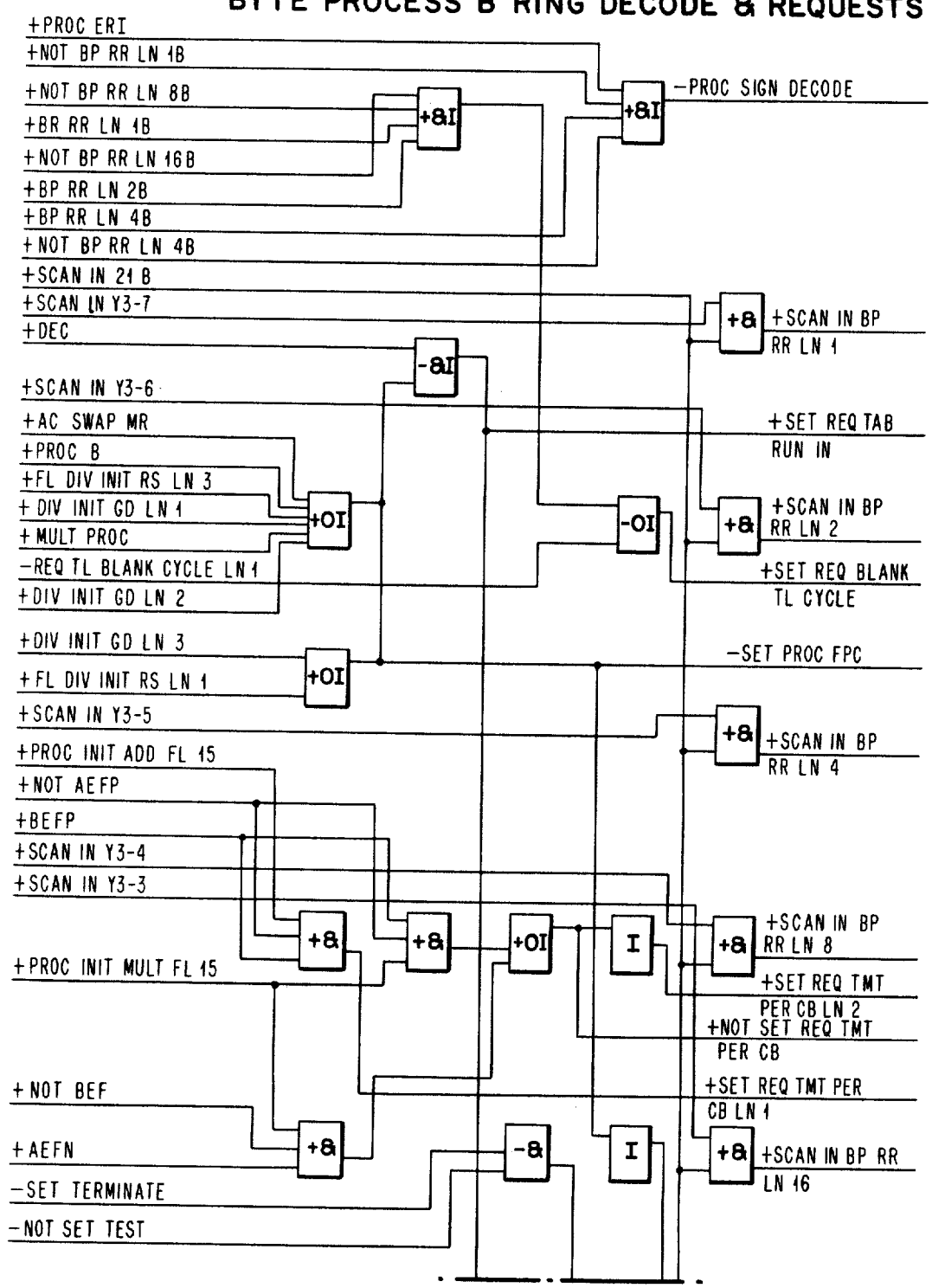
FIG.54a  BYTE PROCESS B RING DECODE & REQUESTS

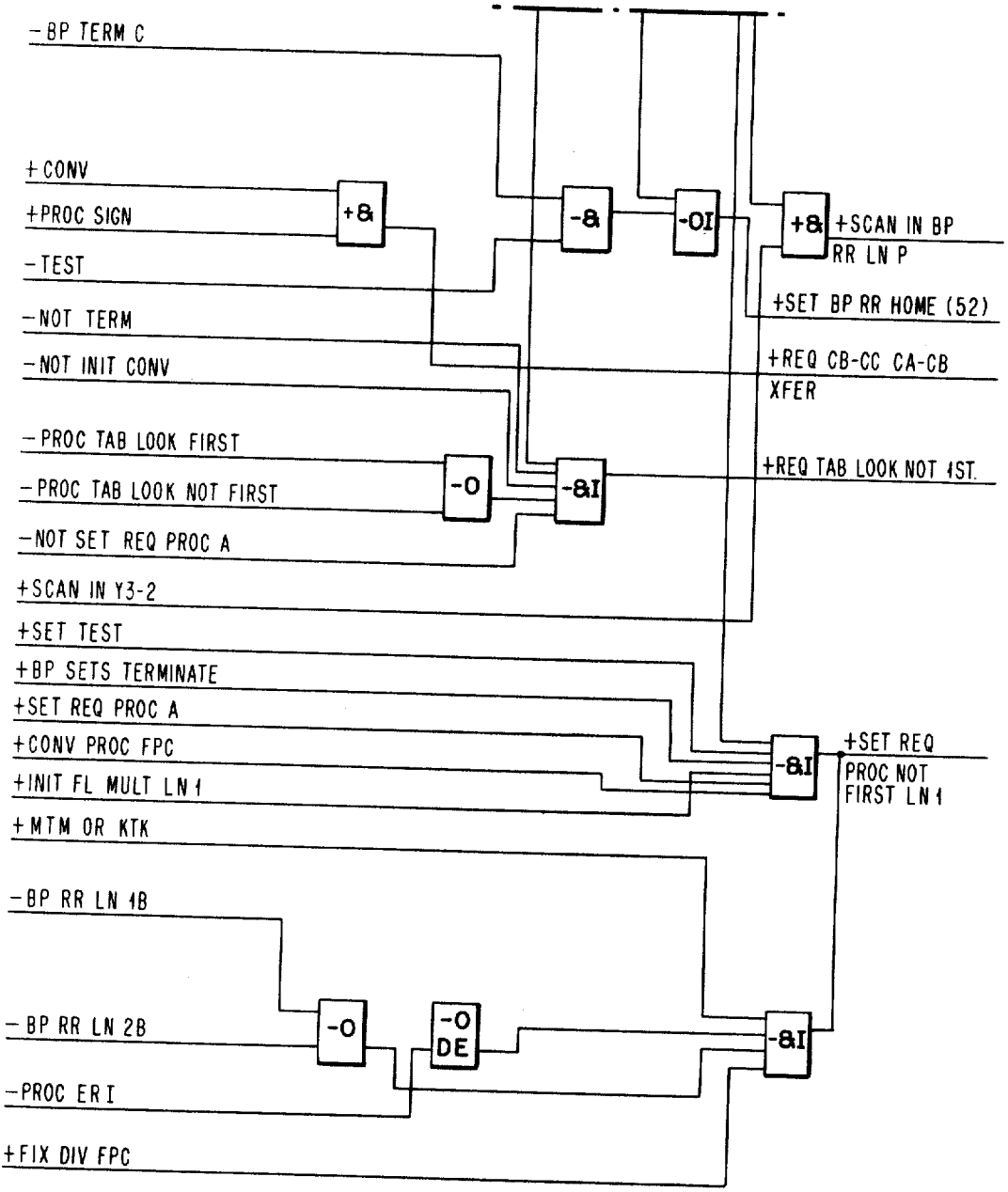
FIG.54b BYTE PROCESS B RING DECODE & REQUESTS

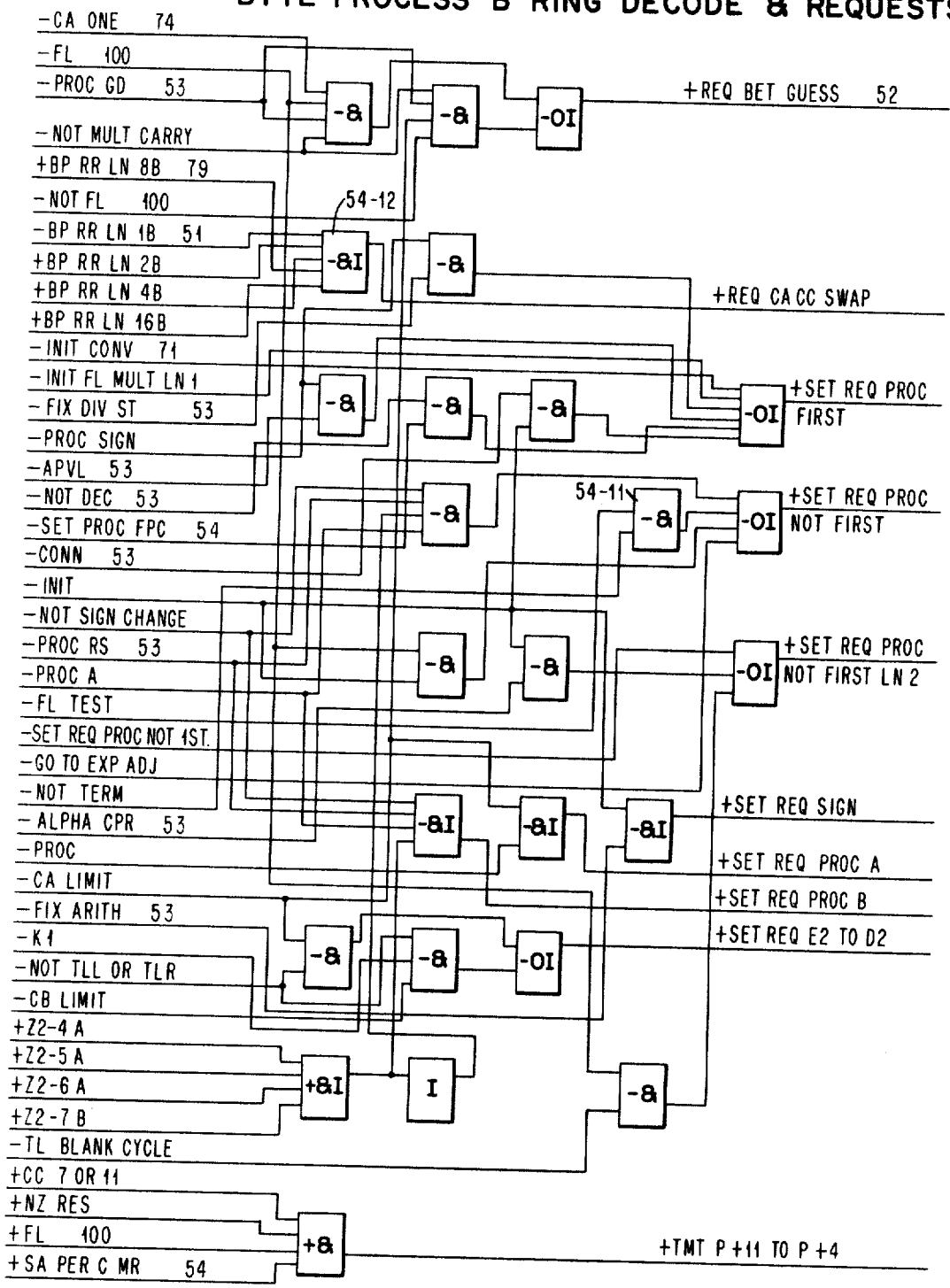
FIG. 54c  BYTE PROCESS B RING DECODE & REQUESTS

June 27, 1967 G. A. BLAAUW ET AL 3,328,771
PRIORITY SEQUENCE CONTROL
Filed June 30, 1964 153 Sheets-Sheet 62

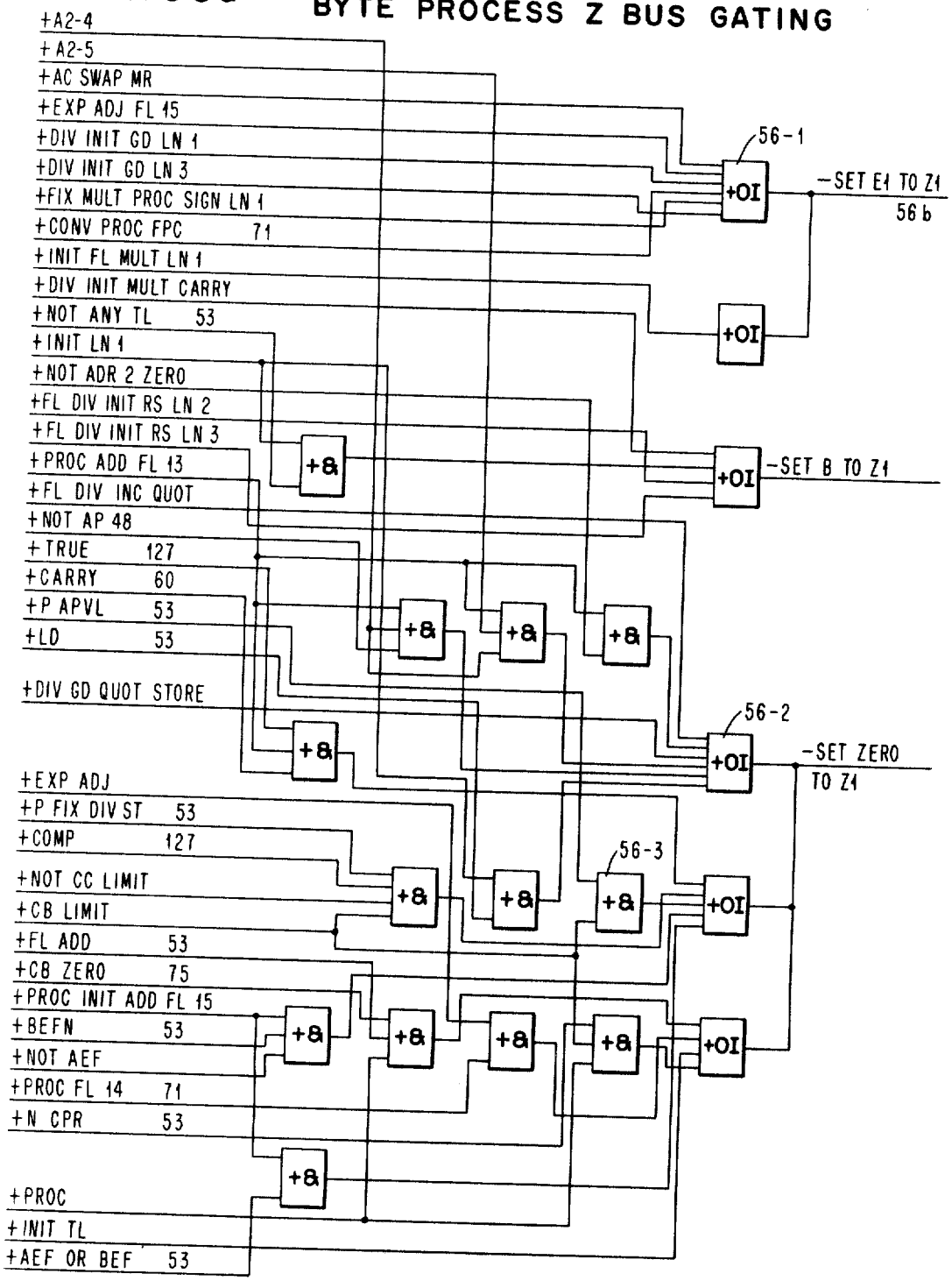
FIG. 56a  BYTE PROCESS Z BUS GATING

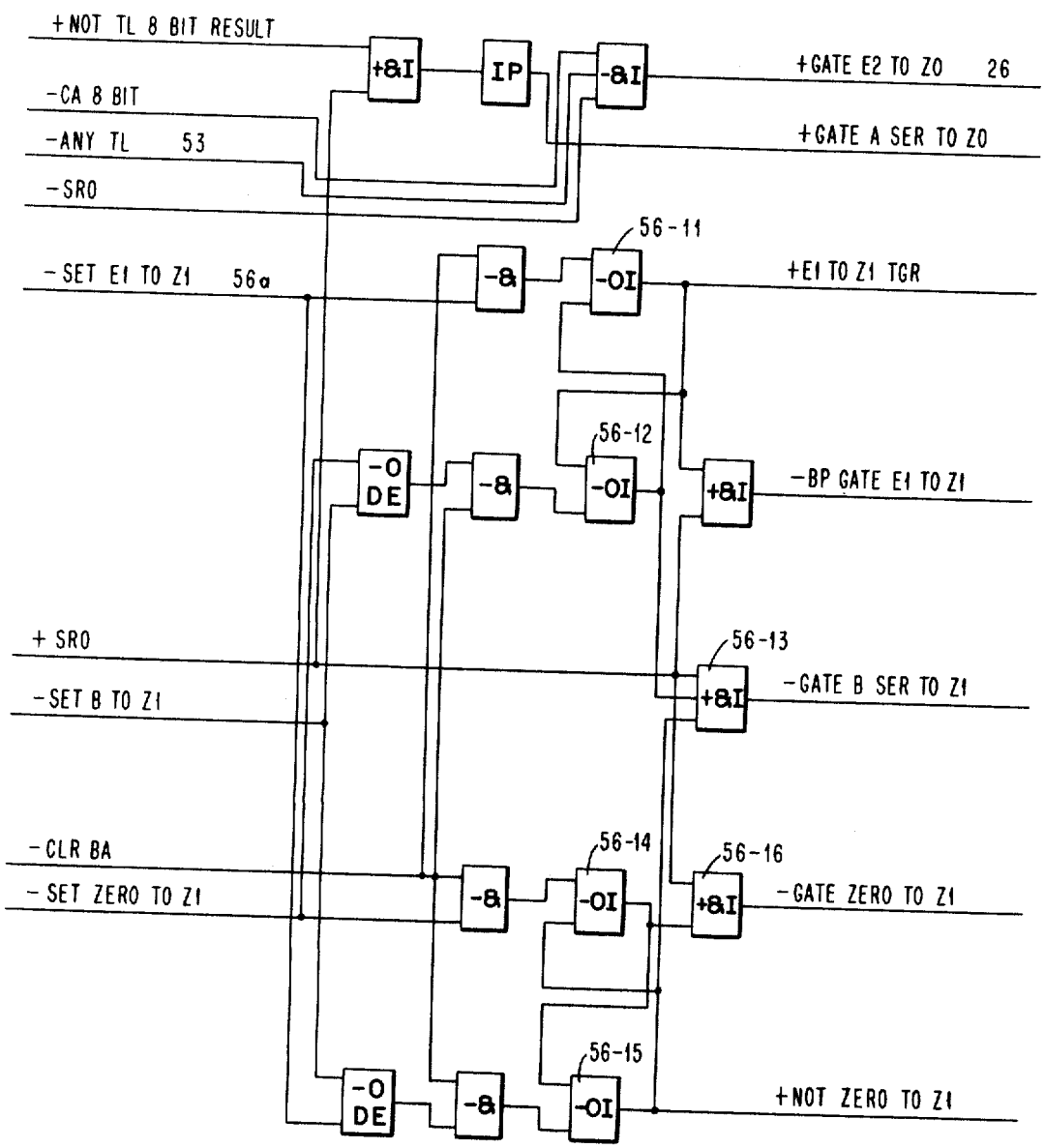

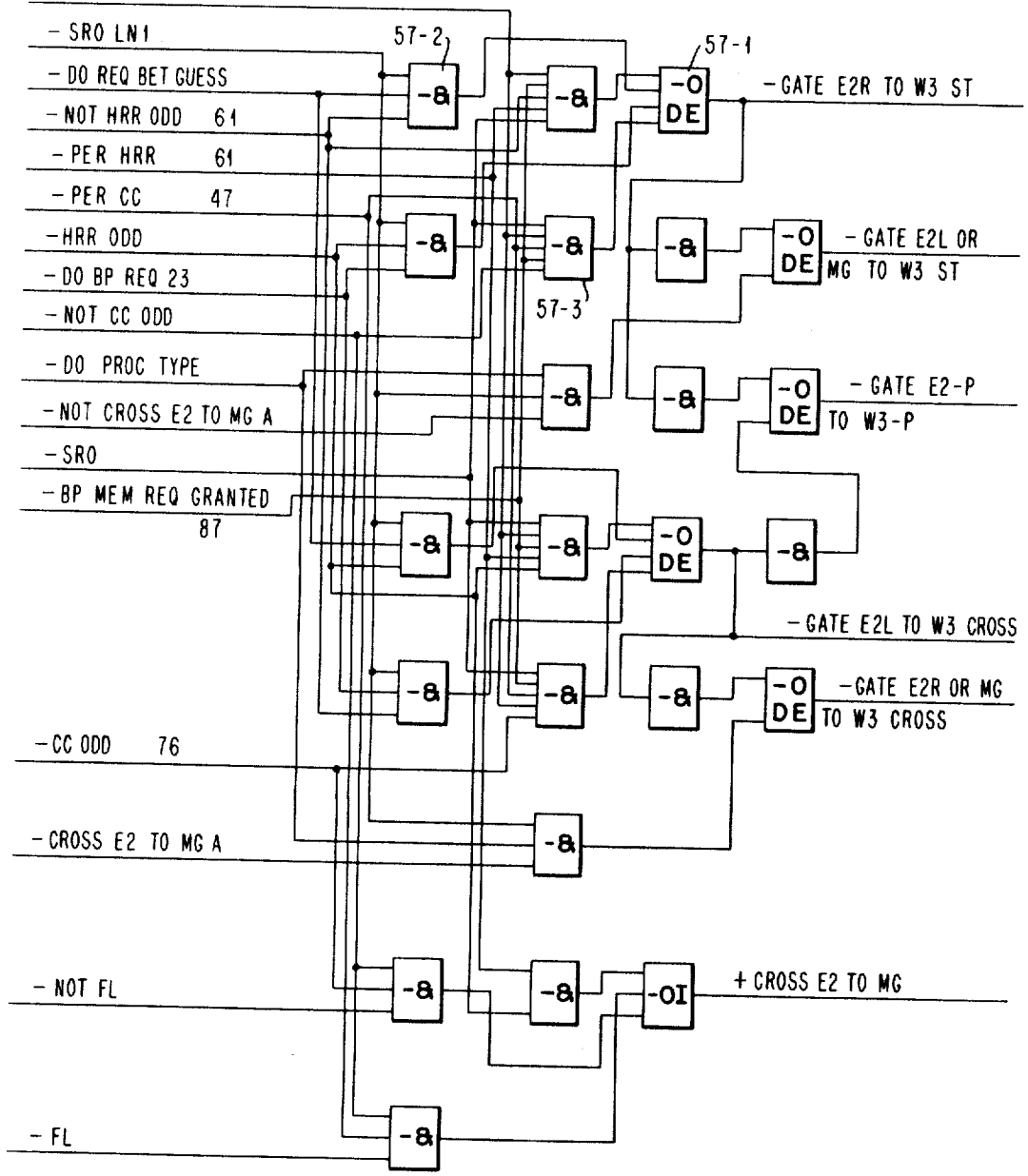
FIG. 57  W3 BUS GATING

June 27, 1967          G. A. BLAAUW ET AL          3,328,771
PRIORITY SEQUENCE CONTROL
Filed June 30, 1964          153 Sheets—Sheet 66
FIG. 58    BYTE PROCESS DATA FLAG CONTROLS
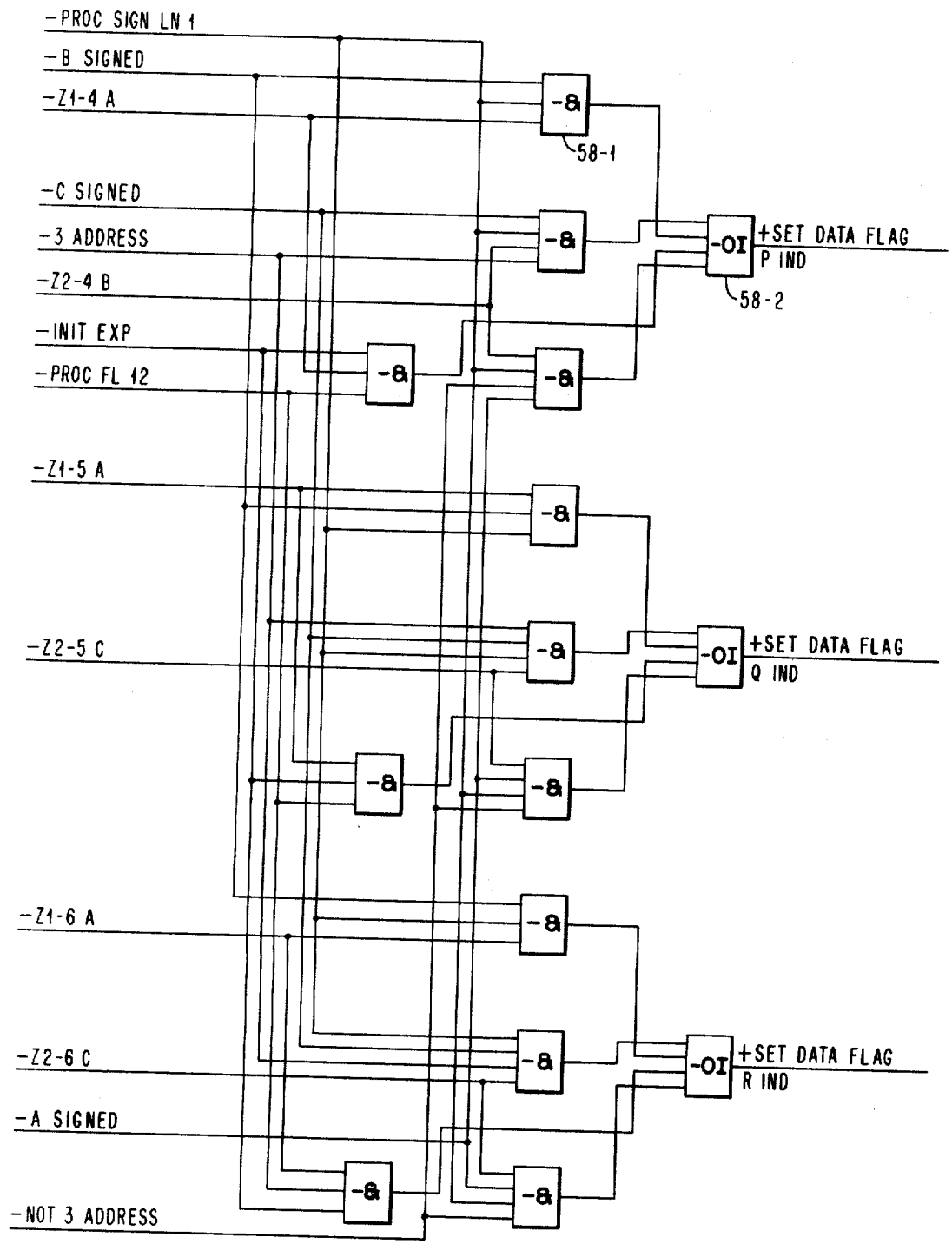

FIG. 59  CONDITION REGISTER CONTROLS
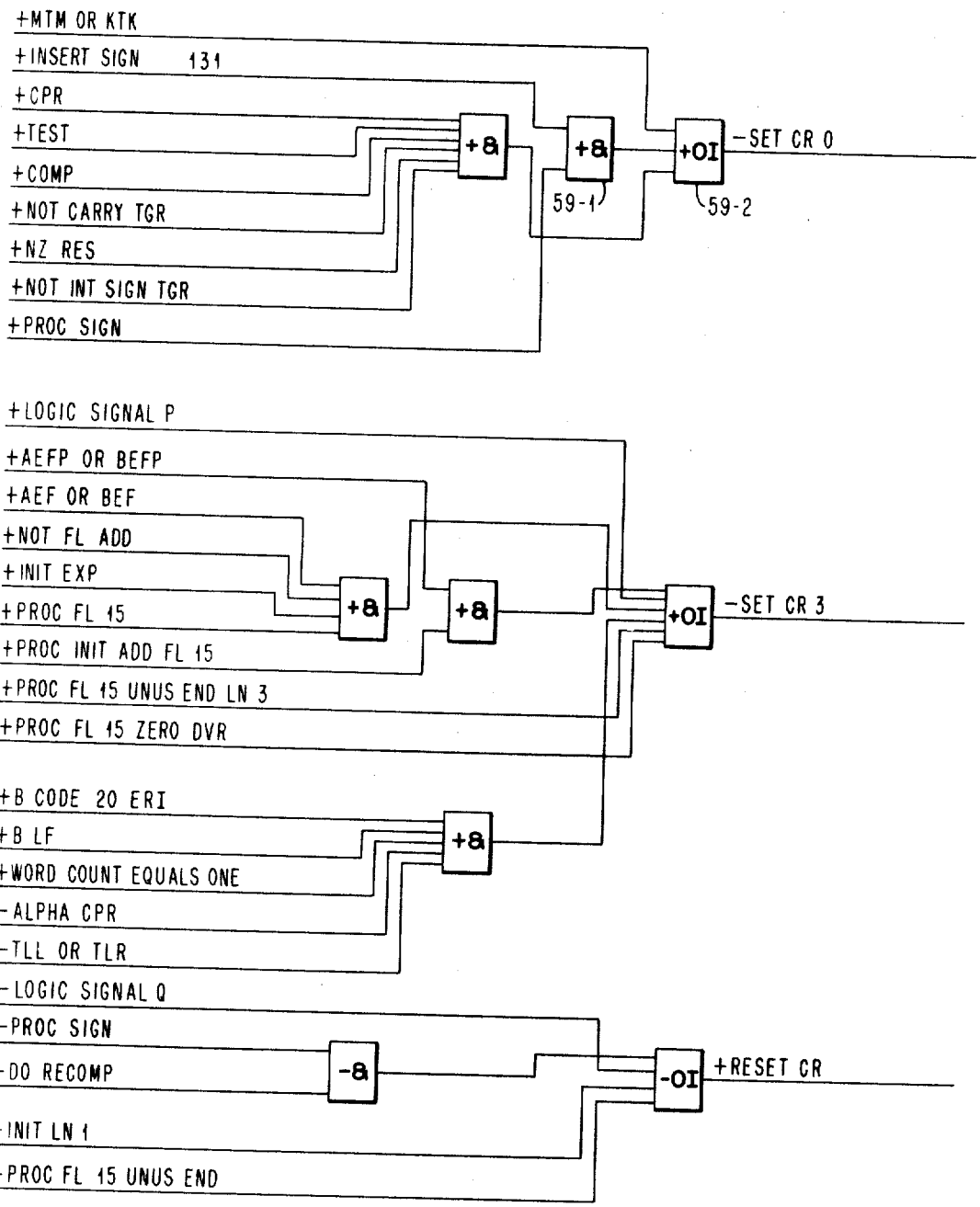

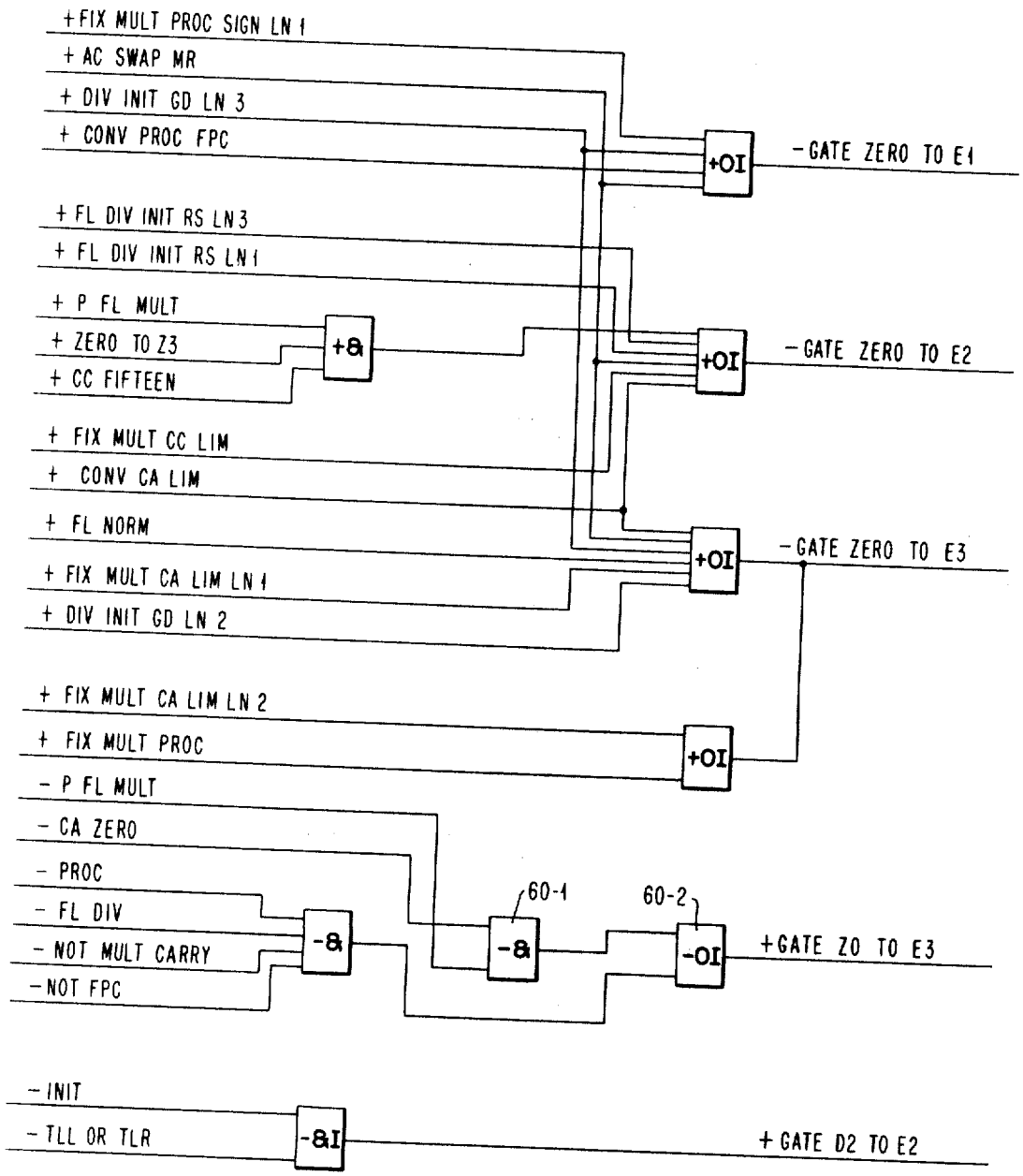
FIG. 60a  REGISTER E GATING

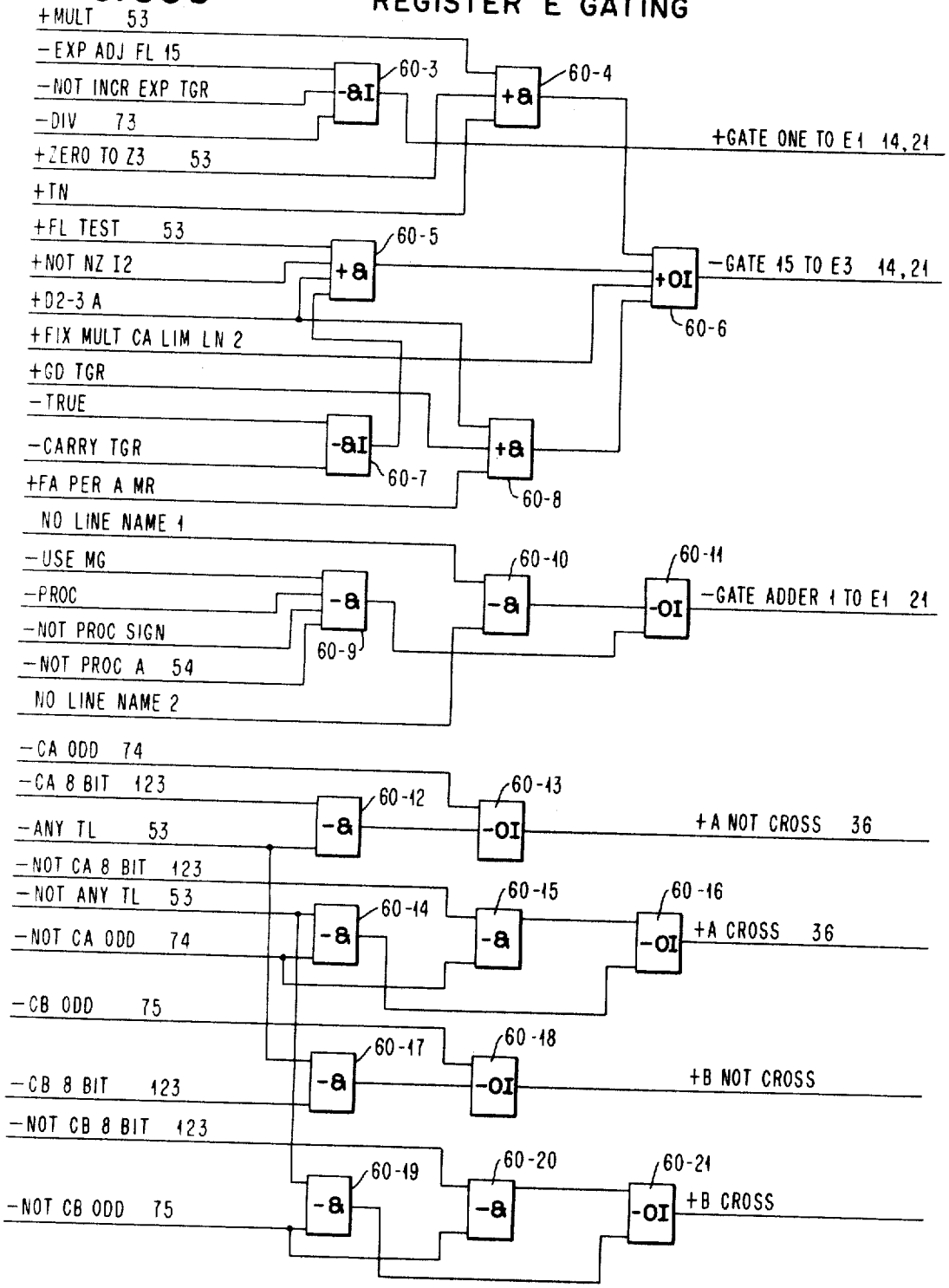
FIG. 60b REGISTER E GATING

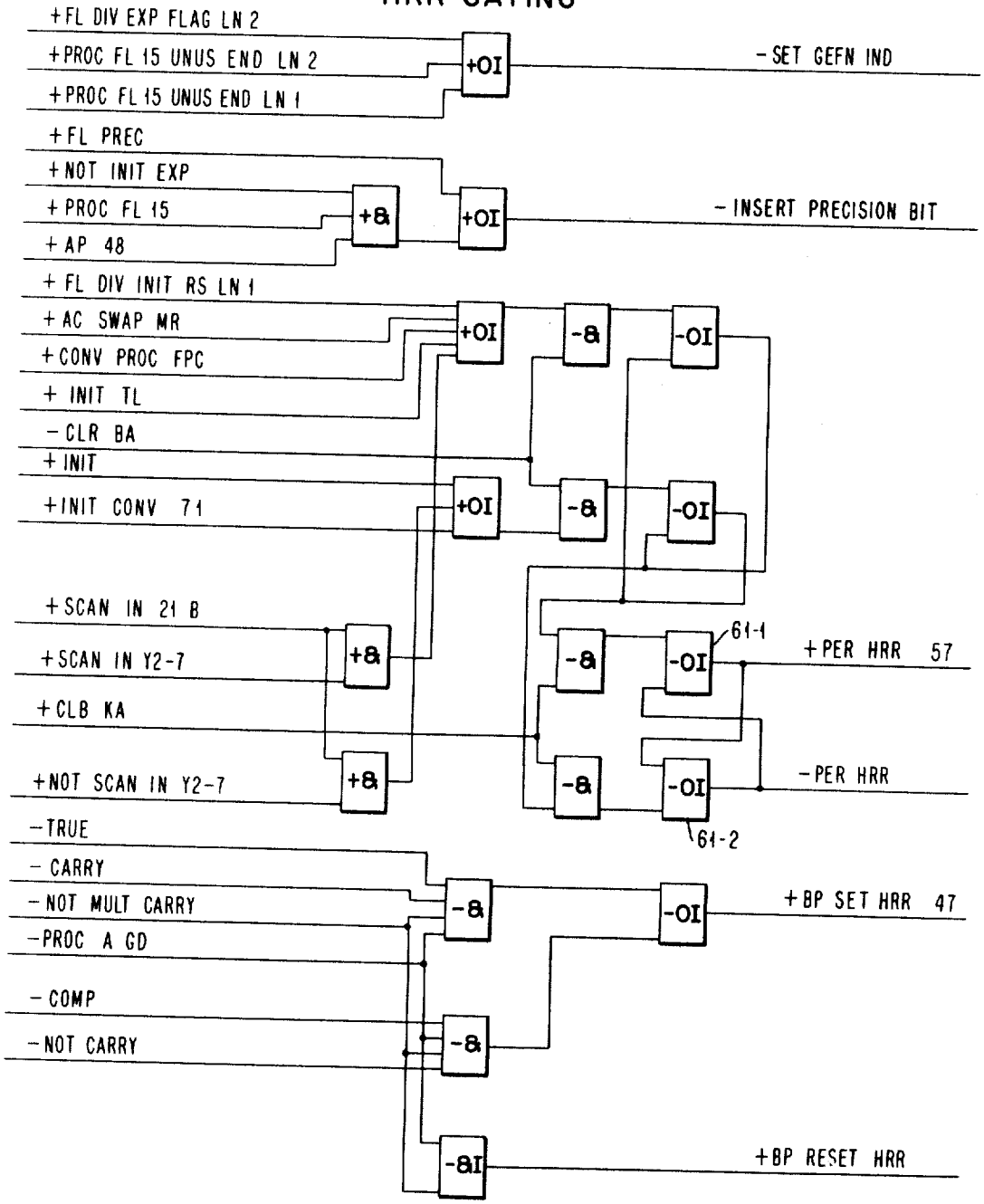
FIG. 61 HRR GATING

BYTE PROCESS SET TRUE

June 27, 1967
G. A. BLAAUW ET AL
3,328,771
PRIORITY SEQUENCE CONTROL
Filed June 30, 1964
153 Sheets-Sheet 72
FIG. 63  SET COMP SET CARRY
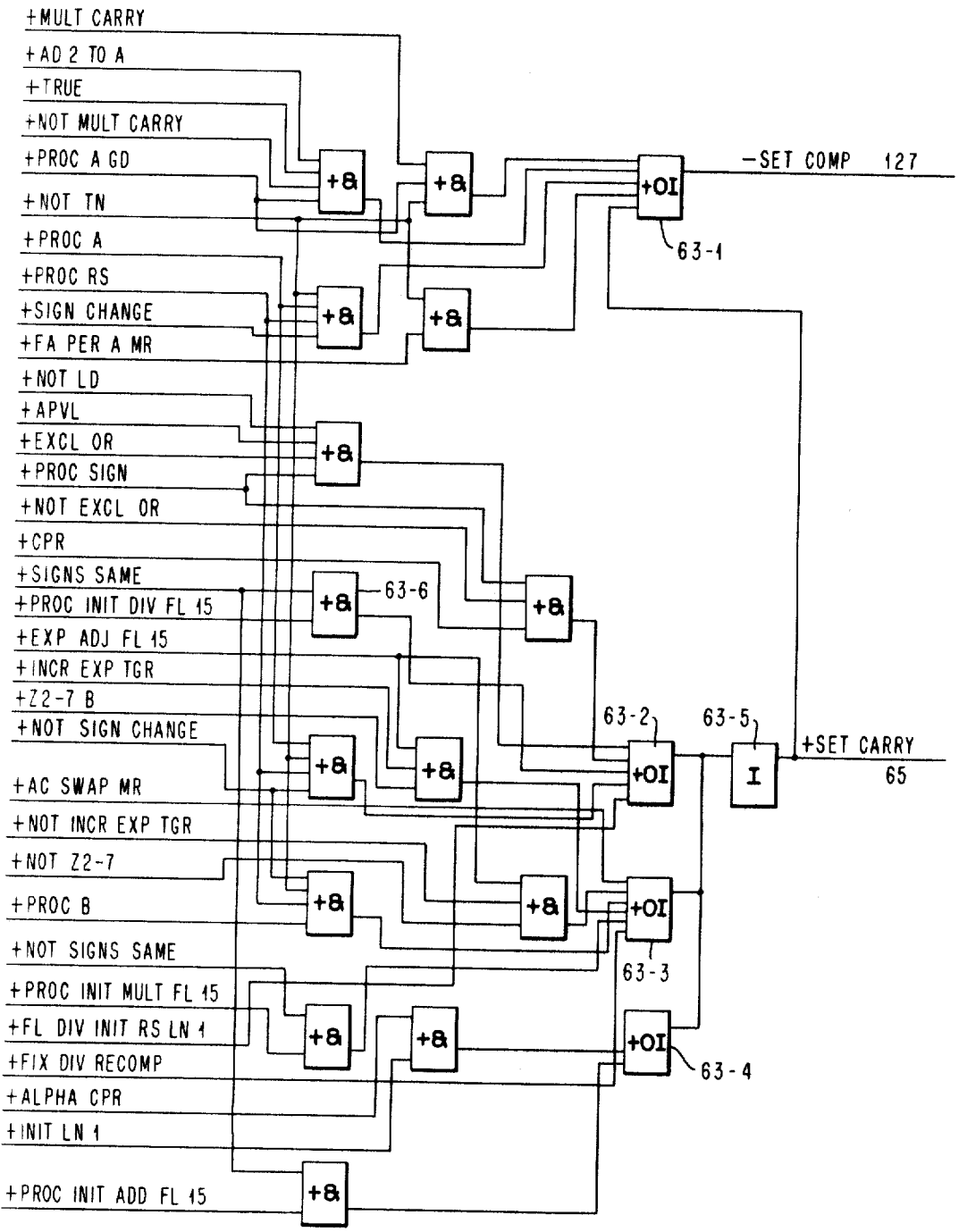

FIG. 64 SET TCR
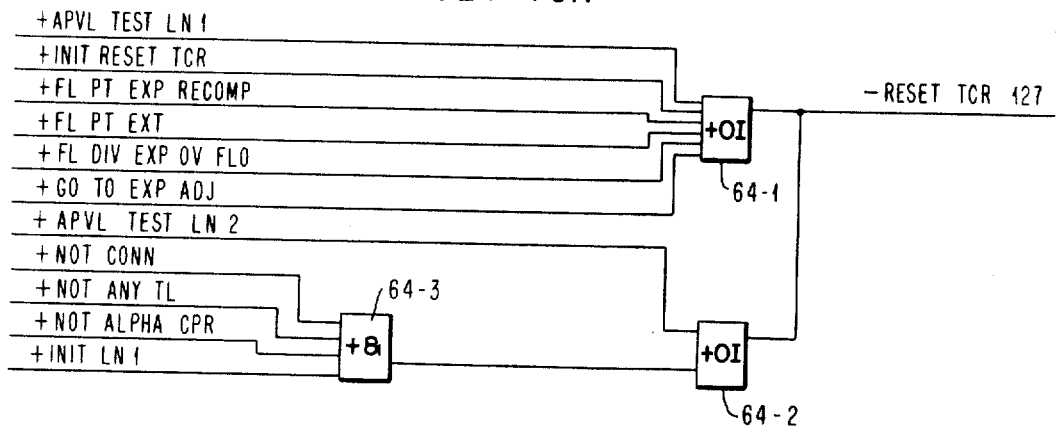
FIG. 65 SET RECOMP
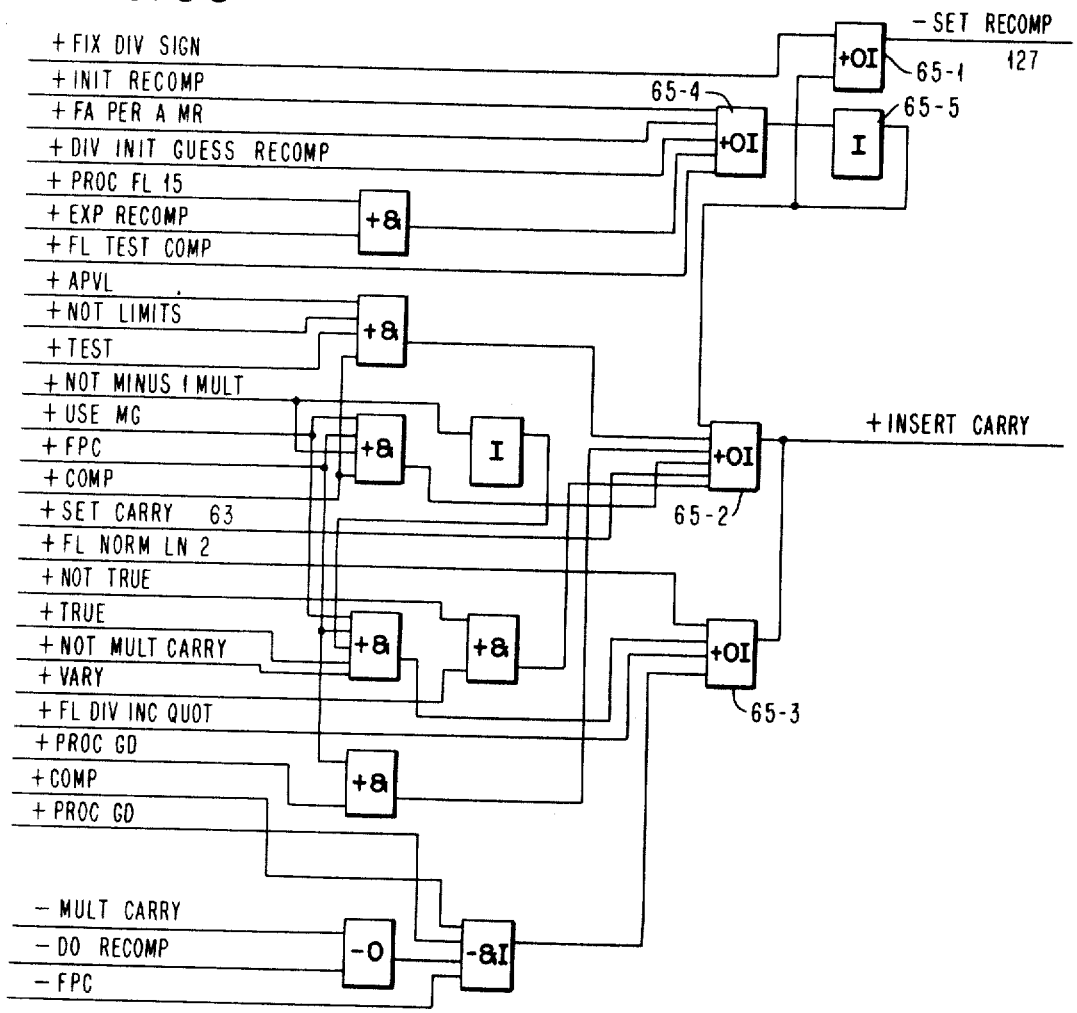

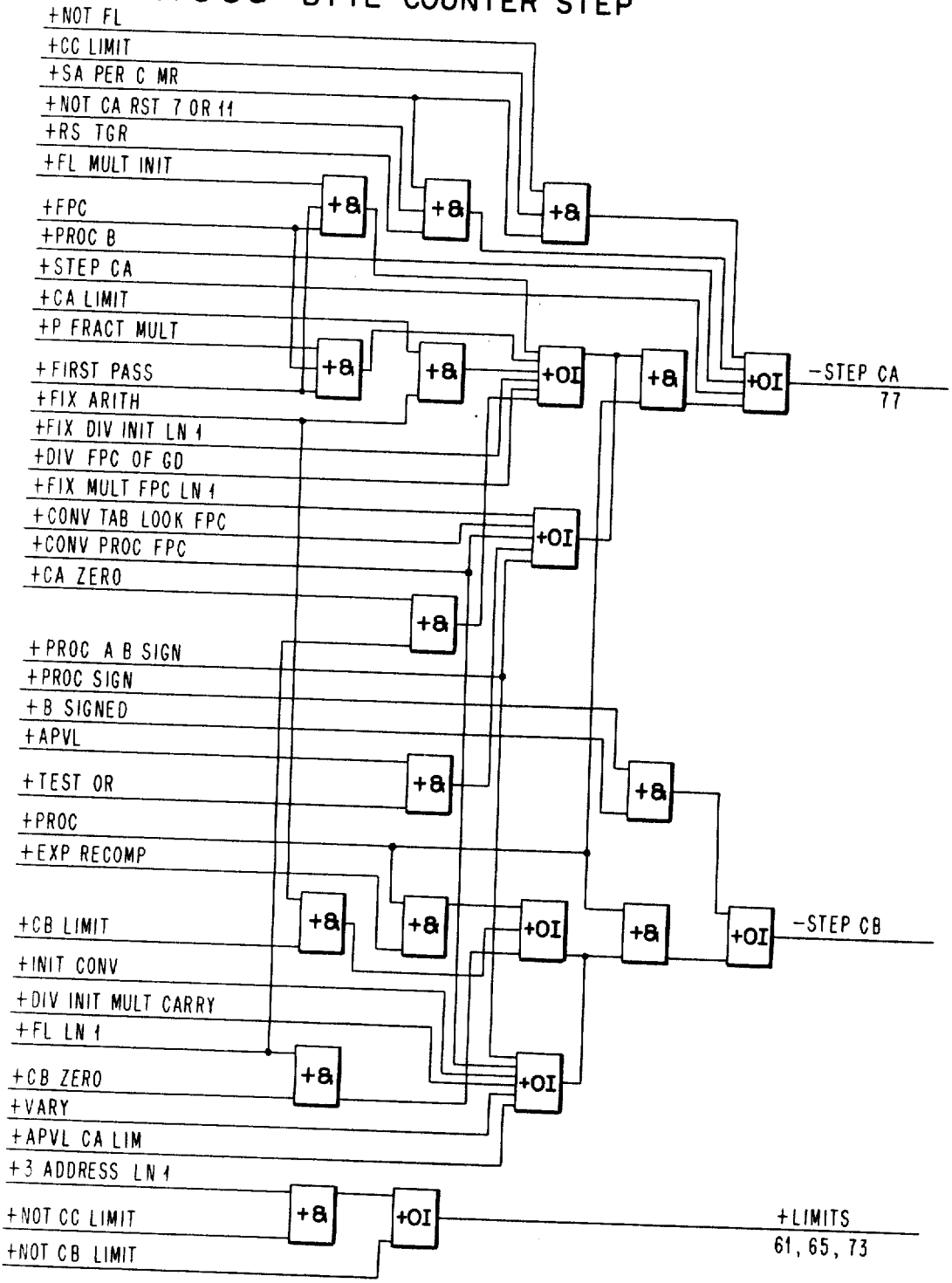
FIG. 66a BYTE COUNTER STEP

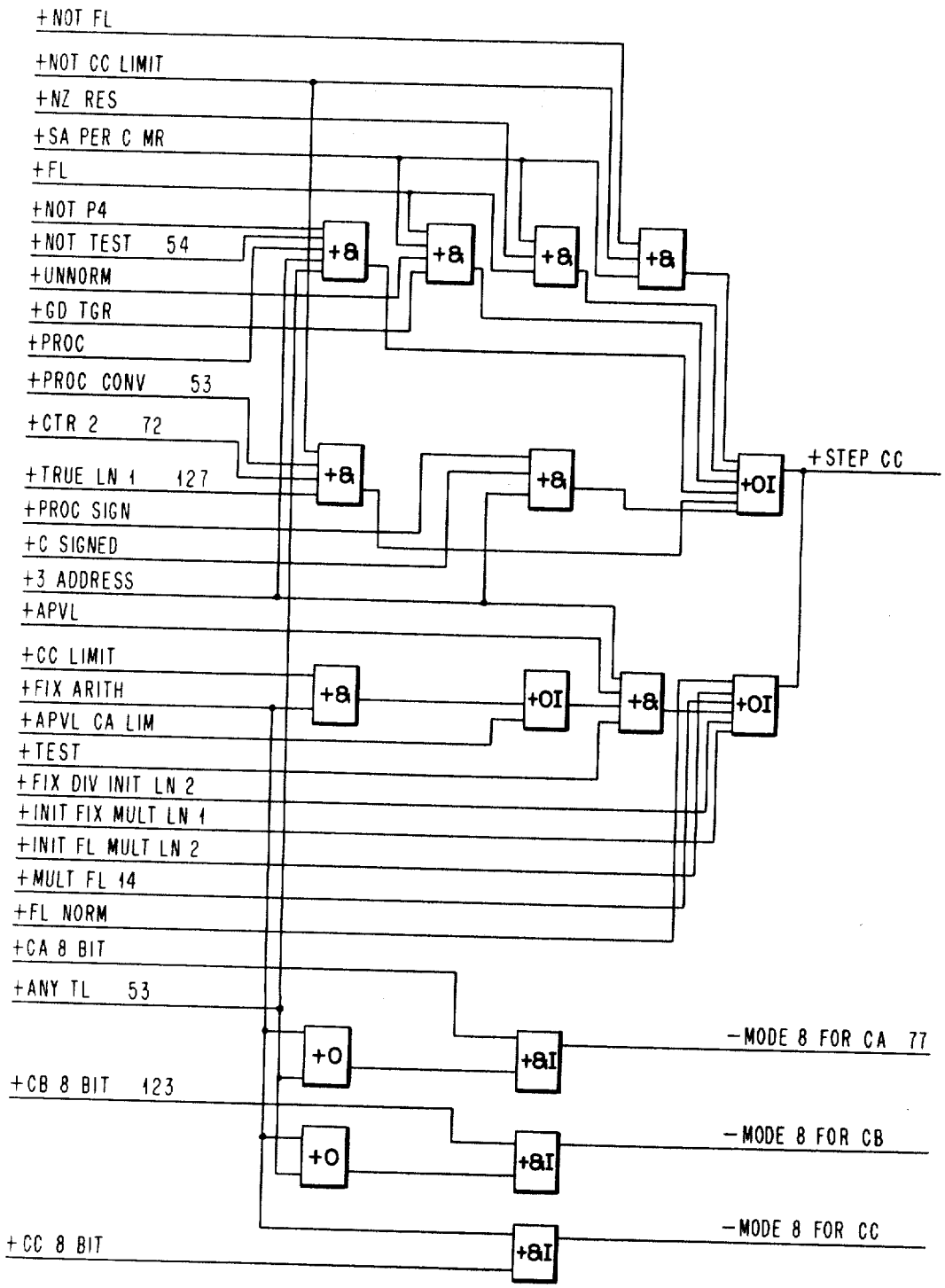
FIG.66b  BYTE COUNTER STEP

June 27, 1967  G. A. BLAAUW ET AL  3,328,771
PRIORITY SEQUENCE CONTROL
Filed June 30, 1964
FIG.67  BYTE COUNTER STEP CONTROL
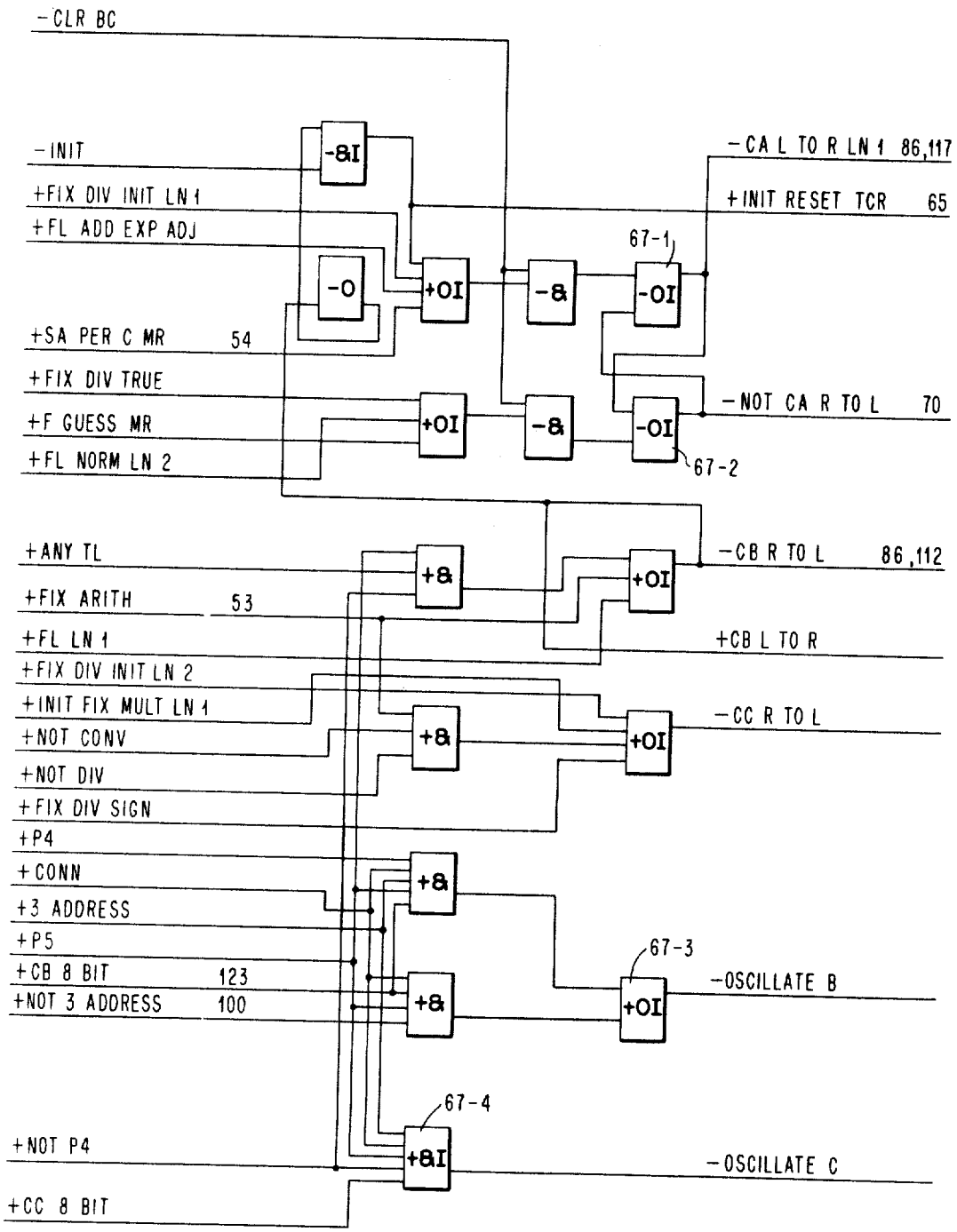

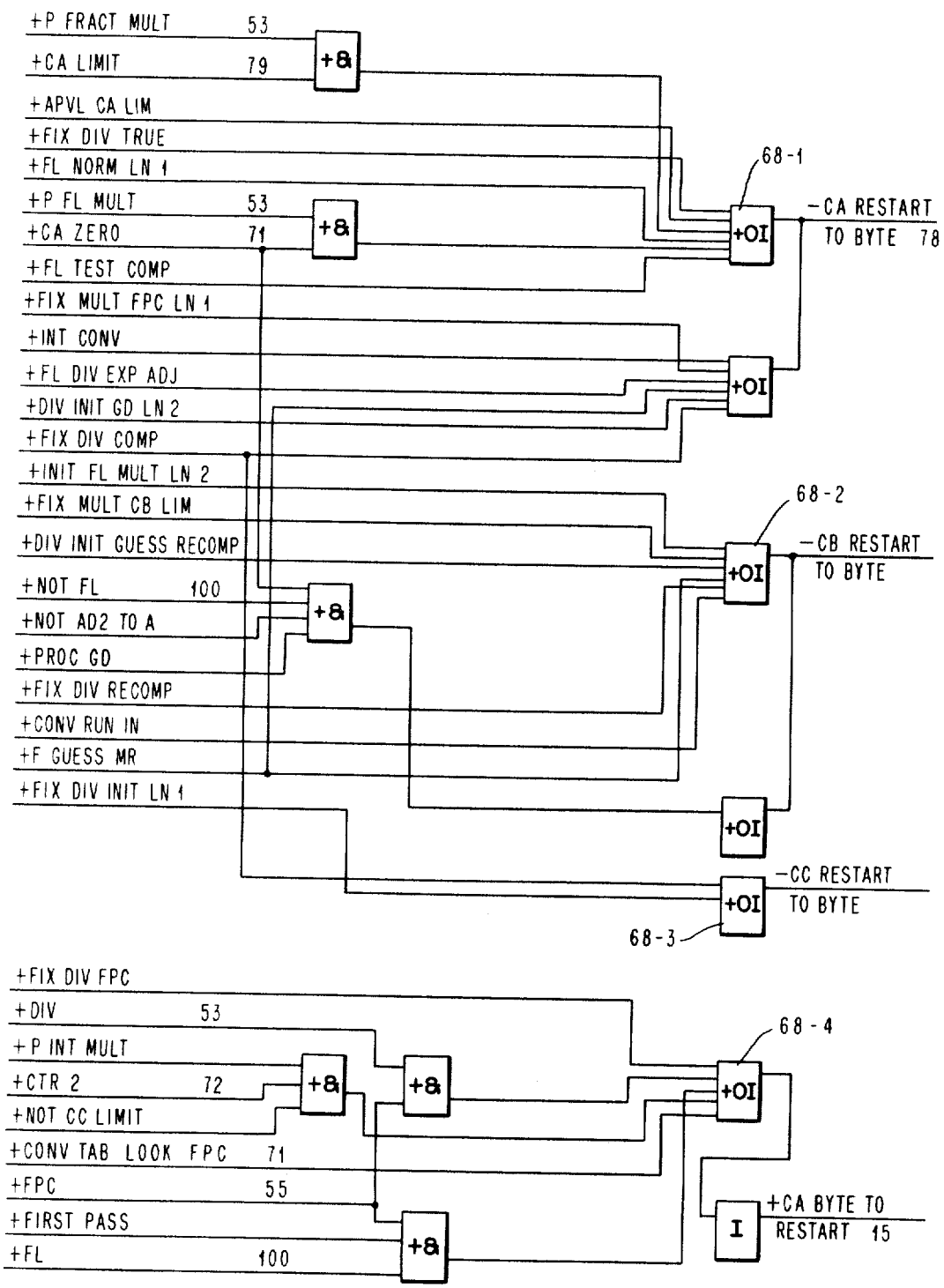
FIG.68 RESTART

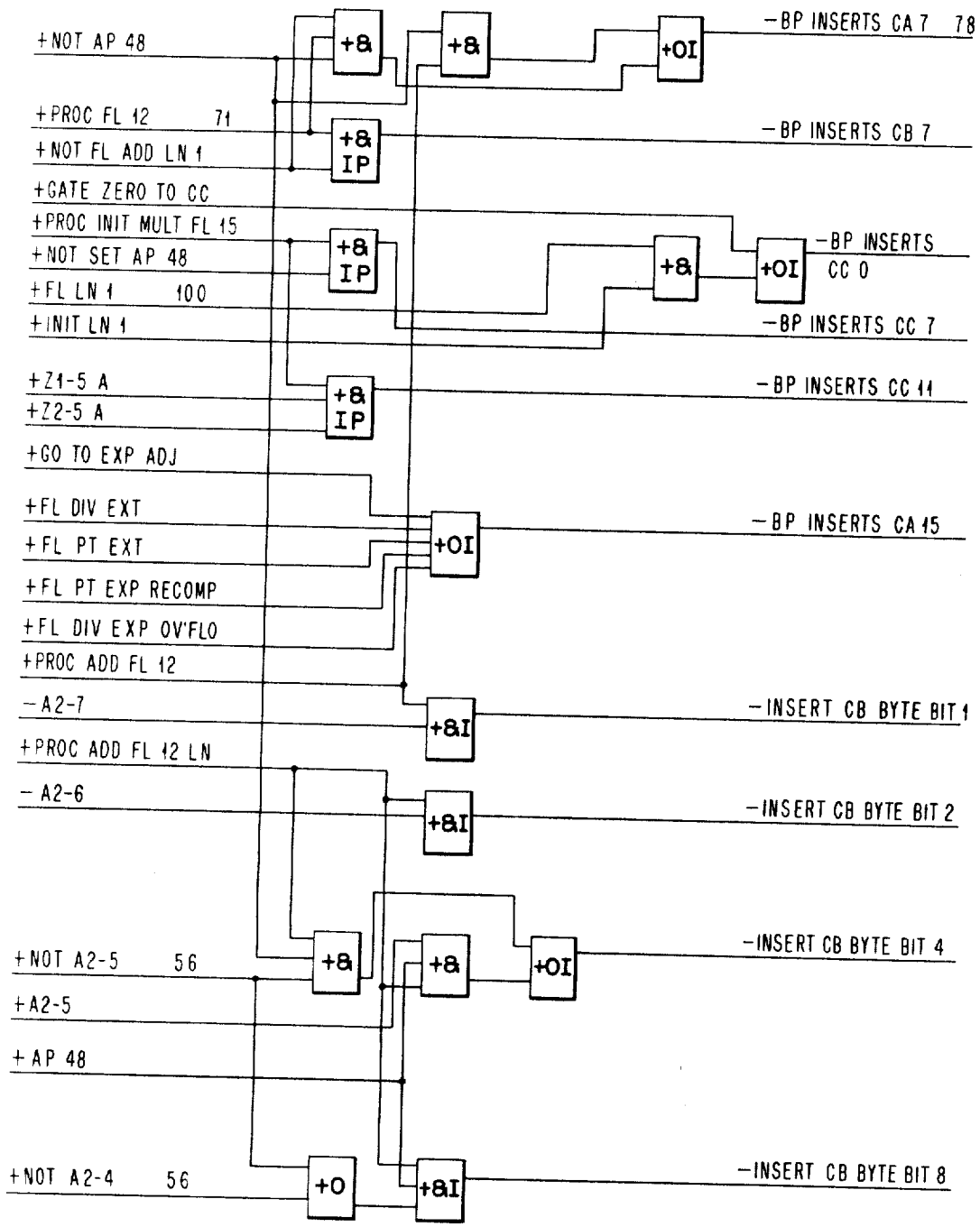
FIG.69  BYTE COUNTER GATING

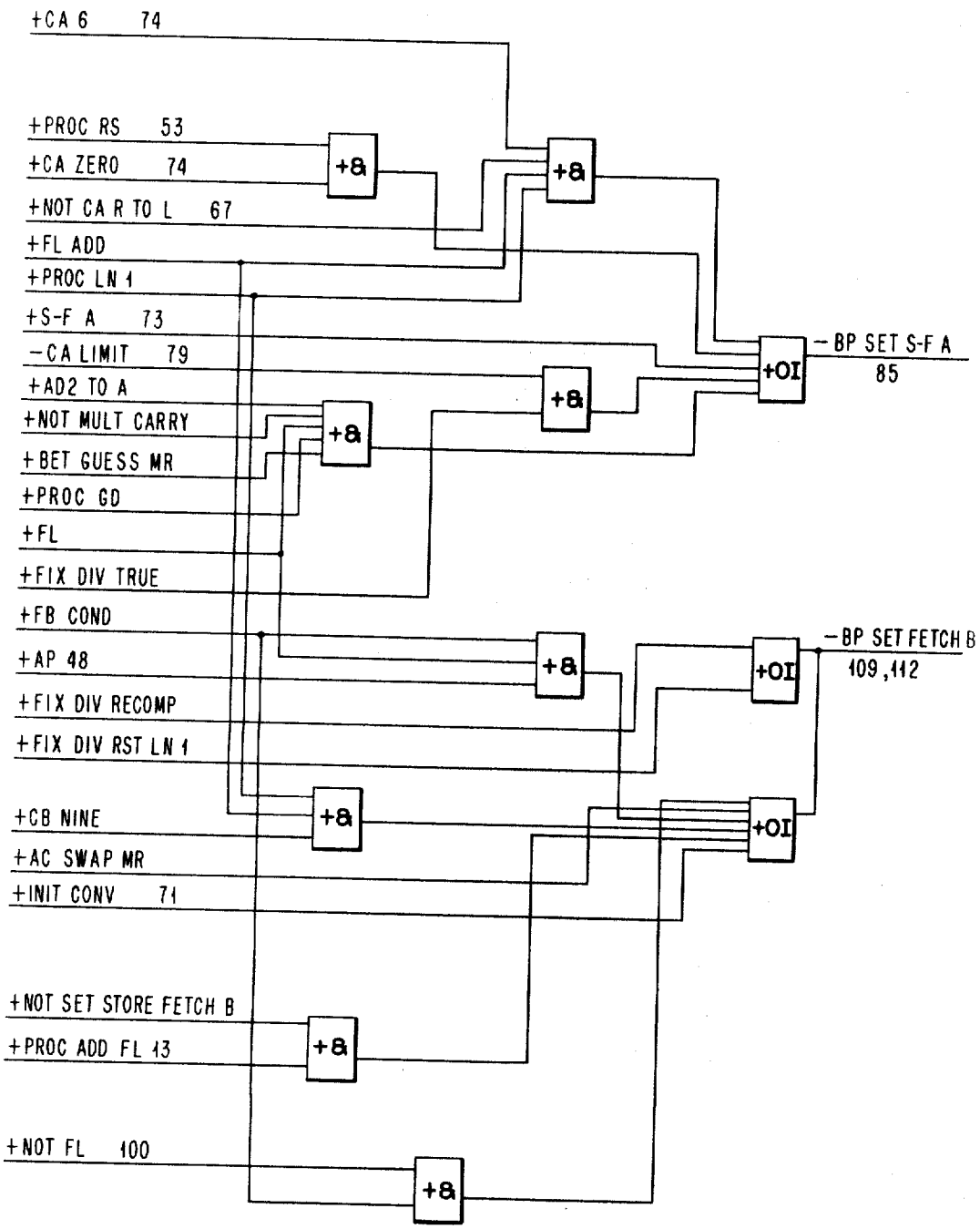
FIG. 70 BYTE CONTROL REQUESTS

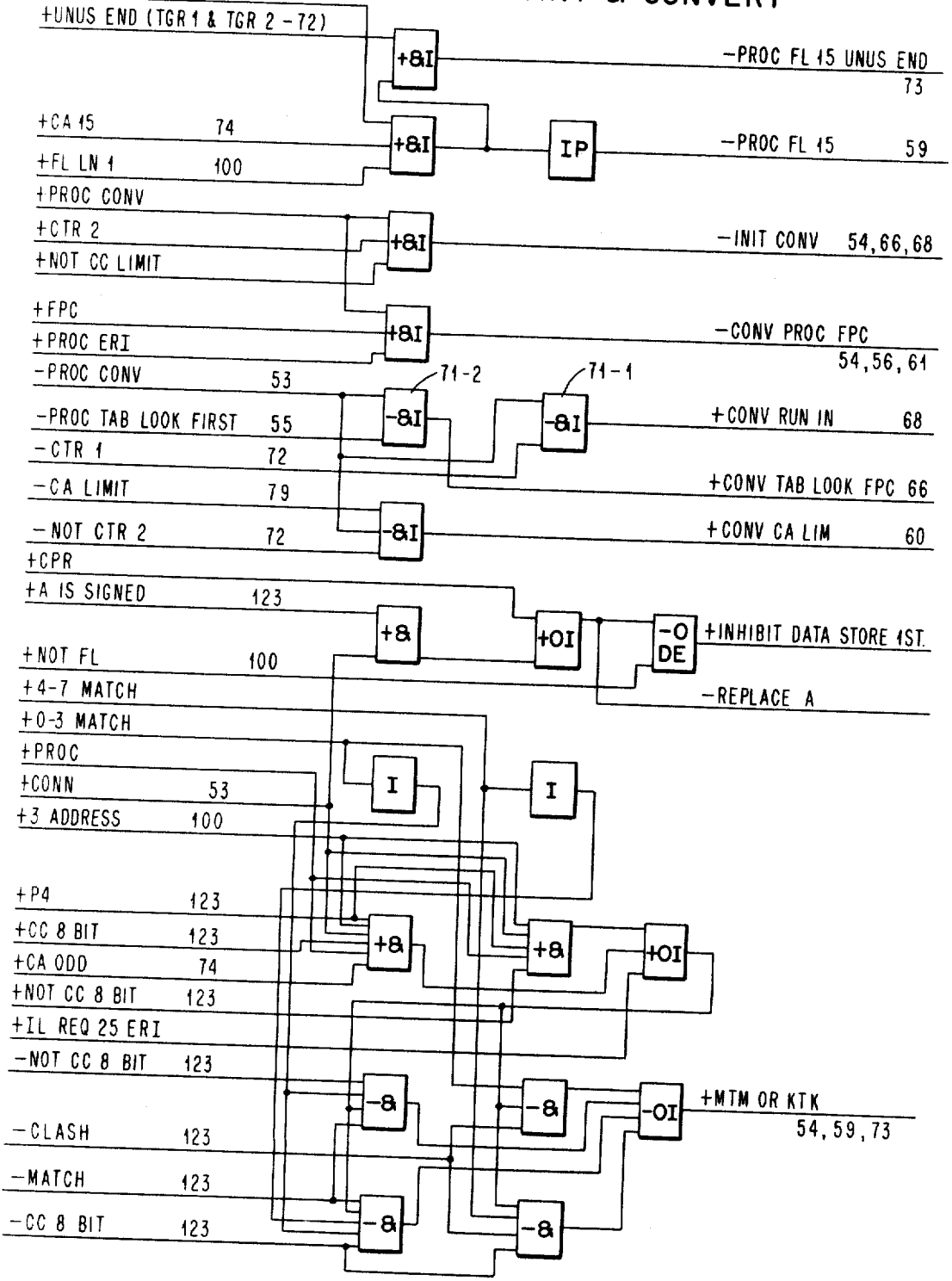
FIG. 71 FLOATING POINT & CONVERT

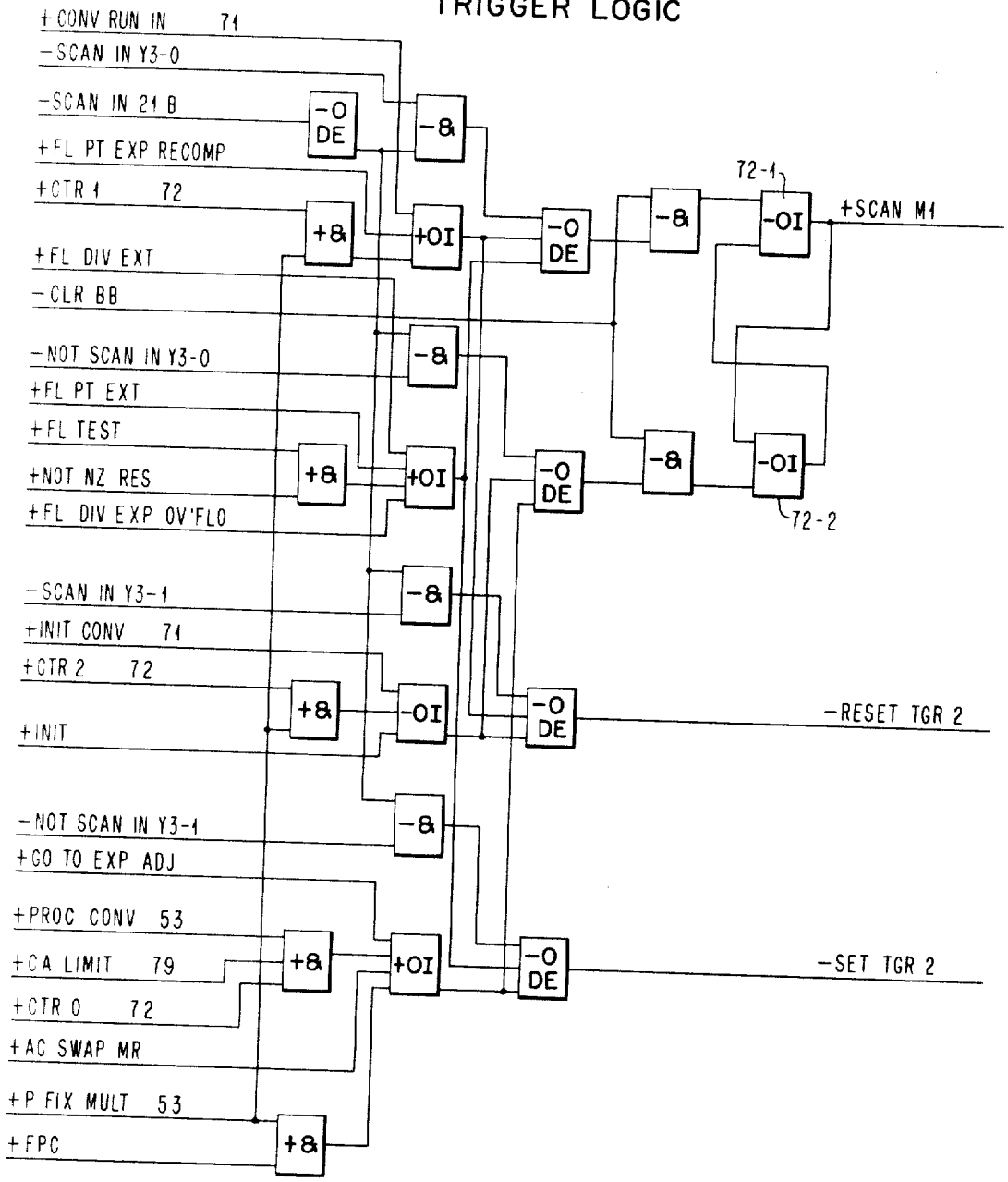
FIG.72 TRIGGER LOGIC

June 27, 1967 G. A. BLAAUW ET AL 3,328,771
PRIORITY SEQUENCE CONTROL
Filed June 30, 1964 155 Sheets-Sheet

TERMINATE

TERMINATE

BCA BYTE REGISTER

June 27, 1967

G. A. BLAAUW ET AL 3,328,771

PRIORITY SEQUENCE CONTROL

Filed June 30, 1964

BCB BYTE REGISTER

BCC BYTE REGISTER

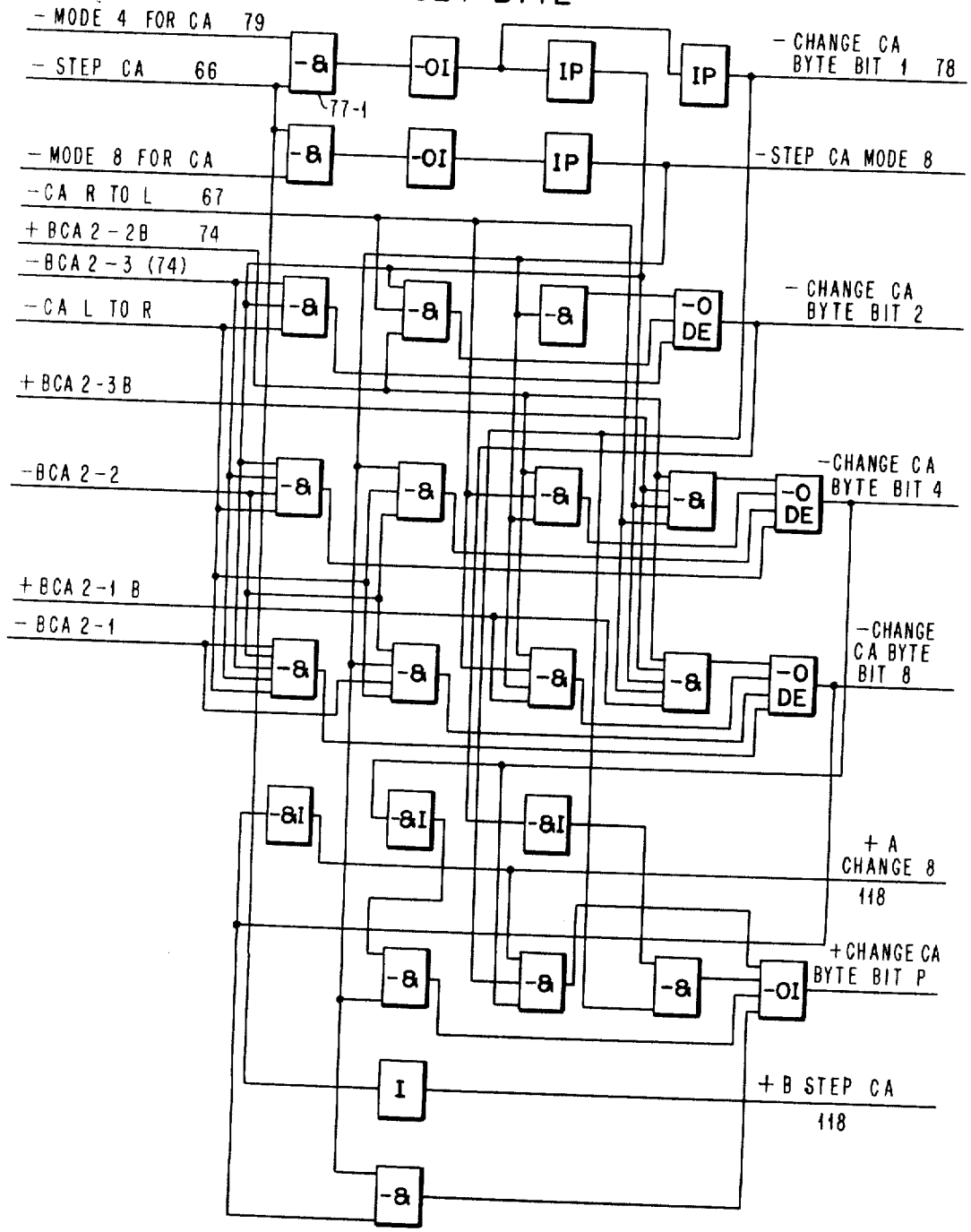

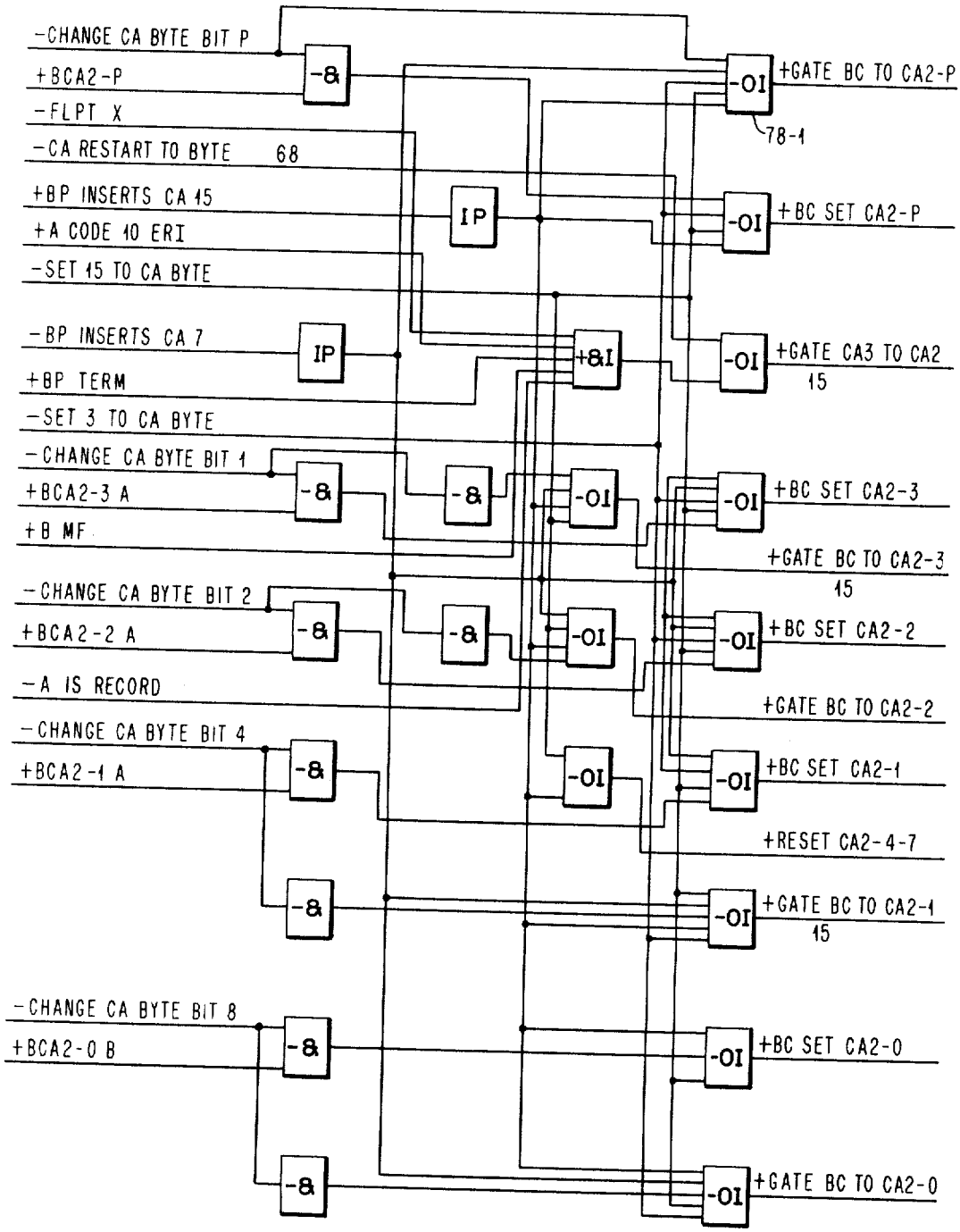
FIG. 78 SET BYTE COUNT RESET

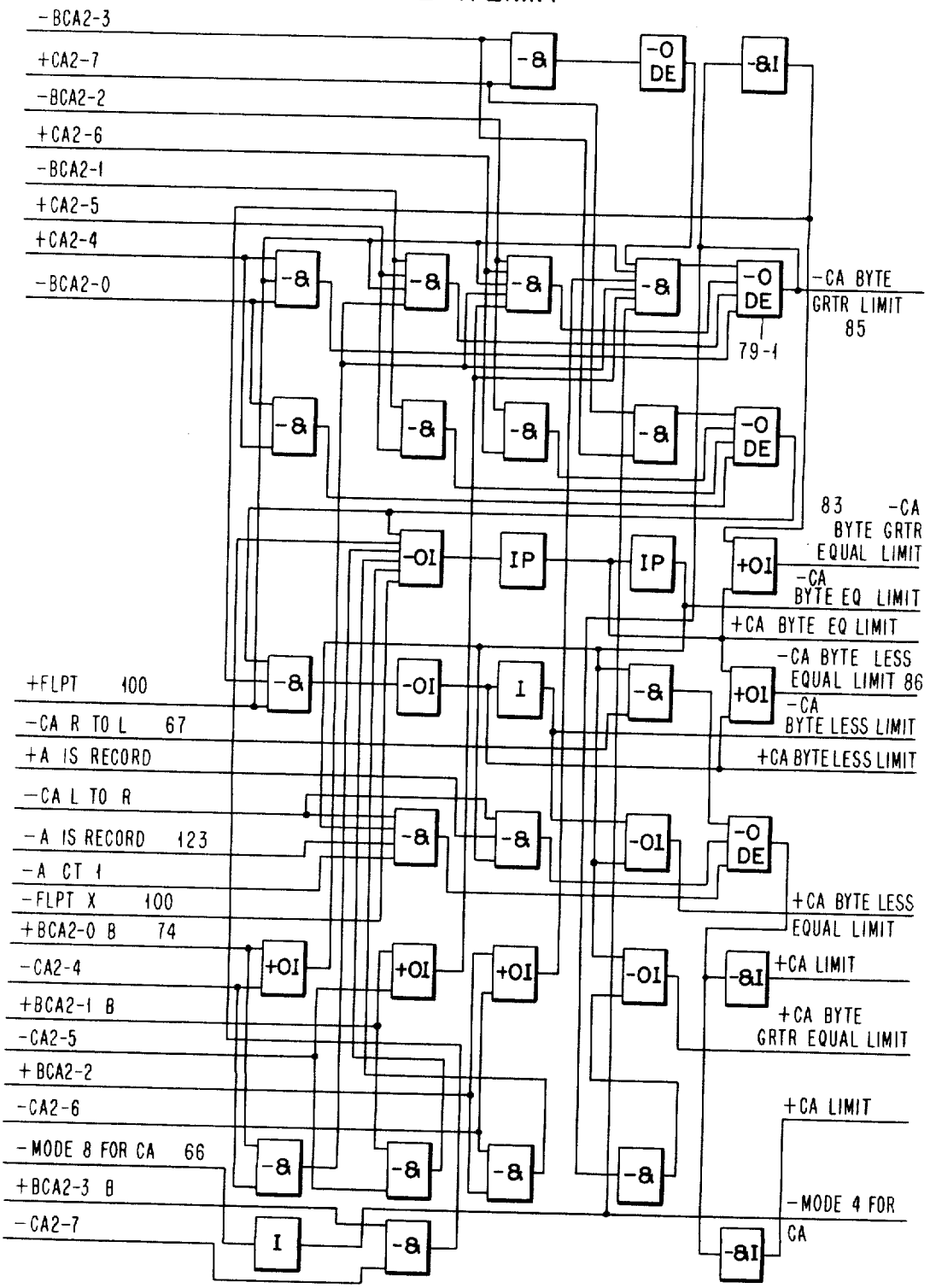
FIG.79 BYTE V. LIMIT

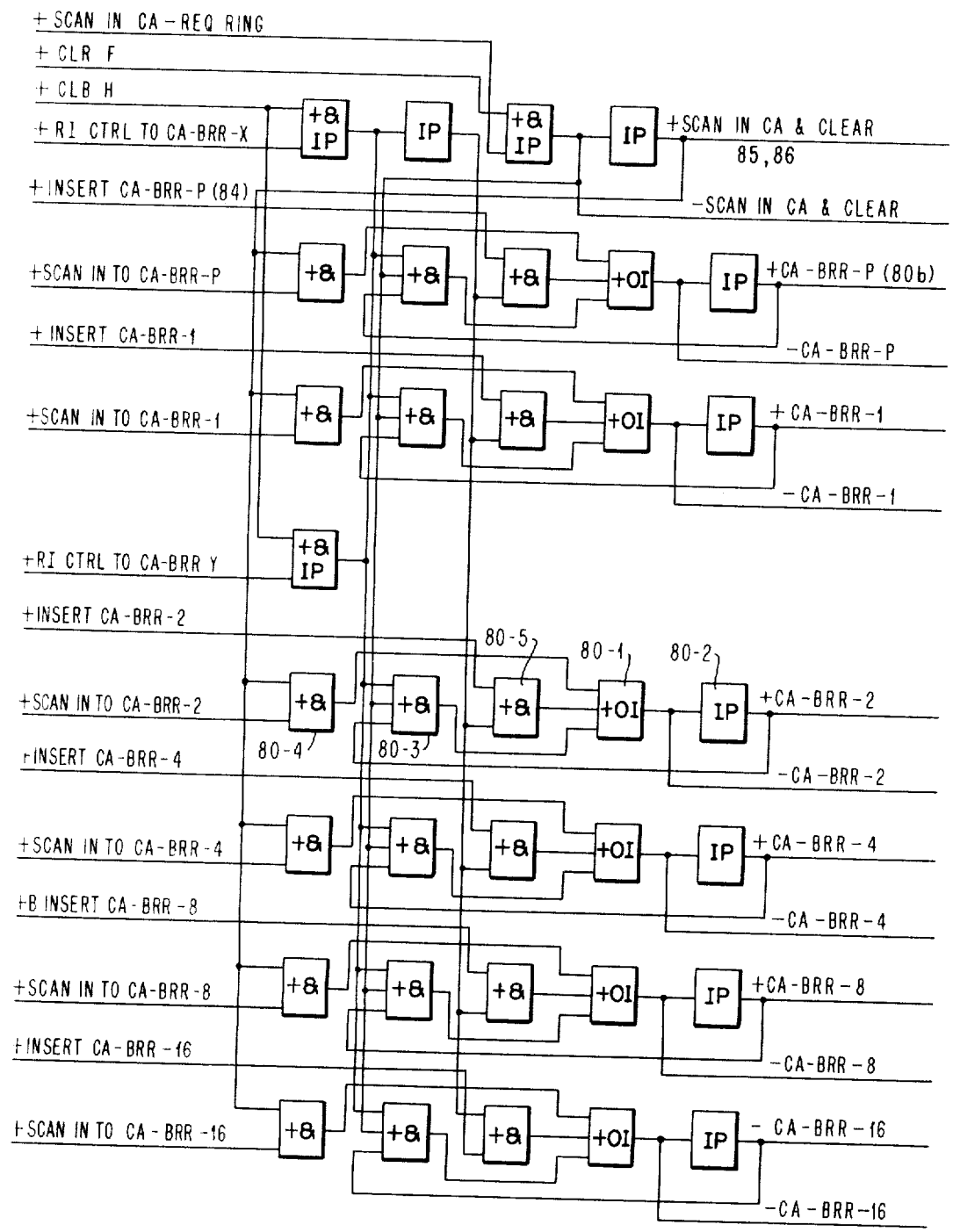
FIG. 80a  REQUEST RING A

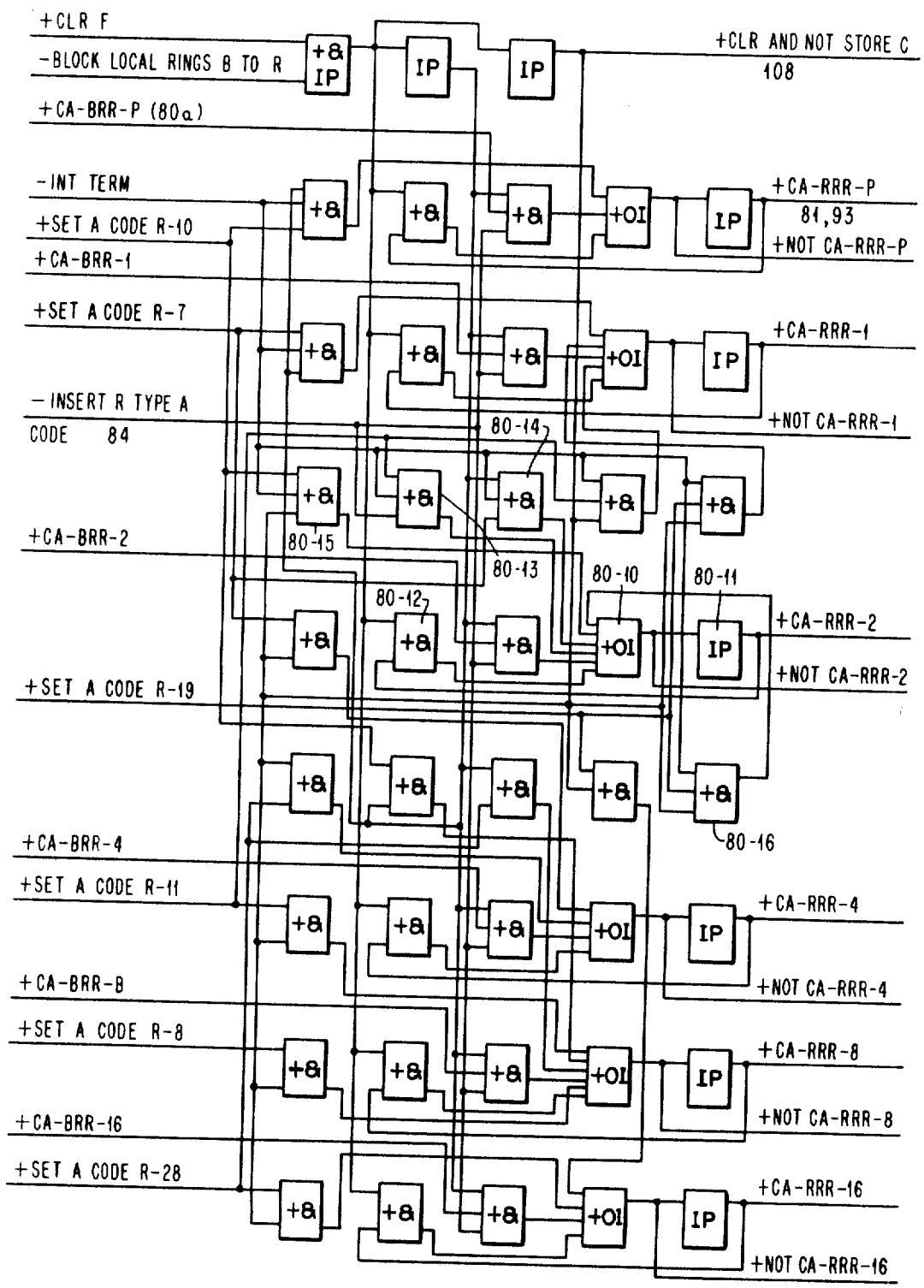

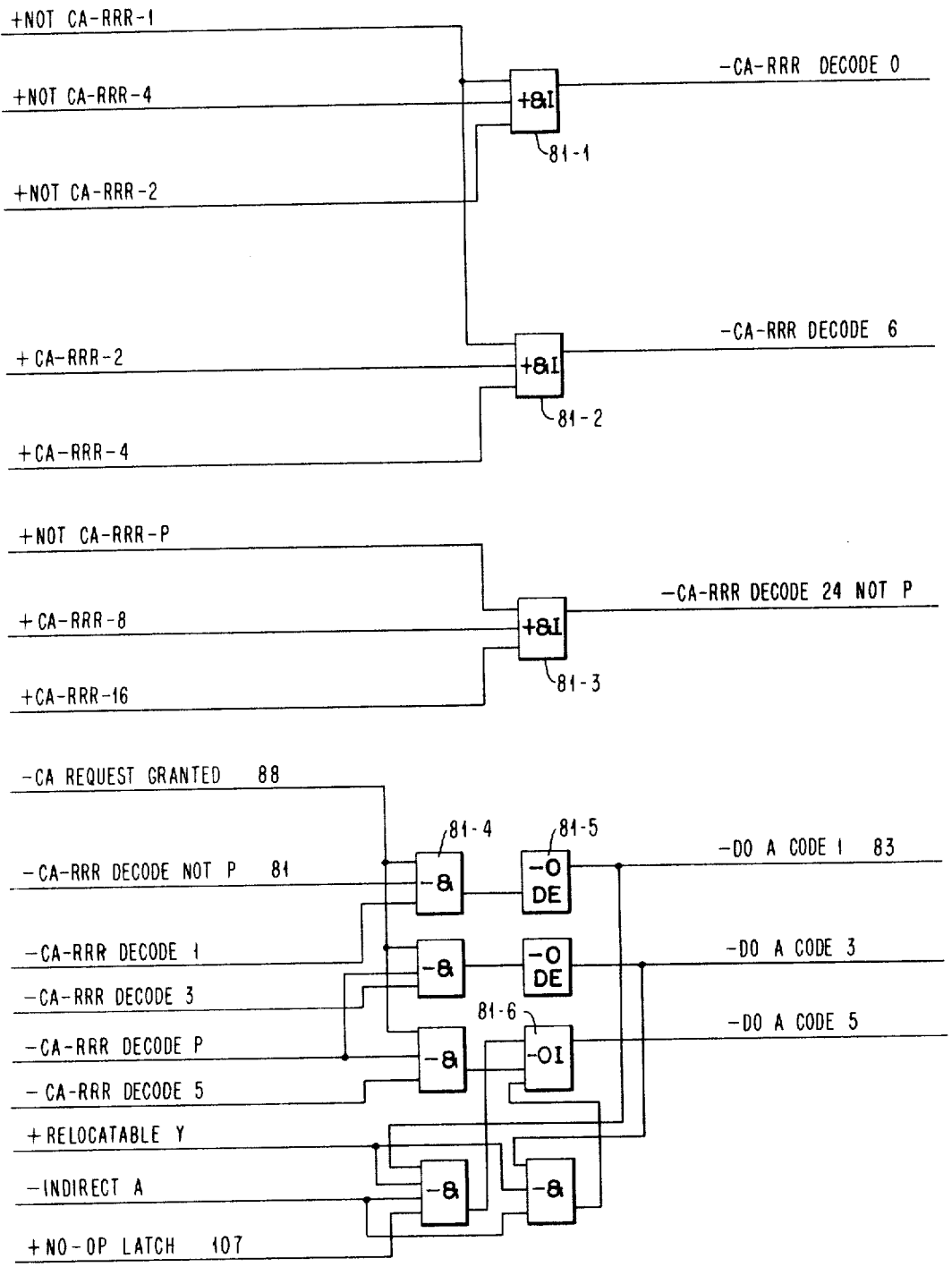

FIG. 82 CA REQUEST RING ANDS
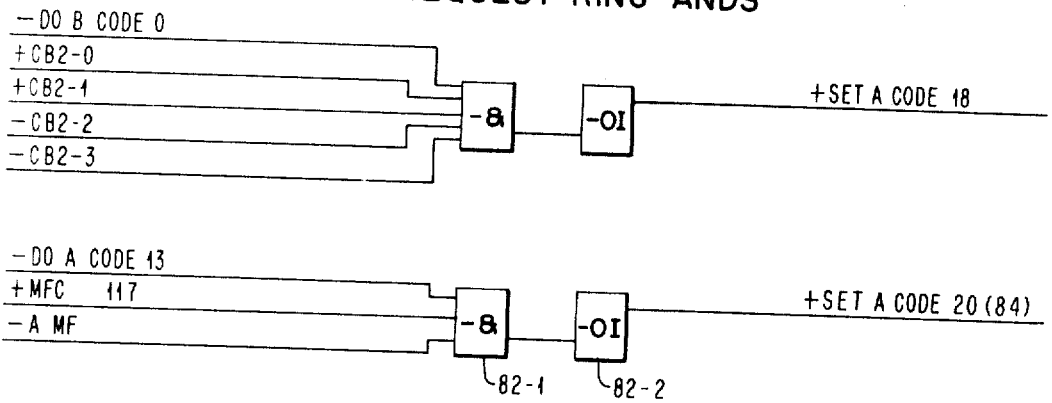
FIG. 83 CA REQUEST RING ANDS
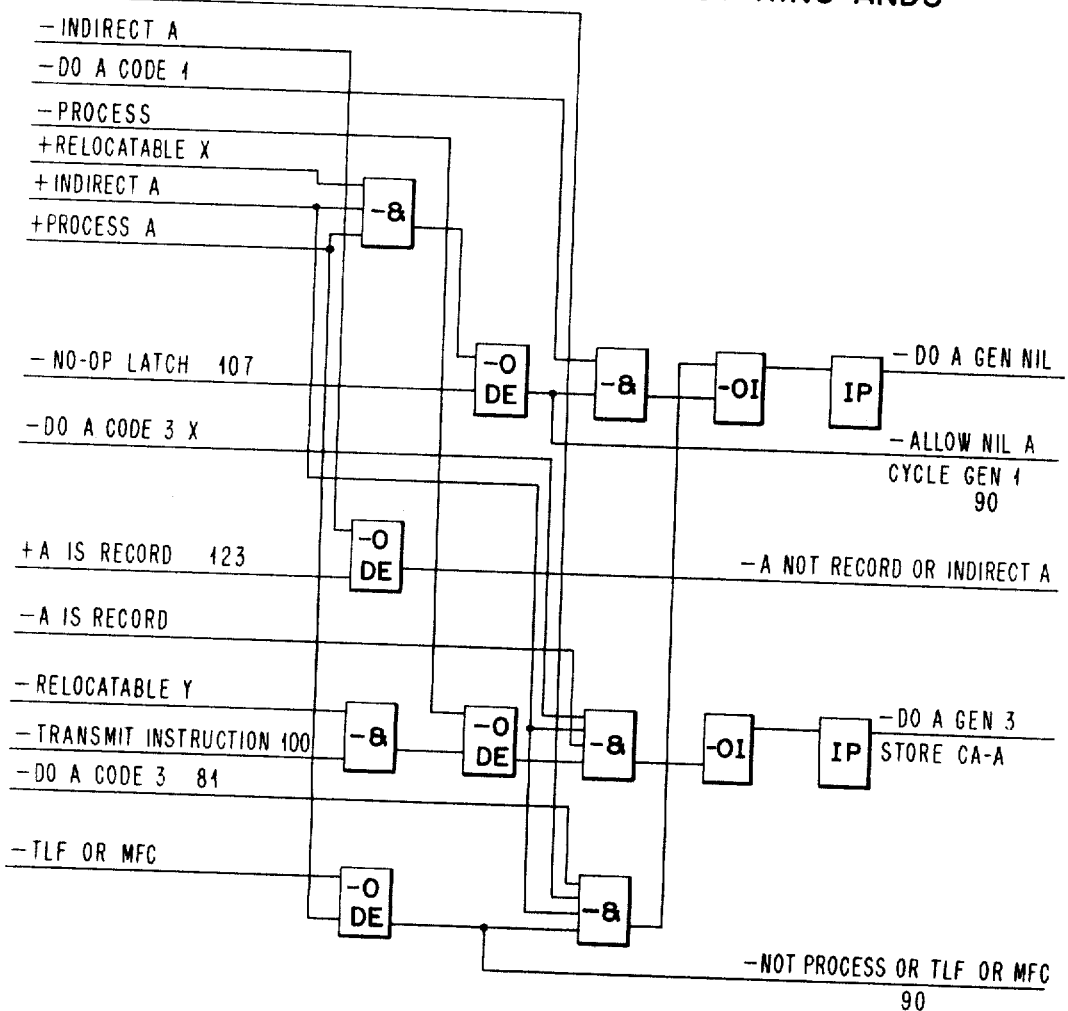

FIG. 85  INCREMENT CA WORD ADDRESS

A WORD 2

June 27, 1967 G. A. BLAAUW ET AL 3,328,771
PRIORITY SEQUENCE CONTROL
Filed June 30, 1964 153 Sheets-Sheet 98

CA CB CC DECIDE

FIG. 89 DX AND IL DECIDE

FIG. 90 PRIORITY GIVEN TO IL

FIG.92 DATA TO PRIORITY PIPE BITS 1 + 2

FIG. 93 DATA TO PRIORITY PIPE BIT P

FIG. 94 PRIORITY PIPE BITS PARITY 16-1

PRIORITY PIPE DECODE

June 27, 1967  G. A. BLAAUW ET AL  3,328,771
PRIORITY SEQUENCE CONTROL
Filed June 30, 1964   153 Sheets-Sheet 107
FIG. 97
PRIORITY PIPE B DECODE
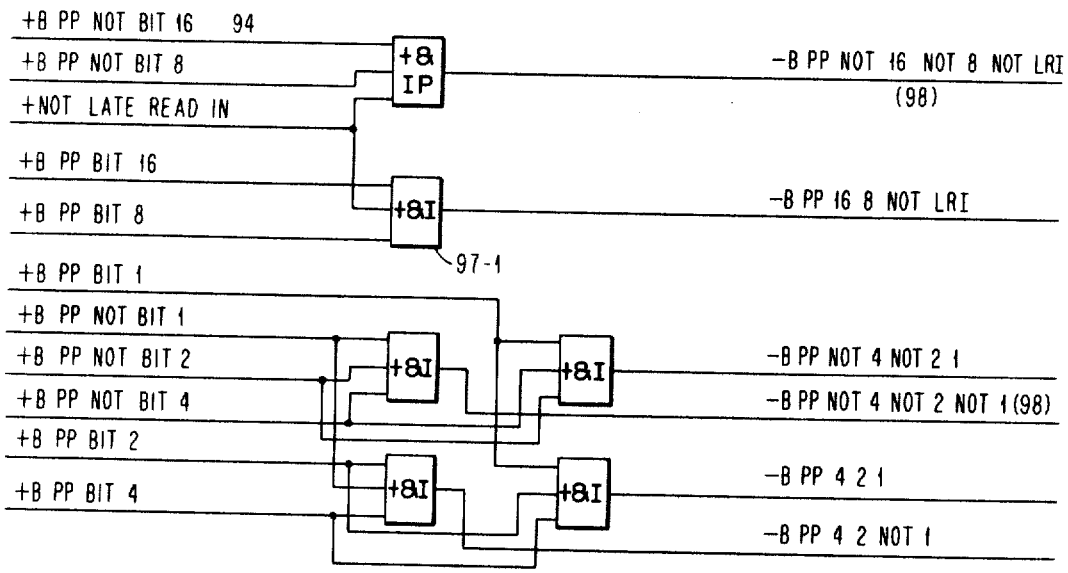
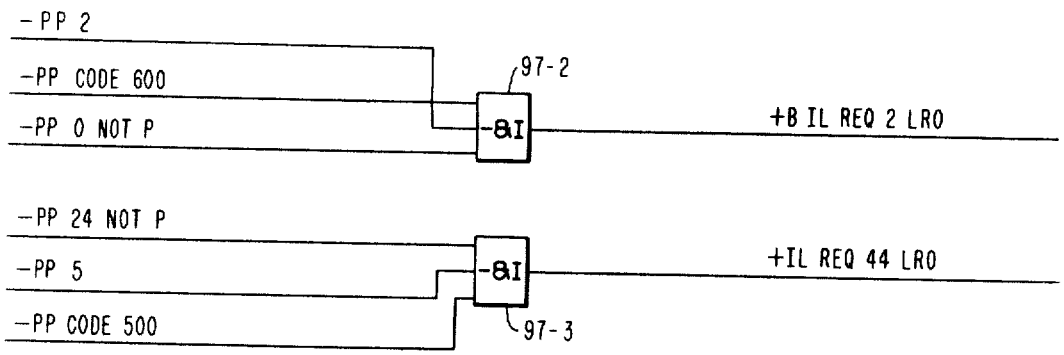

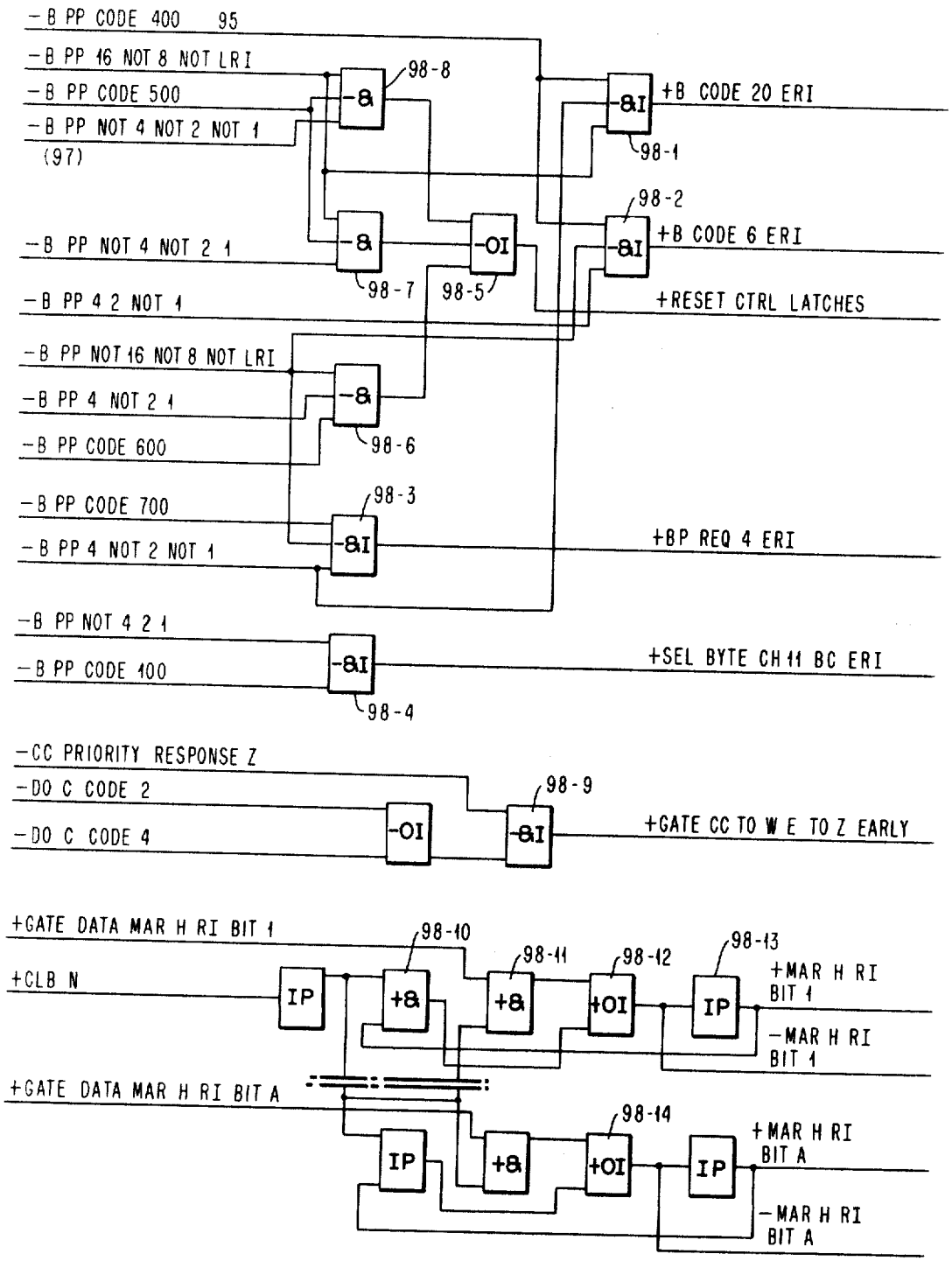
FIG.98 PRIORITY PIPE RI

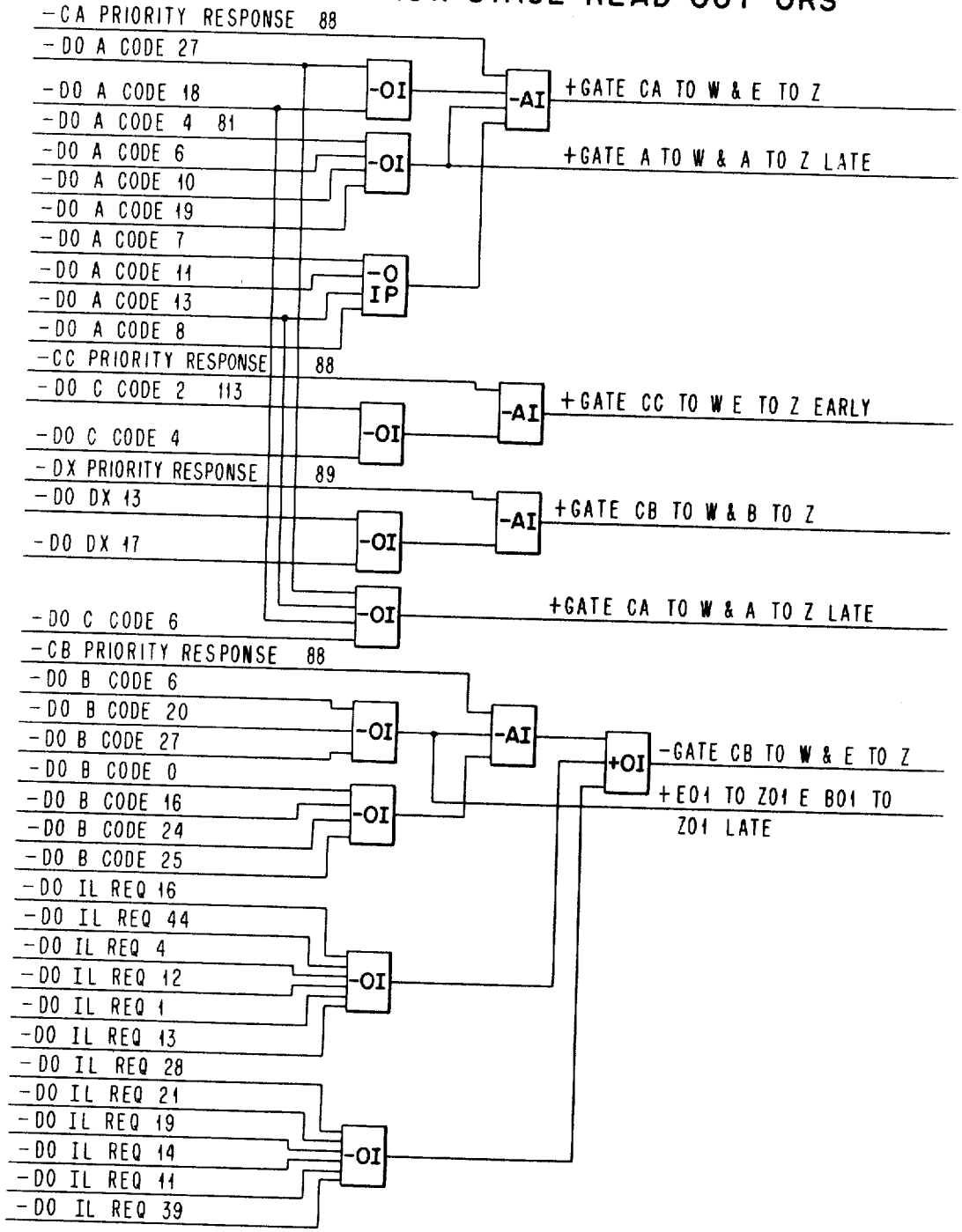
FIG.99a    1ST. STAGE READ OUT ORS

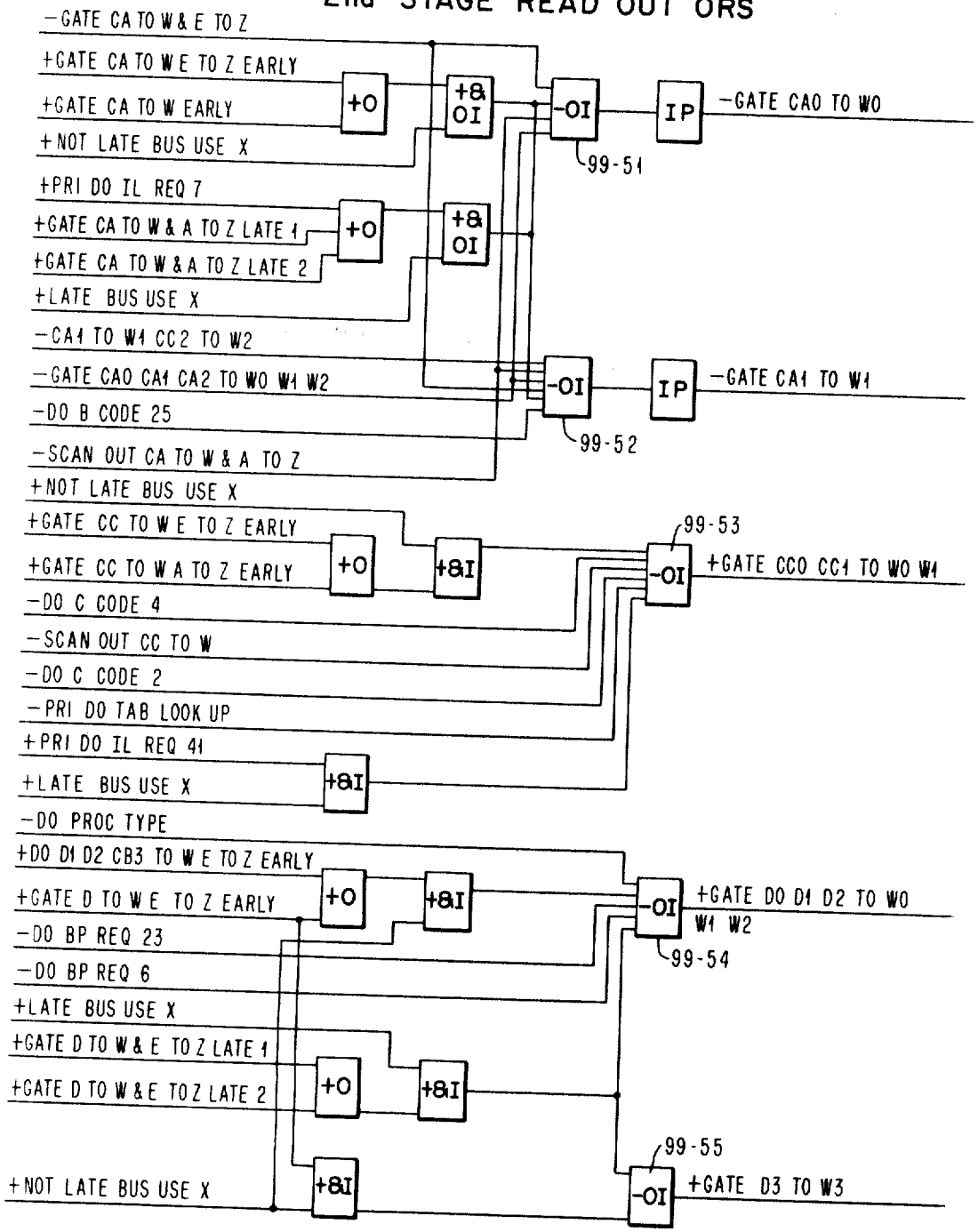

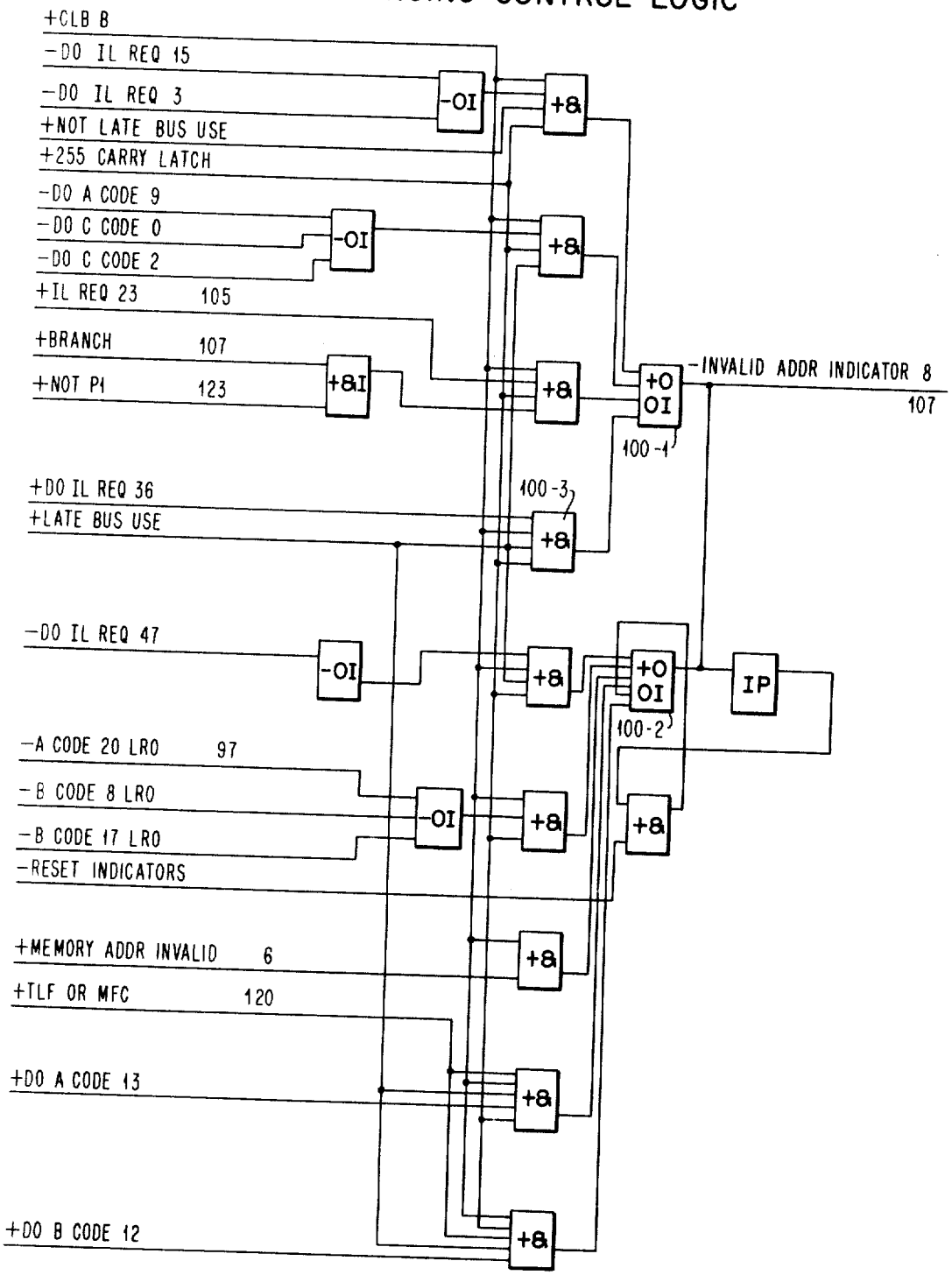
FIG. 100a SEQUENCING CONTROL LOGIC

June 27, 1967   G. A. BLAAUW ET AL   3,328,771
PRIORITY SEQUENCE CONTROL
Filed June 30, 1964   153 Sheets-Sheet 112
FIG.100b  SEQUENCING CONTROL LOGIC
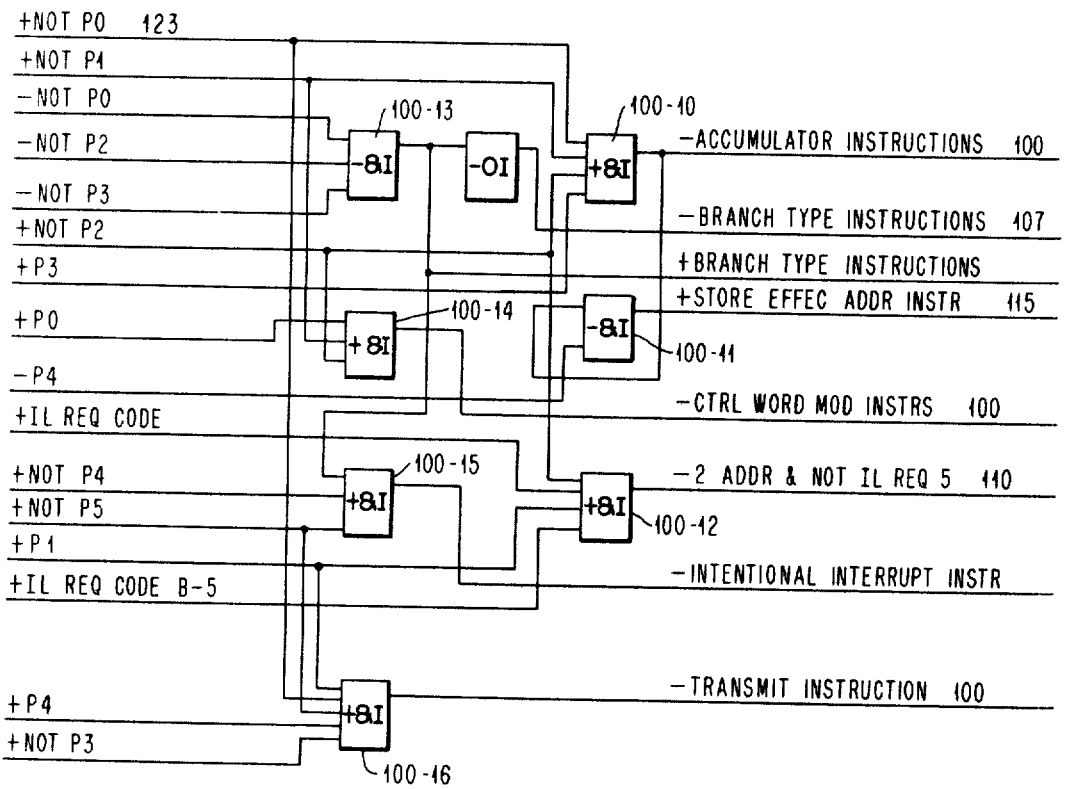
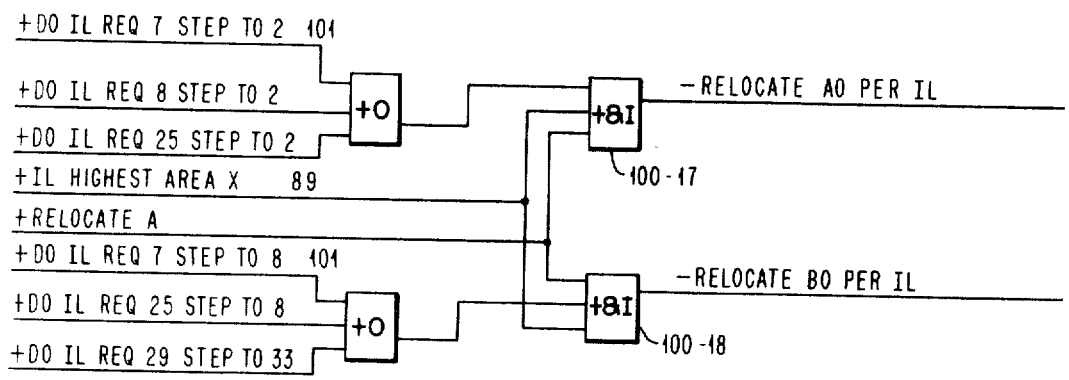

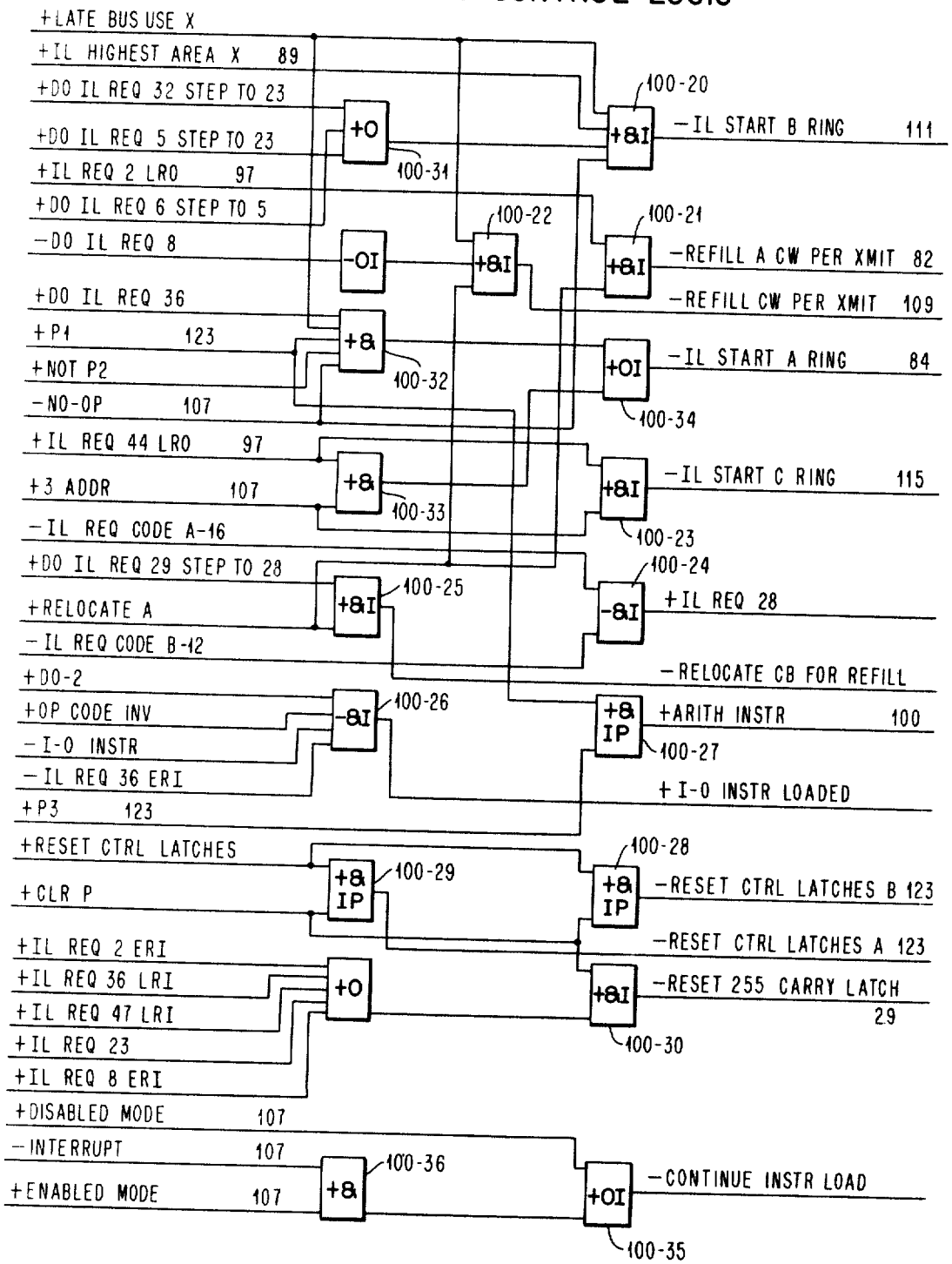

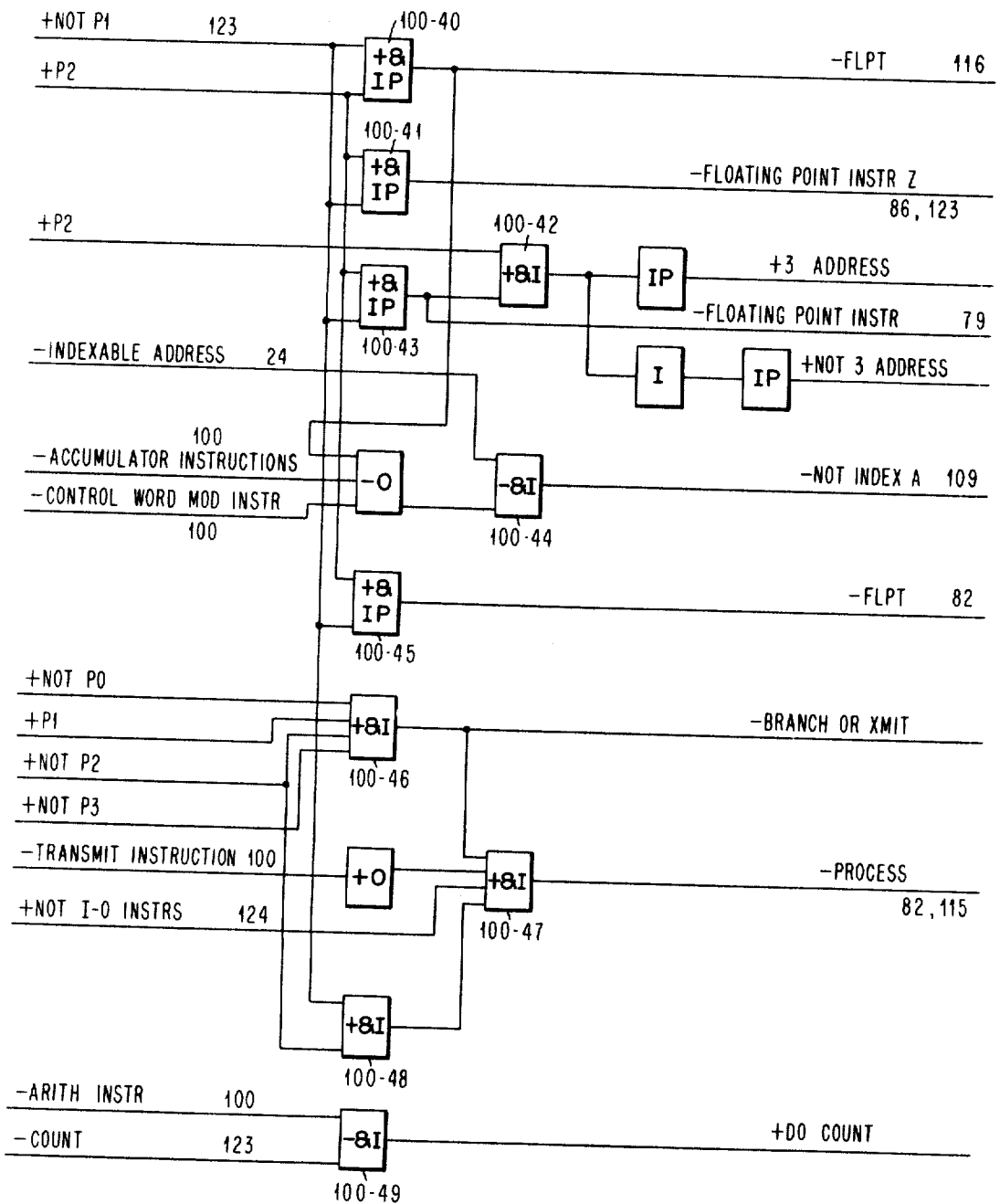

June 27, 1967  G. A. BLAAUW ET AL  3,328,771
PRIORITY SEQUENCE CONTROL
Filed June 30, 1964                    153 Sheets-Sheet 115
FIG.101a  IL REQUEST SEQUENCING
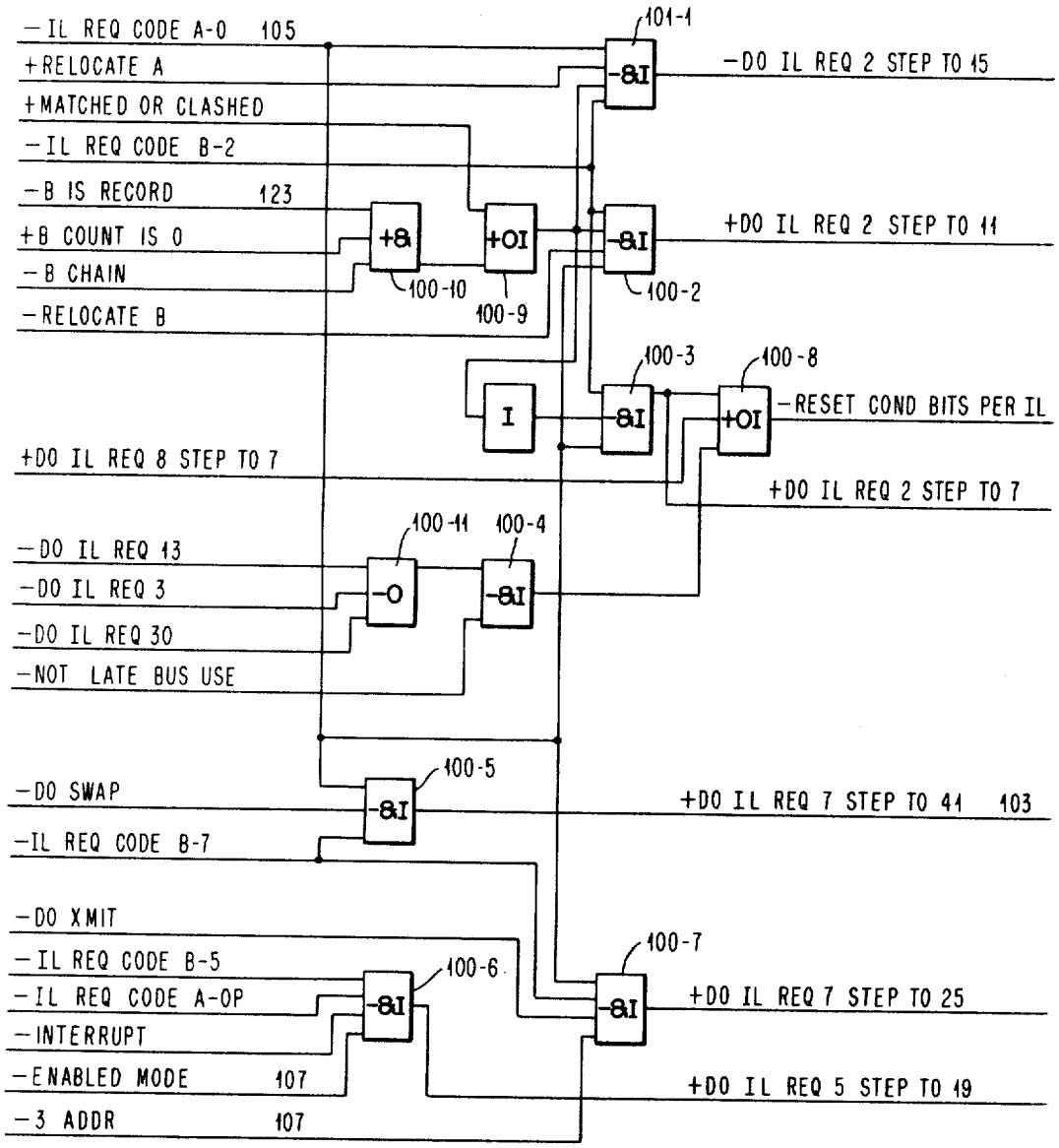

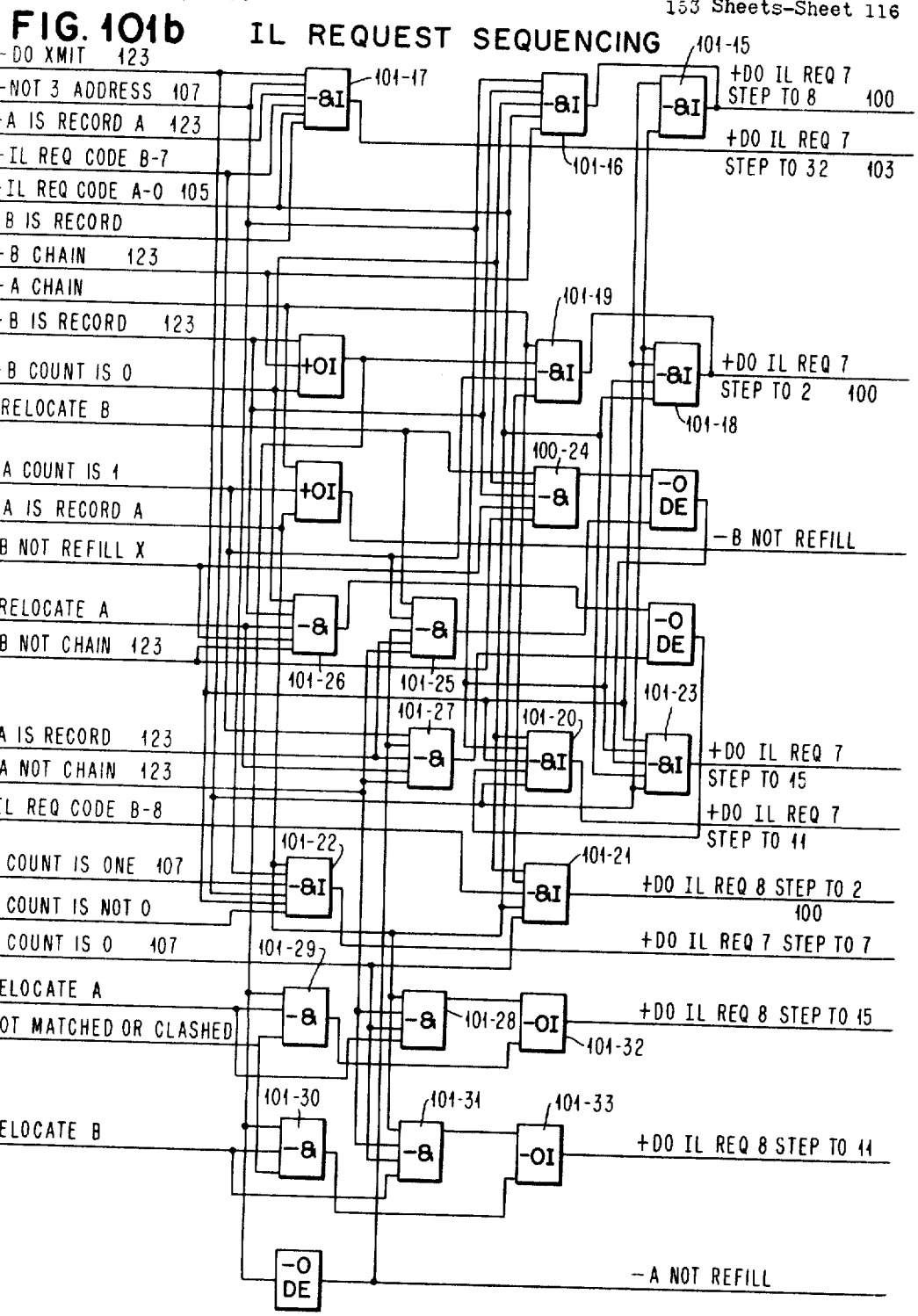

June 27, 1967  G. A. BLAAUW ET AL  3,328,771
PRIORITY SEQUENCE CONTROL
Filed June 30, 1964  153 Sheets-Sheet 117

IL DO LINES

FIG. 103  IL BUFFER RING

June 27, 1967  G. A. BLAAUW ET AL  3,328,771
PRIORITY SEQUENCE CONTROL
Filed June 30, 1964  153 Sheets-Sheet 119

FIG.104   IL REQUEST RING

IL REQUEST DECODE

FIG.106

IL SEQUENCE ADVANCE

+STEP TO IL REQ 19C
+DO FILL BUS STEP TO 48
+STEP TO IL REQ 27
+BC ADVANCE IL RING
+PRIORITY ADV IL RING
→ +OI 106-1 → −ADVANCE IL REQUEST RING

+DO DX 13 A
+INSTRUCTION ACTIVE A
→ +& 106-2

+NOT CB RRR 8
+NOT CB RRR 16 X
→ +&I 106-3 → −USE CB ADDR

+CA RRR 16
+CA RRR 8
+NOT CA RRR 4
→ +&I 106-4 → −USE CA ADDR

+CC RRR 8
+CC RRR 2
→ +& 106-6 → +OI 106-5 → −USE CC ADDR
+DO CC NIL 90

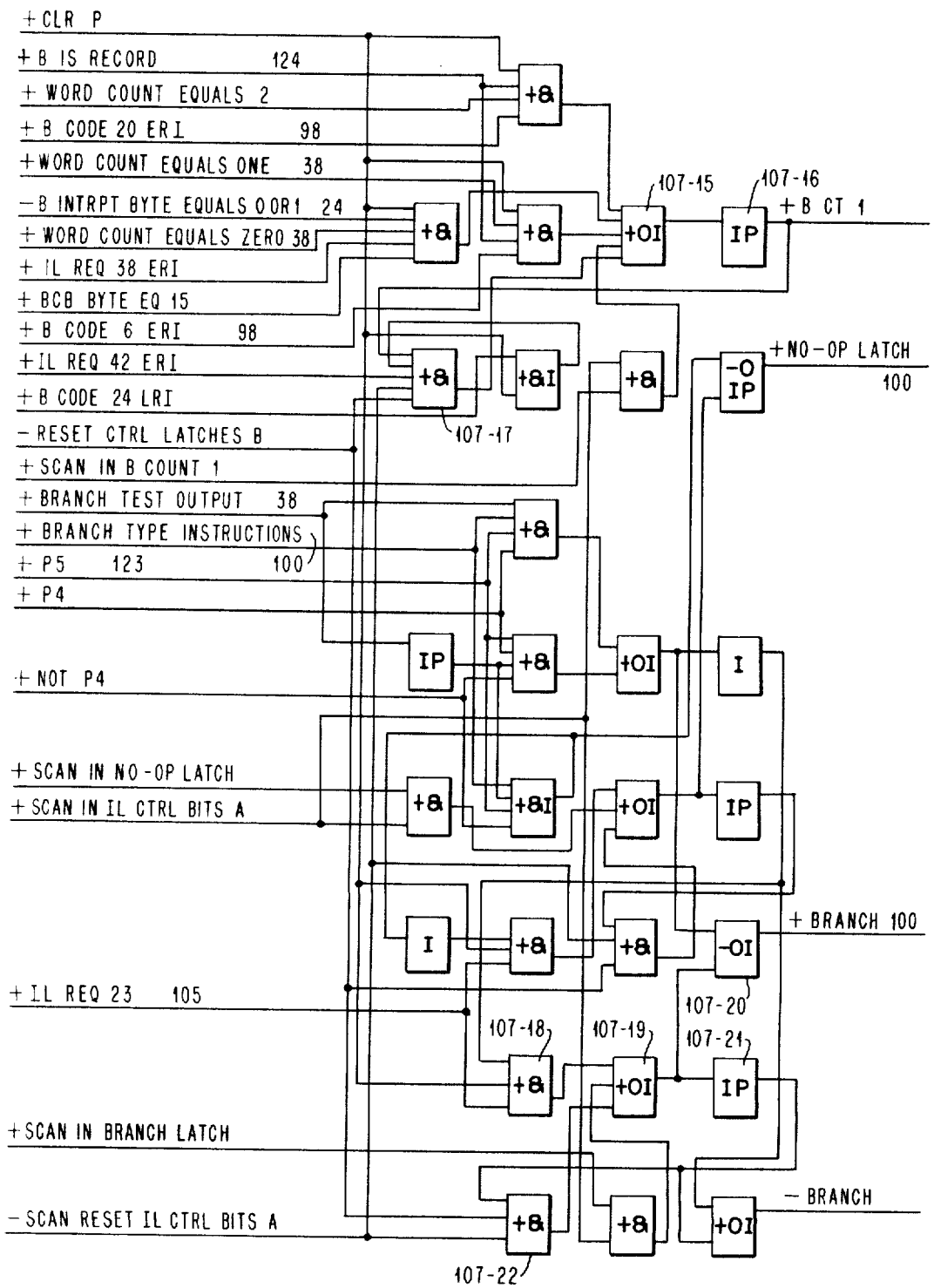
FIG.107b CONTROL LATCHES

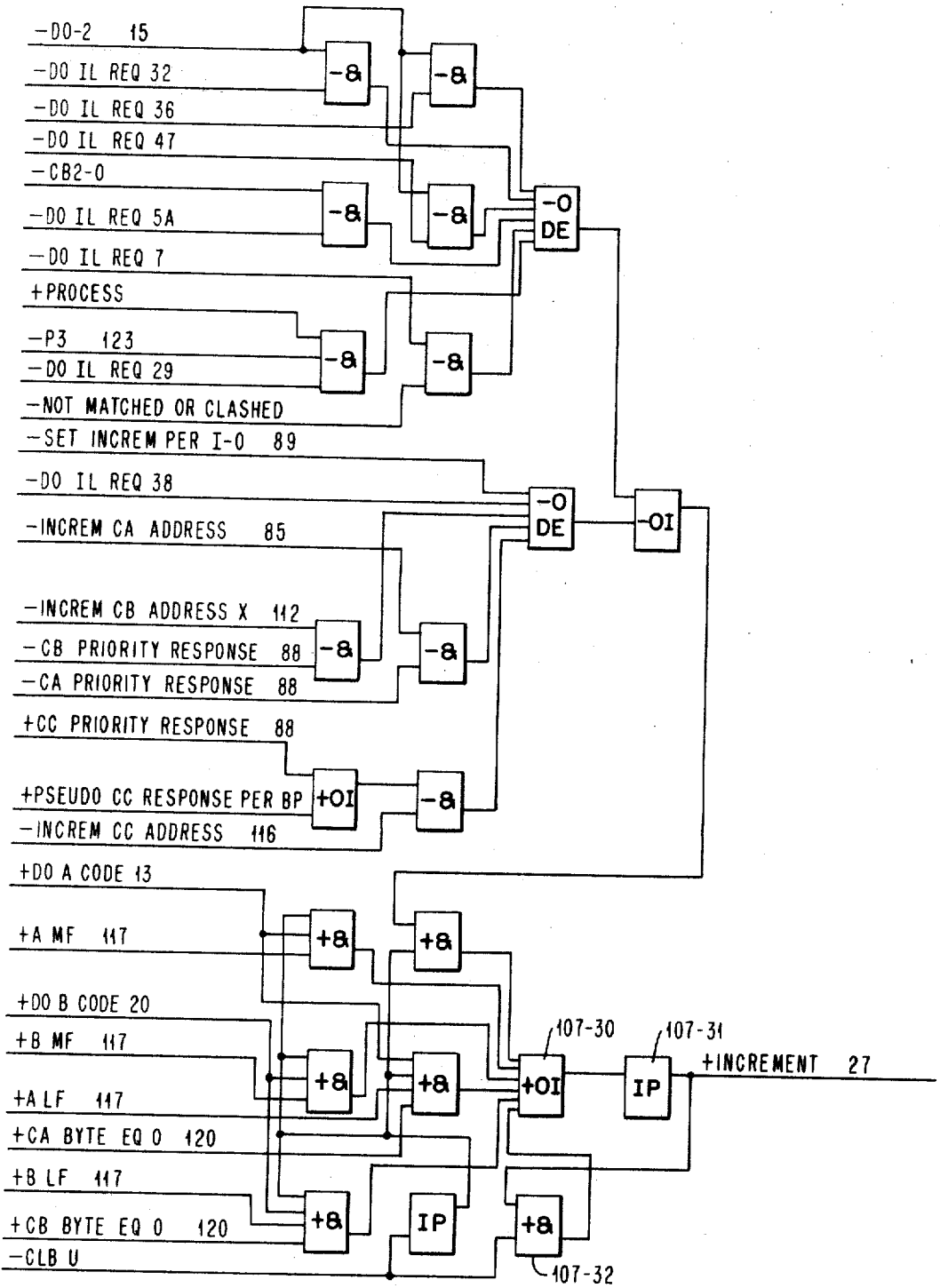
FIG.107c CONTROL LATCHES

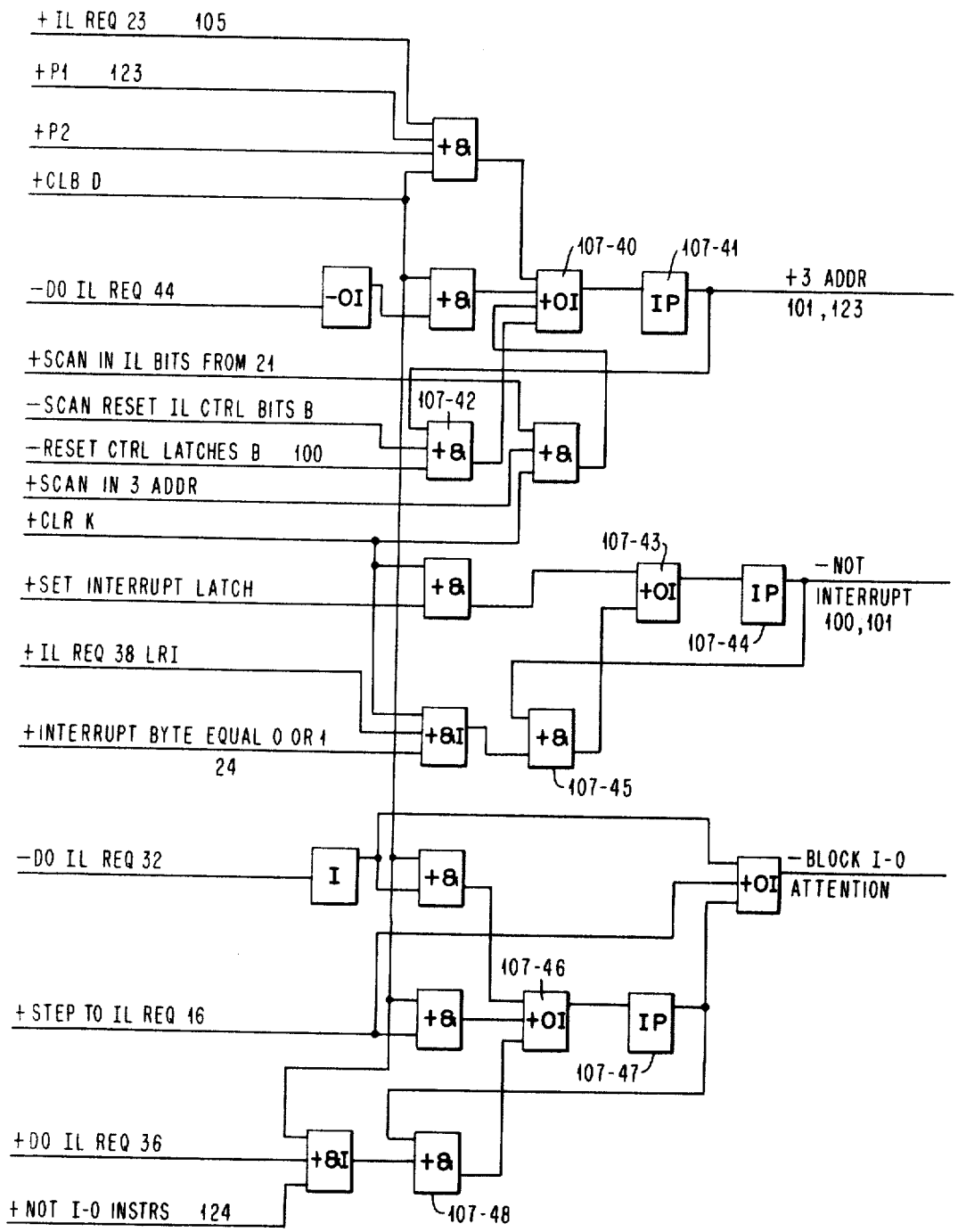
FIG.107d  CONTROL LATCHES

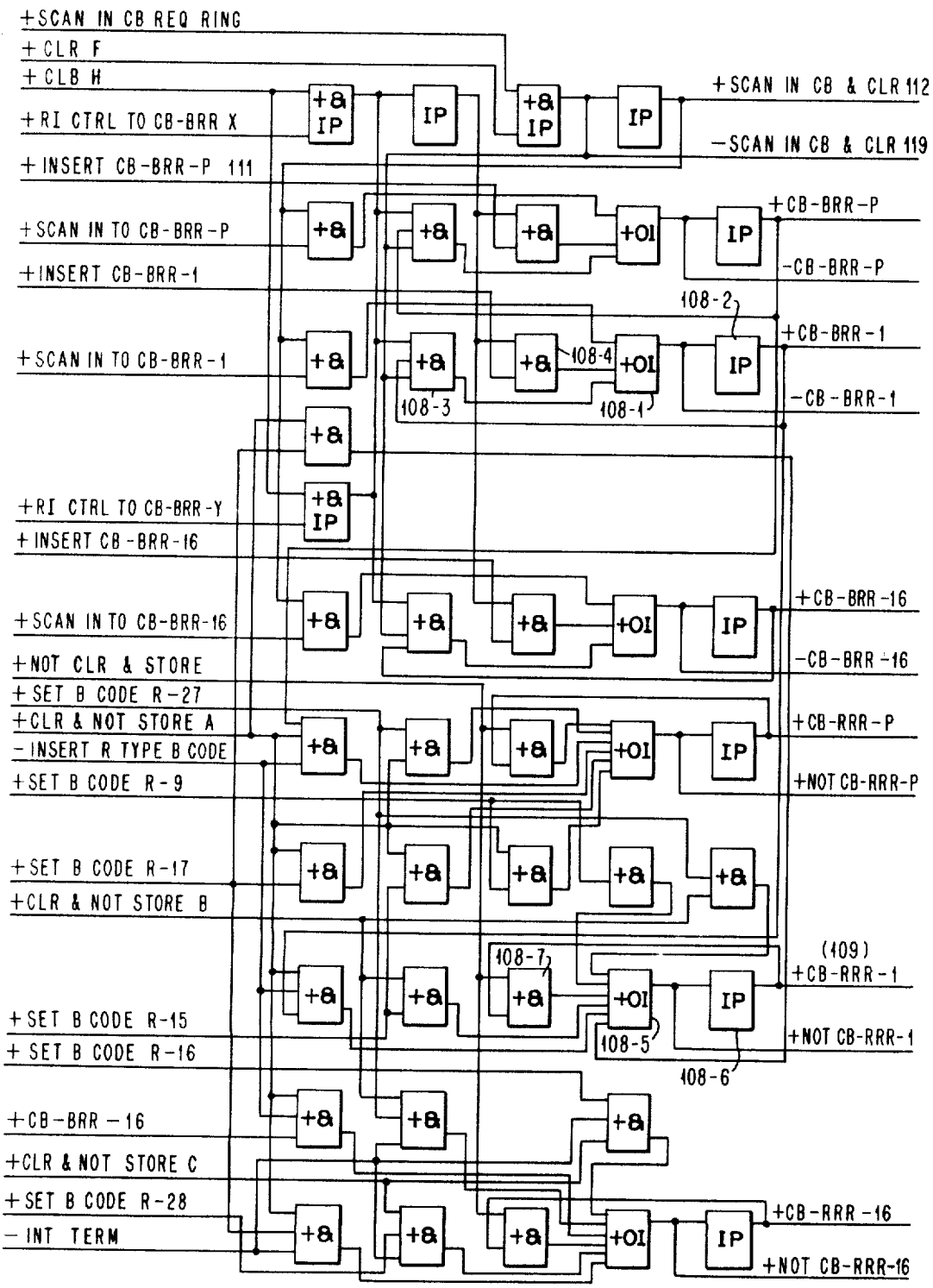
FIG. 108  REQUEST RING CB

June 27, 1967  G. A. BLAAUW ET AL  3,328,771
PRIORITY SEQUENCE CONTROL
Filed June 30, 1964  153 Sheets-Sheet 127
FIG. 109
CB REQUEST ANDS
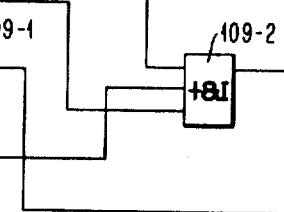
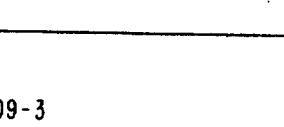
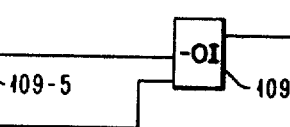
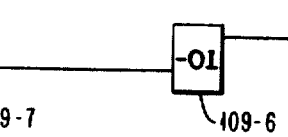

CB REQUEST RING GEN REQUESTS

FIG. 111

INCREMENT CB WORD ADDRESS

FIG. 113 REQUEST RING CC

CC DECODE

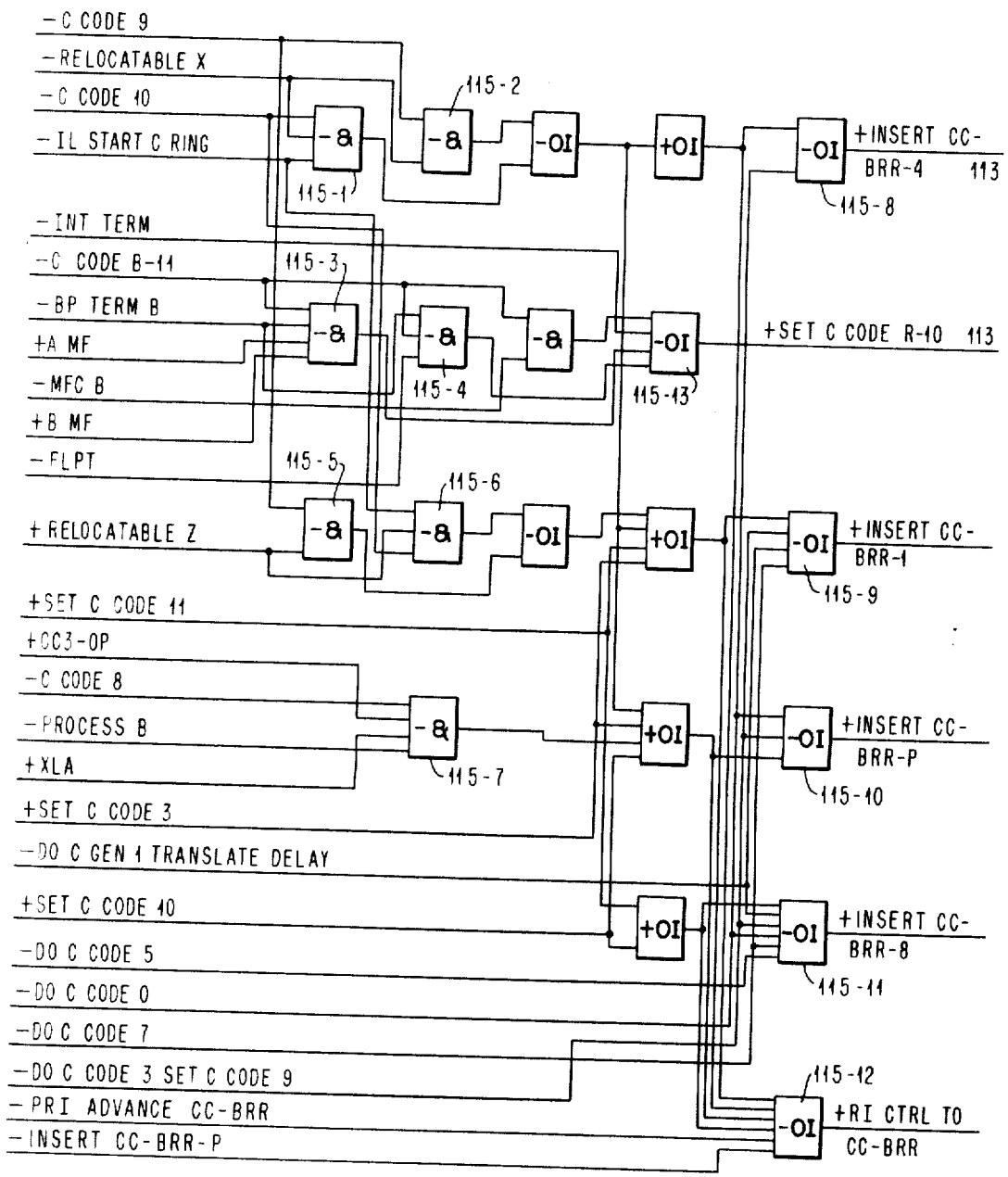
FIG. 115 CC REQUEST ANDS

June 27, 1967  G. A. BLAAUW ET AL  3,328,771
PRIORITY SEQUENCE CONTROL
Filed June 30, 1964  155 Sheets-Sheet 13
FIG. 116  INCREMENT CC WORD ADDRESS
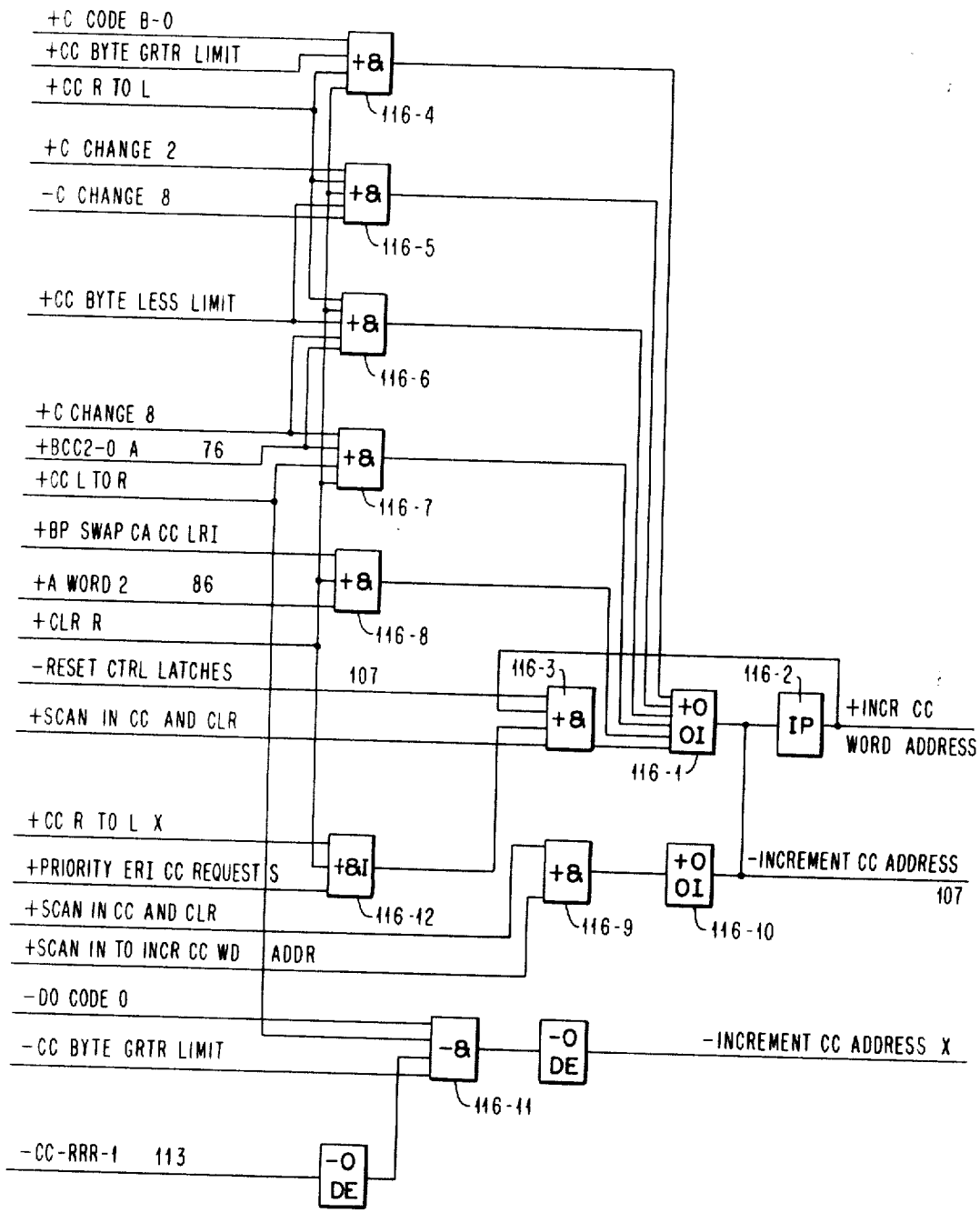

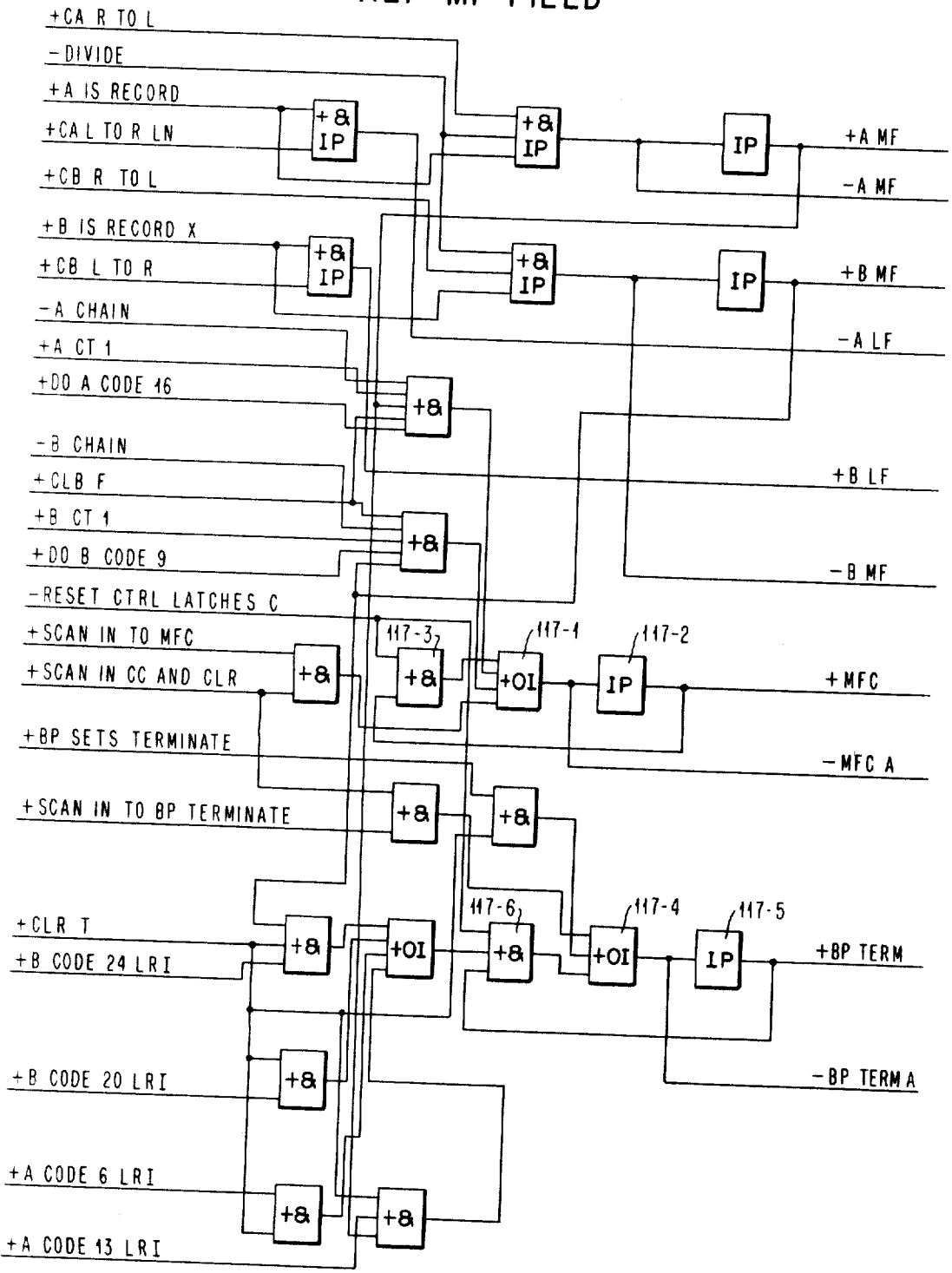
FIG. 117 ALF MF FIELD

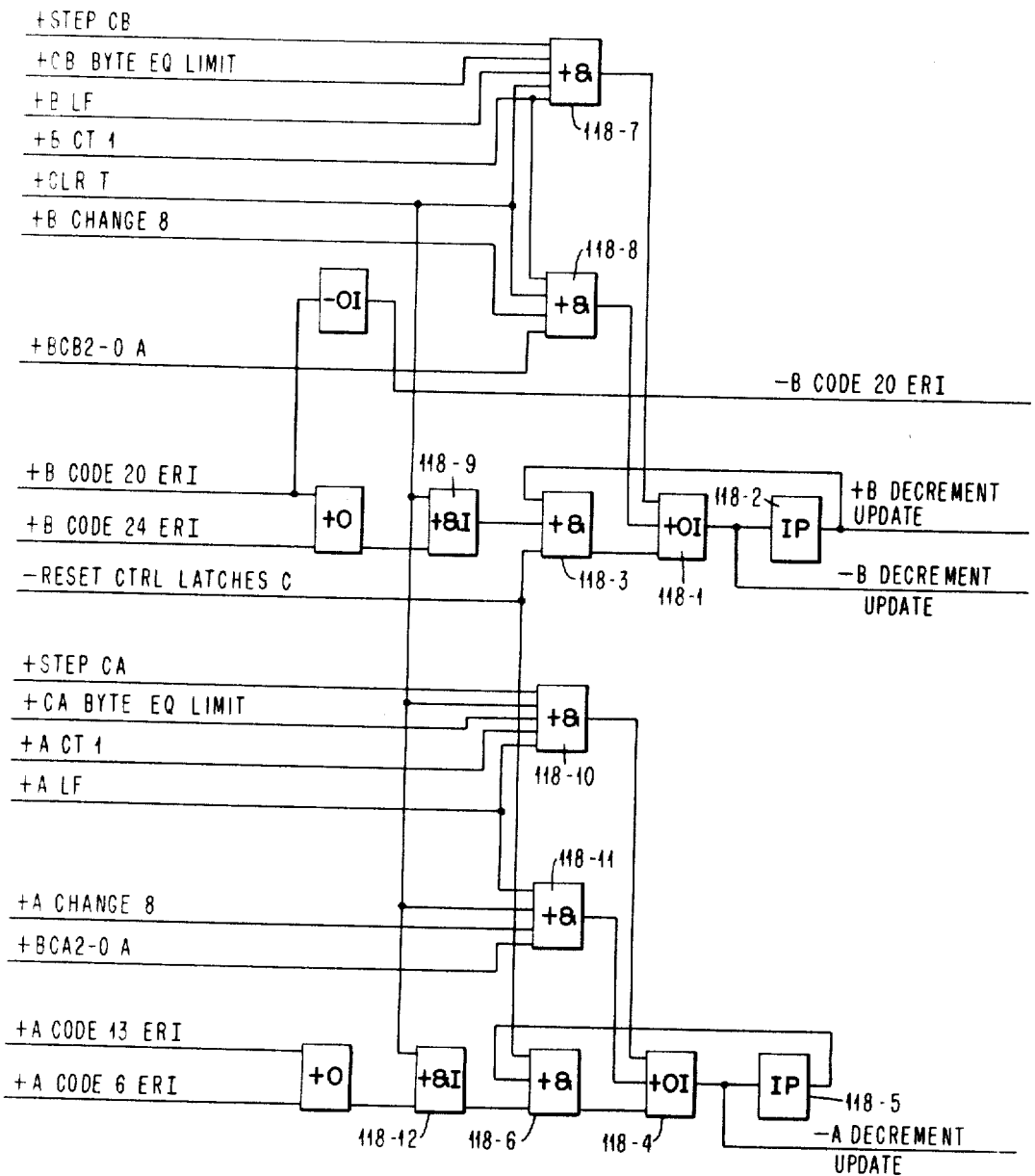
FIG. 118 DECREMENT UPDATE LATCHES

FIG. 119 "BUS TIME" DECODERS
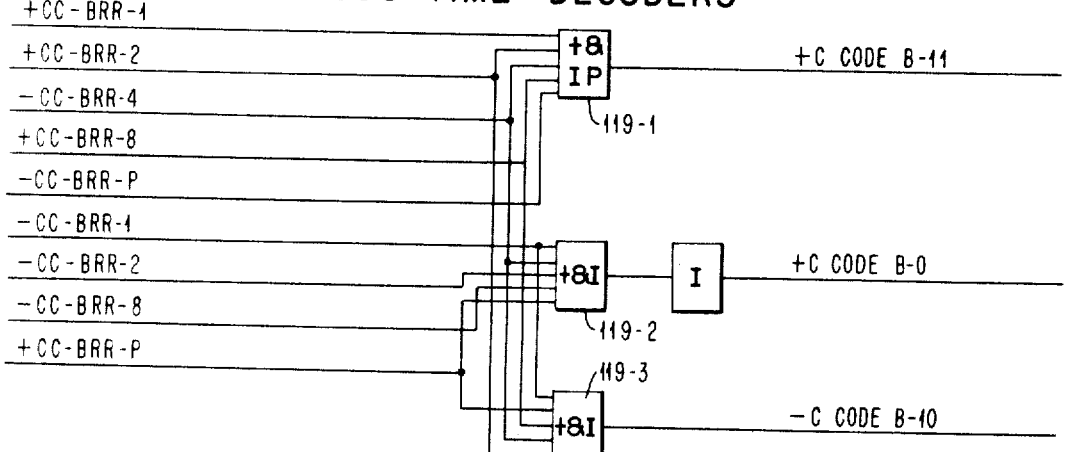
FIG. 120 BYTE EQUAL ZERO
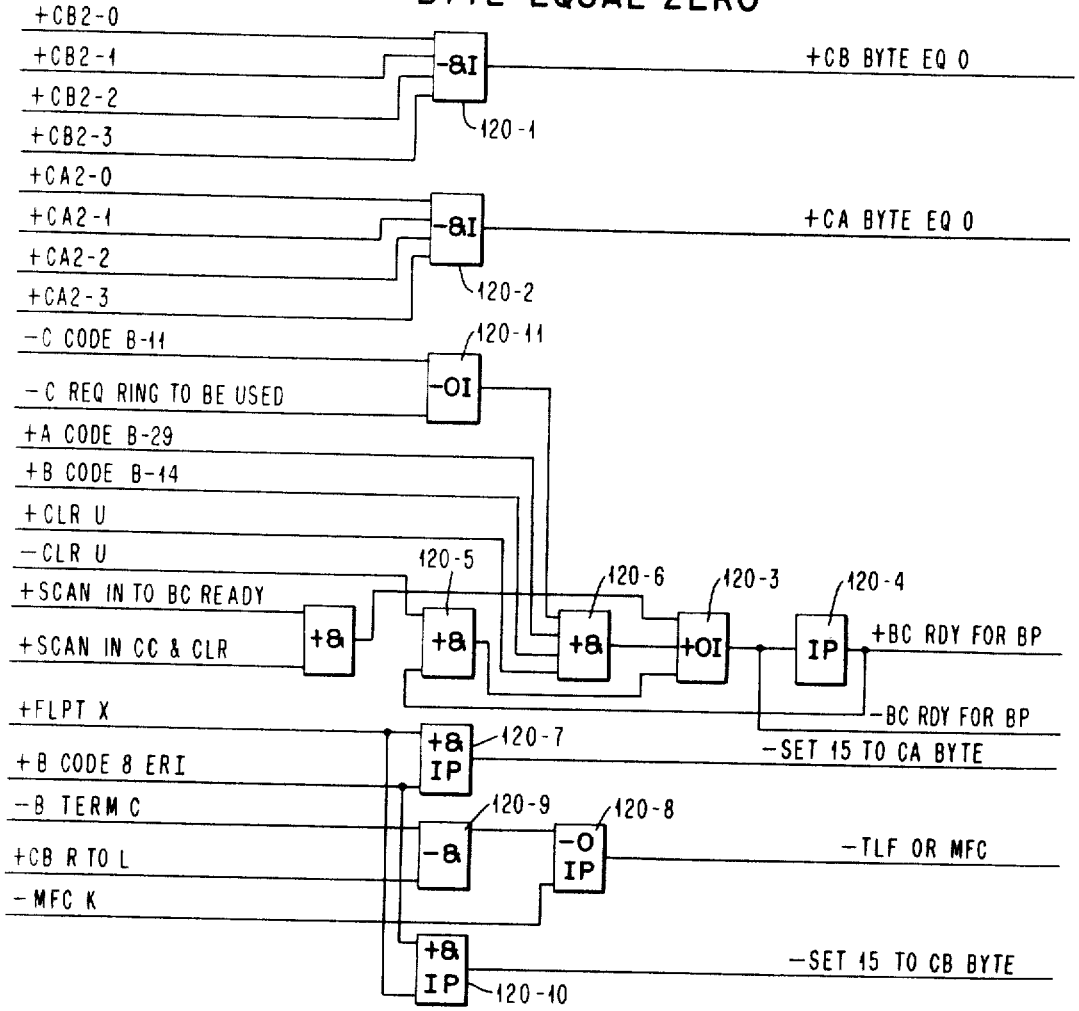

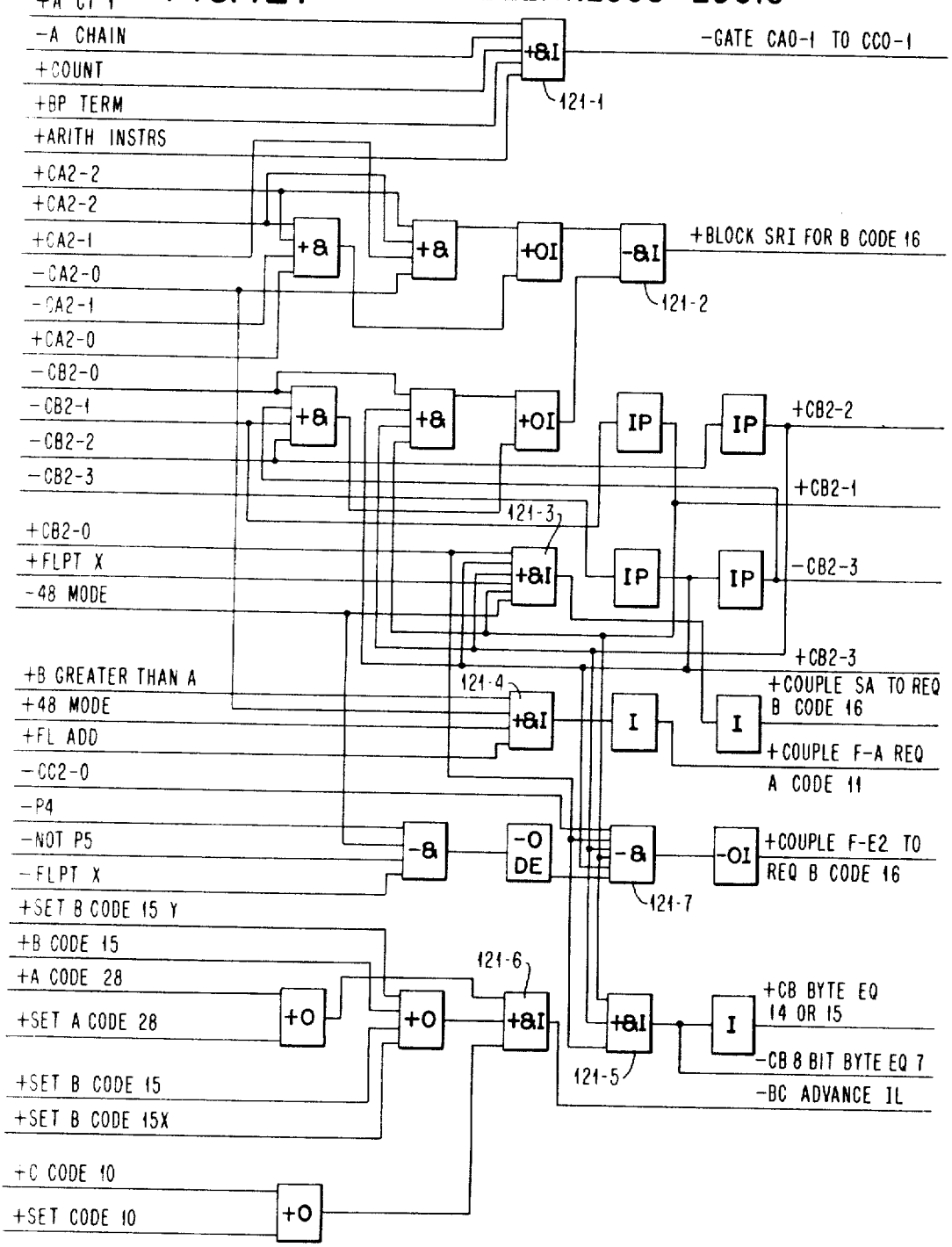
FIG. 121 MISCELLANEOUS LOGIC

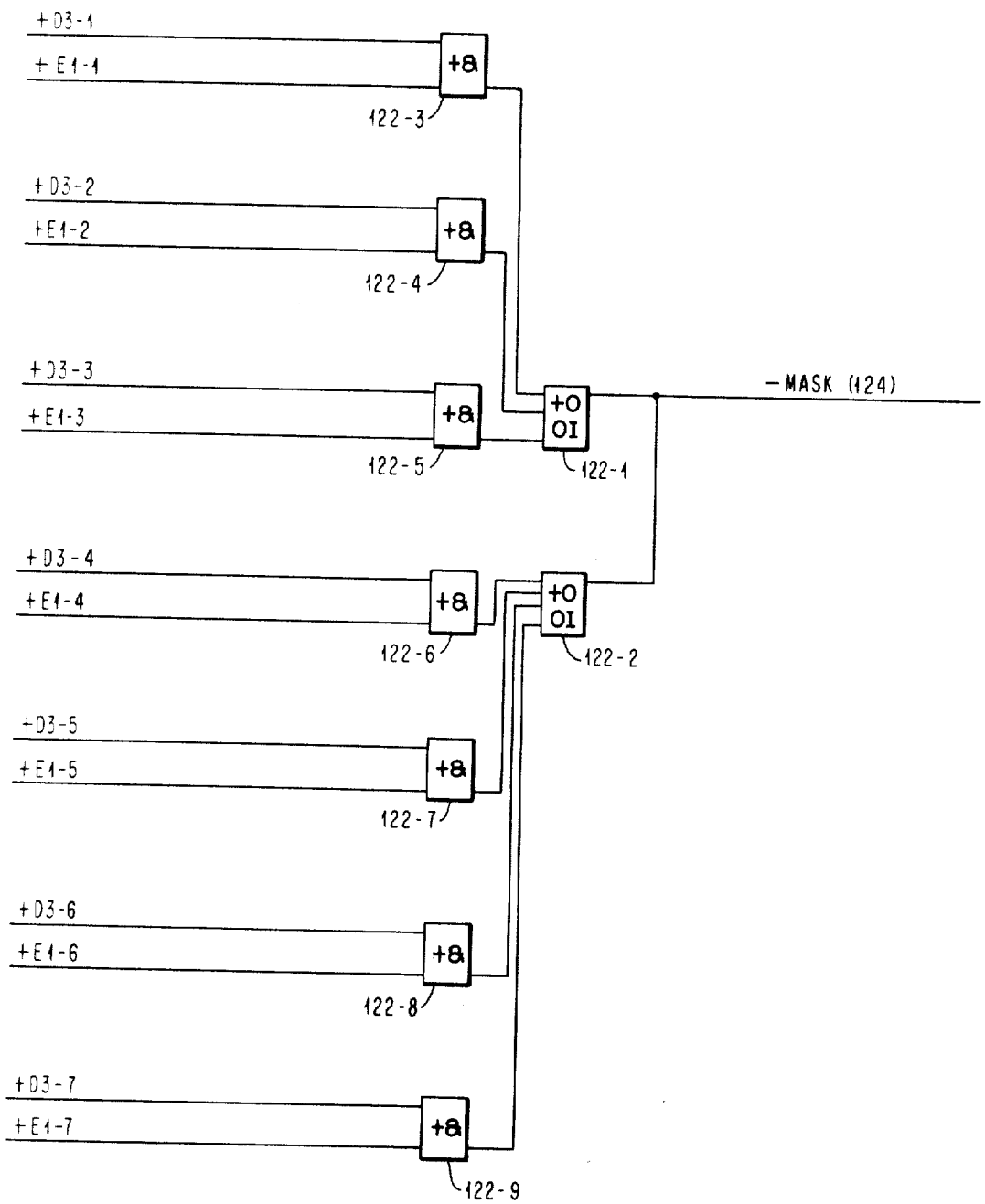

June 27, 1967
G. A. BLAAUW ET AL
3,328,771
PRIORITY SEQUENCE CONTROL
Filed June 30, 1964
FIG.123a  PRESERVE REGISTER
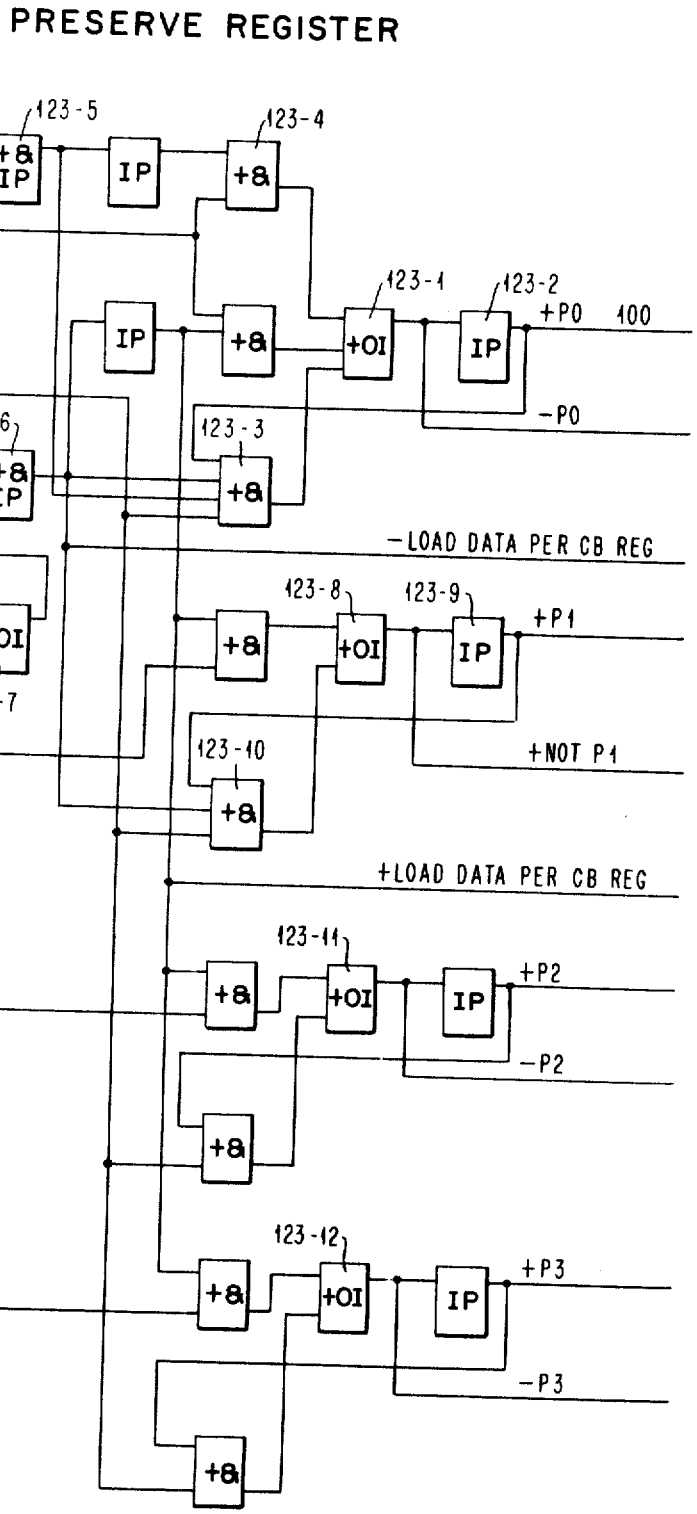

PRESERVE REGISTER

PRESERVE REGISTER

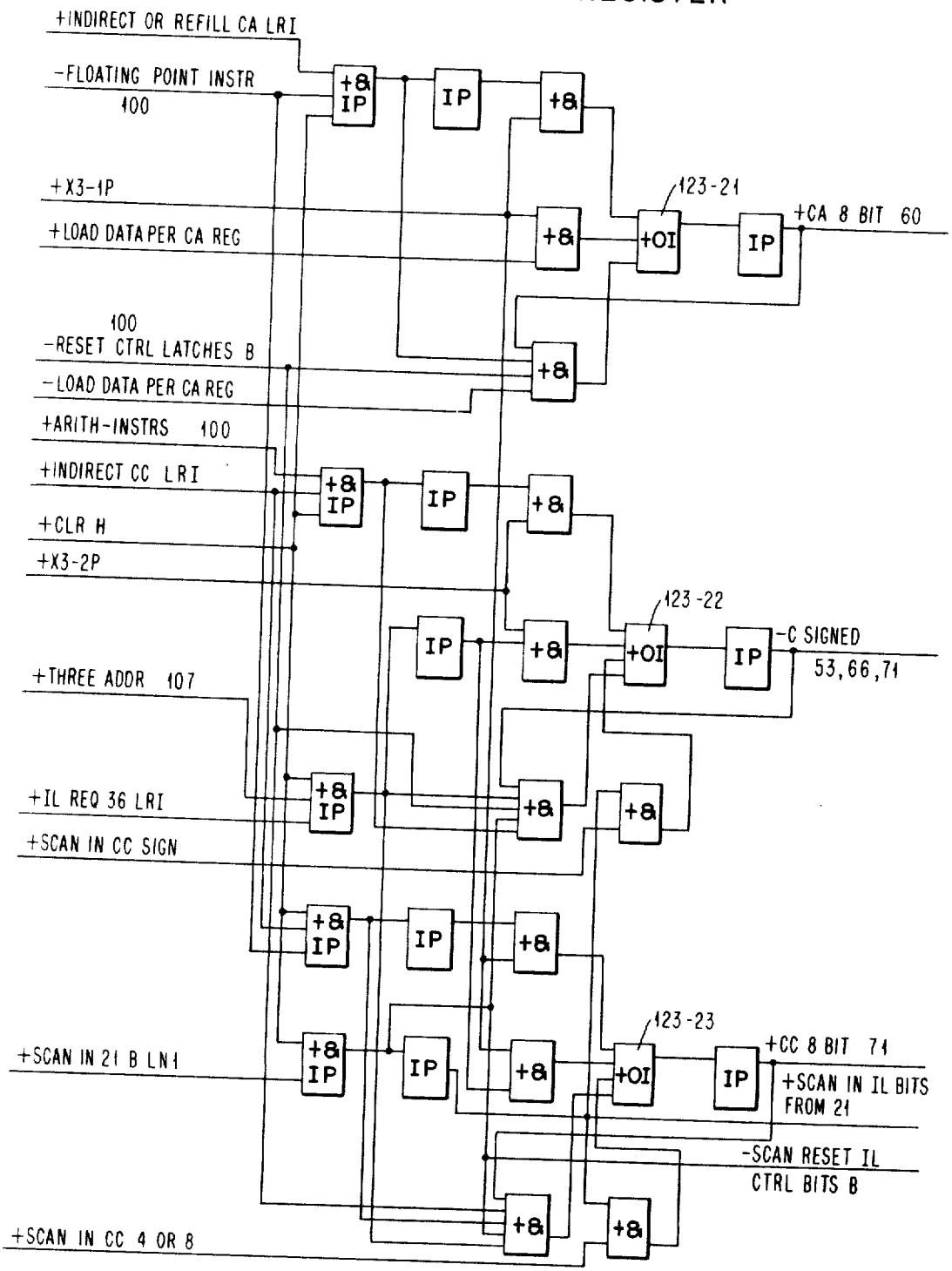
FIG.123d  PRESERVE REGISTER

PRESERVE REGISTER

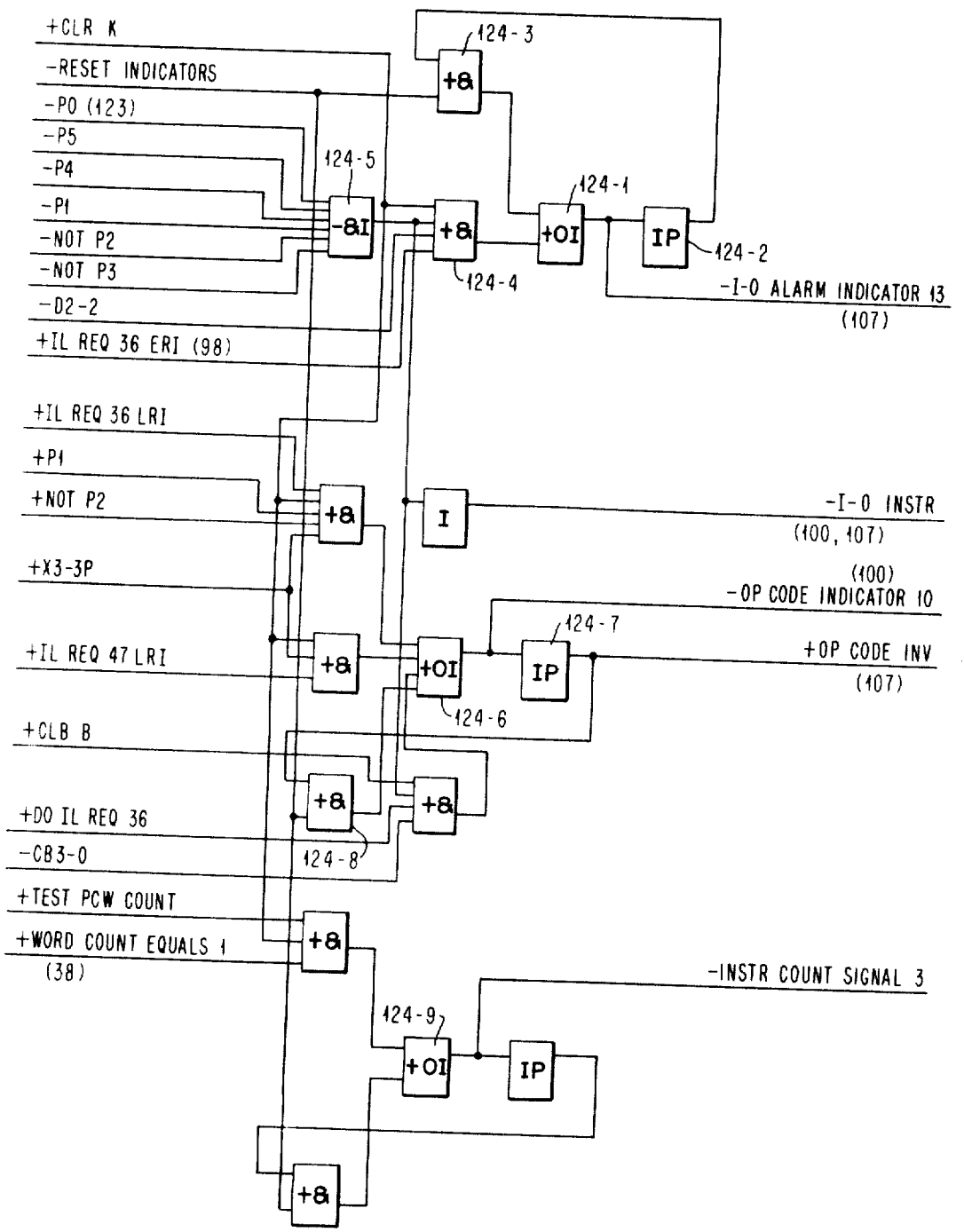
FIG.124a INDICATORS

INDICATORS

FIG.127 ADDER CONTROLS
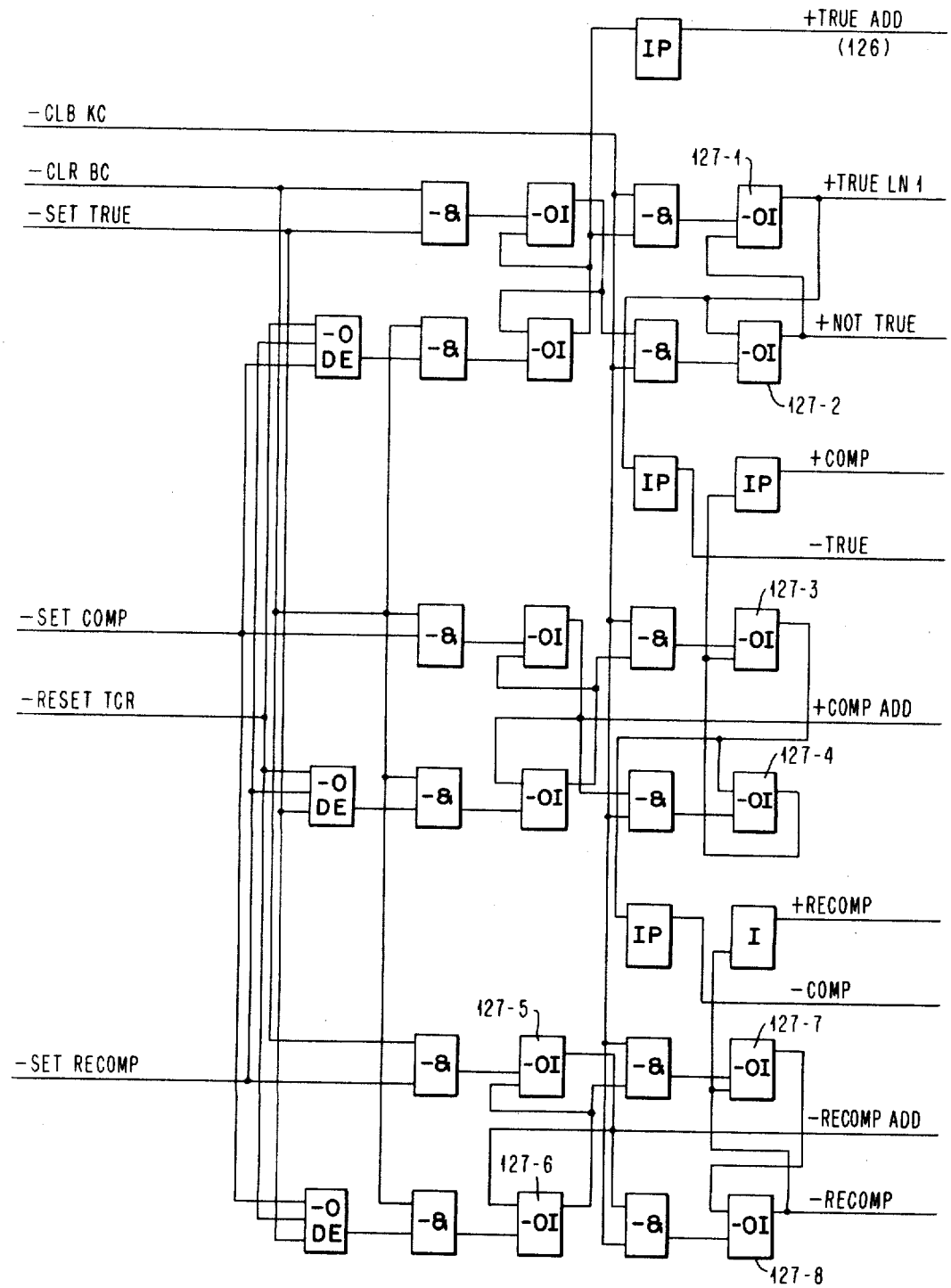

FIG.128 ADDER 2 TO A TRIGGER
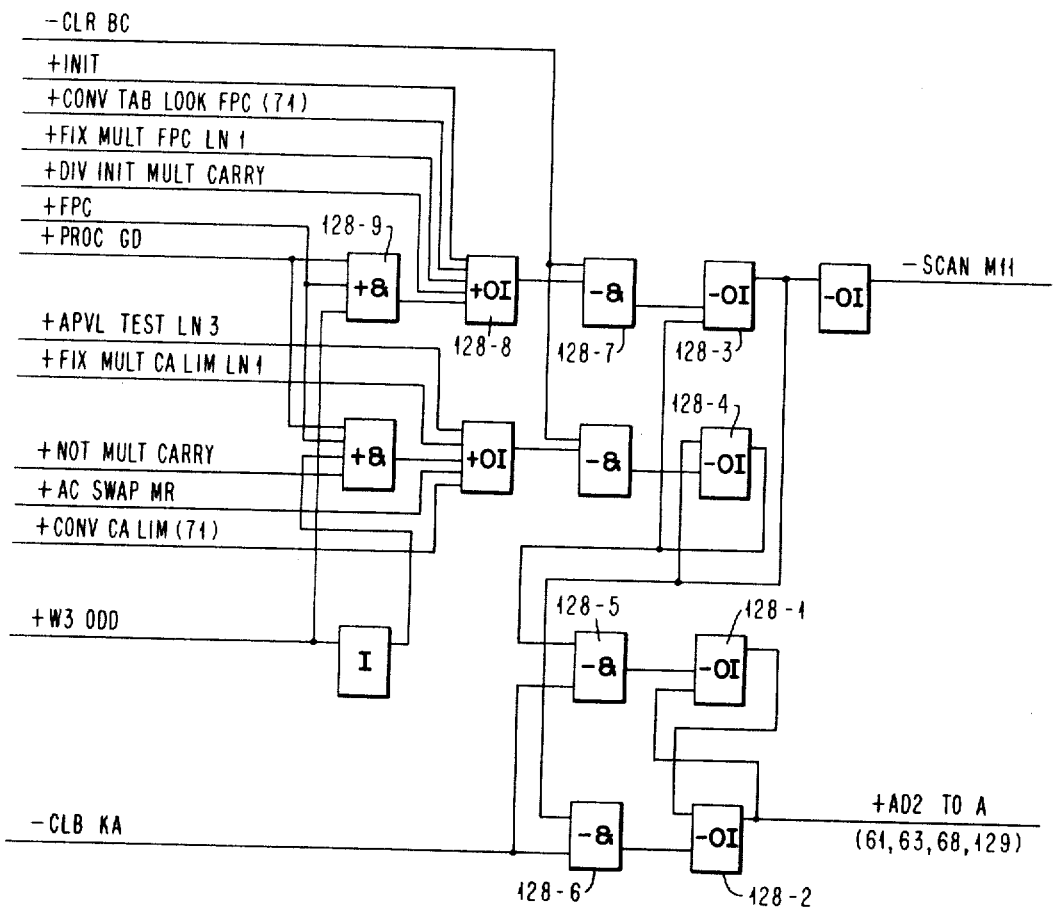
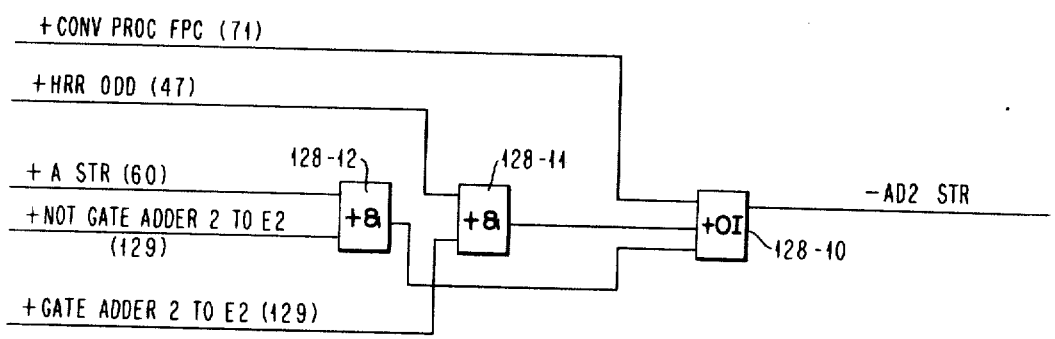

June 27, 1967  G. A. BLAAUW ET AL  3,328,771
PRIORITY SEQUENCE CONTROL
Filed June 30, 1964

ADDER 2 GATING

FIG.130 ADDER CONTROLS
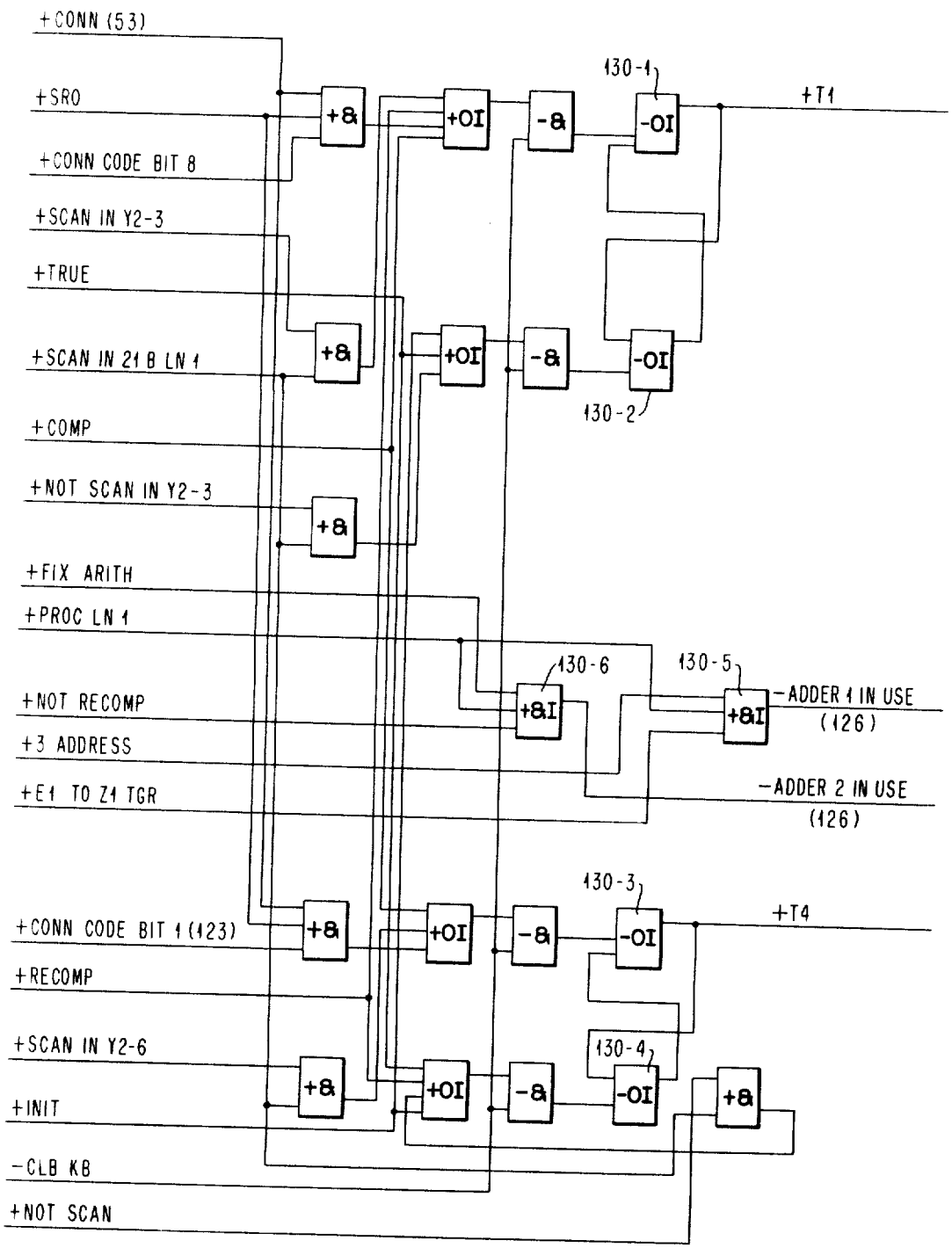

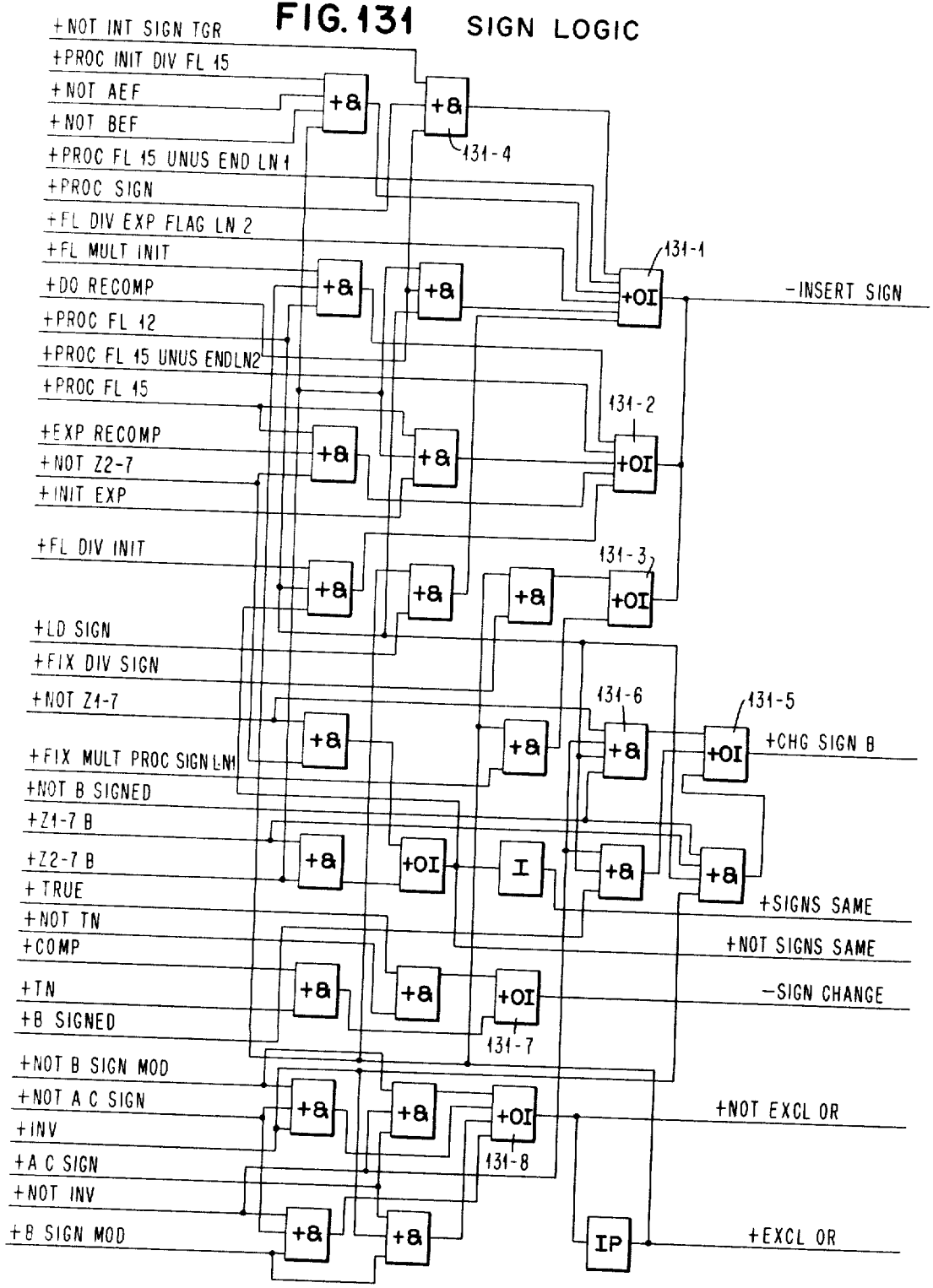

United States Patent Office 3,328,771
Patented June 27, 1967

3,328,771
PRIORITY SEQUENCE CONTROL
Gerrit A. Blaauw and William V. Wright, Poughkeepsie, and Russell H. Larson, Wappingers Falls, N.Y., assignors to International Business Machines Corporation, New York, N.Y., a corporation of New York
Filed June 30, 1964, Ser. No. 379,235
20 Claims. (Cl. 340—172.5)

ABSTRACT OF THE DISCLOSURE

The invention is a unitary control for a stored program data processing system. It responds to a stored program by causing a logical assemblage of registers and arithmetic units, memory, and data buses to operate as a data processor. It provides a higher ratio of use to non-use of the various units than that available with previous controls, by overlapping successive operations which are free of conflict.

---

This invention relates to control apparatus for stored program electronic data processors and more particularly to control apparatus providing a number of simultaneous control sequences for optimum data processor operation.

The various operations of a stored program data processor may be categorized in several basic types of control sequences which are relatively independent of each other. In this invention, each control sequence is controlled by a "request ring," and a priority mechanism controls the request rings to prevent conflicting requests from interfering with each other.

The processor operates according to instructions, each instruction involving a number of elemental processor control functions or operations. Each instruction initiates an operation sequence by activating several request rings. The request ring takes over and controls performance of the sequence under control of the priority mechanism.

Each operation in turn requires specific gating functions to be performed during a finite small number of basic machine cycles. The specific gating functions may be termed "jobs," and there may, for example, be two jobs (early and late) per operation. Successive operations are permitted to overlap except where the second job of the first operation requires use of the same data paths as the first job of the second operation. The priority mechanism provides a go-ahead signal to the request ring for the second operation only where no data path conflicts occur.

The function of a request ring is to request priority go-ahead for the operation called for by is present configuration, control the operation, and set itself to a new configuration according to the present configuration, the instruction and a set of indicators.

The "request rings" are not simple rings. They each include a multi-bit register and complex logic to control the sequence of requests according to the instruction and a set of indicators. For example, a request ring might proceed from bit configuration 11010 to 11011 during addition if the sign is +, but might proceed from 11010 to 00011 in subtraction if the sign is —.

The early job of a particular operation is performed immediately upon a response from the priority mechanism, controlled by gating signals transmitted on conductors called "do" lines. The late job is coded so as to identify the source request ring and delayed a proper period of time in a delay device called "priority pipe."

The late job code comes out of the priority pipe to control the gating for the late job simultaneously with the gating signals on the "do" lines for the early job of the next request. Where this simultaneity would demand double use of a machine bus, the next request is delayed. If a malfunction should occur and the conflicting next request not be delayed, the double use of the bus will in most cases be detected as a parity error.

B. CHARACTERISTICS OF THE INVENTION

B1. Objects

An object of the invention is to provide a computer system with a plurality of independent simultaneously functioning operation control sequences.

Another object of the invention is to provide a computer with a checked system of operation control sequences.

Another object of the invention is to optimize usage of the data paths of a digital computer by providing several independent simultaneously functioning operation control sequences with a priority control which uses the data paths to a maximum by allowing successive non-conflicting operations to overlap.

Another object of the invention is to check the operation requests in a control sequence indirectly through normally available parity checks on the data paths.

Another object of the invention is to preserve the information required to duplicate the setup of the data processing system.

Another object is to assemble addresses from actual address values and from fixed values in response to control sequence position, and to facilitate byte addressing.

B2. Features

A feature of the invention is a system of independent simultaneously functioning request rings which provide to a priority control a constant source of operation requests. The request rings each have an assigned rank for priority purposes. The priority control permits the highest priority operation request to proceed simultaneously with the later portion of the previous operation request, or delays the operation to prevent overlap, depending upon whether or not the operations can overlap without conflicting demands for usage of data paths.

A first related feature is the provision of a flexible priority which permits a lower priority request ring, in appropriate circumstances, to bypass higher priority operation requests.

A second related feature is the provision of parity in each of the operation request codes provided by the request rings.

Another feature is the provision of operation control codes with capability to provide parity on unused buses so that standard parity check devices on the buses can give an indirect but dependable check on the control mechanism.

Another feature is an auxiliary register to preserve information for duplicating the setup of the data processing system.

Another feature is an address switch which assembles addresses from address data and from fixed address values derived from the request rings, and connects to byte address delay means.

The foregoing and other objects, features and advantages of the invention will be apparent from the following more particular description of preferred embodiments of the invention as illustrated in the accompanying drawings.

B3. Drawings

FIGURE 1 is a block diagram of the priority sequencing control according to the invention.

FIGURE 2 is a time-scale diagram of an example of operation according to the invention.

FIGURE 3 is a block diagram of data paths of the computer environment of the invention.

FIGURES 4a, 4b and 4c are a more detailed block diagram of data paths.

FIGURES 5a, 5b, 5c and 5d are a diagrammatic presentation of the request rings.

FIGURES 6–131 are detailed schematic block diagrams of a preferred embodiment described in the following tables (which also relate each detailed schematic block diagram to FIGURES 1, 3 and 4 as appropriate).

B4. Functional unit index to drawings

Figure 4B:
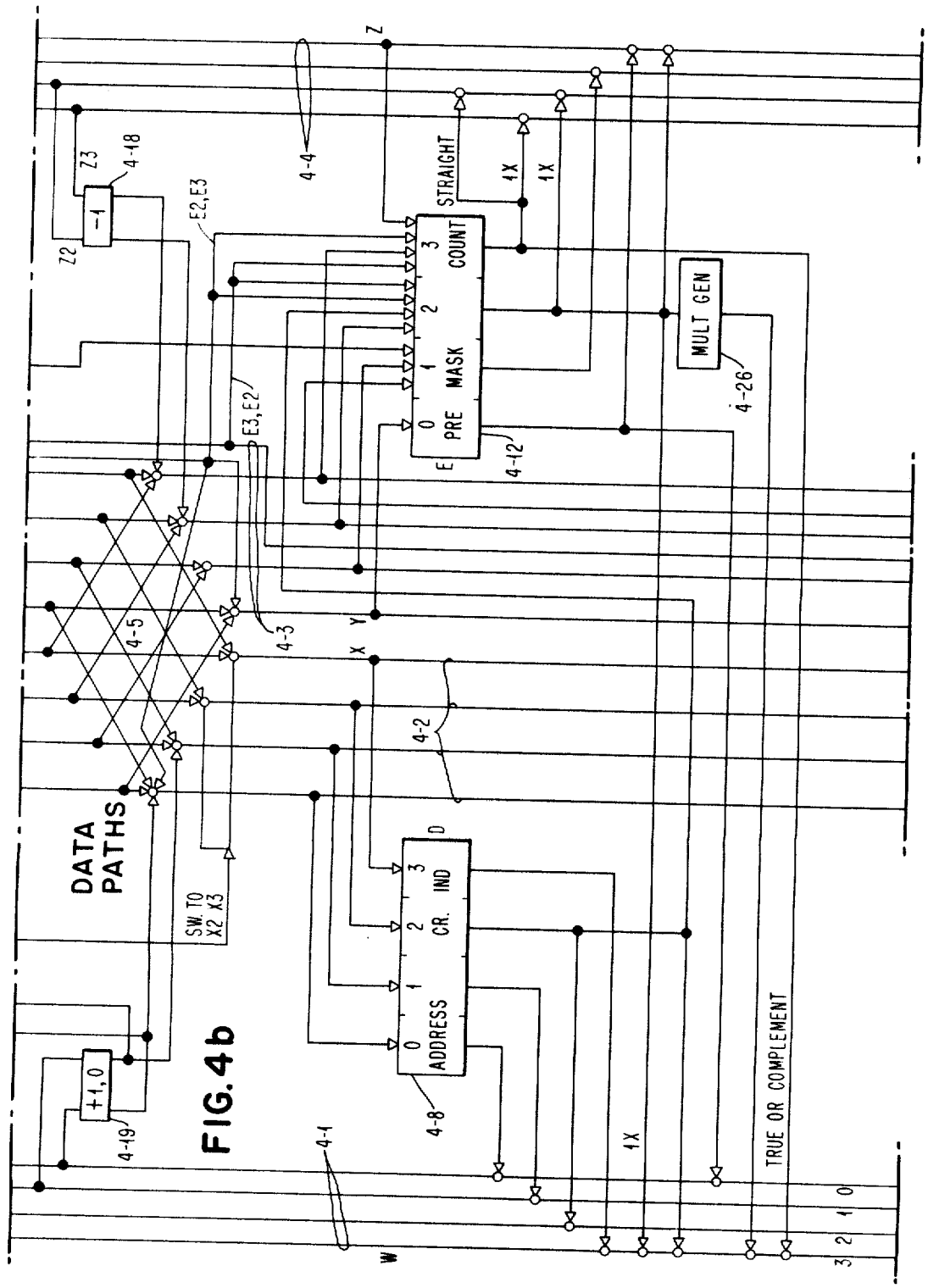

| Functional Unit | Fig. No. | Fig. 1 | Fig. 3 | Fig. 4 |
|---|---|---|---|---|
| X Bus | 6 | | 3-2 | 4-2 |
| Address Invalid | 7 | | | |
| Memory Address Register | 8a, 8b | | 3-7 | 4-8 |
| Memory Select | 9 | | | |
| CA Register | 10 | | 3-9 | 4-9 |
| D Register | 11 | | 3-8 | 4-8 |
| A Register | 12 | | 3-13 | 4-13 |
| B Register | 13 | | 3-14 | 4-14 |
| E Register | 14a, 14b, 14c, 14d | | 3-12 | 4-12 |
| Register Set and Reset CA, CB, CC, D, A, B, E | 15-21 | | | |
| I-O Address Change | 22 | | | |
| Mask | 23 | | | |
| Instruction Load Gates | 24 | | | |
| Bus W | 25 | | 3-1 | 4-1 |
| Bus Z | 26 | | 3-4 | 4-4 |
| Increment Byte 0 Parity | 27 | | 3-19 | 4-19 |
| MDBI | 28 | | | |
| W Bus Set and Reset | 28a | | | |
| Parity and Z Bus Set and Reset | 28b | | | |
| Increment Byte 1 Parity | 29 | | 3-19 | 4-19 |
| 255 Carry Latch | 29a | | | |
| Decrementer Parity | 30 | | 3-18 | 4-18 |
| Parity Check | 31-34 | | 3-31 | 4-31 |
| W0-W1 Greater Than Z0-Z1+1 | 35a, 35b | | | |
| A Register Serial Output | 36a, 36b | | 3-13 | 4-13 |
| 0-1-2 Detect | 37 | | | |
| Count 0-1 | 38 | | | |
| MDBO Serial Bits | 39-40 | | 3-6 | 4-6 |
| Switch | 41a, 41b, 41c, 42-44 | | 3-15 | 4-15 |
| MAR Encoder Parity | 45 | | 3-16 | 4-16 |
| HR HB BRR Register | 46-49 | | | 4-29, 4-30 |
| MDBO to X and Y Controls | 50 | | | |
| BP Req Ring | 51-52 | 1-7 | | |
| Byte Process Decoder | 53a, 53b, 53c, 53d, 54a, 54b, 54c, 55 | (See 1-14) | | |
| Byte Process W and Z Bus Gating | 56a, 56b, 57 | | | |
| Byte Process Data Flag Controls | 58 | | | |
| Condition Register Controls | 59 | | | |
| Register E Gating | 60a, 60b | | 3-12 | 4-12 |
| HRR Gating | 61 | | | 4-30 |
| Byte Process Details | 62-65 | | | |
| Byte Counter | 66a, 66b, 67-69 | | | |
| Byte Controls | 70-72, 73a, 73b | | | |
| BCA Byte Register | 74 | | | |
| BCB Byte Register | 75 | | | |
| BCC Byte Register | 76 | | | |
| Set Byte | 77 | | | |
| Set Byte Count Reset | 78 | | | |
| Byte v. Limit | 79 | | | |
| CA Request Ring | 80a, 80b, 81-86 | 1-3 | | |
| BP, CA, CB, CC, DX, and IL Decide | 87-89 | 1-12 | | |
| Priority Given to IL | 90 | | | |
| I-O Byte Cycle Decide | 91 | 1-11 | | |
| Priority Pipe | 92-98 | | | |
| 2nd Stage Read Out ORS | 99a, 99b | 1-18, 1-19 | | |
| Sequencing Control Logic | 100a, 100b, 100c, 100d | | | |
| IL Request Ring | 101a, 101b, 102-106 | | | |
| Control Latches | 107a, 107b, 107c, 107d | | | |
| CB Request Ring | 108-112 | | | |
| Request Ring CC | 113-116 | 1-6 | | |
| ALF MF Field | 117 | | | |
| Decrement Update Latches | 118 | | | |
| "Bus Time" Decoders | 119 | | | |
| Byte Equal Zero | 120 | | | |
| Miscellaneous Logic | 121 | | | |
| Mask | 122 | | | |
| Preserve Register | 123a, 123b, 123c, 123d, 123e | | | |
| Indicators | 124a, 124b | 1-28 | | |
| Equals 0 | 125 | | | |
| Invalid Data | 126 | | | |
| Adders | 127-131 | | 3-17 | 4-17 |

The reference numerals throughout the patent application include the figure number. Reference numeral 52-4, for example, identifies an OI block in FIGURE 52. The detailed description is in terms of individual figures; the function and mode of operation of each figure is explained with as little reference to other figures as possible.

C. SUMMARY OF THE INVENTION

The invention is a unitary control for a data processing system which provides for such data processing system a number of simultaneous control sequences. The data processing system includes bus means 3-1 to 3-5; memory register 3-6; and logical means including registers 3-7 to 3-14, logical and arithmetic units 3-15 to 3-19. Two of the buses serve as memory in buses. These buses include latches 3-21 and 3-24 and associated parity checkers 3-31 and 3-34.

The data paths are equipped with suitable gates at all appropriate connecting points of bus means, memory means and logical means. These gates are subject to gating signals from gate control registers 1-20 and 1-21 of FIGURE 1. The data processing system operates according to instructions which are available from instruction register 1-28. Each instruction involves a number of control functions called operations. Each instruction initiates several sequences of operations controlled by assigned request rings. The request ring takes over control from the instruction register and controls performance of the sequence of operations for that instruction. The actual performance of the operations takes place at times determined by priority mechanism 1-15 which provides go ahead signals for the request rings in a fixed priority rank. During the performance of each instruction, each operation as it is given a priority go ahead requires specific gating functions to be performed during a finite small number of basic machine cycles. The specific gating functions may be termed jobs and there may, for example, be two jobs, early and late, per operation. Successive operations are permitted to overlap except where the second job of the first operation requires use of the same gate control signals for the first job of a particular operation. Gate control signals for the second job of the previous operation are available at gate control register 1-20 and ORS 1-19. The mechanism by which the particular request ring controls the gate control registers includes the request rings themselves (1-1 to 1-7) which provide outputs to DECIDE blocks 1-11, 1-12 to determine the highest priority ring currently requesting. Early decoders 1-13 and 1-14 for each request ring set up a decoded signal in response to the request which decoded signal awaits only a priority response from priority mechanism 15. This priority go ahead is provided to the highest rank request ring if there is no job conflict signalled by job conflict box 1-27. Upon receipt of the priority response, the early decoder provides immediately gate control signals at OR 1-19 to control out gates to the buses. It provides slightly delayed gate control signals via B latch 1-20 to gate data into the registers. It provides an output from encoder 1-17 which is delayed one complete cycle, passed through late decoder 1-24 and provided to the gate control register 1-20 and OR 1-19 on the subsequent cycle.

The priority sequencing control of FIGURE 1 provides, for each job of each operation request, suitable gating signals to apply proper parity signals to each of buses 3-1 and 3-4. Any failure to provide this proper parity is detected by parity checkers 3-31 or 3-34 and signals an error.

Preserve register 3-25 is connected to preserve suitable information to duplicate the setup of the data processing system.

D. FUNCTIONAL DISCUSSION

D1. *Priority sequence control unit (FIGURE 1)*

The function of the priority sequence control unit is to provide basic control of data paths, including logical units, buses, and memory, to make the data paths function as a data processor. The control unit is made up of several request rings, each providing suitable operation codes to control a short sequence of jobs. Priority mechanism determines which request ring is to have immediate access to the data paths. Each job involves gating of data and control of logical manipulations during a single machine cycle of two half cycles.

Greatly simplified, operation of the priority sequence control unit includes the following hierarchy of control.

I. Instruction:
   A. Priority mechanism—
      (1) Request ring operation code—
         (A) First cycle—
            (1) First half cycle (bus)
            (2) Second half cycle (register)
         (B) Subsequent cycle—
            (1) First half cycle (bus)
            (2) Second half cycle (register)

The request rings are as follows:

| | | |
|---|---|---|
| IO | 1-1 | Input output. |
| DX | 1-2 | Data transfer. |
| CA | 1-3 | Operand control. |
| CB | 1-4 | Do. |
| CC | 1-5 | Do. |
| IL | 1-6 | Instruction load. |
| BP | 1-7 | Byte processing. |

Because of the general characteristics of a computer, priority is assigned to the request rings in the order listed. Input output, for example, is related to electromechanical devies which do not have the time flexibility of other operations. Input output control ring IO is thus assigned first priority. The priority rank is fixed with the exception that the IL ring can bypass rings CA, CB and CC under appropriate circumstances.

Each request ring includes several sets of triggers, each set providing a request ring code related to an operation. DX ring 1-2 is shown to include B triggers 1-8, which operate at "bus" time, and R triggers 1-9, which operate at "register" time. Each cycle is divided into B and R periods, and the triggers are controlled accordingly.

The request ring is not a ring in the technical sense, but a complex device having several multi-bit configurations, each configuration providing a multi-bit output related to an operation and the logic necessary to step to the next configuration, according to a set of conditions. A ten configuration request ring might, for example, step 1-2-3-4 . . . 9-10 under one set of conditions and might step 1-3-5-7-5-2-10 under another set of conditions. The conditions may be related to computer instructions, to arithmetic indicators or to other variables.

Each request ring provides its output (operation request) to a decode (DCID) box (1-11 and 1-12 shown) and an early decode box (1-13 and 1-14 shown). The early decode box converts a portion of the operation request to a simple code identifying the request ring, which indicates to priority box 1-15 that its ring is making a request for service. Priority box 1-15 assigns priority to the appropriate ring and provides a "go ahead" signal to the selected early decoder. If request ring DX, for example, is the highest priority requester, as indicated to priority box 1-15 by a signal from job box 1-12 in the absence of a signal from job box 1-11, priority box 1-15 provides a go ahead signal to early decoder 1-14.

D1.1. *"Do" lines*

The selected early decoder feeds back a signal to its request ring to step the request ring to the next position, and provides control outputs on "do" lines 1–16 and to encoder 1–17. The function of the "do" lines output passes via multiple OR gates 1–18 and 1–19 to gate data onto the bus during the first half of the cycle and also set gate control register 1–20. The gate control register gates the results of the operation in the second half of the cycle back into the appropriate register.

Encoder 1–17 controls gating for the late job, on the next machine cycle. It provides as its output a "priority pipe code" identifying both the request ring and the operation. The priority pipe code passes to the priority pipe 1–22 (B latches) and 1–23 (R latches) which control gating after a delay of one cycle from the go ahead signal. The signals necessary to provide actual selection of gates are decoded by late decoder 1–24 and supplied via lines to the ORS 1–19 which gate data onto the bus and also to the gate control register 1–20 which controls gating the results of the operation back into the appropriate register.

D1.2. Checking

Parity is carried along in all request ring outputs (operation requests); it could be carried in decoder sequences to 1–26. Points 1–25 and 1–26 are suitable parity check points if such checks are desired. The proper output of early decoders and late decoder, however, is reflected by the contents of control register 1–20 and gate control ORS 1–19 which control the actual gating operations. If these contents are not in order, there is a failure to load properly all of buses W, X, Y and Z, and a parity check results when the buses are activated.

D1.3. Bus conflicts

Since both the early and late decoders have access to control register 1–20 and the gate control ORS 1–19, and since it is necessary to prevent conflicts in bus assignments, it is necessary to define the situations where the first cycle operation of a particular job could conflict with the second cycle operation of the previous job. This definition is performed by job conflict box 1–27 which cooperates with priority box 1–15 to delay the go ahead for the particular job. The job conflict box responds to bus use information derived from the priority pipe code supplied to it. It identifies the buses required to perform the job identified by the priority pipe code. If the buses are also needed by the fisrt job of the subsequent operation, the subsequent operation is not granted priority go ahead.

D2. Example (FIGURE 2)

FIGURE 2 shows on a time scale how the early and late cycles of a sequence of operations are handled separately or concurrently to provide maximum use of mechanism.

The early cycle of a suceeeding operation occurs concurrently with the late cycle of the existing operation wherever possible. If this overlap is such that bus conflicts might occur, the early cycle is delayed, as indicated by the blank portions.

The legend on the leftmost early cycle time mark,

"D→W"
———
IL means that the contents of the D register pass to the W bus under control of the Instruction Load ring IL. Other time marks are similarly identified to indicate happenings at such times.

A complete description of the example follows in sequence with the discussion of FIGURES 3 and 4 and OPERATION—GENERAL, under subhead OPERATION—EXAMPLE.

D3. Data paths (FIGURES 3 and 4)

The basic data transfer paths are the W, X, Y and Z buses 3–1, 3–2, 3–3, 3–4 and crossover 3–5. These provide mutual access to memory data register (MDR) 3–6 for each of the several registers 3–8 to 3–14 and arithmetic and logical units 3–15, 3–17 and 3–18. Buses W and Z are checked by parity checks 3–31 and 3–34. The W and Z buses are equipped with bus latches 3–21 and 3–24.

During computer operation, operands and instructions are stored in appropriate registers, are acted upon by the various arithmetic and logical units, and are stored or replenished by reference to memory via MDR 3–6 according to the contents of memory address register (MAR) 3–16.

All operations of the units shown in FIGURE 3 are under direct gating control according to the current outputs of OR gates 1–19 and control register 1–20.

FIGURE 4 shows the data paths in greater detail. Wherever possible, the same reference character suffixes are used as in FIGURE 3. The memory data register, for example, is 3–6 in FIGURE 3 and 4–6 in FIGURE 4.

E. OPERATION—GENERAL

The processor is designed to achieve processing power through the ability and flexibility of the machine operations. Maximum use of control equipment, data paths, and registers is made. The organization of the internal controls obtains the desired machine functions, control checking, and fault diagnosis in an efficient manner.

E1. Control sequencing

The processor simultaneously controls a processing operation and the transmission of data through several input-output channels. Operation of the channels is initiated by the main program, and the channels proceed subsequently, independent of the processing and from each other, under control of request rings IO and DX.

The main processing operation can be divided into five independent parts. These five parts are—one sequence for instruction loading (IL), one for instruction execution (BP), and three for operand control (CA, CB, CC).

The instruction-loading sequence fetches the instructions for operating the data processing system. The instruction-execution sequence executes the desired arithmetic or logical process under the assumption that the operands are available in internal registers. These two sequences are separate entities, but do not occur simultaneously.

An operand-control sequence performs the task of fetching operands from storage into the internal registers or storing of results, including the preparatory tasks of indirect addressing, indexing, control-word modification, and address translation. If the maximum number of results and operands for an instruction is three, three operand-control sequences are required. These sequences operate concurrently with the instruction-loading and instruction-execution sequences and with each other for two reasons. First, an operand-control sequence must load or store the contents of an internal register when a word or half-word boundary is reached, or when the field to be processed is initiated or exhausted. These actions occur at moments which differ for each of the operands. These moments are best determined by individual circuits and therefore imply individual controls for each operand. Second, a time-saving is realized through independent operand sequences, as illustrated by the indirect addressing procedure. For each operand, several levels of indirect addressing may be specified. With each address obtained from storage, a binary digit (bit) is associated which indicates whether indirect addressing is to continue or not. This bit must be inspected after the address has been obtained from storage. It is therefore not possible for the storage cycles required by indirect addressing to be adjacent to each other in time. Instead, an intervening cycle is required for decision-making. This intervening cycle may well be used to fetch addresses or operands by other operand-control sequences. The concurrent operation of independent control sequences therefore results in a time saving.

E2. *Priority*

Each control sequence may proceed independently of other sequences. However, when more than one control sequence requires the use of a functional unit, a priority of use must be enforced. A single rank of priority affects all control sequences. A priority circuit enforces this rank of priority by signalling a selected control sequence to proceed while other control sequences must wait.

Two control sequences are required for each input-output channel, a byte control sequence and a data-transfer sequence. A byte is a grouping of bits, for example eight bits, less than a memory word, for transfer or other use. Rather than build two individual sequences for each channel, a second level of priority is established for the entire input-output area. This reduces the equipment to two independent sequences and a number of status triggers equal to the number of channels.

E3. *Request rings*

Each of the independent control sequences is built in the form of a "request ring." The rings are encoded and consist of several twin-latch triggers each. A five-trigger ring can be used when the number of configurations required by the area to be controlled does not exceed 32; otherwise a larger ring must be used. A parity trigger is added to each ring so that the output code of a ring always has the same parity. This parity is useful in control checking.

E4. *Early and late cycles*

Whenever priority is granted to a request ring, the output of the ring, the operation code, is used to open the desired "in" and "out" gates of the processor. In a majority of cases a fetch or store operation is part of the operation to be controlled. These operations require two machine cycles; an early cycle for addressing, a late cycle for the actual data transfer. During each of these cycles "in" and "out" gates are controlled; therefore, control must be supplied at four successive moments in time. These times are as follows:

(1) Early Cycle Bus Time
(2) Early Cycle Register Time
(3) Late Cycle Bus Time
(4) Late Cycle Register Time

E5. *Flow of control information*

The output of each request ring is a request ring code which is sent to an early decoder and to a common code bus. The output of the early decoder in turn is sent to the priority circuit, to several gates, and to the input of the control ring.

Depending upon the request ring code, the priority circuit may or may not be involved. If the priority circuit is not involved, the ring steps to its next state as determined from the current configuration and any outside conditions which may be required. The proper gates are opened while the ring is in the current configuration. The majority of request ring codes, however, require the use of data paths or storage, and therefore involve the use of the priority circuit. So long as priority is not granted, the output of the early decoder does not open any gates and the ring configuration remains unchanged. When priority is granted, the output of the early decoder becomes effective, and at the end of the cycle the ring assumes its next configuration according to its old configuration and machine conditions. The priority circuit acts like a dispatcher by feeding the request ring code,
including its parity, to the encoder, which converts the request ring code to a priority pipe code, which identifies both request ring and the required job. The priority pipe code passes into a set of control bus triggers 1–22 and 1–23. These triggers are of the latch type and delay the priority pipe code for one entire machine cycle. Three bits of the priority pipe code identify the source request ring. The priority pipe code is used during the succeeding cycle as an input to late decode box 1–24, and the output of late decode box 1–24 is used to control machine gates during the late job cycle. There is only one common late decoder 1–24, while there is an individual early decoder 1–13, 1–14 for each control ring. As a rule, each decoder output controls several gates. A particular gate, on the other hand, is controlled by an OR circuit 1–18 or 1–19 which combines several decoder outputs. The delay provided by the control bus triggers 1–22, 1–23 makes it possible for one request ring to control the machine gates during two successive machine cycles. Since the early decoder and the late decoder outputs may be delayed by single unlatched triggers, gate control signals are provided at four different moments in time: early cycle B, early cycle R, late cycle B and late cycle R.

The order in which the priority circuit grants control to each request ring is independent of the current state of the ring. As a result, signals between request rings are kept to a minimum.

E6. *Overlap*

The flow of control information from a request ring to the early decoder 1–13, 1–14 and via the control bus triggers 1–22, 1–23 to the late decoder 1–24, and finally from the decoders to the machine gates, permits the overlap of the late cycle job of a given operation with the early cycle job of the subsequent operation, so long as bus use and memory use conflicts are absent. The jobs performed during the early and late cycles can be selected so that conflict seldom occurs. Job conflict box 1–27 can identify possible conflict situations to inhibit overlap in such situations.

E7. *Bus conflict*

FIGURES 3 and 4 show the data paths and registers of the processor. The X and Y buses are used in fetching data from storage to the processor registers during the late cycle. The W and Z buses are used during an early cycle to address the memory address register and to update the address registers of the processor. Since the W and Z buses are also used during the late cycle to store information, it is not possible to overlap the storing of data with the addressing of storage for a succeeding operation. The job conflict box 1–27 and priority box 1–15 recognize all store operations and delay succeeding operations one cycle. This delay is acceptable because the majority of operations either fetch data from storage or process information without involving storage, and only a small group store data. Process-type operations use the W and Z buses, but do not use storage. Therefore, machine control is granted to processing operations during early cycles and need not be extended to late cycles.

The following charts illustrate bus usage for four basic operation types, the possible bus conflicts, and the acceptable queueing arrangements.

E7.1. *Bus usage*

|   | Type  | 1B   | 1R   | 2B   | 2R   |
|---|-------|------|------|------|------|
| A | F     | W    |      |      | XY   |
| B | S     | W    |      | WZ   |      |
| C | P     | WZ   | XY   |      |      |
| D | Other | (WZ) | (XY) | (WZ) | (XY) |

E7.2. *Bus conflicts*

|              | Operation 1      | A        | B           | C | D               |
|--------------|------------------|----------|-------------|---|-----------------|
| Operation 2  | A                |          | W           |   | W               |
|              | B                |          | W           |   | W               |
|              | C                | XY       | WZ          |   | WZXY            |
|              | D                | XY       | WZ          |   | WZXY            |

E7.3. *Queuing*

| Operation Type | Overlap Type | Delay Type |
|----------------|--------------|------------|
| A              | AB           | CD         |
| B              |              | ABCD       |
| C              | ABCD         |            |
| D              |              | ABCD       |

E8. *Cycles and pulses*

Two cycle durations are used within the processor. A short cycle requires one time unit and is used whenever storage is not required. A long cycle requires two time units and is used whenever a storage fetch or store is involved in the operation. Except for their duration the two cycles are identical. Each contains two basic pulses; the B pulse (to bus) and the R pulse (to register). During the B pulse, information is read from the registers to the W bus and to the Z bus. During the R pulse, information is read into the registers from the X and Y buses or from the logical circuits. Any processing operations can be performed during the short cycle. For operations requiring the long cycle, the R and B pulses are simply stretched out. This arrangement provides flexibility in the type of storage used, and permits the attachment of storage units with a cycle time of more or less than the standard. The arrangement furthermore permits the short cycle to be adjusted according to the actual safe operating speeds of the processor circuits. The B pulses are directly controlled from the outputs of the early and late decoders. The R pulses are controlled from the single triggers fed by these decoders. In this manner, control for the register out gates and in gates remains steady for the duration of the corresponding B and R pulses.

E9. *Checking*

The request ring and priority pipe codes, including parity bits, are decoded by the early and late decoders. Only valid codes result in signals which open gates. A code with invalid parity or an unused code with valid parity does not send information to the W and Z buses. The check circuits on these two buses, however, are constantly operating and note the complete absence of information, since odd parity is required. Thus, the check circuits on the data buses are used inferentially to check control information. Valid codes *always* send information on all bytes of both the W and the Z buses. Even if no information is needed on one of these buses, a register is gated out to provide proper parity. This incidentally provides added checking on some of the counting and byte-addressing circuits thus read onto a bus. This checking procedure extends not only to the individual request rings, but to any fault in the priority or control bus circuits which would cause an erroneous control code. Faults in the decoders and gate circuits are detected by lack of information on the bus or by the presence of too much information. Since four individual parities must be satisfied for each bus, wrong parity is very likely to occur when two or more registers are erroneously gated onto the same bus. Although compensating data patterns are a possibility, this possibility is so remote that the bus parity checks provide a fully acceptable check on the control codes.

E10. *Scanning*

The control-check procedure is inexpensive as no additional check circuits are required. It is effective in conjunction with an error-scan procedure because any detected error stops normal machine operation and initiates an error scan-out. Such a scan-out records the exact condition of the individual registers of the system, making trouble shooting relatively simple. The ability to stop machine operation is inherent in the control system since the priority circuit can stop all request rings. The information in all machine registers, including the request rings and the control bus triggers, is placed in storage and is available for diagnosis. Thus, a very up-to-date "snapshot" is obtained of the state of the controls when the error occurred. By a reverse procedure, scan-in, the control triggers can be set to any desired configuration, and proper operation of the control circuits can be verified on a cycle-by-cycle basis. A further description of these diagnostic techinques is given in: R. H. Larson and W. V. Wright, "Maintenance Scanner," IBM Technical Disclosure Bulletin, August 1961, page 54, vol. 4, No. 3.

E11. *Additional functions*

The control procedure provides the necessary versatility of control in an economical way. Once the basic requirements are fulfilled, several additional features can be introduced at low cost. The queueing of interruption codes and the updating of a real-time clock may serve as examples. These functions are additional input-output tasks and therefore can share the input-output controls, as well as the data paths. The queueing of interruption codes shares the data store and fetch controls, while the updating of the read-time clock shares the control-word updating controls.

F. OPERATION—EXAMPLE

The example illustrated in FIGURE 2 shows the cycles used for a fixed-point ADD instruction followed by a successful branch. The first instruction address of the ADD has one level of indirect addressing, and the first operand crosses a word boundary. Two byte cycles of a concurrent input-output operation are shown during the ADD operation. The top line of the figure represents early cycles; the bottom line, late cycles. The request rings originating the cycles are shown below the bars in the diagram and are listed at bottom of the figure. The length of the bars shows whether the cycles are short or long. The diagram illustrates the general principle of priority control and some of the detailed considerations which may be incorporated. For example, storage addressing for input-output does not use the W bus and thus storage access for input-output may occur simultaneous with a processing cycle. Bus conflict upon storing is illustrated by the transition from ADD to the branching operation.

The priority sequence control unit thus controls processing simultaneous with input-output channel operations, by dividing all instructions into logical sequences of operations, and permitting these operations to proceed under the supervision of a priority circuit. In the example, each control-ring code and its decoding to control codes worked without error; during no cycle was there a lack of complete parity on the W and Z buses.

G. OPERATION—FUNCTIONAL DETAILS

G1. *FIGURES 3 and 4—Data paths*

FIGURE 3 shows important data paths; FIGURE 4, which is made up of a composite of FIGURES 4a, 4b and 4c, shows the data paths in greater detail. Reference characters in FIGURE 4 show the similarity to FIGURE 3 by use of the same suffix; 3–12 and 4–12, for example, relate to the E register.

Four buses, WXYZ, 3–1 to 3–4, form the basic data paths of the machine. Two data buses (X and Y) are memory fetch buses and two (W and Z) are memory store buses. Crossover 3–5 allows transfer of data interchangeably on the memory fetch buses. One or more of the four buses connect to memory data register MDR 3–6 and to all registers and arithmetic and logical units in the data paths. Registers 3–8 to 3–14 perform the necessary high speed storage functions to make the data paths serve as a computer. Address switch 3–15 and memory address register MAR 3–16 perform the functions of referencing a particular desired location in memory and updating or modifying the address for the next memory reference. Arithmetic and logical units 3–17 to 3–19 perform multiplication, addition and increment-decrement tasks. W and Z buses 3–1 and 3–4 are latching buses as indicated by the bus latch boxes 3–23 and 3–24. The W and Z buses are supplied with parity check units 3–31 and 3–34, which perform directly the function of data checking and inferentially the function of control checking, because each valid control code is defined as including information on both of the memory store buses W and Z.

FIGURE 4 shows in greater detail those items shown in FIGURE 3. The open arrowheads indicate the presence of gates. W bus 4–1, for example, provides to MDR 4–6 four bytes of information via gates. These bytes of information may be provided to W bus 4–1 from D register 4–8, from CA register 4–9, from CB register 4–10, from CC register 4–11, or from a variety of sources including B register 4–14, A register 4–13, multiple generator 4–26, E register 4–12 or an IO device. X bus 4–2 receives data directly from the left half of MDR 4–6 or indirectly from the right half of MDR 4–6 via crossover switch 4–5 and the appropriate gates. X bus 4–2, via appropriate gates, provides data to D register 4–8, to CA register 4–9, to CB register 4–10, or to CC register 4–11. The X bus 0 byte can also be provided via a gate arrangement to a special register, preserve register 4–25.

The Y bus 4–3 is essentially the mirror image of X bus 4–2. It receives directly the right half of a data word from MDR 4–6. It can receive data from the left half of MDR 4–5 via crossover 4–6 and the appropriate gates. It delivers data to E register 4–12, A register 4–13, or B register 4–14.

Z bus 4–4 provides data to memory and to the various arithmetic and logical processing units 4–17b, 4–17a, 4–27, 4–16, etc. Z register 4–4 receives its data from E register 4–12 from multiple generator 4–26, from A register 4–13 or from B register 4–14.

The MDR content passes via a memory data bus out to the X and Y buses; the content of the registers pass via a memory data bus into MDR 4–16.

The essence of the data path arrangement, as shown in FIGURE 4, is that the memory communicates via memory data register 4–6 and via memory fetch buses X and Y and the crossover switch 4–5 with selected registers or arithmetic devices. As the computation is carried out, the data temporarily stored in the registers is operated on or controls the operation of arithmetic and logical mechanisms and provides its data output to memory store buses W and Y, 4–1 and 4–5, for return to memory via MDR 4–6. Each register generally has a full range of input and output capability. Where the needs of the computing machine do not require this full range, certain data bus connections are not made. CA register 4–9, for example, receives input directly from X bus 4–2 and provides output directly to W bus 4–1 only. A register 4–13, however, receives input from both the X bus 4–2 (bytes 4 and 3) and from Y bus 4–3, and provides its output to both W bus 4–1 and Z bus 4–4.

G2. FIGURE 4—Data path detail

Several items not shown in FIGURE 3 appear in FIGURE 4. Among these are:

Multiple generator 4–26, useful in providing multiples of a multiplier during multiply operations;

Equals comparison box 4–27;
Fixed address generator 4–28;
Fixed address generator 4–29;
Fixed address generator 4–30;
OR block 4–32, an IO connective;
Adder #1, 4–17a, and adder #2, 4–17b, shown separately instead of being taken together as a single "Arithmetic Unit" 3–17.

H. REQUEST RINGS—FUNCTIONAL DETAILS

Seven request rings, shown in FIGURE 1 as 1–1 to 1–7, control data processor operation in the preferred embodiment. The function of a request ring is to control a sequence of jobs to perform a program. Each request ring operates asynchronously with respect to the other request rings, insofar as priority is granted to it.

FIGURE 5a shows the general makeup of a request ring. It includes a register made up of a set of B latches 5–1 and a set of R latches 5–2. The register holds bit configuration codes identifying the request. This code is provided as an output, and fed back via logic 5–3 to provide the next configuration.

FIGURE 5b is a map of the CA request ring. This ring includes nine active states and two inactive states. The active states are shown as single circles about the number; the inactive states are shown as double circles about the number. The arrows show the operation.

H1. CA ring (FIGURE 5b)

The active states of the CA ring are to be listed infra under section I. The inactive states 0 (going), 6 and 12 serve as interim resting places for the ring. The active states accomplish the functions marked on the map. For example, active state 1 accomplishes the function of fetching operand a from the CA register. This operation occurs if indirect addressing is required. From CA ring stage 1, the only path is to inactive state 6. From state 6 it is possible to go to state 2 either directly during field direct operations or via state 4 during direct record operations. From the going state 0, depending on indicators, it is possible to go to state 5, to state 7, to state 8 or to state 10. State 10 controls the operation of fetching operand A per prefix address stored in register E 0 byte. From step 10 the CA ring passes to state 12. From state 12 the CA ring can go to state 3. The map indicates a multiplicity of possible request sequences controlled by the individual ring. In a usual function the ring will control indirect addressing and then will control operand movement by revolving in the rightmost portion of the map until a refill operation becomes necessary, a different path around the left side of the map is followed.

H2. CB ring (FIGURE 5c)

Figure 5C:
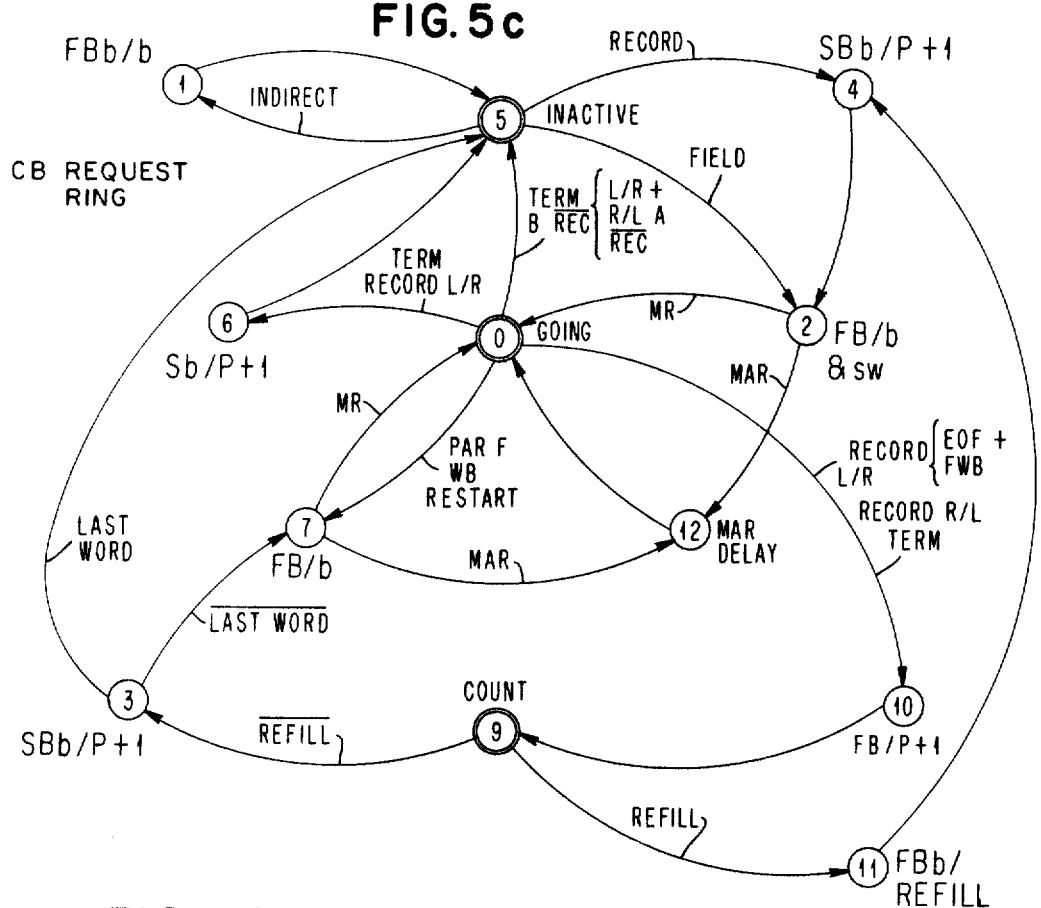

FIGURE 5c maps the operation of the CB request ring identified as ring 1–4 in FIGURE 1. The CB ring includes three inactive states, 0 (going) 5 and 9. These inactive states are resting places during operation of the ring, which resting places make it more convenient to move from one state of the request ring to the next state of the request ring.

H3. CC ring (FIGURE 5d)

Figure 5D:
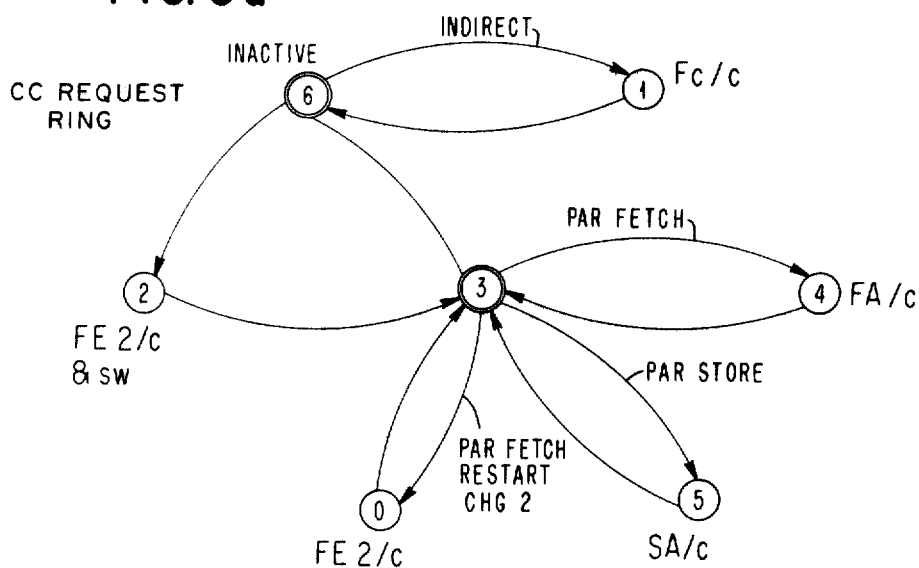

FIGURE 5d illustrates the CC request ring, identified as ring 1–5 in FIGURE 1. The CC ring, less complicated than the CA and CB rings, includes only two inactive states and five active states. Activity controlled by the CC ring includes indirect addressing by state 1, and fetch-store operations controlled by states 4, 5, 0 and 2. Inactive state 3 receives heavy use, serving as intermediary in most changes of state. The path from active state 4 to active state 5, for example, is via inactive state 3. Each of the active states controls its related operation.

I. REQUEST RINGS—SPECIFICATION

| Request Ring | Request Ring Code | Priority Pipe Code | Function | Bus Type | Mem Use |
|---|---|---|---|---|---|
| I/O Byte | 4W | 130 | F I/O FADW CHNL 4 | 4-4 | F |
| | 5W | 124 | F I/O FADW CHNL 5 | 4-4 | F |
| | 6W | 122 | F I/O FADW CHNL 6 | 4-4 | F |
| | 7W | 121 | F I/O FADW CHNL 7 | 4-4 | F |
| | 4R | 150 | SI/O FADW CHNL 4 | 4-2 | S2/Sb |
| | 5R | 144 | SI/O FADW CHNL 5 | 4-2 | S2/Sb |
| | 6R | 142 | SI/O FADW CHNL 6 | 4-2 | S2/Sb |
| | 7R | 141 | SI/O FADW CHNL 7 | 4-2 | S2/Sb |
| DX | 1 | 250 | SbB/FA32 | 4-2 | S2 |
| | 2 | 212 | FbB/FACWA | 4-4 | F |
| | 3 | 206 | FbB/FACWB | 4-2 | F |
| | 3A | 456 | SMDR/FACWA | 4 | S2 |
| | 4 | 242 | SbB/FACWA | 4-2 | S2 |
| | 5 | 260 | FMDR/FADW | 4-2 | F |
| | 5A | 455 | SMDR/b | 4 | S2 |
| | 9 | 244 | SbB/a+128 | 3-2 | S2 |
| | 10 | 266 | CORR. PARITY | 4-2 | I |
| | 11 | 256 | SbB/FACWB | 4-2 | S2 |
| | 12 | 224 | BLANK | 4-4 | I |
| | 13 | 274 | UPDATE | 4-2 | I |
| | 14 | 236 | BLANK | 4-4 | I |
| | 15 | 263 | FbB/FA32 | 4-2 | F |
| | 16 | 235 | FORM NEW CW | 2-4 | I |
| | 17 | 241 | BYTE TO MEM | 2-2 | Sb |
| | 18 | 265 | UPDATE & RESET | 4-2 | I |
| | 19 | 227 | BLANK | 4-4 | I |
| | 22 | 211 | FbB/B (REFILL) | 2-4 | F |
| | 25 | 214 | FMDR/b | 2-2 | F |
| | 25A | 433 | SMDR/FADW | 4 | S2 |
| | 26 | 205 | FbB/FACWA | 4-4 | F |
| | 29 | 230 | F I/O/b | 2-4 | Fb |
| CA | 1 | 315 | FaA/a(Indirect) | 3-4 | F |
| | 2 | 313 | FA/a, a→(SW) | 2-4 | S1 |
| | 3, 4 | 351 | SA/PREFIX+0 | 2-2 | S1 |
| | 5 | 375 | Sa/PREFIX+0 | 1-3 | S1 |
| | 7 | 354 | SF A/a | 3-2 | S1/F |
| | 8 | 331 | FA/a | 3-4 | F |
| | 10 | 334 | FA/PREFIX 0 | 1-4 | F |
| | 11 | 337 | FaA/A (REFILL) | 1-4 | F |
| CC | 0 | 422 | FE2/C | 3-4 | Fb |
| | 1 | 421 | FC/C (INDIRECT) | 3-4 | F |
| | 2 | 424 | FE2/C (1st FETCH) | 3-4 | Fb |
| | 4 | 403 | FA/C | 3-4 | F |
| | 5 | 441 | SA/C | 3-2 | S1 |
| CB | 1 | 534 | FbB/b (Indirect) | 3-4 | F |
| | 2 | 515 | FB/b, B—>b (SW) | 3-4 | F |
| | 3, 4 | 552 | SbB/PREFIX+1 | 2++ | S2 |
| | 6 | 575 | Sb/PREFIX+1 | 1-3 | S1 |
| | 7 | 516 | FB/b | 3-4 | F |
| | 10 | 531 | FB/PREFIX+1 | 1-4 | F |
| | 11 | 537 | FbB/B (REFILL) | 1-4 | F |
| IL | 1 | 651 | SA/a, a—>b | 2-2 | S1 |
| | 2 | 670 | FAC/D | 2-2 | F |
| | 2A | 435 | FF/a | 4 | I |
| | 3 | 661 | Load Bit in D2 | 2-4 | F |
| | 4 | 620 | Fba/D | 4-4 | F |
| | 5 | 631 | FDE/FA 2 or 3 | 2-1 | S1 |
| | 6 | 664 | SE/FA 2 or 3 | 1-3 | S2 |
| | 7 | 667 | SbB/PREFIX+1 | 4-4 | F |
| | 9 | 625 | FE/FA 2 or 3 | 2-2 | F |
| | 10 | 646 | SDE/a | 4-3 | I |
| | 11 | 673 | Load Byte in D2 | 3-4 | F |
| | 13 | 634 | FDE/b | 2-4 | F |
| | 14 | 632 | Fba/b, b—> D | 3-4 | F |
| | 15 | 637 | Fba/D | 2-2 | F |
| | 16 | 654 | FMDR/b | 1 | S2 |
| | 16A | 477 | SMDR/a | 4 | I |
| | 16B | 436 | BLANK | 4 | S2 |
| | 16C | 430 | Store MDR/a | 3-4 | F |
| | 17 | 626 | FE2/e | 3-4 | F |
| | 18 | 613 | FA/b | 2-2 | S2 |
| | 19 | 643 | SbB/a | 2-4 | I |
| | 20 | 626 | ADVANCE & COUNT | 2-4 | F |
| | 21 | 607 | FaA/A (REFILL) | 1-2 | S1 |
| | 23 | 640 | SA/PREFIX+O | 1-3 | S1 |
| | 24 | 675 | Sa/PREFIX+O | 1-4 | F |
| | 25 | 616 | FbB/B (REFILL) | 2-2 | S2 |
| | 26 | 652 | SA/a | 2-2 | S2/S1 |
| | 27 | 645 | SC+B/a | 3-4 | F |
| | 28 | 604 | FbB/b | 3-4 | F |
| | P1 | 615 | FC+B/a | 3-2 | F |
| | P2 | 662 | Fa/D | 3-4 | F |
| | P3 | 601 | Load Byte in B/b | 2-1 | S2 |
| | P4 | 676 | SD & E/FA 2 or 3 | 3-3 | S1 |
| BP | 0 | 774 | Sa/FA6L, Fa/FA6R | 3-1 | F |
| | 1 | 755 | FB/b and use bus | 3-1 | F |
| | 2 | 741 | FE2/c and use bus | 4-1 | I |
| | B | 747 | Use bus | 3-4 | Fb |
| | 3 | 730 | Quotient | 3-1 | I |
| | T | 756 | Translate bus use | 3-2 | F |
| | 4 | 772 | FB/b | 1 | I |
| | 4A | 471 | Translate bus use | 4-3 | S1 |
| | 5 | 765 | Sa/FA7L | 4-4 | F |
| | 6 | 717 | Fa/FA7L | 4-4 | F |
| | 7 | 727 | Fc/FA6L | 4-4 | F |
| | 8 | 705 | Fetch Spec F WORD | 3-3 | I |
| | 9 | 771 | b—>a, c—>b | 3-3 | I |
| | 10 | 712 | Fa/FA6L, a—>b | 3-3 | I |
| | 11 | 763 | b—>c (SW), a—>b | 3-4 | F |
| | 12 | 714 | Fa/FA6R, a—>c | 3-4 | I |
| | 13 | 706 | Load Cond. Reg | 3-4 | I |
| | 14 | 736 | a—>a (SW) | 4-4 | I |
| PRIORITY | | 326 | No request | 4 | I |
| | | 526 | Conflict | | |

In addition, each ring may have one or more inactive states. One such inactive is the "home" or rest state, which for most rings is all zeros. Another is the "going" state, an intermediate rest position generally used for convenience in changing from one state to the next with a short delay.

J. DETAILED DISCUSSION

J1. *Buses (FIGURE 6)*

The function of buses W, X, Y and Z is to carry data between memory and the logical portion of the data processing system.

Each of the four major buses W, X, Y and Z includes thirty-six bit positions divided into four eight-bit-plus-parity-bit bytes. These bytes are designated, for each bus, bytes 0, 1, 2 and 3. The basic source of each bit signal for the byte on the bus is a —OI block (minus OR inverter) circuit such as 6–1, 6–2 and 6–3. The —OI block 6–1 provides a signal +X0–P which is the X bus 0 byte parity bit. This signal is available to all those registers and other circuits connecting for input from the X bus. Each bus —OI circuit such as 6–1 receives inputs from several —& blocks which connect to the outputs of registers which connect to the bus. The —& blocks 6–4 to 6–7, for example, feed —OI block 6–2 which provides the signal —X0–0. The —& block 6–4 is conditioned by coincident signals —GATE INCR TO X0 and —INCR 0–0. This is the connection from the incrementer box 3–19 (FIGURE 3) to the X bus, and the gates which control this connection.

The —& block 6–5 responds to coincident signals —GATE MDBO SER TO X0 and —MDBO SER 0. This is the connection to the X bus from memory data buffer odd serial 0 byte.

The —& block 5–6 responds to the coincidence of signal —GATE MDBO TO X0 CROSS and signal —MDBO 4–0. This connects the memory data buffer odd crossed to the X bus.

The —& block 6–7 responds to the coincidence of signals —GATE MDBO TO X0 NOT CROSS and MDBO 0–0. This is a straight connection from the memory data buffer odd to the X bus 0 byte.

Only three bit positions of the thirty-six bit positions of the X bus are shown in detail. The other bit positions of the X bus are quite similar with minor differences in detail as signal inputs and outputs require. The other buses W, Y and Z are similarly made up of —OI (minus OR inverter) blocks which provide the bus output, fed by a sufficient number of —& blocks to serve as gates onto the bus.

J2. *FIGURE 7—Address invalid*

The function of the address invalid logic is to detect gross error in accessing memory.

Blocks 7–1 to 7–3 form a trigger which turns on in response to an invalid memory address situation and stays on until reset by signal —CLR U. The basic timing for this function is the signal +GATE SELECT which controls each of four +& blocks 7–4 to 7–7; each of these +& blocks 7–4 to 7–7 also have an input signal +CLR U which thus serves to enable each of them at the same time that signal —CLR U resets the memory address invalid trigger 7–1 to 7–3.

If either address bit 4 or address bit 5 is present, a plus signal from —OI block 7–8 conditions +& block 7–4 to set the memory address invalid trigger 7–1 to 7–3. The memory address for purposes of this function is intended to contain four bits from bit position 0 through 3 so that any appearance of bit 4 or 5 is improper.

The +& block 7–5 responds to signal +MEMORY OI SELECTED. The +& block 7–6 responds to signal +MEMORY 10 SELECTED; +& block 7–7 responds to signal +MEMORY 11 SELECTED. None of these three selections being proper, each has connections to memory address invalid trigger +OI block 6–1.

The +& block 7–9 responds to coincident plus SCAN IN MEM ADDRESS INVALID and signal +CLR & SCAN IN WORD 21 to set the memory address invalid trigger when this combination of signals occurs.

The address invalid function is a simple check on the proper choice of memory module.

J3. *Memory accessing (FIGURES 8–9)*

The function of the memory accessing mechanism is to locate data in memory for fetch and store operations.

Memory locations are each assigned a unique address by which the selected location is referenced. The address is entered into a memory address register MAR, 3–16 in FIGURE 3.

Figure 8A:
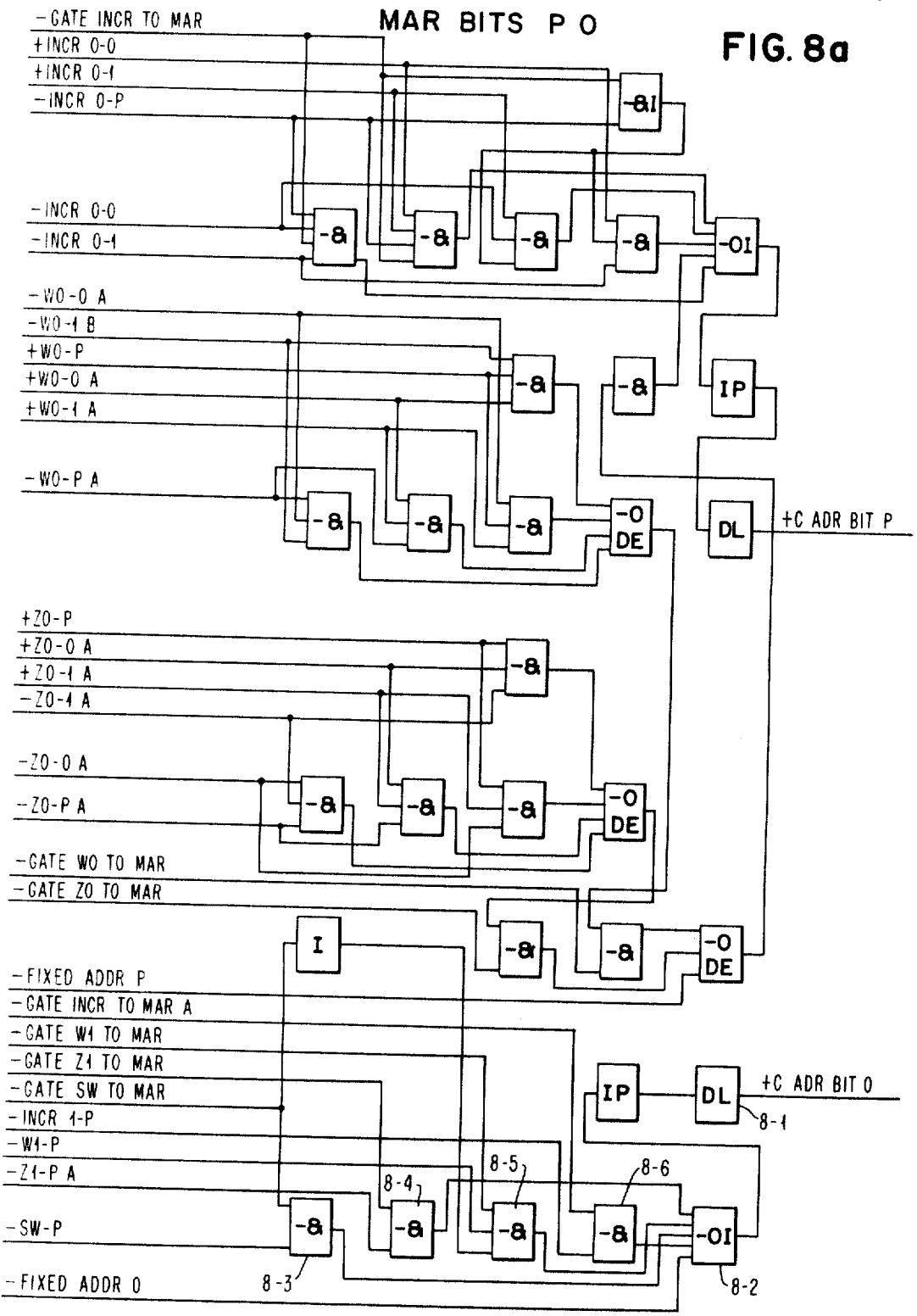
Figure 13:
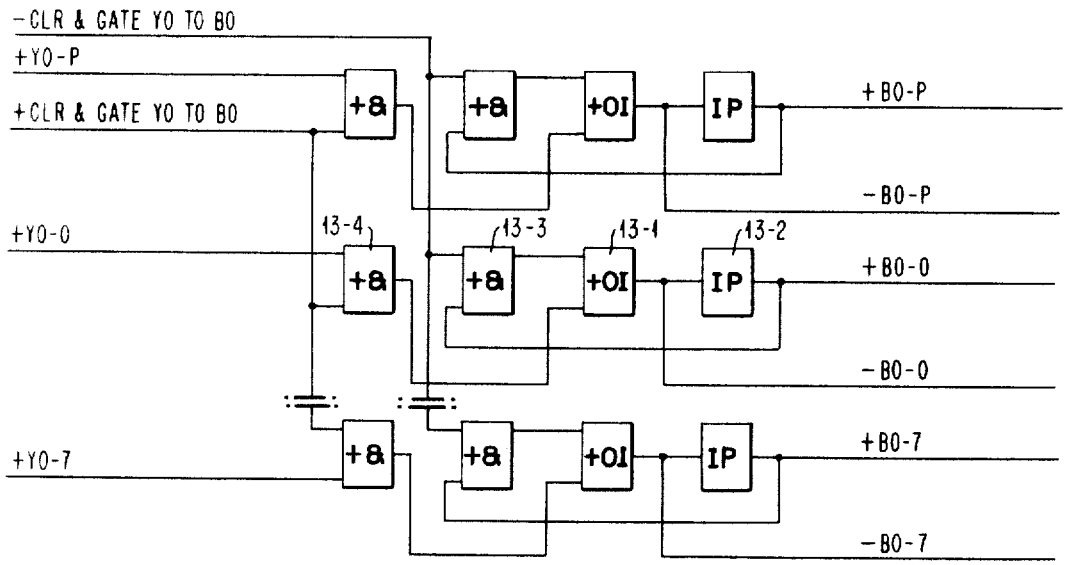
Figure 14A:
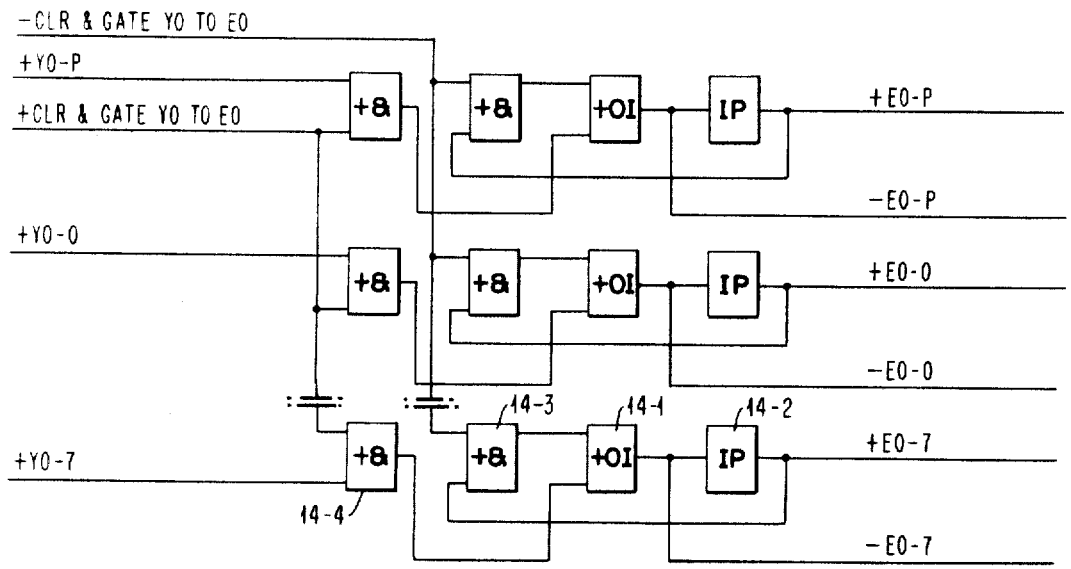

FIGURE 8 illustrates the memory address selection circuit. Each bit position responds to one of several inputs to provide an output signal indicative of a bit of a memory address. Bit 0 output signal +C ADR BIT 0, for example, is provided by DL-block 8–1 in response to a conditioning signal via —OI block 8–2 from any one of —& blocks 8–3 to 8–6, which are connected to appropriate buses or logical units. The —OI block 8–2 can also respond to an input signal —FIXED ADDR 0 from a fixed address box.

FIGURE 8 also shows the simple "store encoder" logic. The function of the store encoder is to develop addresses necessary for a scan operation. To store the content of D, for example, DL block 8–11 provides output signal +C STORE D in response to a signal via —OI block 8–12, from one of —& blocks 8–13, 8–14, 8–15. These & blocks respond to inputs combining appropriate bit inputs and control signals to develop necessary addresses for a scan operation.

FIGURE 9 illustrates logic to select the appropriate one of several available memories. To select memory 11, for example, —OI block 9–1 must be conditioned by —& block 9–2, which in turn responds to the coincidence of a signal —SELECT TIMING PULSE on line 9–3, a signal —GATE SELECT on line 9–4, and the outputs of —O DE blocks 9–5 and 9–6. The —O DE block 9–6 responds to a variety of conditions, one of which is conditioning of —& block 907 by coincident signals —GATE CONSOLE SW TO MAR and —MEMORY SELECT 16. —O DE block 9–5 responds to a variety of conditions, one of which is conditioning of —& block 9–8 by coincident signals —GATE CONSOLE SW TO MAR and —MEMORY SELECT 32. Where multiple memories are used, gated connections from the W bus, and from the Y bus to the Z bus are required.

J4. *Data registers (FIGURES 10–25)*

The registers in a data processor according to the invention are shown generally in FIGURE 3. In most respects these registers are standard and are simply devices capable at the bit level of receiving and retaining binary information providing this binary information upon demand. Representative portions only of the registers are shown in detail in FIGURES 10–25.

J5. *CA register (FIGURE 10)*

The function of the CA register is to fetch the operand for register A, gate bytes sequentially from A register to Z bus for processing and replenish register A from memory when necessary. In general it controls the operand in the A register.

FIGURE 10 shows a representative small portion of the CA register (3–9 of FIGURE 3). The CA register includes four bytes, each byte having eight data bits and one parity bit. For each bit a trigger such as that made up of logical blocks 10–1 to 10–4 is generally provided. The +OI block 10–1 provides the basic trigger output which is amplified through IP block 10–2 and fed back to +& block 10–3. The +& block 10–3 has its other input conditioned by a plus signal during all times except the time of a signal —CLEAR AND GATE X0 to CAO, which permits change of information in the CA register. Blocks 10–1 to 10–3 thus serve as a set-reset trigger settable by a coincidence of signals +X0–7 and signal +CLEAR AND GATE X0 to CA0 at +& block 10–4 and remaining set until the next appearance of signal —CLEAR AND GATE X0 to CA0 to the trigger. The CA register is thus set upon the direct application of data signals as gated by a gating signal.

J6. *D register (FIGURE 11)*

The function of the D register is to supply the address of the next instruction, and serve as the condition register and the indicator register.

The D register is a register of triggers which are set by a straightforward application of data and gating signals. For the 0 bit position, for example, blocks 11–1 to 11–3 serve as the 0 bit trigger of the register and +& block 10–4 serves as the input gate.

J7. *A register (FIGURE 12)*

The function of the A register is to supply the second operand for a two address instruction or a three address instruction.

The A register is a straightforward register with a bit trigger for each bit position. Logical blocks 12–1 to 12–3, for example, serve as the bit trigger for the parity position of the A register 0 byte. The gating for the A register is straightforward but somewhat complex. The parity bit, for example, may be set by coincidence of signals to any of +& blocks 12–4 to 12–6. The bit trigger will remain set until the information is destroyed by the minus condition of one of the inputs to +& block 12–3. Such inputs are signal —CLEAR & GATE Y0 to A0, signal —CLEAR & GATE ADDER 2 TO Y0 and signal —CLEAR & GATE X0 TO A0. The +& blocks 12–4 to 12–6 similarly function to combine the availability of a parity bit from a selected source with the gating signal for that source. For example, +& block 12–4 combines signal +X0–P (which is the parity signal from register X0 byte) with gating signal +CLEAR & GATE X0 TO A0.

J8. *B register (FIGURE 13)*

The function of the B register is to supply the first operand for each instruction. It operates with one-address, two-address and three-address instructions.

The B register is a straightforward gated register of bit triggers similar to the other registers. Logical blocks 13–1 to 13–3 serve as a bit trigger settable by coincidence of a gate signal and a bit signal at the +& block 13–4, for the 0 bit position.

J9. *E register (FIGURE 14)*

The function of the E register is to supply the prefix and mask for a particular operating program and also a count of the total number of instructions that have been executed.

Byte 0 of the E register is a straightforward register of bit triggers with input gating. Bit triggers with input gating form each bit position, such as bit position 7. Each bit trigger is made up of logical blocks such as 14–1 to 14–3, resettable by a signal —CLEAR & GATE Y0 TO E0 and settable by coincidence, at +& block 14–4 of a bit signal +Y0–7 and a gating signal +CLEAR & GATE Y0 TO E0.

The other bytes of the E register similarly include bit triggers but include a more varied input gating. The parity position of E register byte 1, for example, includes logical blocks 14–5 to 14–7 which form the bit trigger and provide output signal —E1-P. The +& 14–7 includes the feedback input from +OI block 14–5 via IP block 14–6, to provide the latching action necessary to serve as a trigger, and includes five resetting inputs which serve as a straightforward clearing input. The +& blocks 14–8 to 14–11 respond to the coincidence of appropriate gating signals and of parity bits from the registers gated to perform the clearing function.

E register byte 2 similarly includes for each bit position a bit trigger such as that made up of logical blocks 14–21, 14–23 and includes input gates 14–24 and 14–25. The parity bit position has input gates 14–26 to 14–30 which operate according to the functions described by their controlling signal designations.

E register byte 3 similarly includes for each bit position a bit trigger such as that made up of logical blocks 14–31 to 14–33 and for each bit position also includes input gates of a suitable number such as gates 14–34 to 14–38 for position P.

As shown in FIGURE 4, byte 0 of the E register holds the prefix, byte 1 the mask, and bytes 2–3 the count. The E register receives inputs from the Y bus, adders 1 and 2, and byte 3 of the Z bus, and provides outputs to both memory in buses X and Z. The E register also feeds multiple generator 4–26.

J10. *Register controls (FIGURES 15–21)*

The function of the register controls is to determine the connection of associated registers to other functional units for data movement.

It has been shown how each register includes a more or less complex set of input gates to provide new data, and a control signal to enable the bit triggers to accept new data (reset the bit trigger).

FIGURE 15 includes a group of simple +&IP blocks which serve the CA register. These +&IP blocks provide the appropriate signal —CLEAR & GATE in response to a signal +CLEAR A and the appropriate gate signal.

The +&IP block 15–1 is illustrative of these circuits. Where required a more complex circuit of several AND circuits feeding a —OR circuit is used to develop the same basic CLEAR & GATE signal. The —OIP block 15–2 thus provides a signal +CLEAR & GATE BC TO CA2–0–3 in response to conditioning of any of its five inputs by any of +&IP blocks 15–3 to 15–7. Each of +& blocks 15–3 to 15–7 also directly provides its appropriate signal —CLEAR & GATE.

Control of the CB register set and reset, FIGURE 16, is a straightforward combination of the appropriate gating selection signals such as for +&IP block 16–1 signals +CB BYTE TO RESTART and signal +B CLEAR C. Block 16–1 provides directly its minus output signal —CLEAR & GATE BC TO CB3 and via inverter block 16–2 provides the complementary signal, which however is given a different functional designation signal, +CLEAR & GATE BC TO CB3–0–3. It is obvious that wherever necessary an inverter, IP block, may be used to provide the opposite polarity of any control signal.

Control of the CC register set and reset, FIGURE 17, is by a number of logical blocks such as 17–1 which combine a signal +CLEAR C with an appropriate gating choice signal.

Control of D register set and reset, FIGURE 18, is by straightforward combination in logical blocks such as +&IP block 18–1 of the signal +CLEAR J with the appropriate gating selection signal which for block 18–1 is signal +GATE D2 TO SW. This block controls clearing and gating of D register byte 2 parity bit to the switch (address switch 3–25 in FIGURE 3).

Control of A register set and reset, FIGURE 19, is by logical blocks such as 19–1 which combines four signals logically to recognize the necessity to provide a control signal —CLEAR & GATE ADDER 2 TO A2.

Control of B register set and reset, FIGURE 20, is by simple combinations in +& blocks such as 20–1 which provides signal +CLEAR & GATE CHANGE SIGN B in response to the combination of signal +CHANGE SIGN B and signal +CLEAR EE.

Control of E register set and reset, FIGURE 21, is by combinations of signals as decoded by +& blocks such as 21–1 and 21–2. These +& blocks provide operative signals such as OR BLOCK 21–1 —CLEAR & GATE ZEROES TO EZ in response to a combination of signal +CLR S and signal +GATE ZERO TO EZ. Block 21–2 responds to a combination of signal +CLR EE and the output of +OR block 21–3 which passes either signal +GATE ZERO to E3 or signal +GATE 15 TO E3.

Each register connects to two or more buses and has gatings which are capable of being controlled by the appropriate gating signals as provided by the register set and reset control for the particular register. All data transfers involving registers thus are controllable on the very lowest level necessary. This low level control of register set and reset allows a complete flexibility of data transfer so long as the appropriate register set and reset controls operate. Although a very detailed showing of register set and reset controls has been made in connection with FIGURES 15–21, it is appropriate to provide further set and reset controls wherever a data transfer would be expedited by such controls.

J11. *Instruction load mechanism (FIGURES 22–24)*

The function of the instruction load mechanism is to introduce instruction values into position for use.

Figure 22:
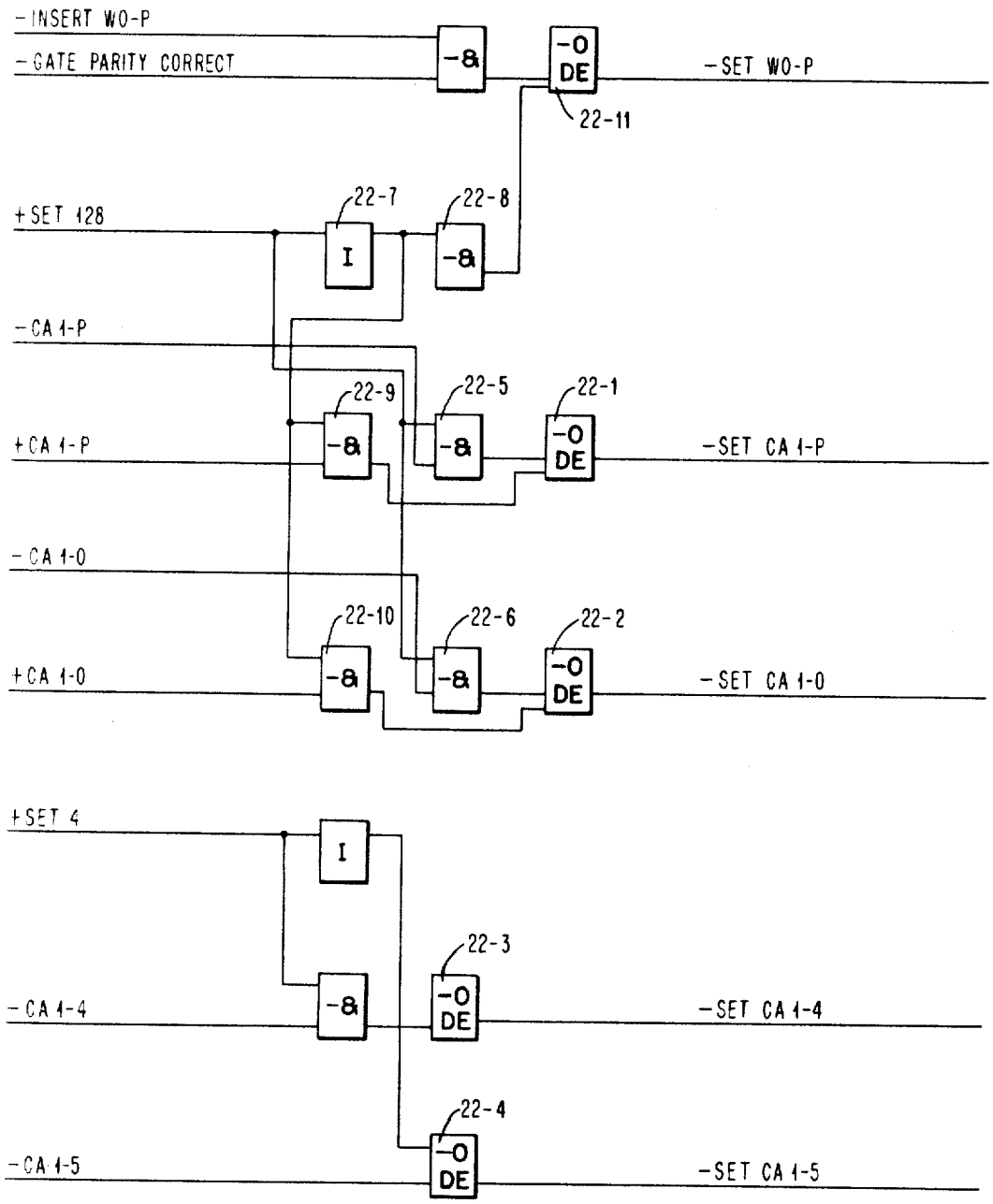

FIGURE 22 shows gating for the IO address change. The basic change takes place in CA register, where CA register byte 1 is set to new values by straightforward techniques.

It may be desired to set the address to a particular value such as 128. Signal +SET 128 deconditions —& blocks 22–5 and 22–6 and via I block 22–7 conditions —& blocks 22–8 to 22–10. —& block 22–8 directly conditions —ODE block 22–11 to provide signal —SET W0–P which provides a parity bit. —& block 22–9 responds to a 0 bit in the CA register byte 1 to provide via —ODE block 22–1 signal —SET CA1–P.

J12. *Instruction load sequence (FIGURE 23)*

The function of the instruction load request ring 1–6 of FIGURE 1 is to provide instruction codes for operation of the machine. Other request rings were shown in FIGURE 5, and described in Section H. The specifications of the request rings are given in Section I.

The instruction load ring is the most complex of the seven rings. It normally has priority rank lower than all but the BP ring, but since it controls the availability of instructions, it must keep ahead of operand control rings CA, CB and CC. Where required, the CA, CB and CC rings can transfer priority to the IL ring.

The IL ring includes a home position (8), several ordinary request positions, a "forced delay" position 31, and several "pseudo positions." The pseudo positions are listed as P1 to P4 in Section I. Pseudo position P2 includes an automatic position P2A which controls the loading of the F work per *a*, the content of the A register.

J13. *Instruction load gates (FIGURE 24)*

The function of the instruction load gates is to set indicators for the instruction load operation in response to need demonstrated by the D, E, CA and CB registers.

Figure 107A:
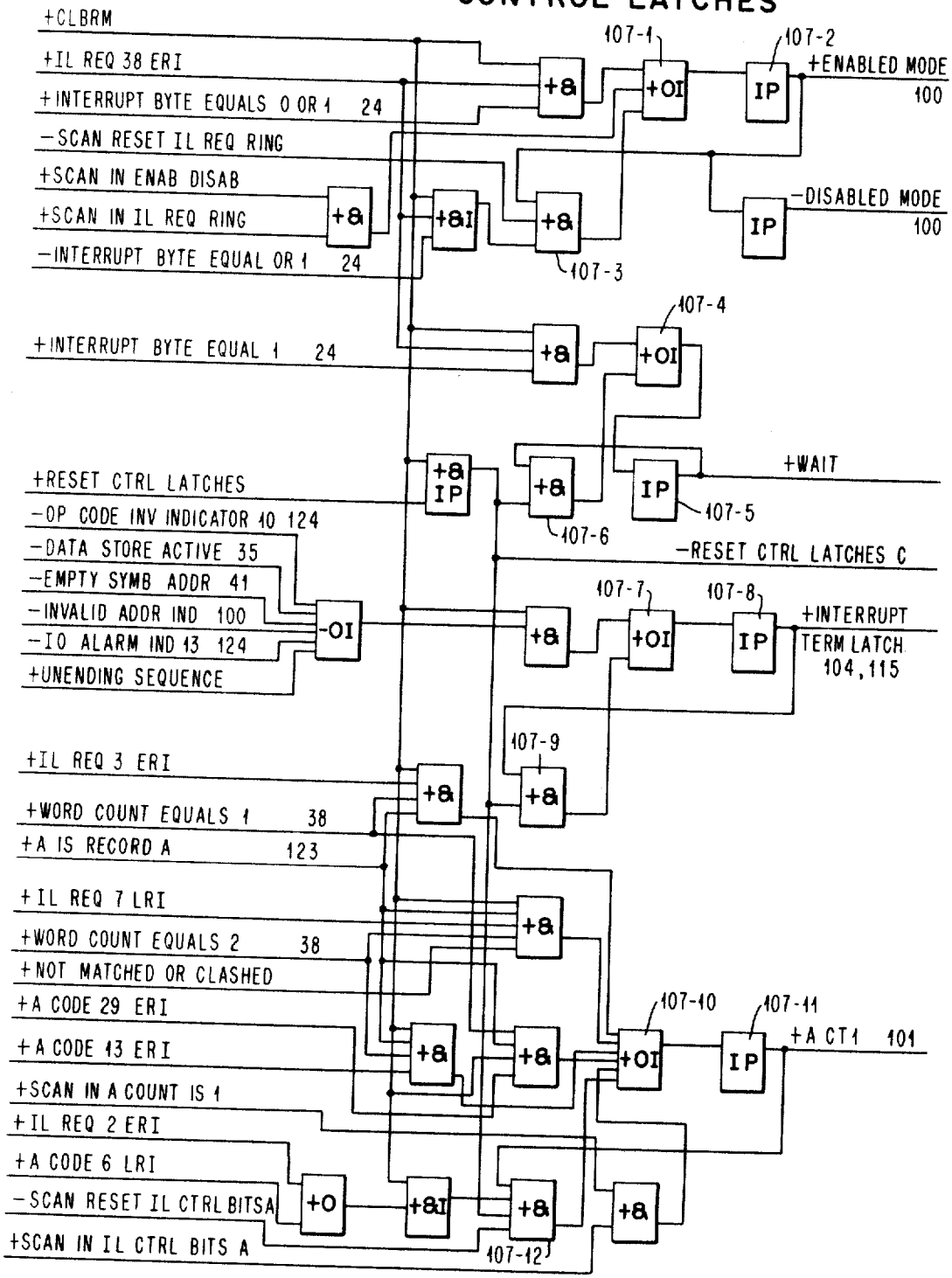

Logic blocks 24–1 to 24–7 respond to combinations of signals from the registers. The —OI block 24–1, for example, provides its output whenever any one of "1" bits 4–7 of D register byte 2 match respectively bits 5, 4, 7 and 6 of CB register byte 2. The output signal +BRANCH TEST OUTPUT passes FIGURE 107*b* to set an indicator.

Blocks 24–2 and 24–3 provide outputs when E register byte 3, the interrupt byte, approaches values 0 and 1. These outputs set indicators in FIGURE 107*a* to control interrupt operations.

Blocks 24–4 and 24–5 provide output signal —INDEXABLE ADDRESS in response to an all —1's condition of the CB register.

Block 24–6 provides signals —BYTE EQUAL OR GREATER 32 and —BYTE LESS THAN 32 in response to high order bits of the E register byte 2. These signals are useful in FIGURE 41 to control the address switch (3–15 of FIGURE 3).

Block 24–7 identifies values 7 and 11 in the left side of CA register byte 3. Bit values 0111 condition +& block 24–8 for the 7. Bit values 1011 condition +& block 24–9 for the 11. The not 7 or 11 condition is useful in FIGURE 66 to control restarting of the byte counter. The +OI block 24–7 provides output signal —CA RST 7OR11.

The instruction load gates thus perform a simple logical function to derive control signals for logic to be described infra, in connection with FIGURES 36, 66, 107 and others.

J14. *Buses (FIGURES 25 to 29)*

The function of the buses is to distribute data among memory and the functional units of the logical mechanism including adders, registers and switches.

Figure 25:
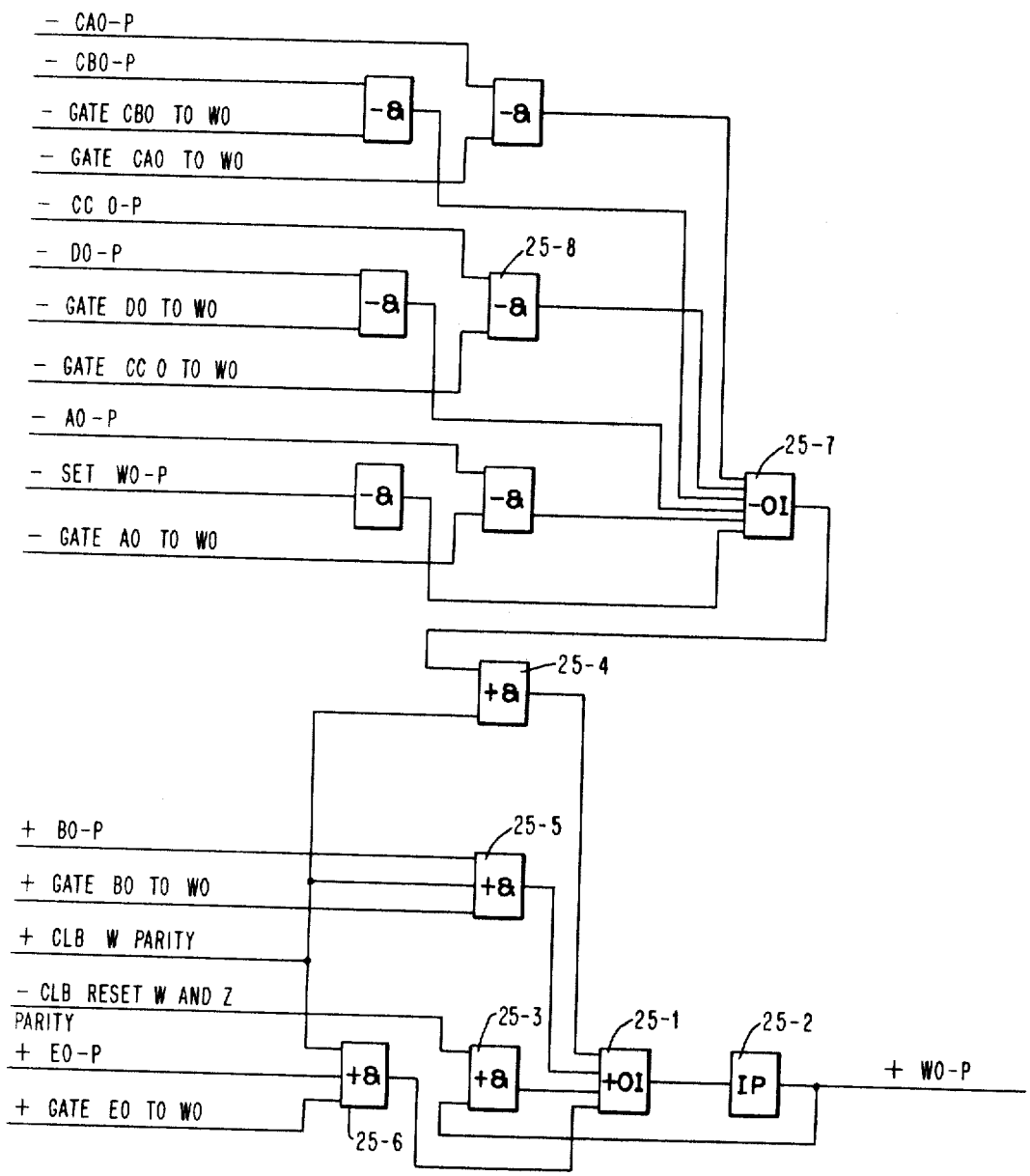

FIGURE 25 shows an illustrative portion of the W bus, the parity position of the 0 byte. Blocks 25–1 to 25–3 form a trigger which provides output signal W0–P. This latch is reset by signal —CLB RESET W AND A PARITY, the top input to block 25–3. The trigger is settable by any of +& blocks 25–4 to 25–6. +& block 25–4 responds via —OI block 25–7 to any of several —& blocks such as 25–8.

Each position of the bus has its own latch and a plurality of inputs.

Figure 26:
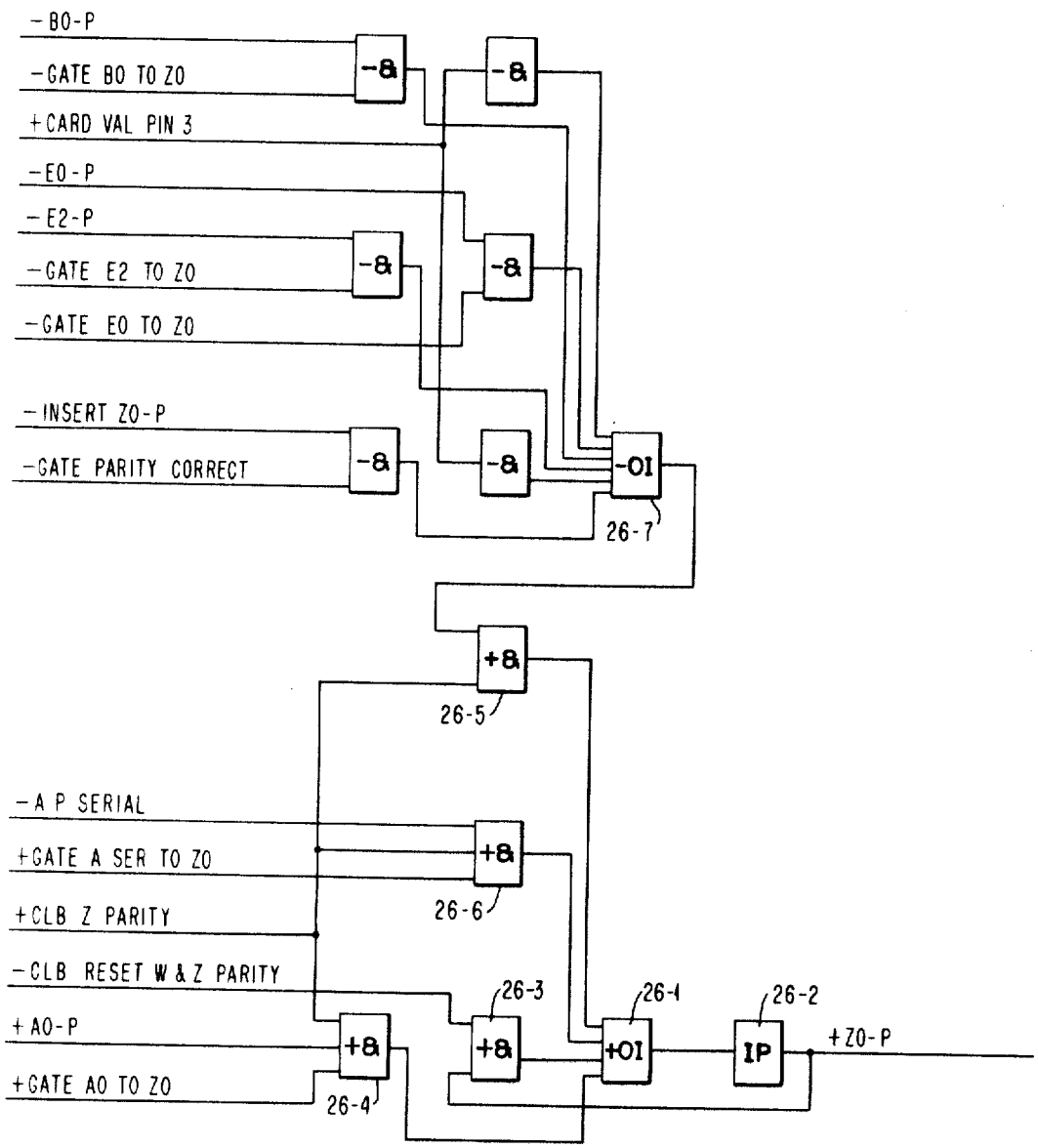

FIGURE 26 shows an illustrative portion of the Z bus, 0 byte parity position. In almost all respects, the Z bus is similar to the W bus shown in FIGURE 25. Each position of the Z bus includes a latch such as that formed by blocks 26–1 to 26–3 for the parity position of the 0 byte. The +OI block 26–1 provides via IP block 26–2 signal +Z0–P and feeds back to +& block 26–3 which is the reset block. The +OI block is settable by an input from either +& block 26–4, 26–5 or 26–6 to give the 1 value to the parity position of the 0 byte of the Z bus. The +& block 26–5 is conditionable by the output of —OI block 26–7 which in turn responds to the output of any one of six —& blocks.

J15. *Incrementers (FIGURES 27–30)*

The function of incrementers is to alter a number, usually an address, by a fixed value +1, 0 or —1. Since the operation is simple, the alteration is performed by decoding logic rather than by an adder. The bits comprising a value 7, for example, are decremented to 6 by simply producing bits 0110 in response to bits 0111 and a control signal "decrement."

FIGURE 3 shows an incrementer 3–19 and a decrementer 3–18 which are used in conjunction with various other logical units of the machine. FIGURE 27 shows an illustrative portion of the incrementer, the byte 0 parity position. The basic output is signal —INCREMENT 0–P from —ODE block 27–1. This block responds to the several incrementing situations which require as the incremented value a parity bit. If, for example, incrementing causes the change of only a single bit in the byte, then there will be a change in the parity bit. Suitable inputs and logic perform this function.

FIGURE 28 shows the parity position of the incrementer byte 1. The —ODE block 28–1 provides the basic output signal —INCREMENT 1–P in response to detection by a number of —& blocks of the various situations in incrementing which result in a parity bit output.

FIGURE 29 illustrates the +255 carry latch circuit. The 255 carry latch is used to identify a situation where an eight bit byte, used as a counter accumulator, has overflowed its capacity. The function of the +255 carry latch is to help control invalid address indicator latch in FIGURE 100.

Logical blocks 29–1 to 29–4 form the +255 carry latch and respond to the coincidence of signal —increment & W1–7 to W1–3 and signal —W1–2 to W1–0 at —& block 29–5 with signals +clear Q and signal +relocate B at +& block 29–4. The +255 carry latch is also settable by +& block 29–6 during a scan in operation. FIGURE 30 is illustrative of decrementer 3–18 of FIGURE 3 and shows the decrementer byte 1 and byte 0 parity positions. —ODE block 30–1 responds to those conditions which are calculated to provide a parity bit for the decrementer 1 byte and —ODE block 30–2 to provide the parity bit for the 0 byte, in those situations where such a parity bit is required.

J16. *Parity checking (FIGURES 31–34)*

The function of parity checking is to identify invalid bit configurations such as occur in error situations. One important error situation, according to the invention, results from a failure of a request ring code or a priority pipe code to load the W and Z buses as required. Such a failure to load the W and Z buses causes a parity error detection and indicates inferentially a control failure in a request ring or elsewhere in the priority sequencing controls.

FIGURE 3 shows how parity check units 3–31 and 3–34 are connected to memory in bus W, 3–1, and to memory in bus Z, 3–4. FIGURE 31 illustrates the parity check circuits by showing in detail byte 0 of the parity check circuit 3–31 for the W bus. A parity error will provide —BYTE 0 ERROR from the latch made up of logical blocks 31–1 to 31–4. This latch is conditioned on every cycle by a signal —SET ERROR LATCHES A at —& block 31–4 in the absence of signal +BYTE W0 PARITY CORRECT from —ODE block 31–5. An error signal will appear unless odd parity exists for the appropriate bytes. The logic of the parity checker is straightforward. Logical blocks 31–6 to 31–10 determine the parity of bits 0, 1 and 2 while other similar arrangements determine the parity of other groups of three bits. These determinations are combined in a set of —& blocks and applied as inputs to —ODE block 31–5, for a final output signal +BYTE W0 PARITY CORRECT for the entire byte.

FIGURE 32 combines the PARITY CORRECT signals from each of the bytes of the W and Z buses. A signal —PARITY CORRECT from +I block 32–1 occurs in the usual situation, where all four bytes of the W bus and all four bytes of the Z bus have correct parity. Logical blocks 32–2 to 32–6 cooperate in providing the parity correct determination.

The two parity checks are the basic checks on both the data paths and the control mechanism. Signal +MAR address parity correct on line 32–7 and signal +BYTE ADDRESS PARITY CORRECT on line 32–6 are also included in the inputs to +&I block 32–1 so that the signal —PARITY CORRECT is as complete as possible. An error condition is assumed in the absence of signal PARITY CORRECT at the appropriate time. The error condition is detected by circuits not shown which produce signal +SET ERROR LATCHES in FIGURE 33.

FIGURE 33 illustrates a sample "set error latch" circuit. Error latches are placed throughout the system in key positions.

The function of the error latches is to freeze the data processing system as much as possible in the error condition, so that a diagnostic scan will be effective. The "set error latch" circuit includes logical box 33. The —signal +SET ERROR LATCHES is combined with signal +&IP at block 33–1, which output is powered to provide signal —SET ERROR LATCHES A and signal +RESET ERROR LATCHES A.

FIGURE 34 illustrates the parity correction logic, the function of which is to power signal —PARITY CORRECTION to provide signal —NOT PARITY CORRECTION A, signal +PARITY CORRECTION and signal —GATE PARITY CORRECT from logical blocks as 34–1.

J117. *Program memory protect (FIGURE 35)*

The function of memory protect is to insure that all stores a particular program might make are located in memory in an address greater than that defined by the prefix for that program. This prefix is located in byte 0 of the E register.

FIGURE 35a shows logic including blocks 35–1 to 35–4 for comparing the address on the W bus with the address on the Z bus, and the data store latch 35–5 to 35–7. Each of several —& circuits responds to a set of Z and W bus signals to deny the "W0–W1 Greater Than Z0–Z1+1" criterion, and provides via —OI block 35–1 a signal SET DATA STORE when the Z bus address is greater. The —& block 35–2, for example, sets the data store latch when the Z0 and W0 bytes are equal in bit positions 0–3 (—& block 35–3) and there is a 4 bit on the Z bus and no 4 bit on the W bus.

FIGURE 35b demonstrates individual Z bus and W bus bit comparison logic used in FIGURE 35a, blocks 35–11 to 35–13.

J18. *Serial data transfers (FIGURES 36–40)*

Where required, the registers shown in FIGURES 3 and 4 are capable of serial data transfer. The registers provide continuously available signals which are gated forward serially to selected destinations, one at a time. The A register 3–13, for example, is arranged for serial readout to the W and Z buses.

FIGURE 36 illustrates a serial output device for the A register. The function of this device is to read out the bytes from the A register in series. The serial outputs for the P, 0 and 7 bits are shown; the others are similar. Each output includes a single —ODE block which for the parity bit is block 36–1 and four —& blocks such as 36–2 to 36–5. The —& blocks receive inputs from the respective bytes of the A register for the appropriate bit value. A suitable combination of + and — signals CA 2–1 and CA 2–2 provide a sequential conditioning of & blocks 36–2, 36–3 36–4 and 36–5 to provide a serial output for the appropriate parity position from A register bytes 0, 1, 2, and 3 respectively.

FIGURE 36b illustrates logic to provide serial output from the A register or selectively to provide crossed outputs. In certain situations it is necessary to read out the bits of the two halves of an A register byte in inverse order. These functions are apparent in the following table:

| Bit | Serial | Cross |
|---|---|---|
| 0 | 0 | 4 |
| 1 | 1 | 5 |
| 2 | 2 | 6 |
| 3 | 3 | 7 |
| 4 | 4 | 0 |
| 5 | 5 | 1 |
| 6 | 6 | 2 |
| 7 | 7 | 3 |

These functions are performed by straightforward logic. FIGURE 36a provides the serial readout from —ODE blocks such as 36–1 for the parity bit. This —ODE block responds to output of any of —& blocks 36—2 to 36–5. Signals CA 2–1 and CA 2–2 in various combinations select various ones of —& blocks 36–2 to 36–5 to take the output from the selected byte position. The —& block 36–4, for example, takes the P bit from the 1 byte A register parity bit when CA-1 is + and CA-2 is —.

FIGURE 36b performs the actual serial cross switch in straightforward manner. The P bit is not altered but passes through —OI block 36–11 for either straight or cross. The 1 bit passes through —OI block 36–12 from —& block 36–13 for the straight case. The 1 bit is derived from the 5 bit by —& block 36–14 in the cross case.

FIGURE 37 shows a circuit for detecting a word count value from the values of bytes 2 and 2 of the Z bus. The function of this circuit is to help control an indicator to be described infra in connection with FIGURE 124. The indicator maintains a count of a control word is approaching zero.

The word count is logically derived directly from the Z bus. The "two" count is defined by the inputs to —& block indicating all zeros on Z bus bytes 2 and 3 with the exception of the (two) bit in position 6 of the Z bus byte 3.

The "one" count is derived by —& block 38–2 from all zeros on Z bus bytes 2 and 3 with the exception of the "one" bit indicated by signal —Z3–7B.

The "zero" count is derived by —& block 38–3 from all zeros on Z bus bytes 2 and 3.

FIGURE 38 shows a circuit for detecting a count of values 0 and 1 from the byte 2 byte 3 positions of the B register, shown as 3–14 in FIGURE 3. The function of this circuit is to signal that a control word is in position, by signal +CW COUNT 1, or that a control word is not in position, by the complementary signal +CW COUNT 0.

The control word count "zero" is derived directly by —& block 38–1, which responds to an all zeros condition on bytes 2 and 3 of the B register (3–14 of FIGURE 3).

The control word "one" count is derived by —& block 38–2 in response to an all zeros condition of all bits of bytes 2 and 3 of the B register except the one bit (B3–7) and the absence of signal C W COUNT 0 from —& block 38–1.

J19. *Memory data bus* (*FIGURES 39–40*)

The connection from main storage to the operating units of the machine is via MDR (3–6 of FIGURE 3) to buses X and Y. These buses transmit data and instructions to the various registers.

FIGURE 39 illustrates a circuit for gating out serially from MDR the contents of a memory location to the memory data out bus (MDBO). Each bit value of MDBO has a —OI block which is fed by 8 —& blocks gated to provide in sequence the assigned bit value from each of the bytes of MDBO.

FIGURE 40 illustrates a circuit to monitor the memory data out bus MDBO values to recognize an empty symbolic address from a serial scan of the MDBO with a no-data result, and to set an indicator.

The empty symbolic address is recognized by a latch made up of logical blocks 40–1, which responds to a logical combination of MDBO serial 0 to 7 signals in logical blocks 40–5 to 40–8.

The output signal from the serial scan of MDBO also passes to logical blocks 40–10 and 40–16 along with an input from the IO devices. If these two are identical, +OI block 40–13 provides output signal +IO byte & MDBO, MDBO SER EQUAL. This signal is useful in detecting comparison errors. It sets a trigger (not shown) which indicates the error and identifies it during a subsequent scan out operation.

The signal from +OI block 40–1, —EMPTY SYMBOLIC ADDRESS, is used to set the interrupt terminate latch 107–7 in FIGURE 107.

J20. *Switch* (*FIGURES 41–46*)

FIGURES 41–46 illustrate the address switch, 4–16 in FIGURE 4. This switch performs the function of assembling an address from a number of sources. It shifts bit values a number of positions required by its own mode control.

FIGURES 41a and 41b illustrate the first half of the switch. The switch receives information from the W bus in most situations, but is also capable of receiving information from input output circuits. Logic blocks including 41–1 to 41–13 respond to appropriate control signals to gate the IO to the switch, or to gate a byte of the W bus either straight or cross to the switch. Mode control signals applied to logic blocks such as 41–14 provide mode control signals to the second half, FIGURE 41c. Logic blocks including 41–21 to 41–28, in FIGURE 41c, receive inputs directly from the first half, FIGURES 41a and 41b. The —& block 41–22, for example, combines signals —SW8 MODE A and —SW3 1st HALF to provide output signal —SWA. In switch mode 8, switch 3 goes to switch A and switch 4 goes to switch 0, etc.

J20.1. *Switch parity* (*FIGURES 42–45*)

The address being assembled by the switch must be provided with proper parity. Since the address is assembled, parity must be logically derived from the bits forming the address itself, and cannot be taken from the inputs. Parity cascade ANDS in FIGURE 42, and switch parity bits in FIGURE 43, combine in FIGURE 44 to provide the proper parity signal; no matter how much shifting is done. FIGURE 45 illustrates the memory address register encoder parity circuit.

FIGURE 42 illustrates the switch parity cascade ANDS. The —ODE block 42–1 provides signal —SW 0 CASCADE ANDS in response to any one of —& blocks 42–2 to 42–6. Since values can be gated straight or cross, the ANDS are arranged to develop signals demonstrative of the result. Block 42–4, for example, accepts W3 L, W3–O and the complement of signal +GATE W2–O to SW to provide the output —SW 0 CASCADE ANDS. Block 42–7 similarly produces —SW 1 CASCADE ANDS.

FIGURE 43 illustrates the switch parity bits, which combine the outputs of the cascade ANDS with signals from the D register. This circuit provides a choice of parity bits 0–7. For parity purposes, the parity bit is the 0 bit when —ODE block 43–1 is conditioned by any one of —& blocks 43–2 to 43–5. Similarly, —ODE blocks 43–6 to 43–9 illustrate other switch parity bits for other situations.

Figure 44:
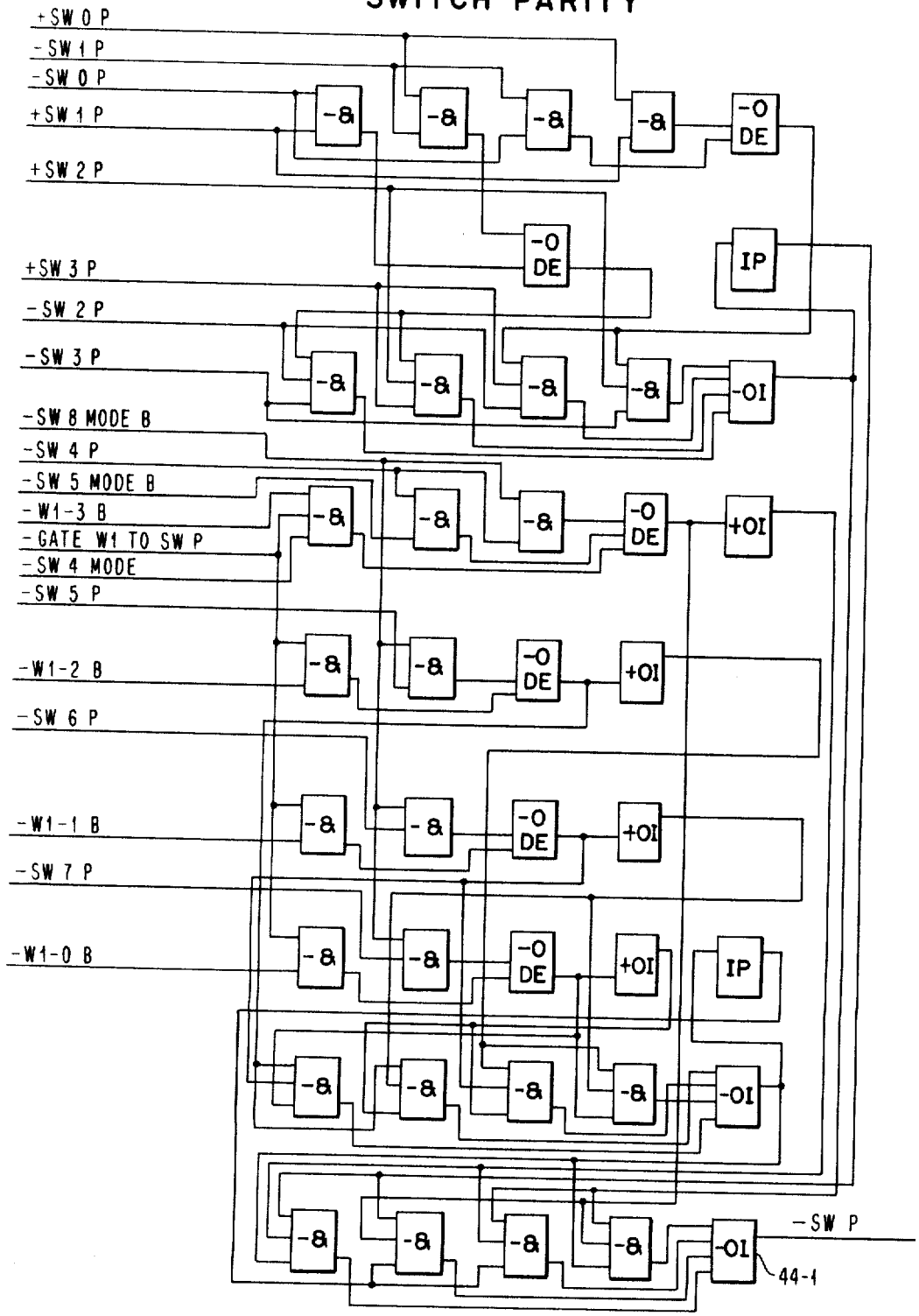
Figure 45:
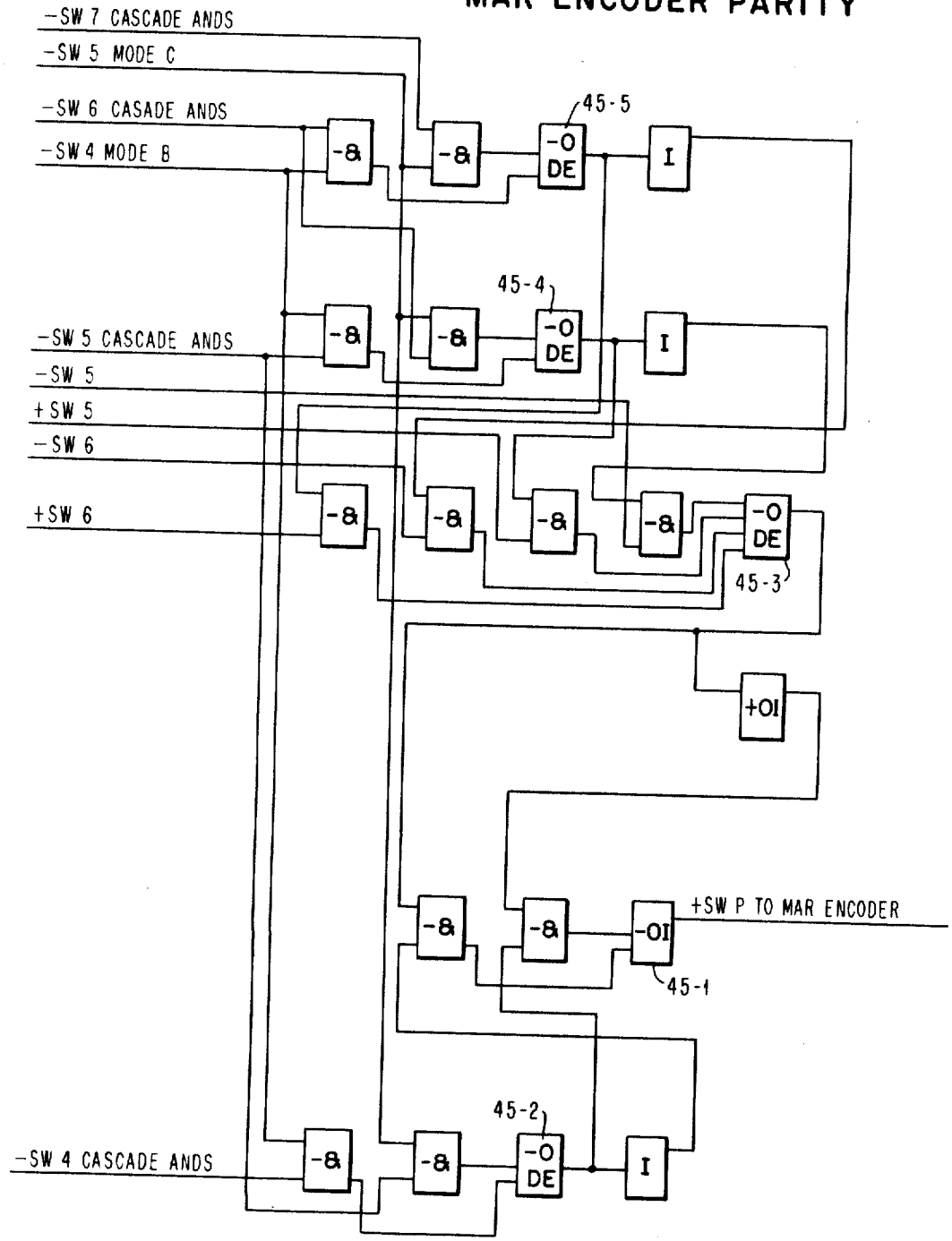

FIGURE 44 combines the switch parity bits according to mode control signals to derive a final parity signal for the switch, at —OI block 44–1. This block responds to any one of several inputs, according to switch mode, to provide proper parity to the memory address register (see FIGURE 8, supra, block 8–3).

FIGURE 45 shows the memory address register encoder parity circuits. These circuits provide signal +SW P to MAR ENCODER from —OI block 45–1, in response to appropriate combinations of outputs of —ODE blocks 45–2 to 45–5.

J21. *HR, HB, HRR registers*

Three registers, identified 4–29 and 4–30 in FIGURE 4, serve to delay the byte address of a word fetched from memory so that the proper gating can be controlled when the word arrives on the X or Y bus. The word address, as shown in the Bus Usage chart of section E7–1, uses bus W on the 1B cycle of type A instructions, while the actual byte to be acted upon is required on the 2R cycle and on the X and Y buses.

Figure 46:
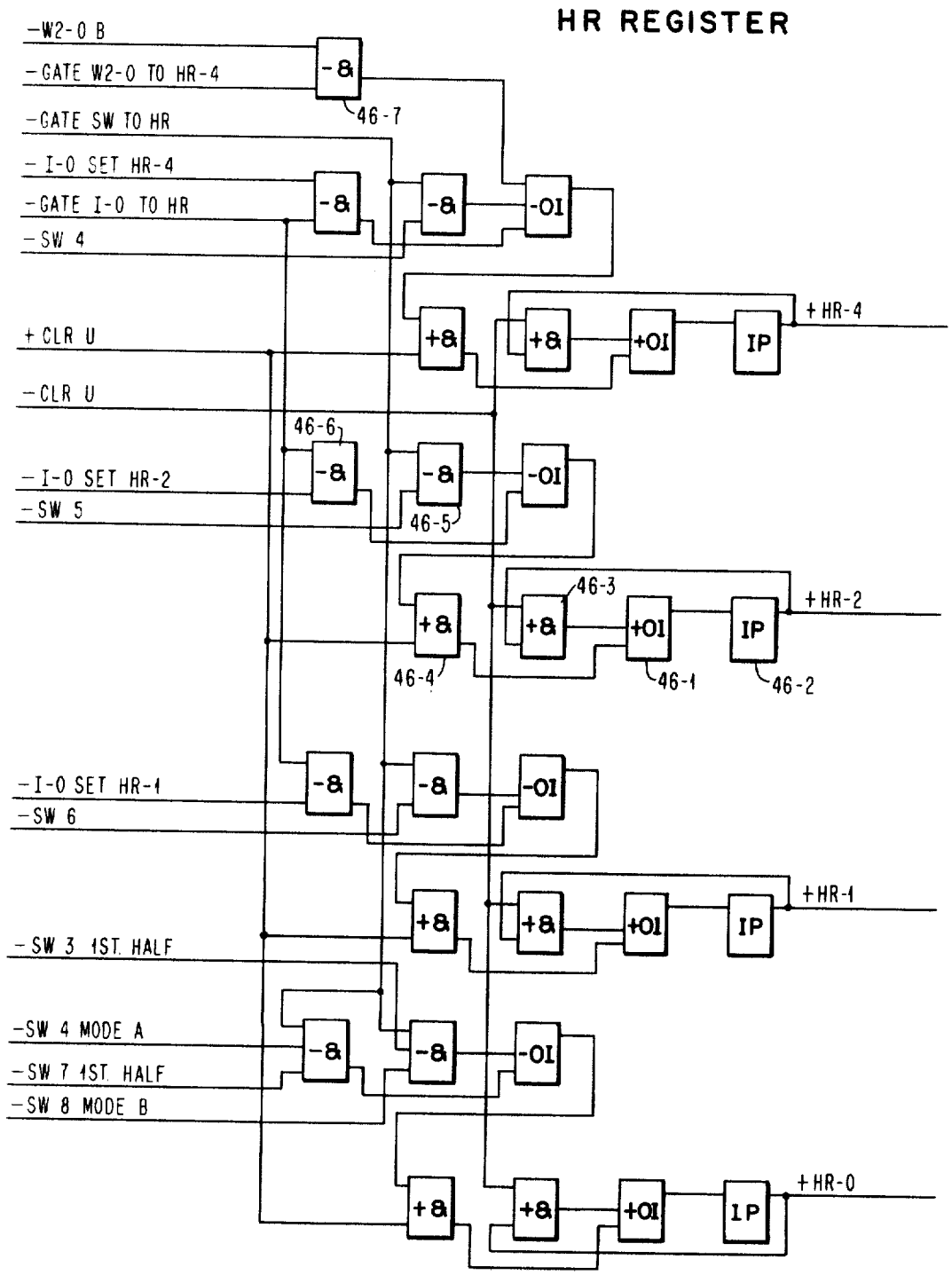

FIGURE 46 shows the HR register. This register stores four bits, identified HR0 through HR4, in latch circuits such as 46–1 to 46–4 for the HR2 bit. These latch circuits receive inputs from the switch, and from IO according to gating signals. The —& blocks such as 46–5 gate the appropriate position from the switch to the HR register bit position under control of signal —gate switch to HR. Other —& blocks such as 46–6 gate IO signals to the appropriate bit position of the HR register under control of signal —gate IO to HR. In addition, the HR4 bit position is directly settable by the coincidence at —& block 46–7 of signal —W2–0B and signal —gate W2–0 to HR4, for a special purpose.

The four-bit byte address assembled by the switch is presented to the HR register, from which it passes on successive cycles to the HB register, the HRR register, and control of E register to W bus gating. At the same time that the byte address is being entered into the HR register, the MAR encoder of FIGURE 45 is entering the same byte address into MAR (4–16 of FIGURE 4). A fixed address value from fixed address box (4–28 of FIGURE 4) may at the same time be entered into MAR, completing assembly of the address.

Figure 47:
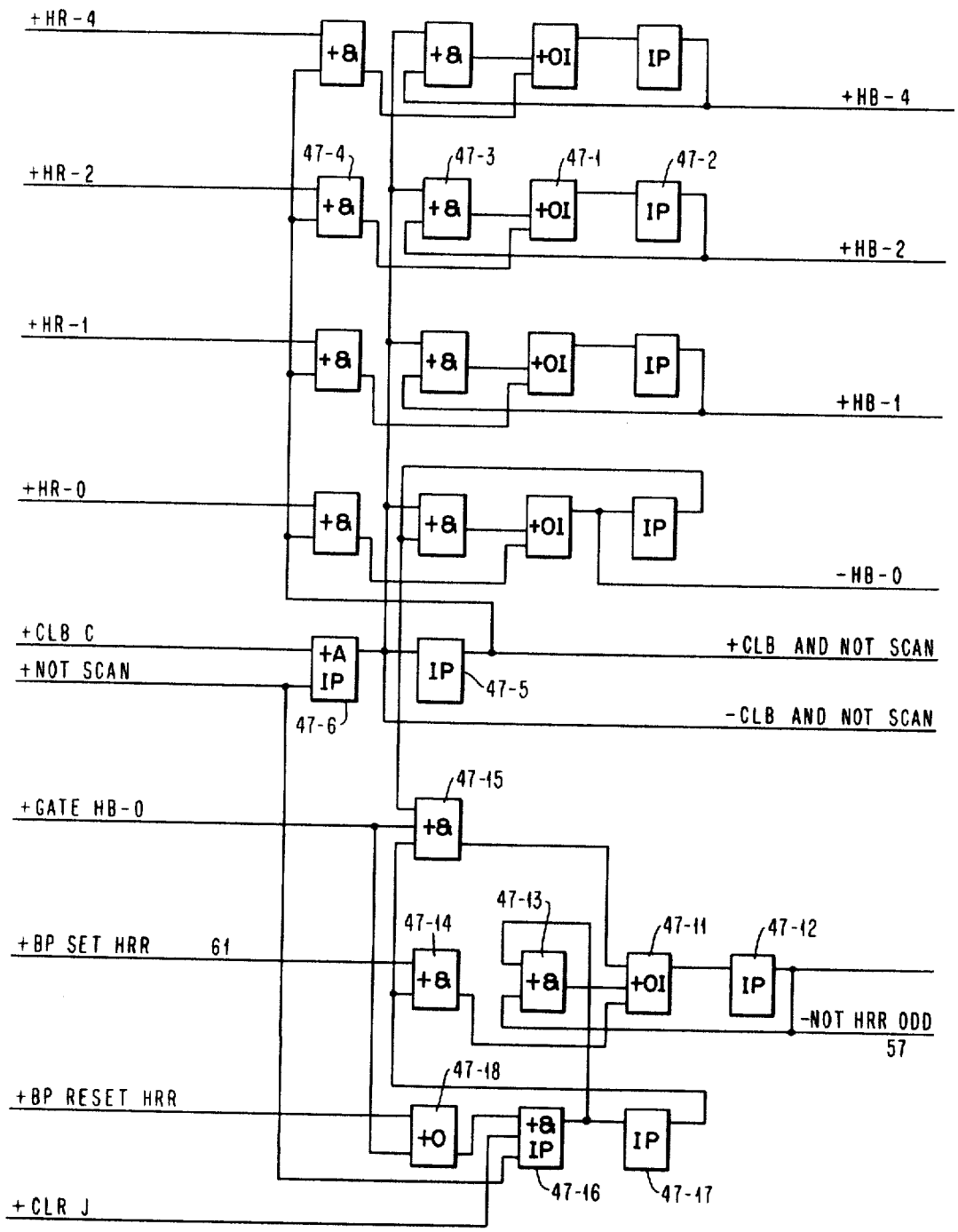
Figure 48:
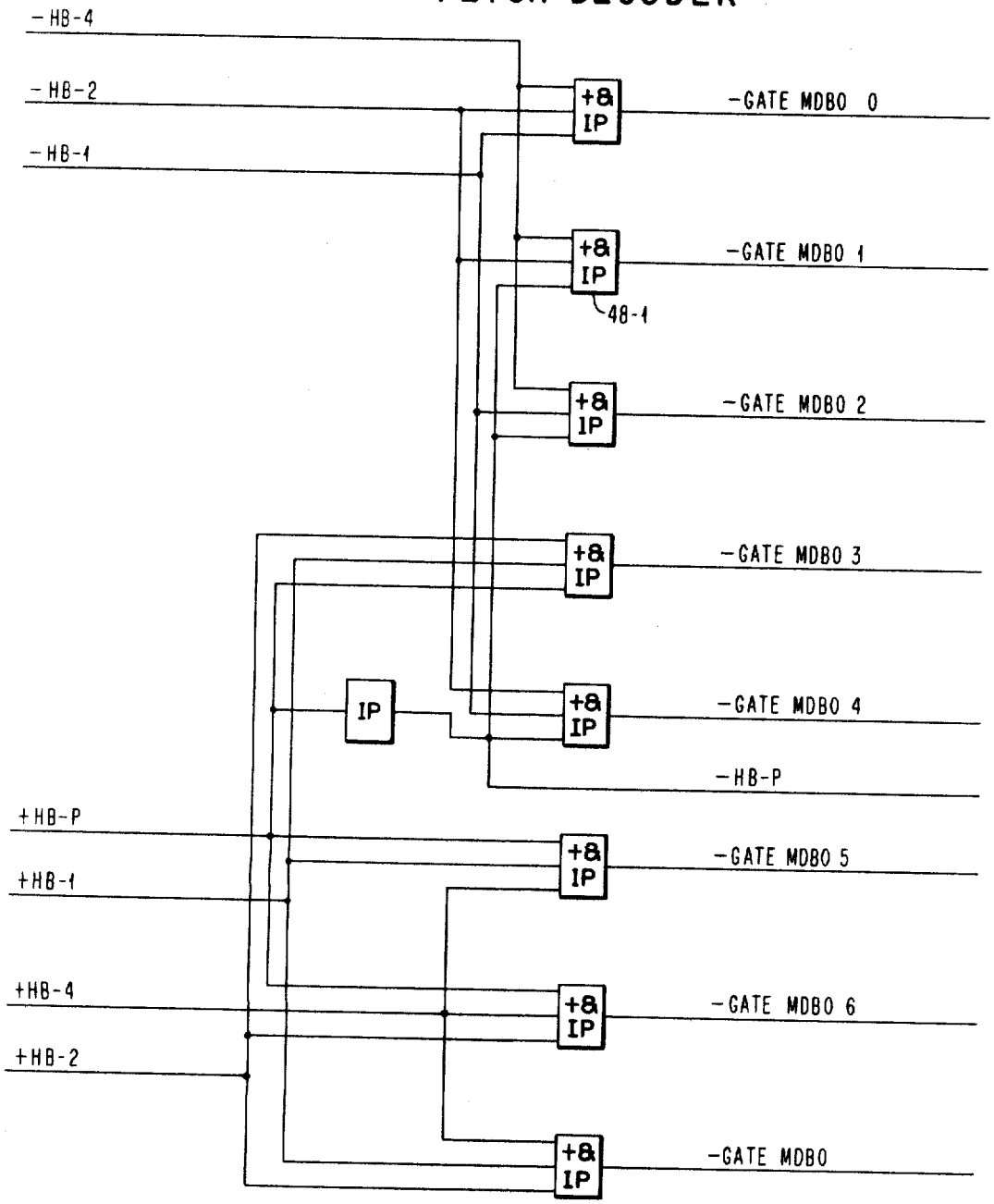

FIGURE 47 shows the HB and HRR registers. The function of these registers is to continue the delay of the byte address started by the HR register, so gating will be proper when the word arrives on the X and Y buses.

The HB register is connected directly to the HR register, shown in FIGURE 46, and is directly coupled on a 1 for 1 basis to provide a simple one cycle delay. The latch for the HB2 position, for example, is made up of logic blocks 47–1 to 47–4 and is directly settable by outputs of the HR register according to the output of IP block 47–5 when it provides its stated signal +clear B and not scan as combined by +AIP block 47–6. The simple control of blocks 47–5 and 47–6 clears the HB register and sets it to the values of the HR register.

The HRR register includes a single latch made up of logic blocks 47–11 to 47–13 with inputs from logic blocks 47–14 to 47–18. It provides a single output signal —not HRR odd when in the unset condition. It is settable by the combination at +& block 47–15 of the 0 bit value from the HB register a clear signal and signal + gate HB–0. It is also settable directly from the byte processing ring by the coincidence at +& block 47–14 of a reset signal and signal +BP set HRR. Reset occurs in response to appropriate signals at logic blocks 47–16 and 47–18.

FIGURE 47 illustrates the fetch decoder which is directly connected to the HB register and decodes the outputs of the HB register into gate control signals. The +& IP block 48–1, for example, provides its output signal —gate MDBO 1 in response to coincident inputs signal —HD4, signal HD2 and the inverted signal +HB–P. Other combinations of bit signals from the HB register are decoded to provide signals to control MDBO 0 to MDBO 7.

Figure 49:
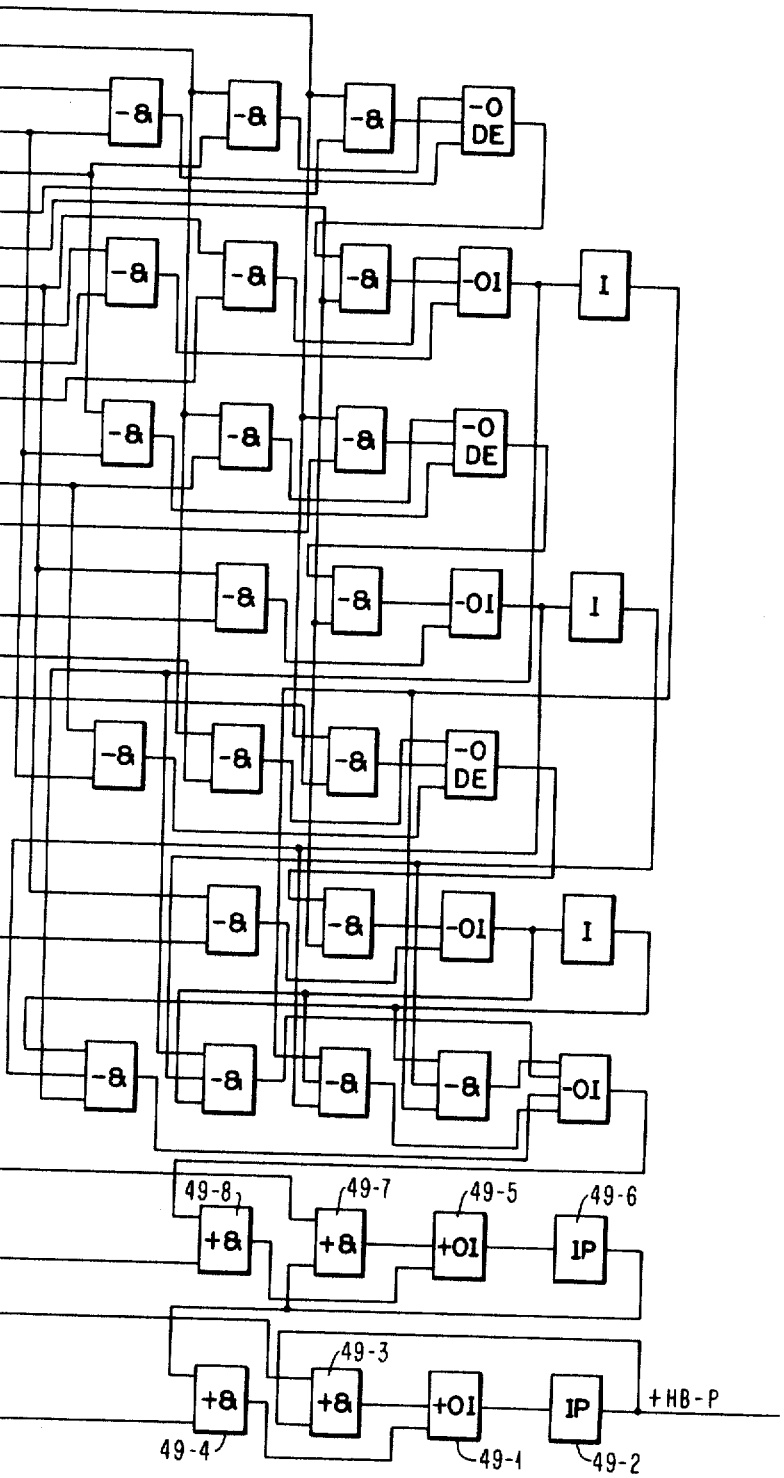

FIGURE 49 illustrates the checking for the HR and HB register and the fetch byte mechanism. The checking culminates in a pair of interconnected latches made up of logic blocks 49–1 to 49–8. These blocks provide a continuously available parity bit identified by signal +HB–P in response to the output of the check mechanism which is applied at +& block 49–8. These two latches combine the output of the check mechanism with control signals clear U and clear B and not scan so that the parity bit is provided where required.

Figure 50:
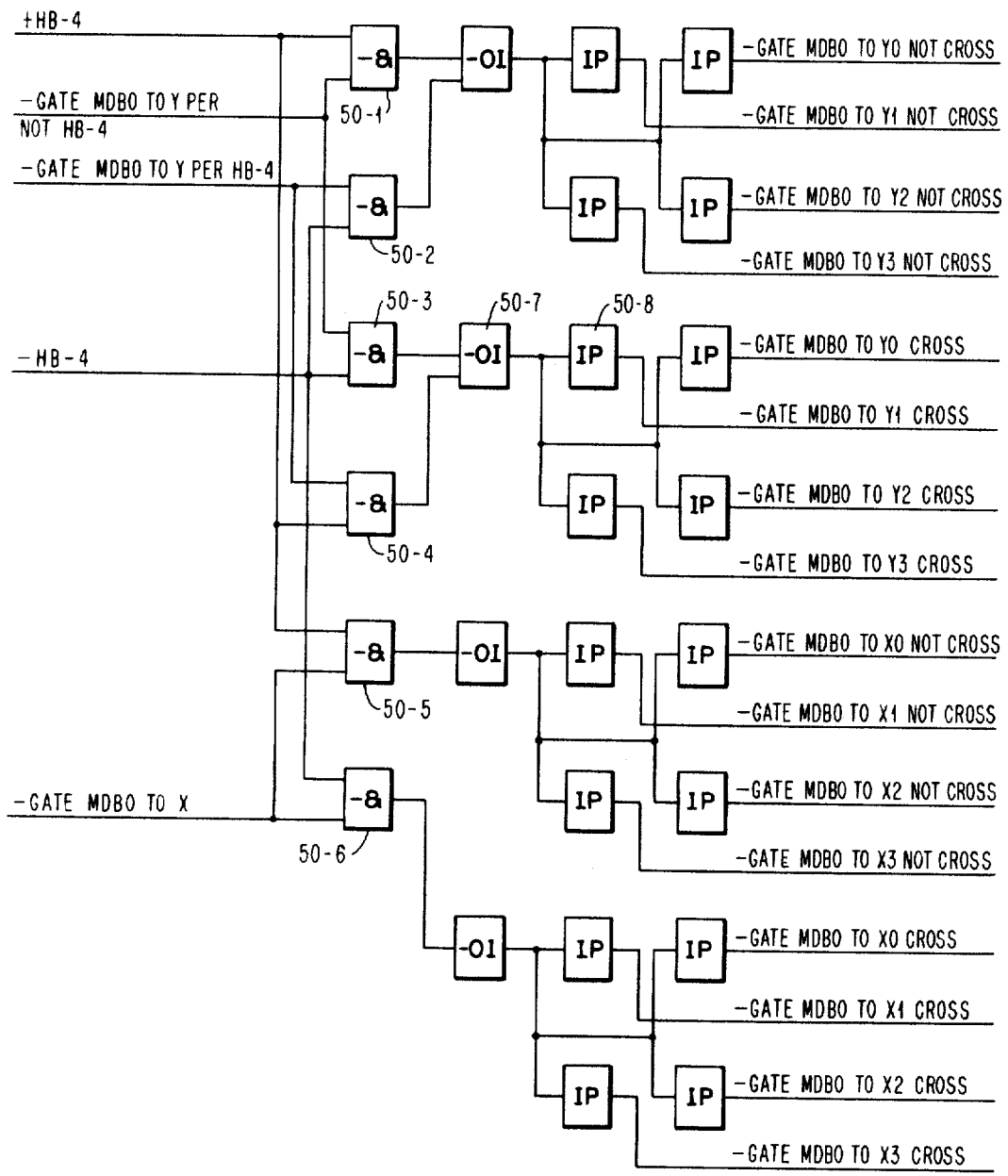

FIGURE 50 shows MDBO to X and Y controls. The basic selection is according to the value of HB register. 4 bit value controls the crossover shown at 3–5 of FIGURE 3 to determine whether the memory data buffer will read out cross or not cross. Signal +HB–4 from FIGURE 47 controls the not cross and signal —HB–4 from FIGURE 47 controls the cross. The cross control signals are combined with gate signals which control gating of the memory data register to the X bus either cross or not cross and to the Y but either cross or not cross according to a specified function of the HB 4 bit value. The output of —& block 50–1 to 50–6 are combined in —OI blocks such as 50–7 and powered by IP block such as 50–8 to provide the actual gating signals to control the crossover.

K. SUMMARY OF FIGURES 1–50

FIGURE 1 shows, in block diagram form, the priority sequencing control of the invention. FIGURE 2 diagrams a sample operation under control of the priority sequencing control of FIGURE 1. FIGURES 3 and 4 show the data paths of the system. FIGURE 5 diagrams the functions of the individual request rings, showing how these request rings control the data paths of FIGURES 3 and 4.

FIGURES 6–50 illustrate in block in representative detail those functional units required in a computer to perform satisfactorily under control of the priority sequencing control shown in FIGURE 1. Those functional units which are relatively standard are not explained in detail but are identified or explained in representative detail.

In general, the functional units described above are capable of performing, each an assigned simple function, upon direct control by the priority sequencing control and associated logic which will be explained in the following section.

L. PRIORITY SEQUENCING CONTROL

The data paths described above are subject to exacting control at a low level. Gates shown as open arrowheads in FIGURE 4 are each subject to gating control from gate control registers 1–20 and 1–21 of FIGURE 1. The gating control is generally of sufficient flexibility that the registers, arithmetic units and switches of the logical mechanism of FIGURE 3 may be considered each to have full access to any one of the W, X, Y and Z buses and memory wherever required.

Figure 51:
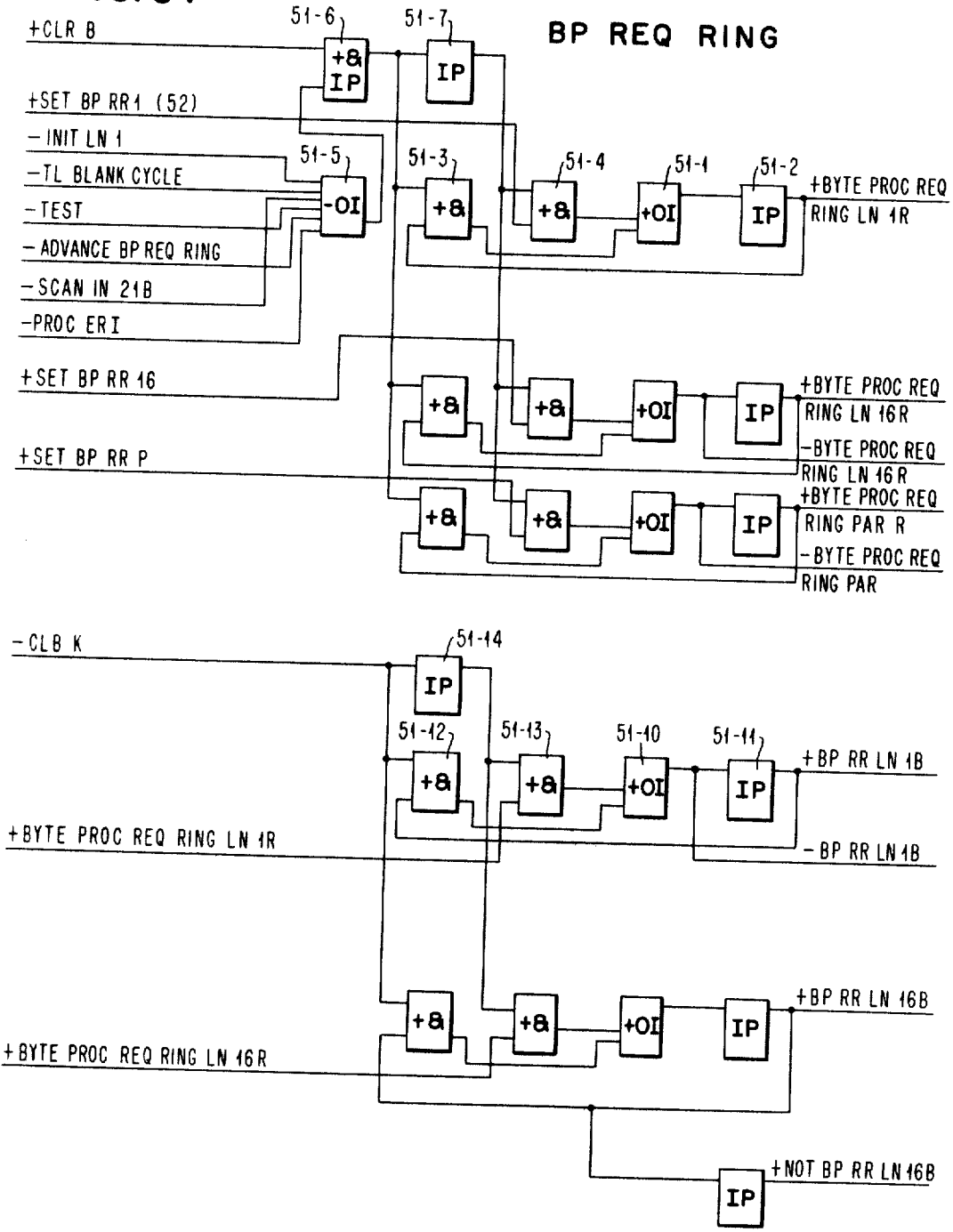

The priority sequencing control of FIGURE 1 and FIGURE 51 and following provides gating control signals which force the data paths of FIGURE 3 to perform in concert as a data processing system.

The basic control is by instructions currently in the D register. The instruction provides an initial value to a related one of request rings 1–1 to 1–7 (FIGURE 1) which control individual gating functions via a priority sequencing circuit which makes maximum use of buses.

The request rings were previously explained on a functional basis in connection with FIGURE 5. Each request ring includes a multiposition trigger register (made up of B latches and R latches) and includes logic so that it can step from a first configuration to a second configuration as dictated by the instruction and by indicator values.

The configurations and their functions were explained in connection with maps shown in FIGURE 5. The following detailed explanation shows how the functions are implemented in logic.

L1. *Byte process request ring (FIGURE 51)*

FIGURE 51 shows an illustrative portion of the byte process request ring (1–7 of FIGURE 1). The function of the BP request ring is to control data manipulations during computer arithmetic and logical operations. Because the byte process ring operates with high speed registers and buses, and because it manipulates data which is readily available, it can operate with lowest priority. The positions of the byte process ring and the operations which it controls are set out in Section I, supra, under heading "Request Rings—Specification."

The BP request ring, as explained previously, is not an ordinary ring but, in fact, a group of double latch triggers with fairly complex interconnections so that the triggers can go from one configuration to another configuration in a selective sequence. The ring may step from configuration 4 to configuration 7, to 11, to 2 or it may step 1, 2, 3, 4. The BP ring operation is shown in map form in FIGURE 5h.

FIGURE 51 shows the R latches of the BP request ring.

Three register time latches are shown for the BP request ring; these are the latch for the 1 position, for the 16 position and for the parity position. The latches for the 2 position, for the 4 position and 8 position are similar. These latches form a five-bit-plus-parity register capable of 64 valid configurations. These configurations are described in Section I.

Logical blocks 51–1 to 51–4 form the R latch for the 1 position and provide signal +BYTE PROC REQ RING LN 1R in response to bit value signal +SET BP RR1.

All the BP request ring R latches respond to logical blocks 51–5 to 51–7 for advance control. For its bit value, each R latch has its own input such as signal +SET BP RR1 applied to +& block 51–4 for the request ring bit 1 position. The —OI block 51–5 controls clear and set timing by responding to any one of six signals which may require a change in the request ring values. These signals are: —INIT LN1, TL BLANK CYCLE, —TEST, —ADVANCE BP REQUEST RING, —SCAN IN 21B and —PROC ERI. Most often applied of these is signal —ADVANCE BP REQUEST RING, which is used to control the advance of the request ring from one configuration to the next configuration when the request is honored by priority block 1–15 of FIGURE 1. Signal +CLR B is a machine timing signal to time the actual change of configuration by controlling +& blocks 51–3 and 51–4 via +&IP block 51–6 and IP 51–7.

The R latches accept inputs to cause changes of CP ring configuration, as controlled by bit value signals, control signals and timing signals. The outputs of the R latches pass directly to related B latches at the bottom of FIGURE 51.

The B latches of the byte process request ring are a simple set of latches directly connected to their counterpart latches in the R side. The 1B position is made up of logic blocks 51–10 to 51–14 and is directly connected to the related R latch output IP block 51–2 at the top of FIGURE 51, by the wire carrying signal +BYTE PROC REQ RING LN 1R. The B latch for the 16 position of the BP B side request ring is similarly connected to the R latch for the 16 position. Other bit positions are also so connected.

FIGURE 52 shows the request encoder for the byte process ring. The function of the request encoder is to provide the bit values of the new configuration to which the request ring is to be set upon advance. This encoder is a set of OR circuits, each OR circuit responding to each of the situations which will produce the associated bit value. For example, the several situations which will produce the 1 bit value are accepted by +OI blocks 52–1, 52–2 and 52–3 to provide output signal —set BP RR1 which is applied in FIGURE 51 to the 1 bit latch of the BP request ring. Other values are developed in similar fashion from the inputs at left of FIGURE 52. These inputs are identified by functional titles wherever possible. The source of these inputs is the byte process decoder which will be explained in connection with FIGURES 53 and following.

Each request ring has a "home" position with its own bit configuration. Signal +SET BP RR HOME, just below the center of FIGURE 52, is applied directly to +OI block 52–4, and also to each of +OI blocks 52–2, 52–5, 52–6 and 52–7. This results in an "all 1's" configuration (011111) with even parity, an all right situation with the ring at rest.

Other signals from the byte process decoder result in odd parity configurations which are active requests and have odd parity. One such situation is the result of signal +FIX DIV COMP (fixed point divide complete) at the top of the figure. This signal condition OI–block 52–1 for a (0) 00001 configuration.

FIGURE 53 shows the byte process decoder. This decoder accepts inputs from the Z bus, from its own output logic illustrated in FIGURE 54, and from certain indicators, and provides output signals indicative of the required operation. The function of the byte process decoder is to provide operation request signals in response to demand by the byte process request ring. The operation request signals are used to control machine gates in carrying out the operation.

Figure 53A:
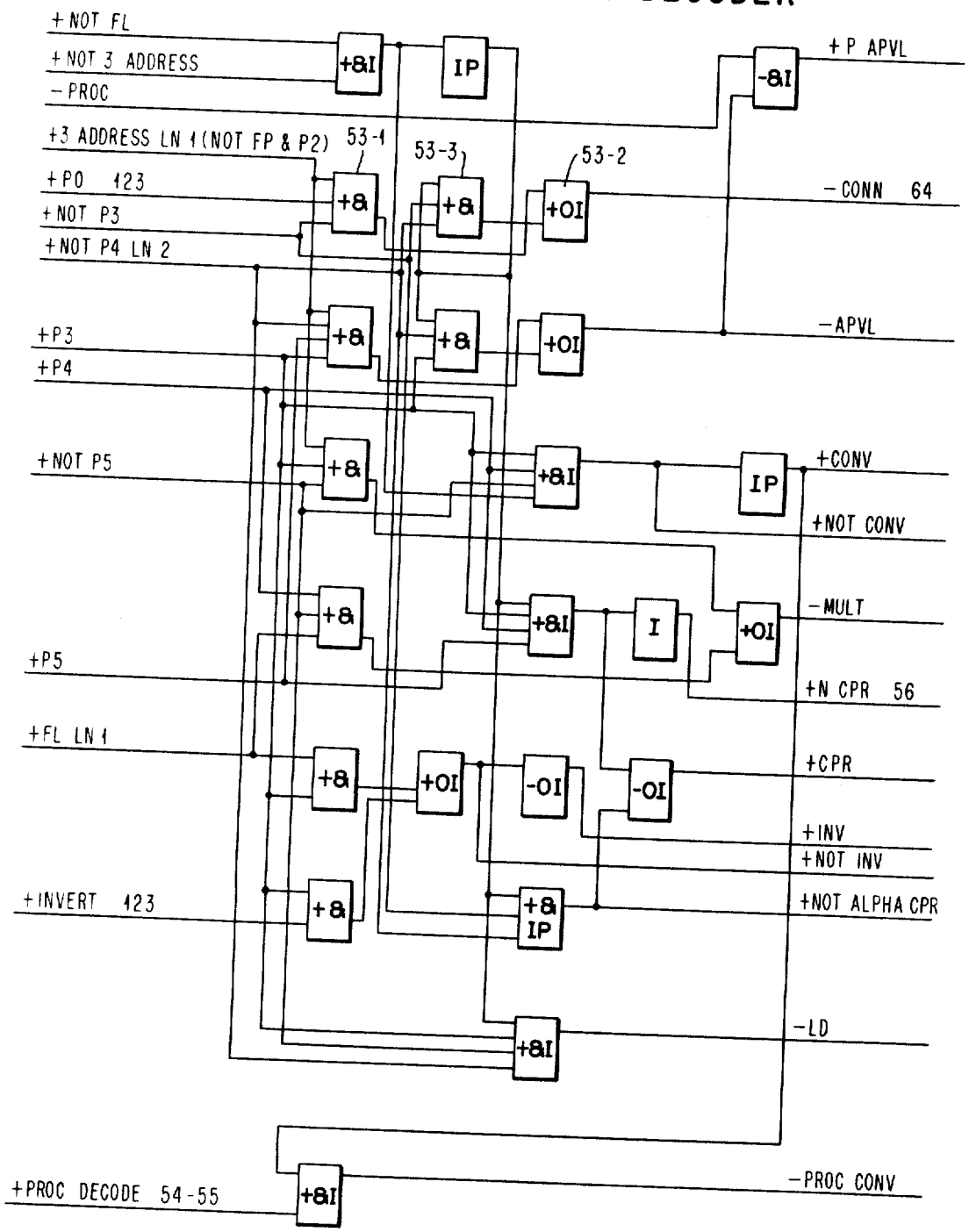

FIGURE 53a shows several AND circuits feeding related OR circuits with signals demanding particular operations. The +& block 53–1, for example, requires the connect operation, and accordingly conditions +OI block 53–2 when the appropriate situation occurs. The situation is identified by signal +3 ADDRESS LN 1 (which is derived by ANDing signals indicating that the operation is not a floating point operation and that there is a 1 bit in the 2 position of the preserve register) with signal +P0 and signal +NOT P3. The +& block 53–3 similarly responds to a combination of circumstances requiring the connect operation, and similarly conditions +OI block 53–2. The output of +OI block 53–2 passes to the circuit shown in FIGURE 64, to set the true-complement-recomplement trigger, and also passes to other circuits where needed.

Figure 53B:
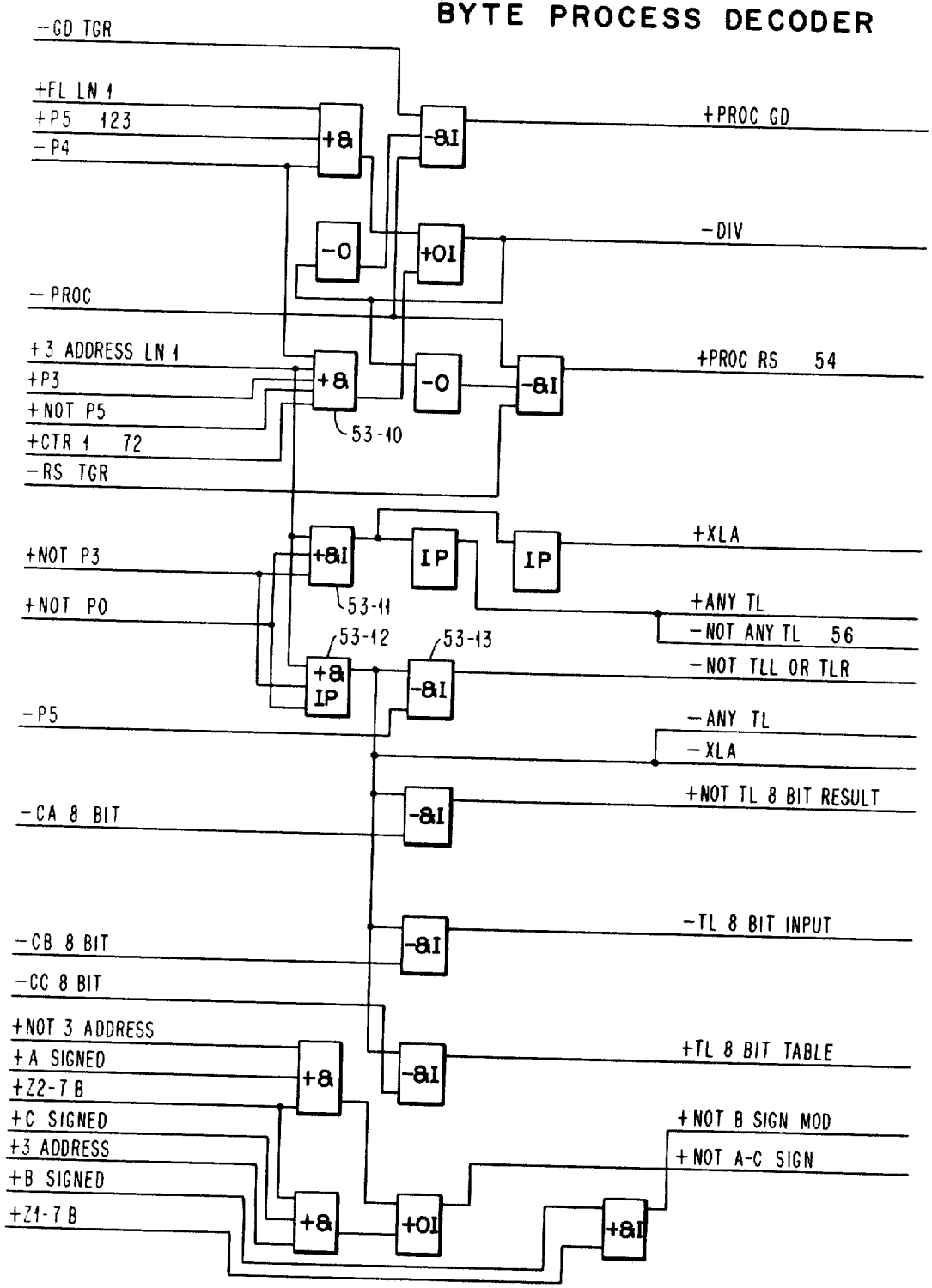

FIGURE 53b shows several more AND circuits including blocks 53–10 to 53–13. These blocks respond to appropriate inputs to condition related OR circuits to provide signals —DIV, +XLA, +ANY TL, and —NOT TLL OR TLR. Signal ANY TL is useful in the circuit shown at FIGURE 56, to control gating on the Z bus.

FIGURE 53c shows more AND circuits, including 53–21, which responds to appropriate signals to provide output signal —P FL MULT, which is used by the circuits in FIGURES 60 and 68 to control gating during floating point multiply operations.

Figure 53D:
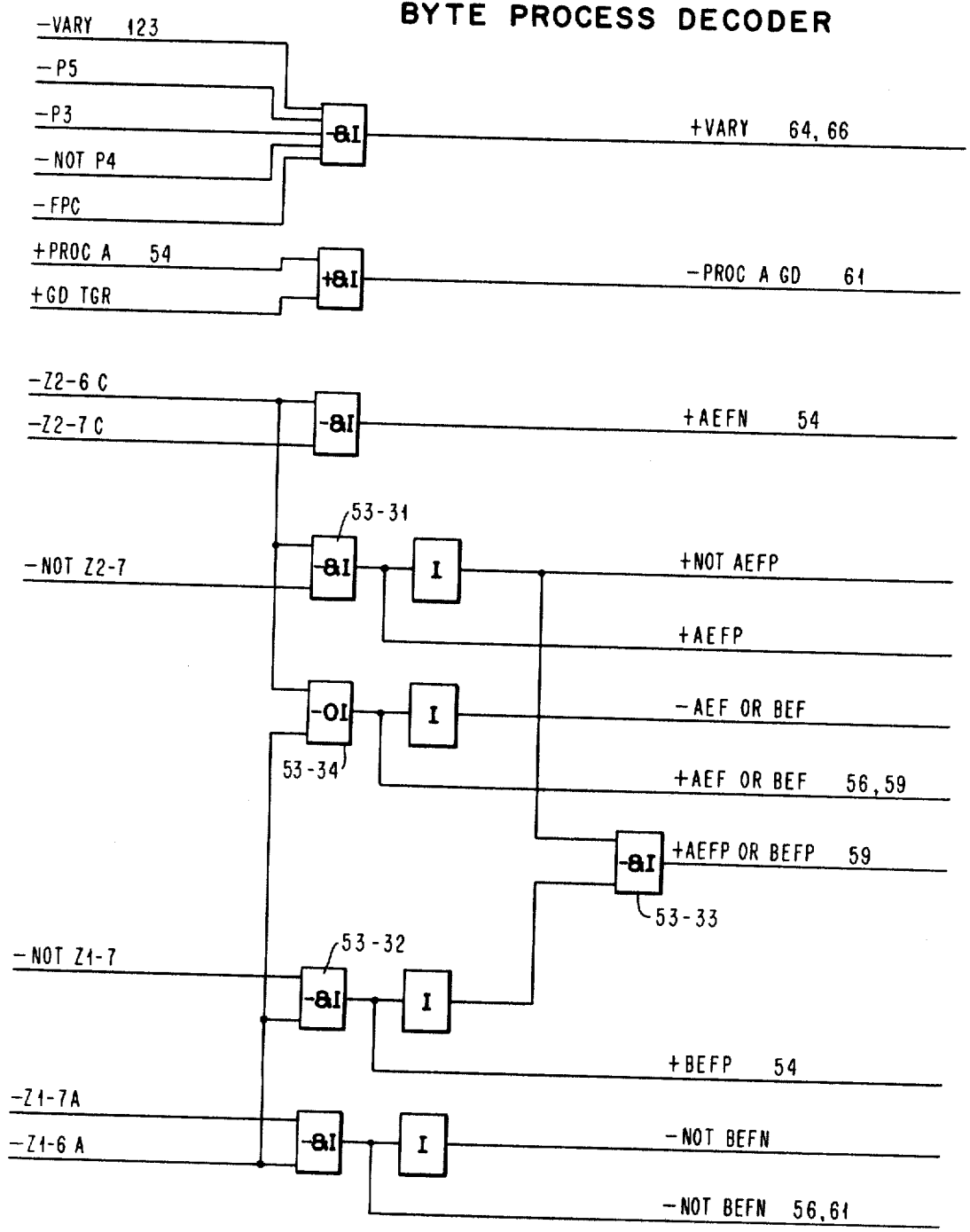
Figure 55:
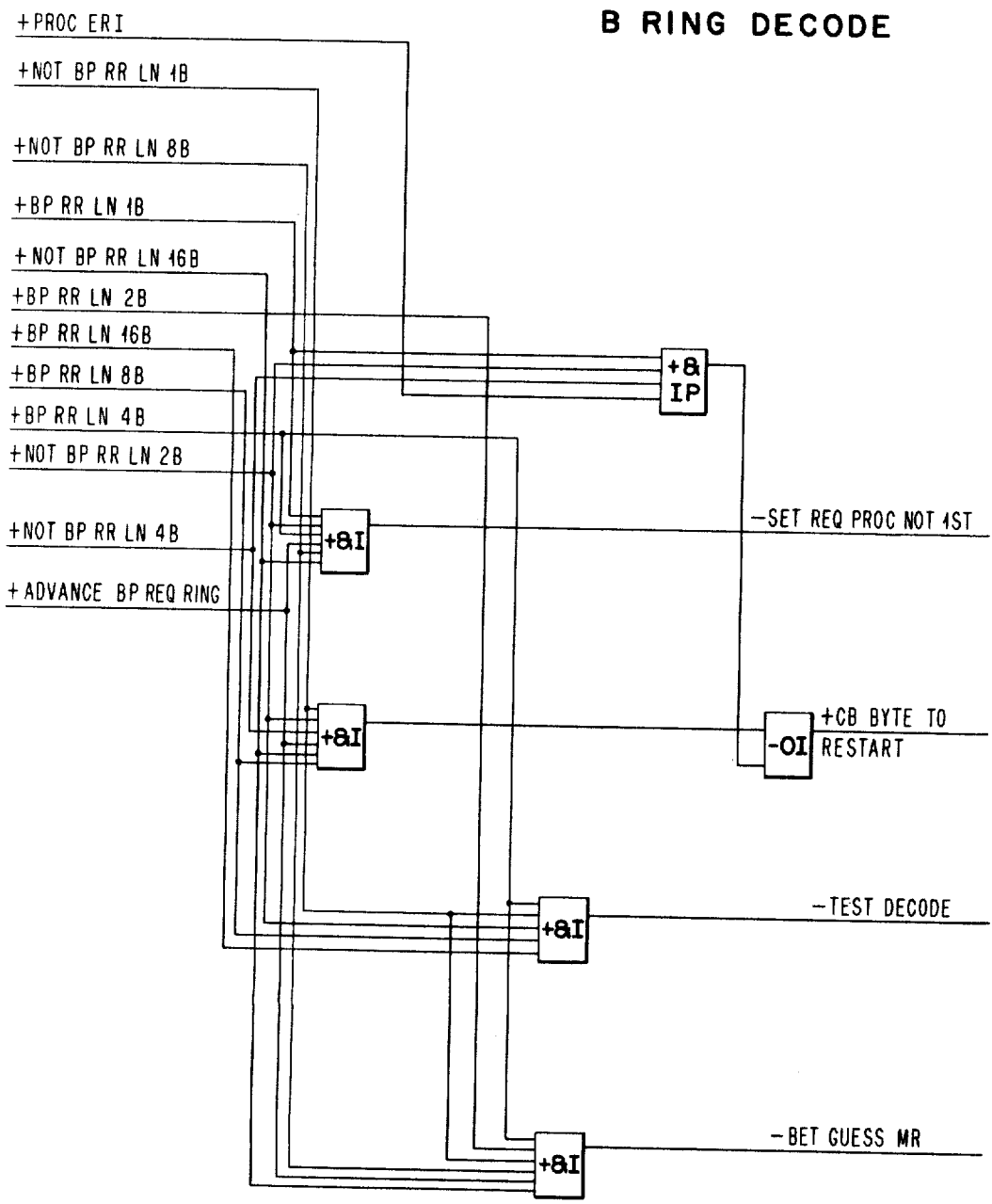

FIGURE 53d shows additional AND circuits, including 53–31 to 53–33, which are useful in controlling the condition register by circuits shown in FIGURE 59. The —OI block 53–33 is also useful for the same purpose.

FIGURE 54 illustrates the byte process B ring decoder and requests. FIGURES 54a and 54b placed together to make a single figure. Signals from various sources, primarily from the byte process decoder of FIGURE 53, condition AND circuits to provide output signals indicative of particular requests. These signals are used to control DO lines 1–16 in FIGURE 1 and are fed back to the circuits in FIGURE 53 to help control decoding for the next instruction.

The +&I block 54–1, for example, responds to a combination of inputs to provide output signal SET REQ BLANK TL cycle. The +&I block 54–2 responds to its combination of inputs to provide output signal —PROC SIGN DECODE which passes to FIGURE 53.

In FIGURE 54b, —& block 54–11 responds to signals —BP TERM C and —TEST to provide output signal +SET BP RR HOME. This signal passes to the circuit in FIGURE 52 and returns the byte process ring to the home position.

FIGURE 54c includes further byte process B ring decoding and requests. The —& block 54–11, for example, responds to the coincidence of signal —NOT TERM and —FL TEST to provide output signal SET REQ PROC NOT FIRST. The —&I block 54–12 responds to byte process request ring configuration 1000 to provide output signal +REQUEST CA CC SWAP. This signal passes to encoder 1–17 in FIGURE 1 which is shown in detail in FIGURE 52.

FIGURES 56a and b show the byte process bus gating. These circuits respond to the appropriate byte process requests, tempered by suitable indicators, to operate the Z bus gates and thus help control a byte processing function.

Circuits including +OI block 56–1 provide intermediate signal —SET E1 to Z1 in response to any of several signals including signal 2CONV PROC FPC from FIGURE 71. Such requests as require transfer of values from E1 to Z1 are provided with a connection, such as +OI block 56–1, which passes a signal to FIGURE 56b circuitry to set the E1 to Z1 trigger, 56–11 and 56–12. Similar logic as appropriate controls transfer of data from B serially to Z1, gating of zero to Z1, and other like functions. The serial gating function requires only +&I blocks 56–13; the gate zeros function includes trigger 56–14 and 56–15 and +&I block 56–16.

FIGURE 56 shows the W3 bus gating. Byte process requests which require the W3 bus are each provided with a connection via an OR circuit to the appropriate gates. The W3 bus carries byte addresses and for that reason receives control from the HRR register 4–30.

Signal —GATE E2R to W3 ST is provided by —ODE block 56–1 in response to conditioning by an AND circuit such as —& block 57–2. Signals —SRO LN1, —DO REQ BET QUESS, and —NOT HRR ODD conditions —& block 57–2 for gating E2 to W3.

Byte process memory requests control AND circuits such as —& block 57–3 in appropriate circumstances, to provide —ODE block 56–1 with another input resulting in signal —GATE E2R TO W3 ST.

A running check of the control mechanism is maintained by the parity checkers 4–31 and 4–34 on the W and Z buses. Each request fills both the W and Z buses. Logic including +OI block 56–2 and +& block 56–3 set a zero in the Z bus. The zero has proper parity and maintains the required completeness for the request.

FIGURE 58 shows the byte process data flag control. The data flag has the function of identifying a special item of significance to data, which is neither a numeric value or a sign.

The data flag controls are simple combinatorial logic to respond to those situations where the data flag is desired. For example, the data flag is desired upon coincidence of the conditions indicated by signal —PROC SIGN LN1, signal —B SIGNED and signal —Z1–4a, which signals ar eapplied to —& block 58–1. The output of —& block 58–1 is applied to —OI block 58–2 to provide signal +SET DATA FLAG P IND, for indirect addressing.

FIGURE 59 illustrates the condition register control. The function of the condition register is to indicate the interim state during arithmetic operations, for example, overflow.

The condition register control sets the condition register to particular values in response to demand situations. One such demand situation sets the condition register upon coincident occurrence of signal +INSERT SIGN and signal +PROC SIGN, applied to +& block 59–1. The output of +& block 59–1 provides output signal —SET CR 0 via +OI block 59–2.

FIGURE 60 shows gating for the E register. The function of the E register is to supply a prefix and mask for a particular operating program, and also to count the number of instructions that have been executed. See Section J9.

It is desired to gate certain bytes from other registers, or even all zeros, to various byte positions of the E register upon occurrence of certain conditions, especially during multiply and divide instructions. The —& block 60–1 and 60–2 control gating of byte 0 of the Z bus to byte 3 of the E register, upon coincident occurrence of signal —P FL MULT and signal —CA ZERO. These signals are applied to —& block 60–1, the output of which conditions —OI block 60–2 to provide output signal +GATE Z0 to E3. On occurrence of other conditions, such as that indicated by signal +DIV INIT GD LN 2, all zeros are required in byte 3 of the E register. The +OI blocks similar to +OI block 60–2 control this and similar gating functions.

FIGURE 60b shows logic blocks 60–3 to 60–21. This logic serves to gate finite values to particular byte positions of the E register for special uses, to gate the output of adder 1 to E register byte position 1, and to control the readout of the CA and CB registers for cross or not cross. For example, signal —CA ODD, or the combination of signal —CA 8 BIT with signal —ANY TL, conditions —OI block 60–13 at the center of the page to provide signal +A NOT CROSS, which controls the logic of FIGURE 36.

FIGURE 61 shows gating to HRR register 4–30 of FIGURE 4. The function of the HRR register is to delay for the final half cycle the byte address of a word addressed the previous cycle.

The HRR gating circuits include OI blocks 61–1 and 61–2 which are connected in flip-flop fashion to provide one or the other of signals +PER HRR or —PER HRR, and blocks 61–3 to 61–5 which provide signals SET HRR and RESET HRR.

The addressing of a particular half byte occurs generally in three steps; addressing the word, addressing the byte and addressing the half byte. The final half byte address is odd or even, and thus requires a possible crossover to select the proper half byte. The addressing being in various steps, the final decision of whether to accept the odd half byte or even half byte is delayed as long as possible by the HRR register 4–30 in FIGURE 4a.

Because of the nature of the priority sequence control, addressing requires a word address at the memory address register during the 1B cycle, and requires the byte and half-byte addresses during the 2R cycle. The HR, HB, and HRR registers retain the byte address for the requisite period.

The priority sequence control operates assembled with addresses which may include fixed address components. The fixed address components are mixed with variable address components under control of a switch. Assembled addresses are of particular value in table lookup operations.

L2. *True-complement controls (FIGURES 62–65)*

Complement addition techniques, used for subtraction, require a set of triggers identifying true and complement conditions.

Figure 62:
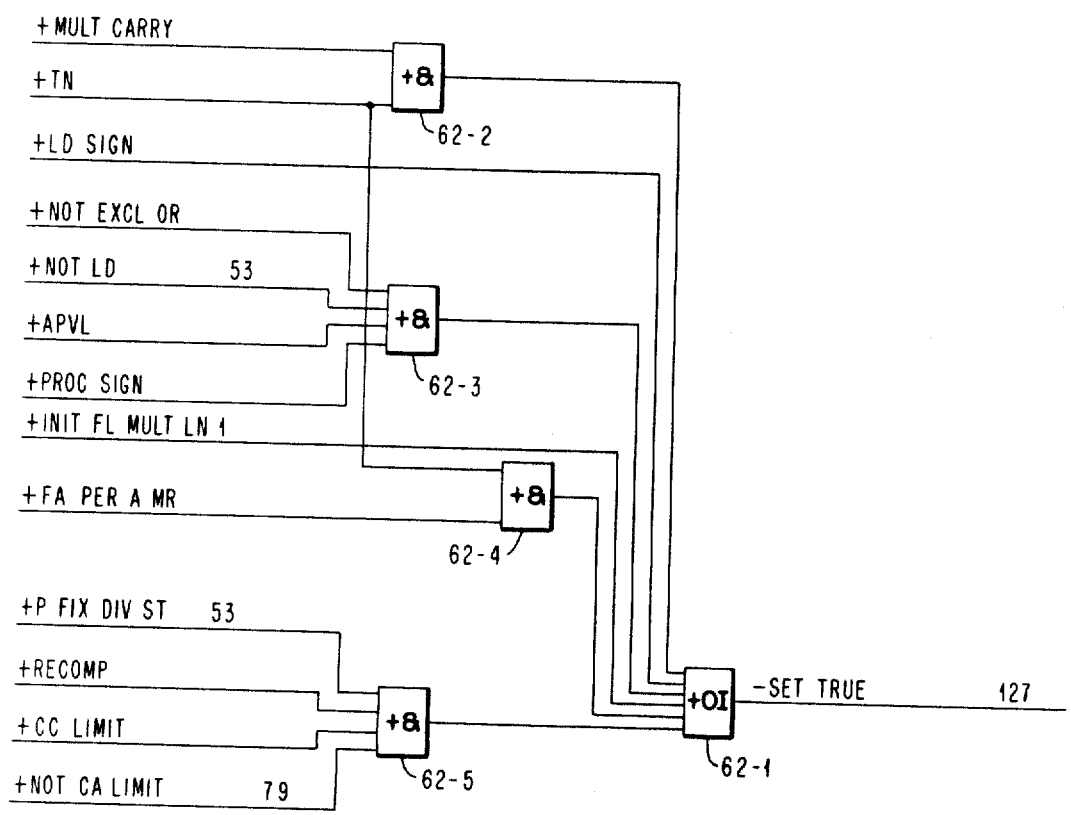

FIGURE 62 shows a simple circuit to provide an output signal —set true which is used to set the true trigger in FIGURE 127. The true trigger indicates that the arithmetic values resulting from processing are true values.

The +OI block 62–1 provides output signal —SET TRUE upon conditioning of any of +& blocks 62–2 to 62–5 responds to an individual "set true" situation. Coincidence of signal +MULT CARRY and signal +TN, for example, condition +& block 62–2 to provide via +OI block 62–1 the output signal —SET TRUE.

FIGURE 63 shows circuitry to set the complement and to set carry triggers used during arithmetic processing. The complement trigger, in FIGURE 127, indicates that arithmetic values resulting from processing are complement values. The carry trigger is set, via circuits on FIGURE 65, to care for the fugitive one in recomplement operations.

The +OI block 63–1 responds to appropriately gated sets of condition signals to provide output signal —SET COMP to set the complement trigger in FIGURE 127. One condition which operates +OI block 63–1 is signal +SET CARRY from the "or" circuit made up of +OI blocks 63–2 to 63–4 and I block 63–5. One situation resulting in signal +SET CARRY is the coincidence at +& block 63–6 of signal +SIGNS SAME and signal +PROC INIT DIV FL 15. In a particular divide operation, with like signs, an initial set condition of the carry trigger is required. The +& block 63–6 controls this function.

FIGURE 64 shows simple logic to provide the output signal —RESET TCR. The function of this signal is to reset the true, complement and recomplement triggers in the adder controls shown in FIGURE 127. There are several specific situations which demand a reset of the true, complement and recomplement triggers.

The +OI blocks 64–1 and 64–2 and +& block 64–3 perform the function in response to any of several demanding signals, such as signal +APVL TEST LN2 applied to +OI block 64–2. The reset is required by ordinary operations as indicated by signal +INIT LN1 and also by exponent manipulation operations as indicated by signal +FL PT EXP RECOMP. FIGURE 65 shows decoding circuitry used to provide signal —SET RECOMP and signal +INSERT CARRY. The function of these signals is to control the carry trigger and recomp trigger operations involving the arithmetic units.

The function is performed by +OI blocks 65–1 to 65–3 which respond to the individual situations identified by their input logic. A "carry insert" normally accompanies a "set recomp" operation; +OI block 65–4 and I block 65–5 force +OI block 65–2 to provide its output signal +INSERT CARRY in all "set recomp" situations except that indicated by signal +FIX DIV SIGN at top of FIGURE 65.

The recomplementing operation is required when the result of a subtraction operation is a negative number. This occurs occasionally during fixed point division and during ordinary subtract operations. A negative result may also occur during exponent manipulation and require recomplementing, as exemplified by signal +EXP RECOMP. This signal is derived from triggers 1 and 2 by logic shown infra at FIGURE 72.

L3. *Byte counter*

The CA, CB and CC registers serve as byte counters, addressing individual bytes within the word.

FIGURE 66, which is made up of FIGURES 66a and 66b, shows circuitry for controlling stepping of the byte counters in the CA, CB and CC registers and shows circuitry for mode control of these registers. The function of the CA, CB and CC registers is to fetch and store operands used in processing, in addition to controlling the sequentially read out and read in of bytes to their respective operand registers.

Stepping of the CA byte counter occurs under control of output signal —STEP CA from +OI blocks 66-1 upon conditioning by any one of several AND circuits which feed it. For example, +& block 66-2 responds to its inputs, signal +SA PER C MR, signal +NOT CA RST 7 or 11 and signal +RS TGR.

The +& I blocks 66-11 to 66-13 provide mode control signals for the byte counters.

FIGURE 67 shows a byte counter step control which operates to provide the mode of stepping the byte counters, for example, right to left, through the field when performing addition.

Figure 86:
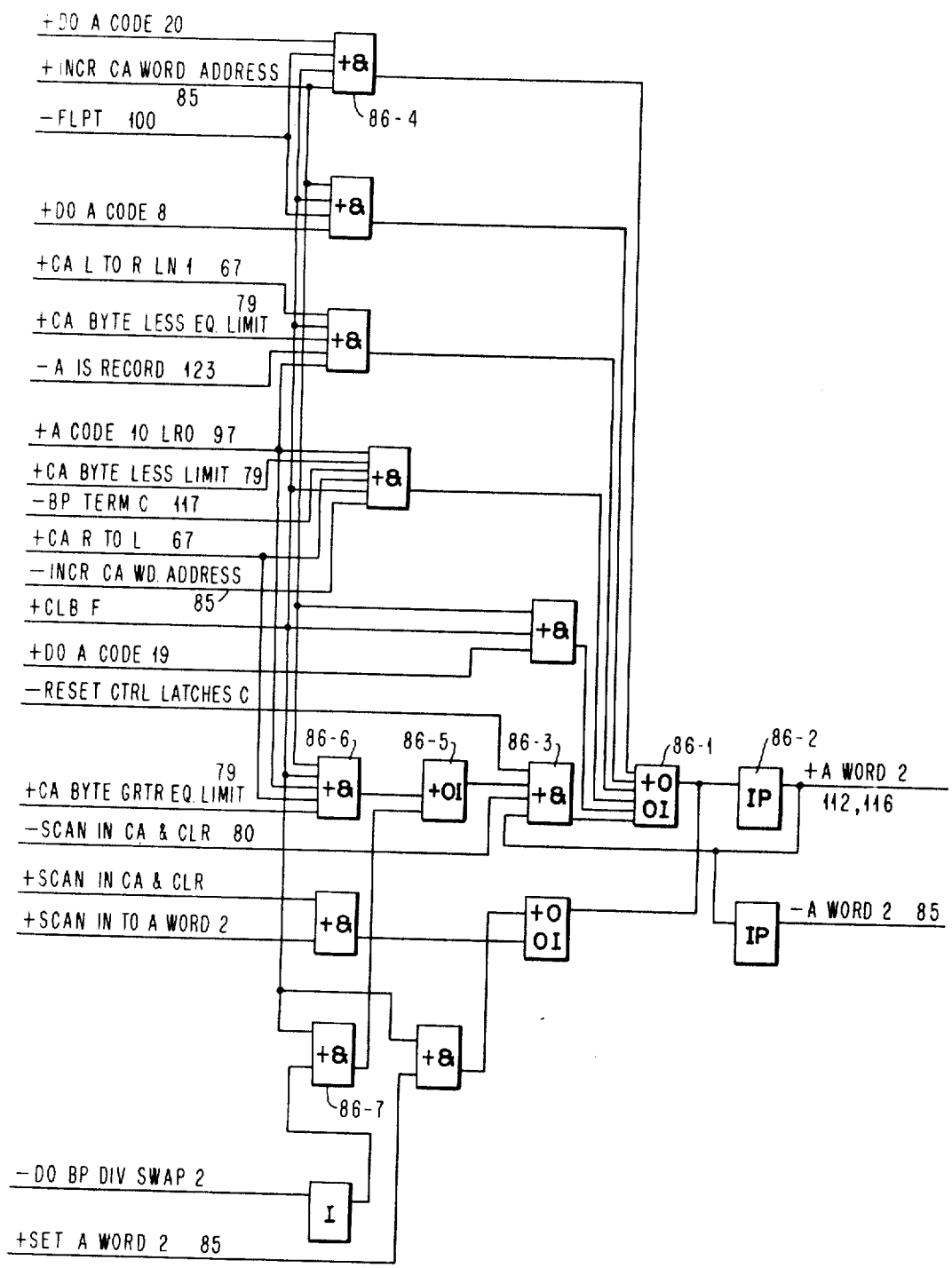

The trigger made up of —OI blocks 67-1 and 67-2 controls right to left stepping, providing signal —CA L TO R LN1 to circuits in FIGURES 86 and 117, and signal —NOT CA R TO L to the circuit of FIGURE 70.

It is also possible for the byte counter to step in oscillatory fashion under control of signal —OSCILLATE B from +OI block 67-3 and under control of signal —OSCILLATE C +&I block 67-4.

FIGURE 68 shows logic to control the restart function. In multiply and divide operations a field is used over and over; consequently the need arises to reestablish the starting byte. This is accomplished with this restart function.

The +OI block 68-1 provides output signal —CA restart to byte which passes to the logic of FIGURE 78 where it controls the setting of the byte count. The +OI blocks 68-2 and 68-3 perform the similar function for the CB and CC rings. The +OI block 68-4 responds to several inputs including signal +CONV TAB LOOK FPC from the logic of FIGURE 71 to provide output signal CA BYTE TO RESTART which is useful in the logic of FIGURE 15 to control gating of the byte count to the CA register.

FIGURE 69 shows the byte counter gating. Circuits including blocks 69-1 and 69-2 provide control signals which control the values to be inserted in the byte counters. The +& block 69-2, for example, responds to the coincidence of its three inputs to provide via +OI block 69-1 the output signal —BP INSERTS CA 7, which is useful in the circuit of FIGURE 78 to control gates necessary to set value 7 into the CA register byte 2.

FIGURE 70 shows the decoder for the byte control requests. This logic provides control signals useful in maintaining word addresses during byte processing. The +OI block 70-1, for example, provides output signal —BP SET S–F A which is useful in FIGURE 85 to control incrementing of the word address. Several signals, including the output of +& block 70-2, condition +OI block 70-2, condition +OI block 70-1. The +& block 70-2 responds to the coincidence of signal +PROC RS from FIGURE 53b and signal +CA ZERO to condition +OI block 70-1.

FIGURE 71 shows the logic to control floating point and convert operations. AND circuits such as —&I block 71-1 respond to their respective inputs in coincidence and provide output signals useful in controlling floating point and convert operations. The —&I block 71-1 accepts input signal +PROC CONV (the complement of signal —PROC CONV at bottom of FIGURE 53a) and —CTR 1 from FIGURE 72 to provide output signal +CONV RUN IN which is useful in the circuit of FIGURE 68 to control +OI block 68-2 to gate a restart value to the byte counter.

The network of logic at bottom of FIGURE 71 provides intermediate signal +MTM OR KTK, which is useful in setting the condition register of FIGURE 59, and in controlling byte process B ring decoding in FIGURE 54b. This logic network in turn responds to inputs from the preserve register of FIGURE 123, which generally identify the instruction, and signals from other identifiers of floating point and convert operations, including the sequence control logic of FIGURE 100. The —&I block 71-2 responds to signal —PROC CONV and signal —PROC TAB LOOK FIRST, their coincidence identifying the first portion of a table lookup operation and provides output signal +CONV TAB LOOK FPC, which is useful in FIGURE 66 to step the CA byte counter.

FIGURE 72 shows a trigger logic circuit. The function of the trigger logic circuit is to provide indications useful in controlling arithmetic operations. Three cascaded triggers, not shown, develop counts 0, 1, 2 and 3. Counts 1 and 2 are used by the logic of FIGURE 71. Count 3 becomes signal INIT OR RECOMP; the absence of count 3 at the proper time for it becomes signal UNUSUAL END.

The trigger logic circuit includes —OI block, 72-1 and 72-2, which are cross-coupled in flip-flop fashion to provide output signal +SCAN M1 where appropriate.

Figure 73A:
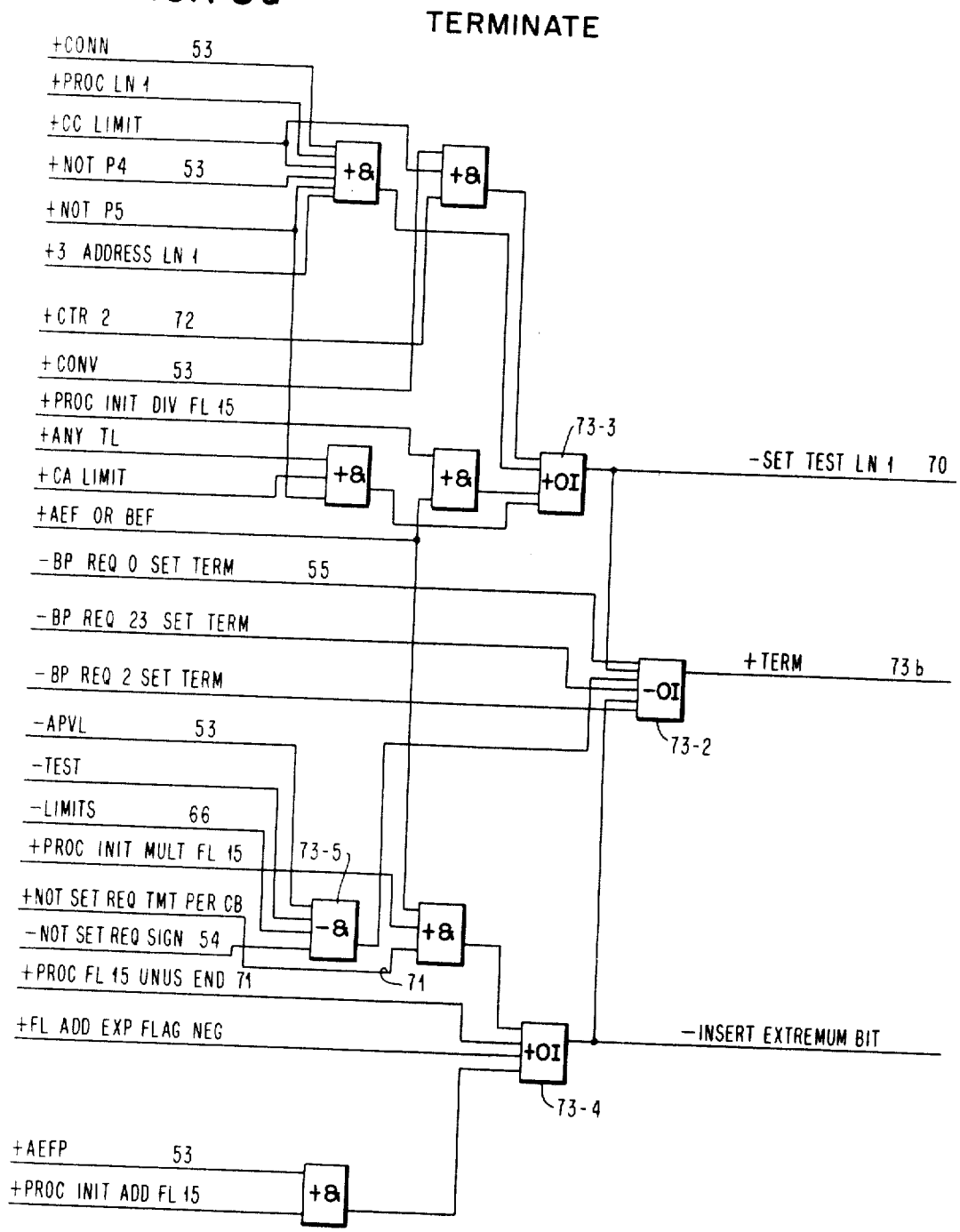

FIGURES 73a and b show the terminate logic. The function of the terminate logic is to end the instruction when the field being operated on is exhausted.

Figure 73B:
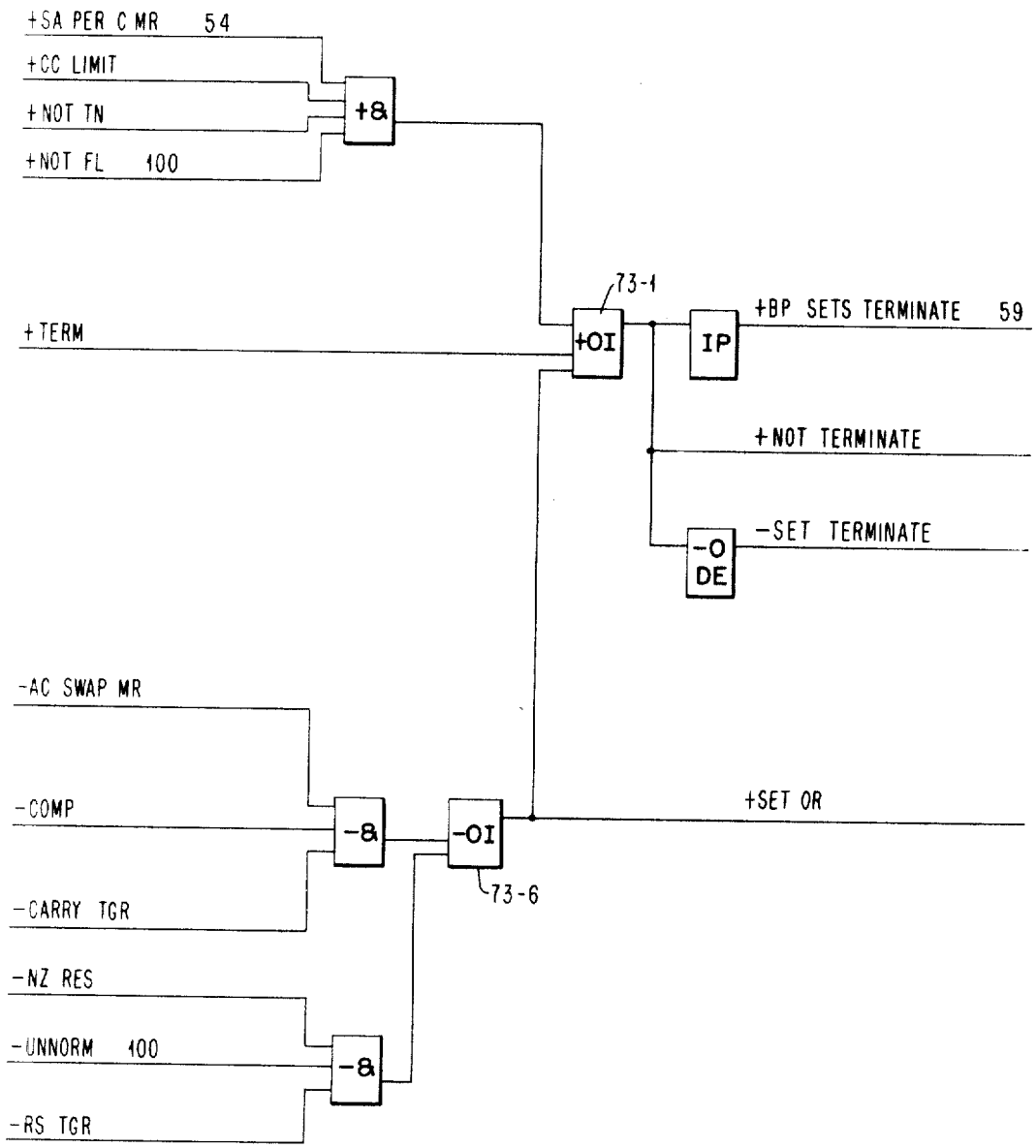

The terminate logic is a decoder for the several combinations of signals which indicate the end of the field including certain requests. This logic provides from +OI block 73-1 on FIGURE 73b the output signal +NOT TERMINATE to indicate termination of a byte processing operation. The +OI block 73-1 (FIGURE 73b) responds to a signal +TERM from —OI block 73-2 in FIGURE 73a. The —OI block 73-2 responds to signal —SET TEST LN1 from +OI block 73-3, to signal —INSERT EXTREMUM BIT from +OI block 73-4 and to each of several other inputs. These other inputs include the output of —& block 73-5, and individual lines carrying the following signals:

—BP REQ 0 SET TERM
—BP REQ 23 SET TERM
—BP REQ 2 SET TERM

An "extremum bit" is generated to indicate a value greater or smaller than the values the field is capable of holding. The normal valuation of the extremum bit is "infinity," although other values may be used at the discretion of the programmer.

The +OI block 73-4 responds to each of the circumstances which require an extremum bit and provides signal —INSERT EXTREMUM BIT.

The +OI block 73-6 (FIGURE 73b) responds to the two sets of conditions which require a signal +SET OR. This signal is a third input to +OI block 73-1, which controls termination.

L4. *Byte registers*

Byte registers CA, CB and CC, shown as 3–9, 3–10 and 3–11 in FIGURE 3, serve as marshalling registers during byte processing. These registers are double latch triggers, with the R latches shown in demonstrative form in FIGURE 10.

Figure 74:
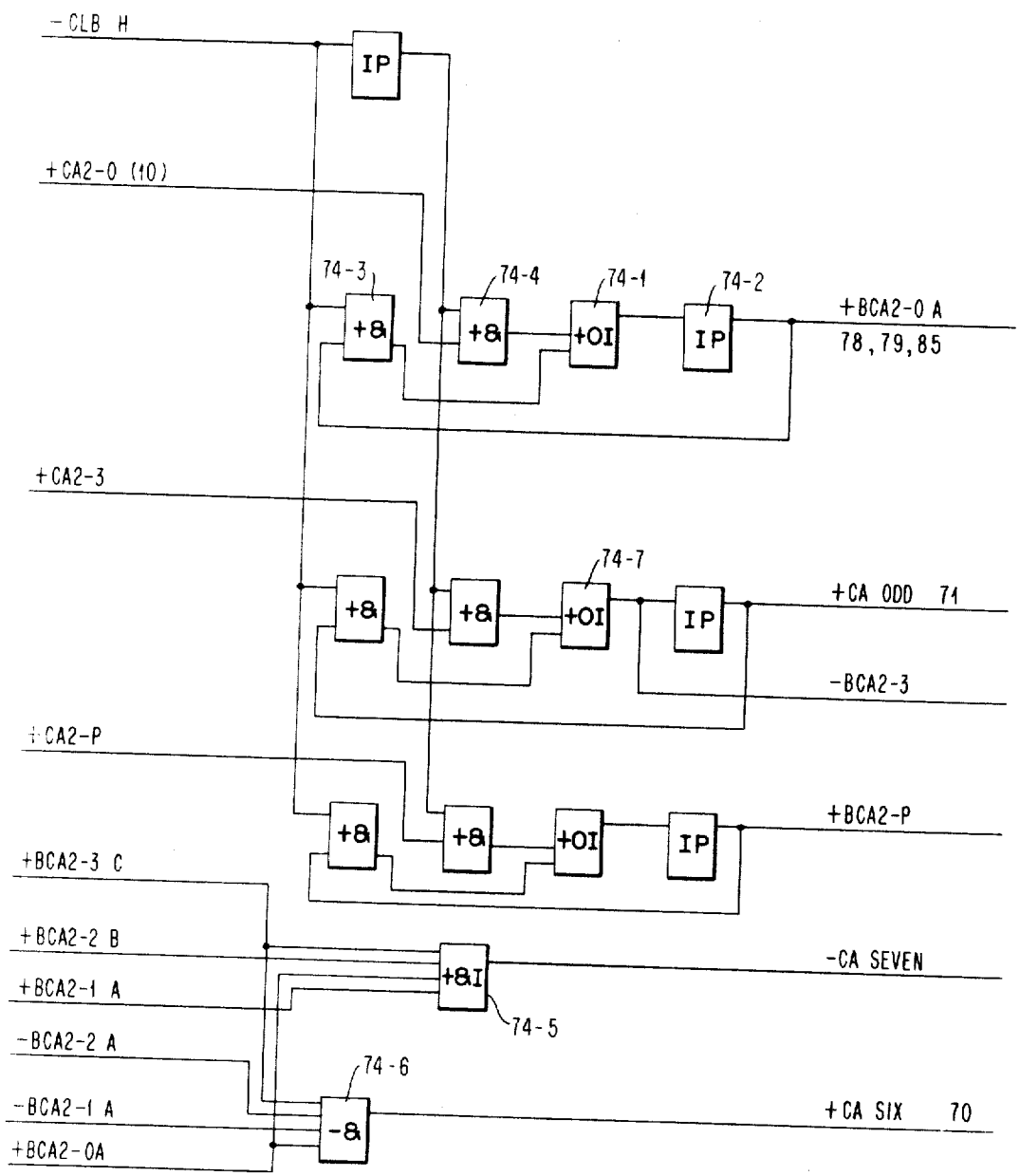

FIGURE 74 is an illustrative showing of the BCA byte register. The function of the BCA byte register is to receive data from the CA register R latches and pass this data onward at bus time if required. Each bit position involves a latch, such as the latch made of logic blocks 74–1 to 74–4 for the byte 2 0 bit position. Inputs are from the CA register.

The outputs of the BCA latches are combined at +& inverter block 74–5 and —& block 74–6 to provide output signal —CA SEVEN and output signal +CA SIX when byte 2 holds values 7 and 6 respectively. Since the CA register byte 2 operates with four bit bytes (bit positions 0, 1, 2, 3), the 3 bit is the units bit. The OI block 74–7 thus provides signal +CA ODD.

Figure 75:
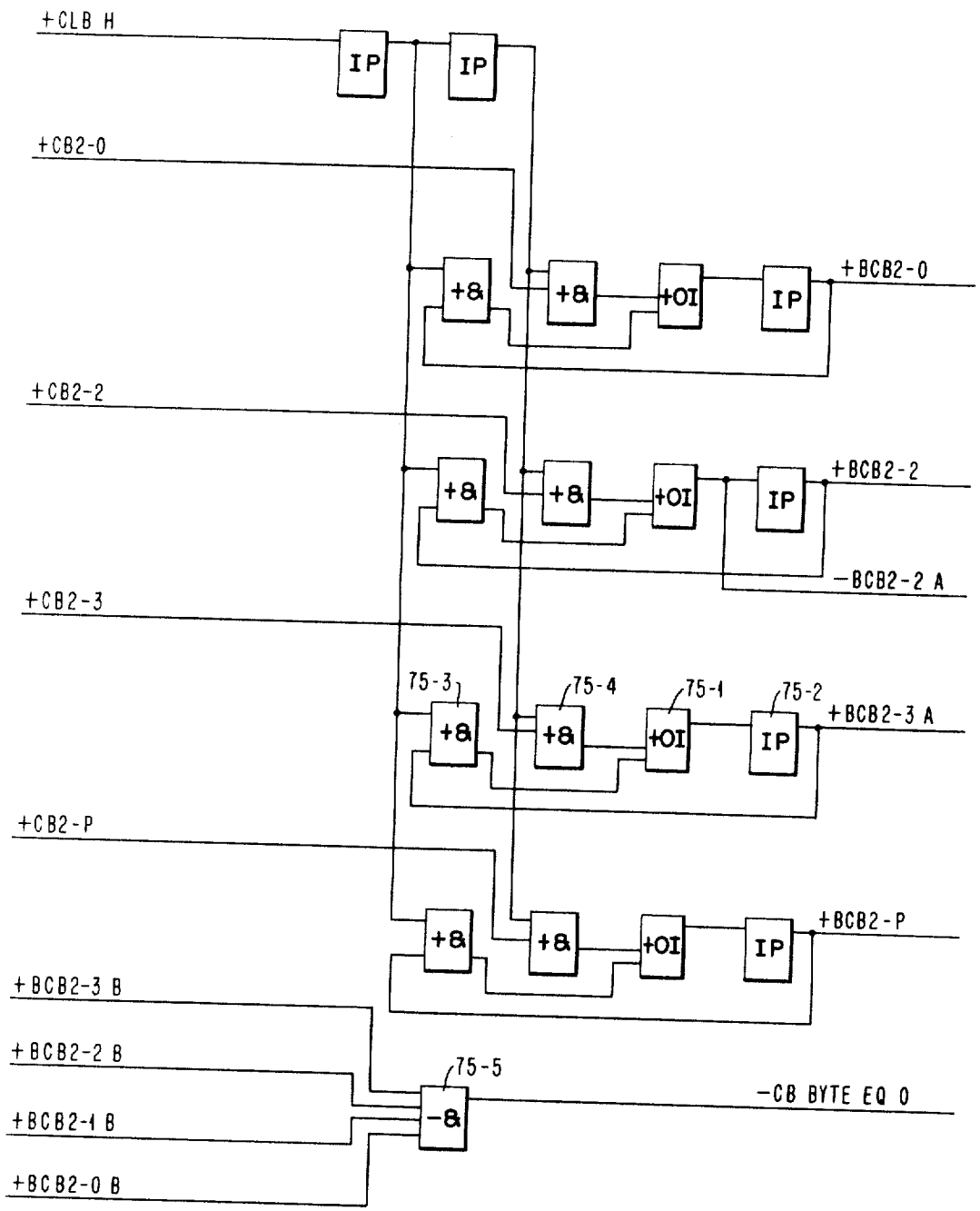

FIGURE 75 shows the BCB byte register B latches which are similar in makeup and use to the BCA byte register B latches of FIGURE 74. Logic blocks 75–1 to 75–4 form the B latch for each bit position, such as the bit position three.

Outputs from the various B latches of the CB register are combined in logic such as —& block 75–5, which provides output signal —CB BYTE EQ 0, to define byte values of particular interest.

Figure 76:
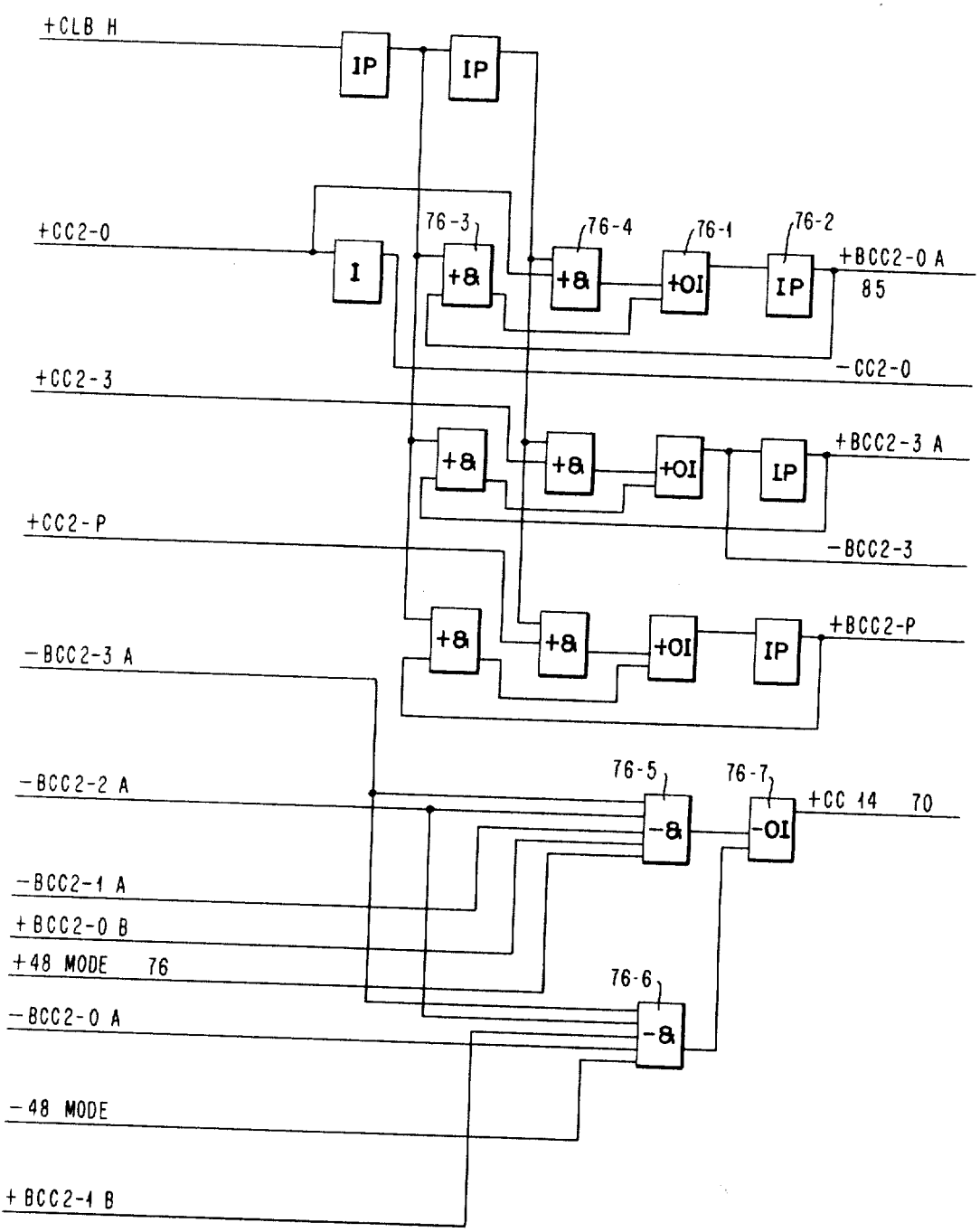

FIGURE 76 shows the BCC byte register B latches, which are similar to the B latches of the BCA and BCB byte registers of FIGURES 74 and 75.

Each bit has a related latch which receives inputs from the R latches of the CC register 3–11 of FIGURE 3 and provides appropriate outputs. For the 0 bit position, this B latch involves logic blocks 76–1 to 76–4.

The outputs of the latches are combined by logic such as —& blocks 76–5 and 76–6, which feed —OI block 76–7 to provide output signal +CC 14.

Logic similar to that shown at the bottoms of FIGURES 74–76 decodes each of the bit configurations of importance to other circuits, as well as those bit configurations shown, which are CA=7, CA=6, CB=0, and CC=14.

The —OI block 76–7 provides output signal +CC 14 in each of two modes, —& block 76–5 in mode "not" 48 and 76–6 in mode 48.

FIGURE 77 shows logic to perform the set byte operation for the CA register. The function of this operation is to provide counting by 1 or 2, up or down on a 4 bit binary encoded counting register which is used to select the bytes in the A register. The count is of the change bit type.

Straightforward logical combinations of the output of the CCA byte register, FIGURE 74, are made to provide the following output signals as required:

—CHANGE CA BYTE BIT 1
—STEP CA MODE 8
—CHANGE CA BYTE BIT 2
—CHAIGE CA BYTE BIT 4
—CHANGE CA BYTE BIT 8
+CHANGE CA BYTE BIT P

FIGURE 78 shows the logical network which controls the set byte count reset. The function of this logic is to set specific values into the byte counting register, in response to signals indicating the existence of conditions which require such specific byte counts.

A set of —OI blocks including —OI block 78–1 provides appropriate output gating signals such as signal +GATE BC TO CA2-P in response to the variety of inputs which require such outputs. The —OI block 78–02 provides signal +GATE CA3 to CA2 to the logic of FIGURE 15, in response to inputs including signal —CA RESTART TO BYTE from FIGURE 68.

The output signals of the set byte logic of FIGURE 77 cooperate with the outputs of BCA byte register in FIGURE 74 to control the set the byte count reset logic. The —OI block 78–1 provides output signal +GATE BC TO CA-P in response to any of its several inputs which require a change of the parity bit of the byte count.

FIGURE 79 shows the logical circuit to produce the byte versus limit comparison. The function of this comparison is to recognize, when stepping through a field a byte at a time, when the end of the field is reached. Field control is thus accomplished by setting a starting byte count value and a limit value.

The limit value is provided by the BCA register, shown in FIGURE 74, and is compared with the output of the CA register byte 2 bits 4–7. The —ODE block 79–1 provides output signals —CA bytes greater than limit. Signals indicating the relationship of byte count to limit are useful in the logic of FIGURES 83–86 in controlling the CA request ring.

L5. *Request ring CA* (*FIGURES 80–86*)

Request ring CA includes five double latch bit triggers and a double latch parity trigger, interconnected and controlled in such fashion that they can provide a selective sequence of bit configurations depending upon certain exterior conditions. The function of the CA request ring is to fetch additional data into the A register when word boundaries are crossed, fetch control words associated with the A register and perform the necessary logic on these control words.

A trigger is provided for each bit value 1, 2, 4, 8, 16 and for parity. Logical blocks 80–1 to 80–5 form the latch for the bit 2 value. They provide output signal

—CA–BRR–2 and its complement output signal +CA–BRR–2 in response to settings provided by signal +INSERT CA–BRR–2 applied to +& block 80–5.

The CA ring, like other request rings, includes an R section and a B section. The B section is shown on FIGURE 80a and the R section on FIGURE 80b. The R section is directly connected to the B section. For example, the latch for the 2 bit in the R section includes logical blocks 80–10 to 80–16. The R latch for the 2 bit provides output signal +CA–RRR–2 and its complement output signal +NOT CA–RRR–2, in response to input signal +CA–BRR–2 from the associated B latch (FIGURE 80a). A variety of gating signals and special setting signals applied to logic blocks 80–13 to 80–16.

FIGURE 81 shows an illustrative portion of the CA decoder. The function of the CA decoder is to decode the request in the CA request ring, present this code to priority and generate DO lines.

The +& I blocks 81–1 to 81–3 respond to the combination of inputs which provide the appropriate value. For example, +&I block 81–3 responds to input signals for not parity, 8 and 16 to provide output signal —CA–RRR decode 24 not P. Other signals are similarly provided in similar straightforward fashion. The decode output signals are combined in logic blocks such as 81–4 and 81–5 to provide the DO signals for the CA ring. The —& block 81–4, for example, combines signal —CA REQUEST GRANTED, signal —CA —RRR–DECODE NOT P and signal —CA-RRR DECODE 1 to provide output signal —DO A CODE 1. The logic to provide an output signal —DO A CODE 5 is slightly more complex, combining input signals —DO A CODE 1, —DO A CODE 3, —INDIRECT A and a complement of signal +RELOCATE-ABLE Y and +NO OP LATCH, to provide via —OI block 81–6 signal —DO A CODE 5.

FIGURE 82 shows the logic identified as CA REQUEST RING ANDS. The function of these ands is to perform the decision as to what the next state of the request ring should be. These ANDS control the sequence of requests of the CA ring according to the present request and certain indicators.

The —& block 82–1, for example, responds to the combination of signal —DO A CODE 13, the complement of signal +MFC and signal —AMF to provide via —OI block 82–2 the output signal +SET A CODE 29. In this fashion the CA request ring is capable of advancing from code 13 to code 29 according to the appropriate set of conditions. Other CA request ring ANDS respond to other appropriate conditions, as indicated by the map in FIGURE 5d.

FIGURE 83 shows additional CA request ring ANDS, which function to provide "do" signals required by input conditions. This logic also provides control signals useful in the logic of FIGURE 90 to control transfer of priority from the CA request ring to the IL request ring.

Figure 90:
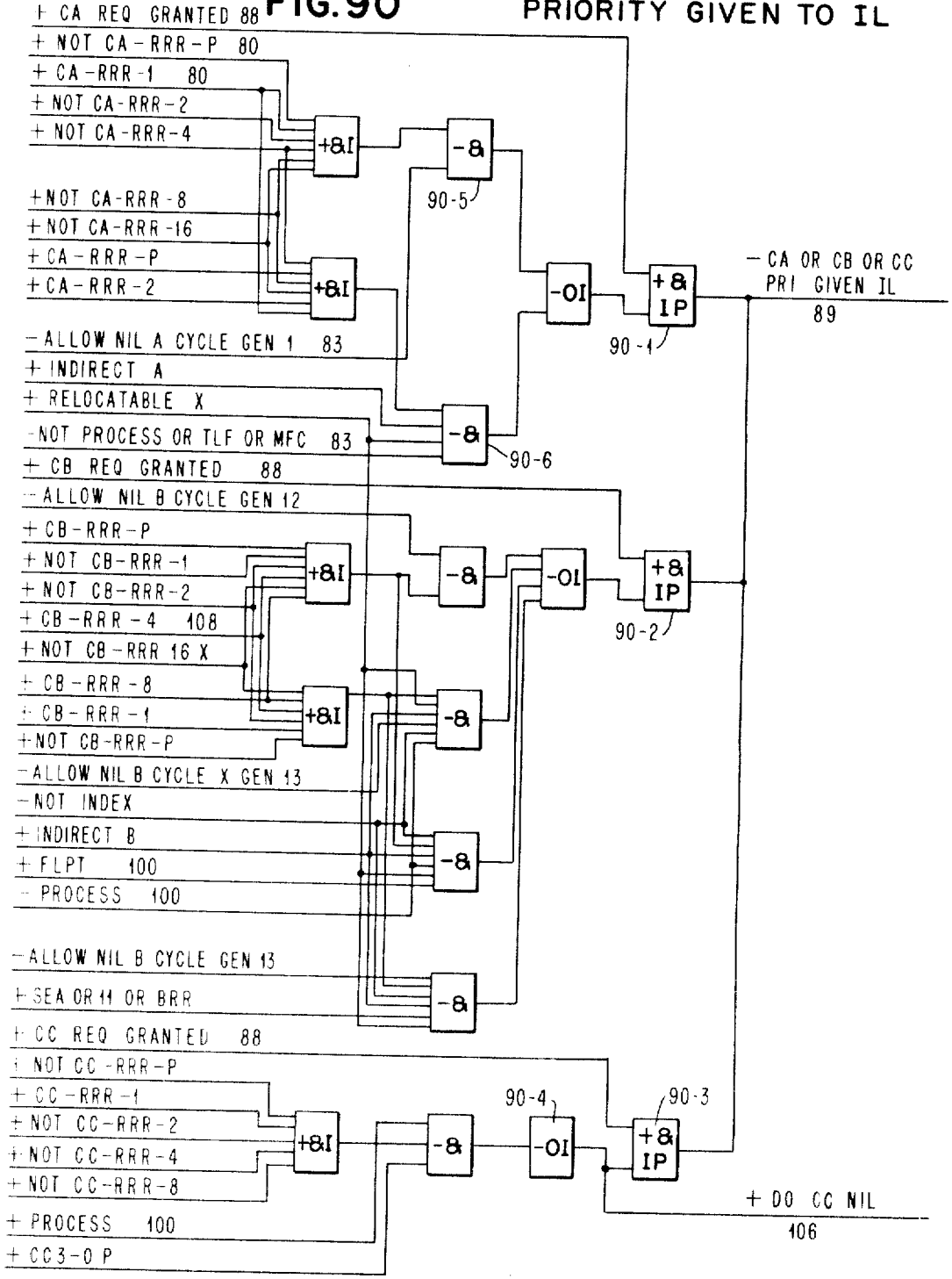

The —ODE block 83–1 provides output signal —ALLOW NIL A CYCLE GEN 1 which passes to the logic of FIGURE 90 to transfer priority. The —ODE block 83–2 combines its inputs to provide signal —NOT PROCESS OR TLF OR MFC to FIGURE 90, and also helps condition —OI block 83–3 to provide output signal —DO A GEN NIL, which is useful in preventing errors when priority is transferred to the IL request ring.

Figure 84:
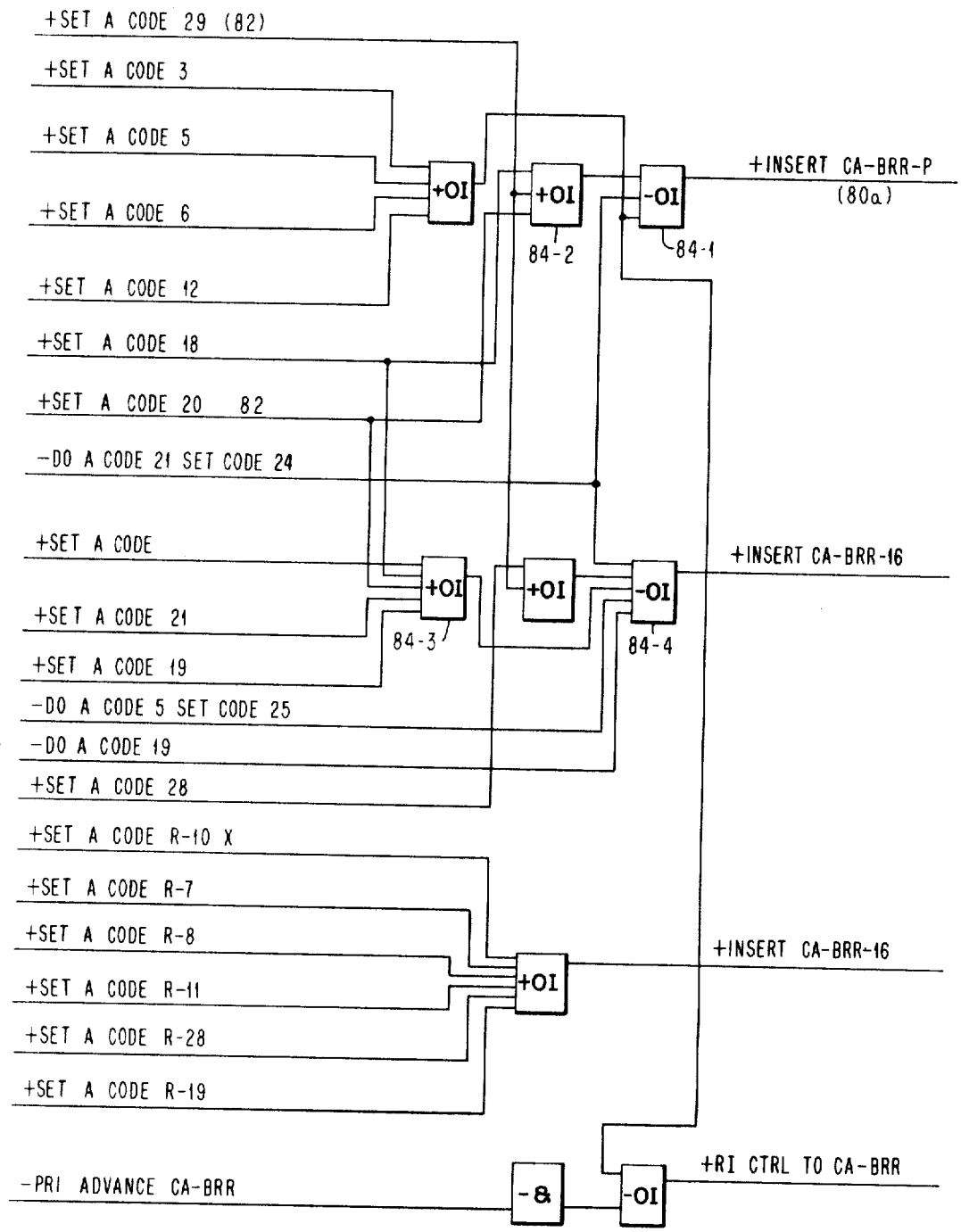

FIGURE 84 illustrates the logic to set A code ORS. The function of this logic is to set up the configuration of the CA ring for each change of configuration.

An arrangement of OR circuits responds to the various code requirements to provide the appropriate bit values to be inserted in the CA ring. For example, a parity bit is needed in the CA ring for the request code which will follow the signal +SET A CODE 29, supplied from FIGURE 82. An input to —OI block 84–1 provides output signal +INSERT CA–BRR–P. A 16-bit is also provided. Code 18 also requires both 16 and P bits. Signal +SET A CODE 18 conditions +OI block 84–2 to provide the parity bit and also conditions +OI block 84–3 to provide via —OI block 84–4, output signal +INSERT CA–BRR–16. Other A codes similarly require insertions in the CA–BRR (CA request ring B) latches.

Figure 85:
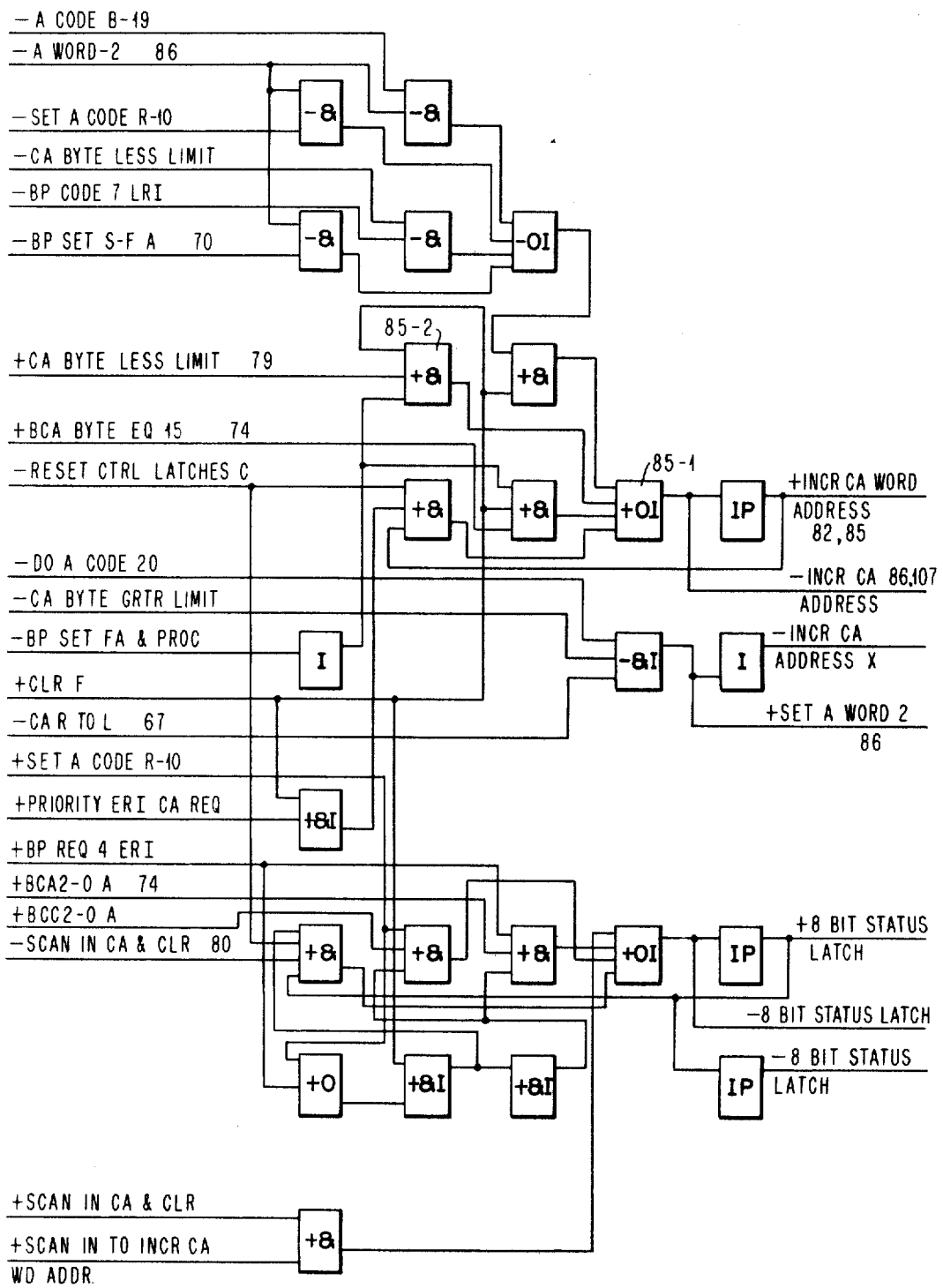

FIGURE 85 shows logic circuitry for controlling the incrementing of the CA word address. This function requires two latches, one to provide output signal +INCR CA WORD ADDRESS and the other to provide a signal +8 BIT STATUS LATCH.

The increment word address latch includes +OI block 85–1, which provides output signal +INCR CA WORD ADDRESS for use by the logic of FIGURE 86. The latch is set by signals including the output of +& block 85–2 when the CA byte is less than the limit.

FIGURE 86 illustrates a latch and circuitry to provide signal +A WORD 2. The function of this mechanism is to indicate when the processing is being performed in the second word of those formats that have two words.

The latch is made up of blocks 86–1 to 86–3. This latch is controlled by logic including blocks 86–4 to 86–7. The +& block 86–4 sets the latch upon incrementing of the CA word address during A code 20. The +& block 86–6 responds to the byte being greater than the limit.

FIGURES 51–86 disclose the details of the byte processing BP request ring and the CA request ring shown in FIGURE 1. Other request rings IO, CB, CC and IL are generally similar in composition and operation but are arranged to control performance of their respective overall machine operations.

The composition of each request ring is essentially a group of double latch triggers which provide for each request within the ring capability a different output code. Suitable logic is included in each request ring so that it can advance selectively from one request to the appropriate one of several other requests according to external and internal conditions, as mapped in FIGURE 5. Each request ring can, for example, be arranged to step from values 1, 2, 3, 4 . . . up to 10 or in some varied sequence such as 1, 4, 10, 3, 7 as appropriate. As illustrated in FIGURE 1, each request ring provides its request output to its own early decoder and via a device box to the priority circuit. IO ring 1–1 in FIGURE 1, for example, provides its coded request directly to early decoder 1–13 and via decode box 1–11 to priority circuit 1–15. It then becomes the function of priority circuit 1–15 to allot priority to the appropriate ring and to gate the appropriate early decoder further to provide actual control of the computer by controlling the various gates.

L6. *Decide logic and priority response (FIGURES 87–90)*

Each request ring shown in FIGURE 1 has an associated "decide box." These decode boxes are shown in FIGURE 1 as box 1–11 for the IO ring 1–1 and box 1–12 for the DX ring 1–2. The function of the decide box is to determine whether the associated request ring is actually making a request and thus has need for access to the computer gates. If in fact the appropriate request ring does not have an active request, the decide box develops this information which is used in determining priority. The decode box supplies the priority mechanism with an unequivocal statement that its appropriate request ring needs a priority response or does not need a priority response. The decide boxes and priority mechanism, shown as distinct blocks in FIGURE 1, are logically combined in FIGURES 87–90. The logic shown performs the dual function of identifying the request from the related request ring, and granting a priority response if there is no higher ranking request ring currently requesting.

Figure 87:
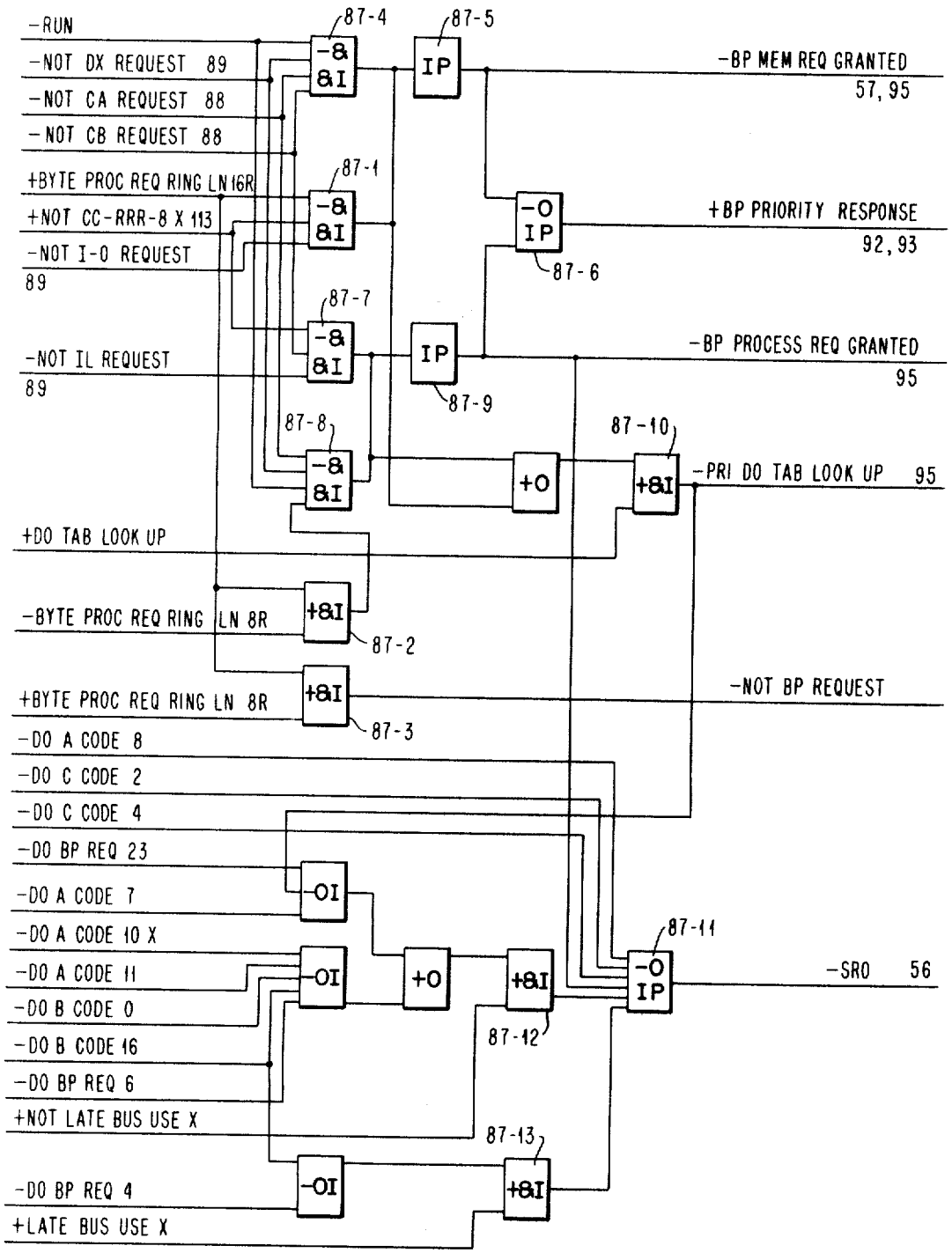

FIGURE 87 shows the byte process decide logic and the related portion of the priority box 1–15. The byte process ring (1–7 of FIGURE 1) has the lowest priority of any of the request rings and thus has priority only if no other ring is currently requesting.

This logic determines that the byte processing ring is requesting, that no higher priority ring is requesting and that the request code is valid; then provides a go ahead signal. The —& blocks 87–1 to 87–10 form the decide logic.

The BP ring has two types of requests, one for a memory cycle and one for a process cycle. These requests require different amounts of time for their operation as shown in the example, FIGURE 2. In the usual situation, the memory cycle is longer than the process cycle.

The —&I block 87–1 and —&I block 87–4 are connected in wire-or fashion to provide via IP block 87–5 priority response for the byte process memory request. This is immediately granted since blocks 87–4 and 87–1 assure that no higher priority ring is making a request. This request is granted in response to coincidence of signals —RUN, —NOT BX REQUEST, —NOT CA REQUEST, —NOT CB REQUEST, —NOT IO REQUEST and the minus signal complements of signal +BYTE PROC REQ RING LN 16R and signal +NOT CC–RRR–8X.

A byte process memory request is thus granted when the machine is running, when none of rings DX, CA, CB or IO is making a request, when the BP ring 16 bit is at the 0 value and when the CC ring has an 8 bit. The output of IP block 87–5 provides via —OIP block 87–6 the output signal +BP PRIORITY RESPONSE.

The —&I blocks 87–7 and 87–8, connected with outputs wired together as input to IP block 87–9 and to +O block 87–10, respond to BP requests including an 8 bit and a coincidence of signals indicating that no other ring is making a request to produce output signal —BP PROCESS REQ GRANTED.

The output of IP block 87–9, signal —BP PROCESS REQ GRANTED, provides final conditioning of —OIP block 87–11 which provides output signal —SRO which performs the function of reading a byte out of the A and/or B register onto the X bus to be processed by arithmetic and logical units.

Signal —SRO is provided in response to the byte process request granted signal and any one of several "do" signals coinciding with signal +NOT LATE BUS USE X at +&I block 87–12, or upon coincidence with a specified small group of "do" signals at +&I block 87–13 of signal +LATE BUS USE X. Certain "do" signals in the byte process format can actually be performed immediately, even when the bus is not being used, but most "do" signals require the use of buses.

The byte process ring is the lowest priority of the seven request rings, since the units it controls are capable of very high speed and of tolerating certain short delays.

The combination of 16 bit with 8 bit is not a valid byte process request and provides an output from +&I block 87–3 signal —NOT BP REQUEST.

Figure 88:
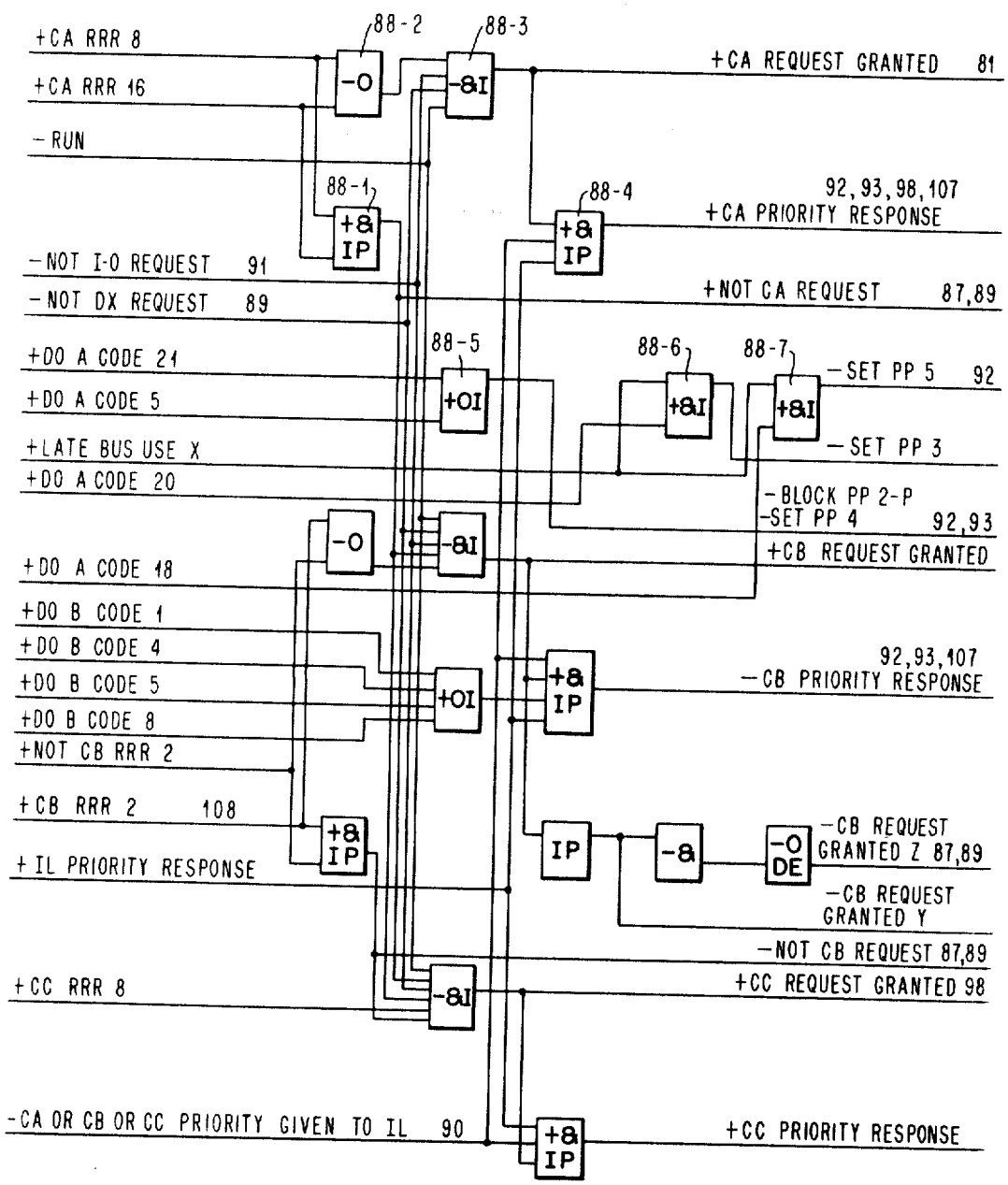

FIGURE 88 provides the logic for the CA, CB, CC decide and priority response. The CA request is identified by the CA decide mechanism, including logic blocks 88–1 to 88–7. Block 88–1 identifies, by coincident occurrence of CA request ring 8 and 16 bits at +&IP block 88–1, an invalid CA code and provides directly the output signal +NOT CA REQUEST. Any other code combination in the CA ring, so long as it includes either an 8 bit or a 16 bit, conditions —O block 88–2 to provide an input to —&I block 88–3. If —&I block 88–3 is also conditioned by signals indicating that the machine is running and that no higher ring is making a request, it provides its output signal +CA REQUEST GRANTED. Signal +CA REQUEST GRANTED conditions +&IP block 88–4 to provide output signal +CA priority response.

Certain of the A code "do" signals are combined by logic such as +OI block 88–5 which provides output signal —SET PP 4. Other "do" signals are combined with signal +LATE BUS USE X at logic blocks such as +&I block 88–6 and +&I block 88–7 to provide other output signals to the priority pipe. The function of these signals is to set the job code requested by a particular request ring into the priority pipe so that the proper in and out gates can be controlled in the late cycle to complete the operation.

Figure 89:
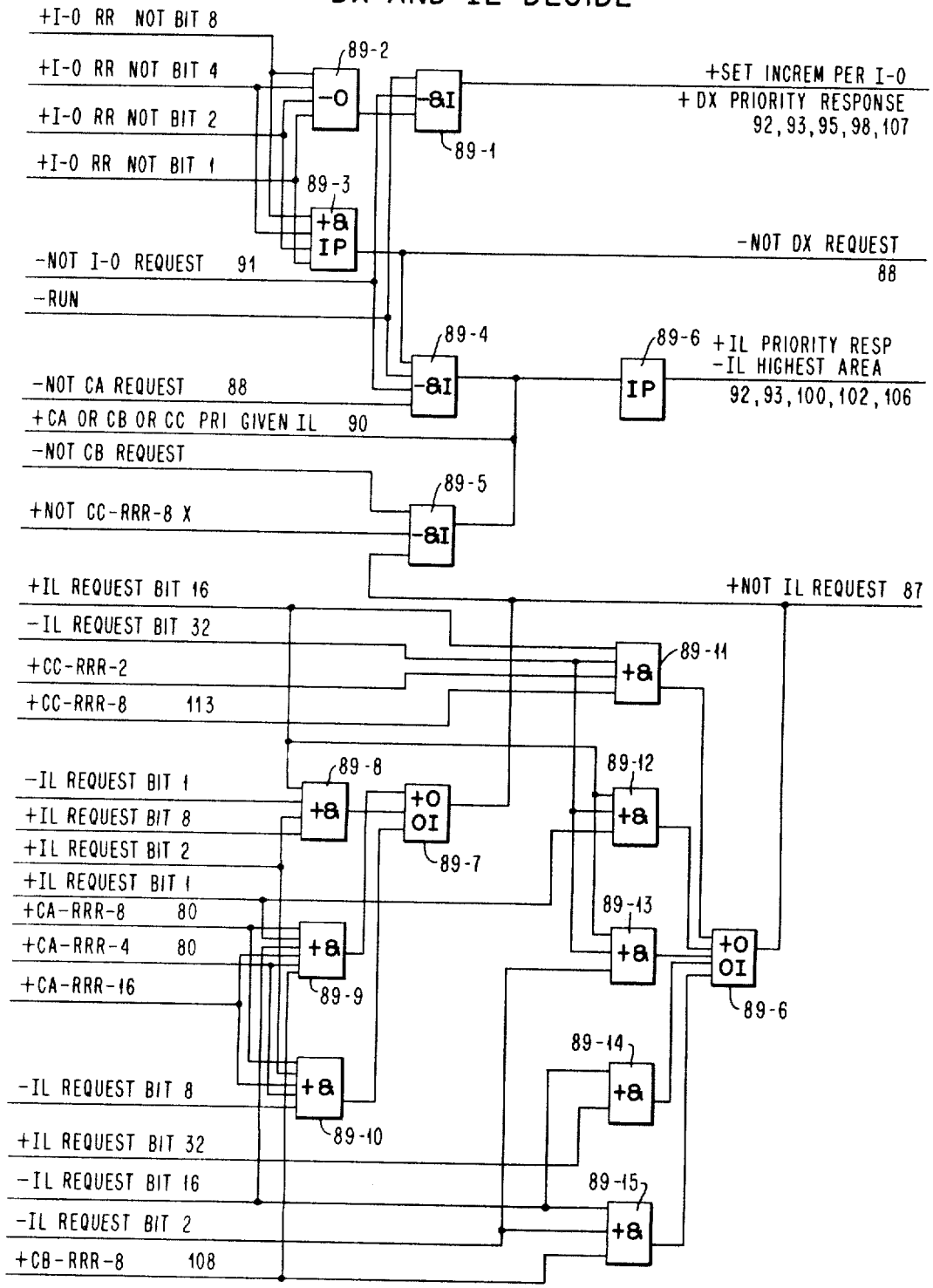

FIGURE 89 illustrates the logic for the DX and IL Decide boxes and the related portion of the priority mechanism. The function of this logic is to identify DX and IL requests for priority purposes. This logic performs the function of giving a priority response to the DX, or to the IL request ring when the IO ring is not requesting and the DX or IL ring makes a request. Signal +SET INCREM PER I–O is developed at —&I block 89–1 in response to the coincidence of signals —NOT I–O REQUEST, —RUN and the output of —O block 89–2. The —O block 89–2 responds the presence of any bit in the IO request ring. The function of signal +SET INCREM PER I–O is to respond to the end of each IO function sequence by setting the incrementer.

The +& IP block 89–3 responds to the coincidence of 0 values in all four bits of the IO request ring to produce signal —NOT DX REQUEST. This signal is used in FIGURES 87 and 88 in allocating priority to lower ranked request rings. If the IO ring is at the all 0's value, there is no need for any data transfer and thus signal —NOT DX REQUEST is appropriate. Signal —NOT DX REQUEST combines at —&I block 89–4 with signals —NOT IO REQUEST, —RUN and —NOT CA REQUEST to condition —&I block 89–4. The —&I block A 9–5 is connected via a wire-or with —&I block 89–4 to IP block 89–6. The —&I block 89–5 responds to the coincidence of minus values on its three inputs which occurs when the CB ring is not requesting, when the complement of signal +NOT CC–RRR–8 X is available and when the IL ring is requesting. IP block 89–6 thus provides its output signal —IL HIGHEST AREA Y upon the coincidence of those signals which indicate that IL has priority.

The network of logical blocks feeding +OI block 89–6 and +OI block 89–7 generate signals indicating the presence or absence of an IL request. Coincidence of inputs indicating an IL request at any one of +& blocks 89–8 to 89–15 provides a plus input to one of the +OI blocks 89–6 or 89–7, which provides output signal +NOT I–O REQUEST. The minus value indicates that an IO request is current.

L7. *Departure from fixed priority rank (FIGURE 90)*

FIGURE 90 illustrates the circuitry entitled PRIORITY GIVEN TO IL. The function of this circuit is to depart from fixed rank of priority when necessary. There are occasions when instruction loading is very important even though the IL ring might not have priority in the usual scheme. This circuit responds to those occasions and provides from +& IP blocks 90–1, 90–2 or 90–3 an output signal —CA or CB or CC PRI GIVEN 1L. This circuitry also provides, in the appropriate circumstances, output signal +DO CC NIL from —OI block 90–4 to identify the situation where the CC ring transfers priority to IL. The reason for the transfer is that the machine needs an instruction before proceeding.

There are two occurrences which require that CA priority be given to IL. These occasions are defined by —& blocks 90–5 and 90–6. The —& block 90–5 responds to a 1 value in the CA register, supplied by the logic of FIGURE 80, together with signal —ALLOW NIL A CYCLE GEN 1 from the logic of FIGURE 83. The —& block 90–6 responds to a 1 bit, a 2 bit and a parity bit from FIGURE 80, together with signal —NOT PROCESS OR TLF OR MFC from FIGURE 83.

The several occurrences where CB priority is given to IL are defined by the —& blocks feeding +&IP block 90–2.

The occasion when priority is transferred from the CC request ring to the IL request ring is defined by logic including blocks 90–3 and 90–4. A 1 value in the CC RRR register, together with the complement of signal +PROCESS from the logic of FIGURE 100, serves to transfer priority to the IL request ring.

Figure 91:
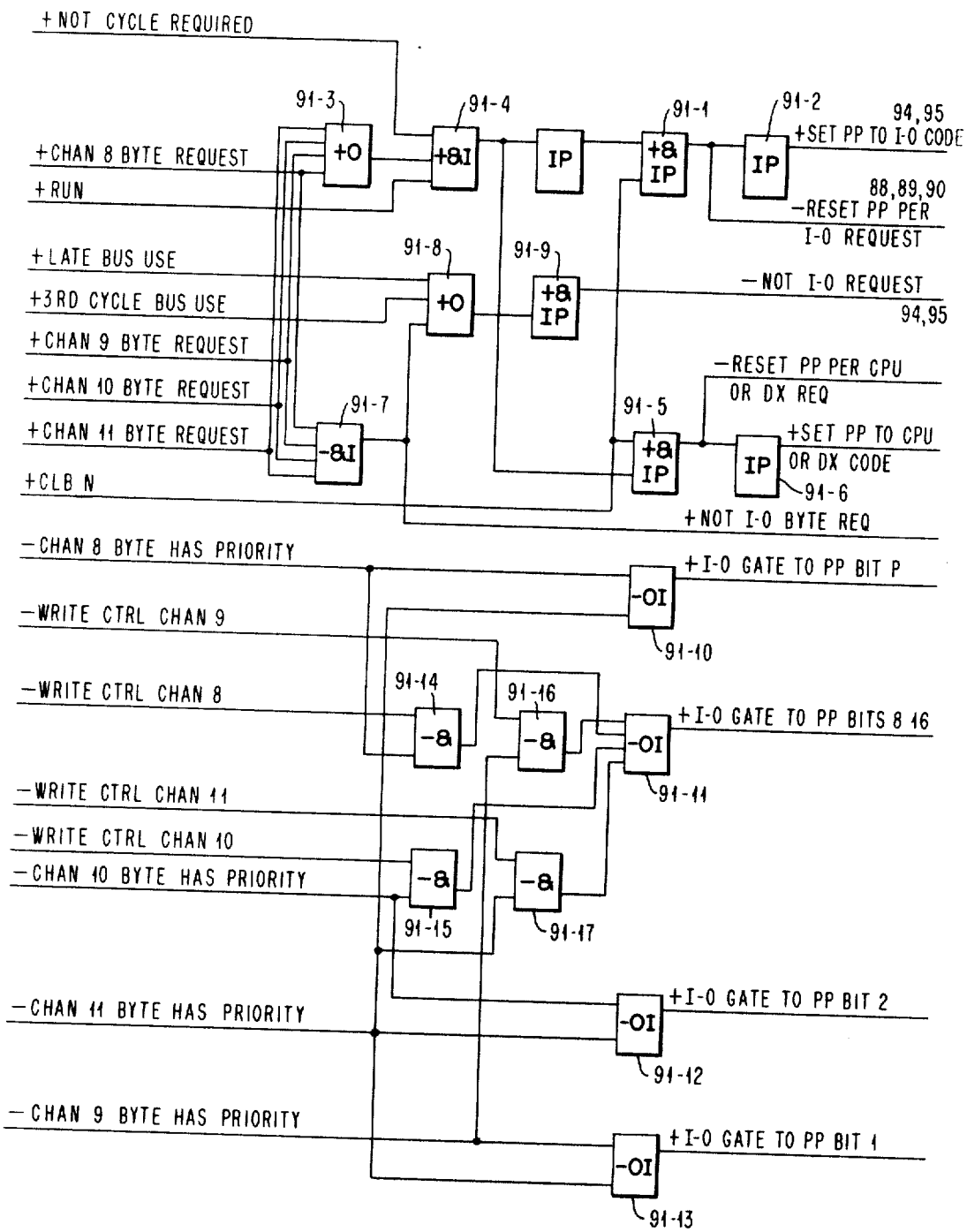

FIGURE 91 illustrates the logic for IO BYTE CYCLE DECIDE. The function of this circuit is to identify IO requests, and, since IO has top rank, to assign priority by gating the request to the priority pipe.

The IO units may be mechanically driven, electrically read tapes, disks or drums. These devices present data at relatively high rates but are not susceptible to immediate access or turnoff. Accordingly, it is the usual procedure to permit IO devices to operate according to their own speeds and according to their own demands for service. In the embodiment the IO request ring has top priority. If there is an IO request, this request will be honored before honoring the request of any of the other rings. The logic shown in FIGURE 91 performs these functions for a certain number of channels.

The request may originate from the CPU or from the IO channel. The +& IP block 91–1 provides output signal —RESET PP PER I–O REQUEST in response to a suitable byte request from a channel. IP block 91–2 provides at the same time the complementary signal +SET PP TO I–O CODE. Any request, such as signal +CHAN 8 BYTE REQUEST, from a channel, conditions +O block 91–3. This provides at +& I block 91–4 suitable conditioning when signals +RUN and +NOT CYCLE REQUIRED are available. The output of +& I block 91–4, inverted and combined with a timing signal, conditions +& IP block 91–1 to provide output signal —RESET PP PER I–O REQUEST. The +& I block 91–4, when combined with the timing signal, conditions +& IP block 91–5 to provide signal —RESET PP PER CPU OR DX REQUEST. This signal passes via IP block 91–6 and becomes signal +SET PP TO CPU OR DX CODE. The —& I block 91–7 responds to the absence of requests from channels 8 through 11 to provide signal +NOT I–O BYTE REQUEST. The output of —& I block 91–7 at the same time provides via blocks 91–8 and 91–9 the complementary signal —NOT I–O REQUEST. This same signal is also available upon occurrence of either of signals +LATE BUS USE or +3rd CYCLE BUS USE applied to +O block 91–8.

Signals +LATE BUS USE and +3rd CYCLE BUS USE define the few instances when an instruction sequence requires additional bus uses. In such conditions it is mandatory that the IO request not be granted even though it follows at a reasonable interval behind the earlier request. An artificial signal —NOT I–O REQUEST permits some other request ring to use the cycle, even though an I–O request is in fact present.

Blocks 91–10 to 91–13 provide bit signals to the priority pipe register PP, which signals identify channel having priority. When, for example, channel 11 has priority, signal —CHAN 11 BYTE HAS PRIORITY is available near the bottom of the page. This signal connects to —OI blocks 91–10, 91–11, 91–12 and 91–13 to provide bits 8, 2, 1, 16 and parity to indicate 11. When channel 9 has priority, only —OI blocks 91–11 and 91–13 are conditioned to provide bits 81 and 16 to the priority pipe. The —& blocks 91–14, 91–15, 91–16 and 91–17 respond to the combined signals indicating that their respective channels have priority and are being conditioned to write to provide the 8 and 16 bits through the priority pipe.

ENCODER AND PRIORITY PIPE (FIGURES 92–98)

Encoder (1–17 of FIGURE 1) and the priority pipe, which includes latches 1–22 and 1–23, provide a one cycle delay for the late job of each request. The encoder provides the priority pipe code (see chart entitled "Request Rings—Specifications") which identifies the source request ring and the job. The priority pipe passes the priority pipe code to job conflict box (1–27 of FIGURE 1) and later decoder 1–24.

Figure 92:
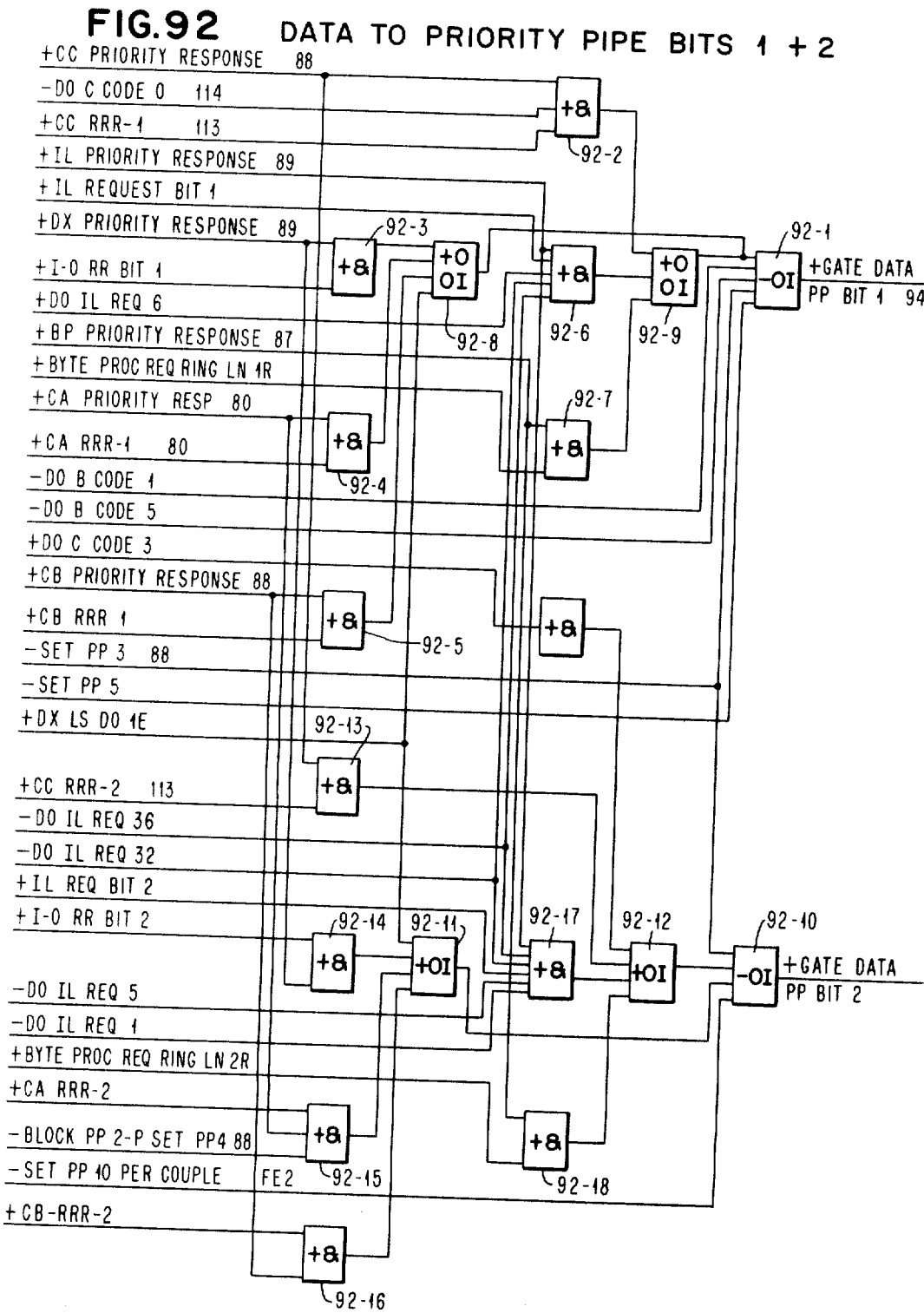
Figure 93:
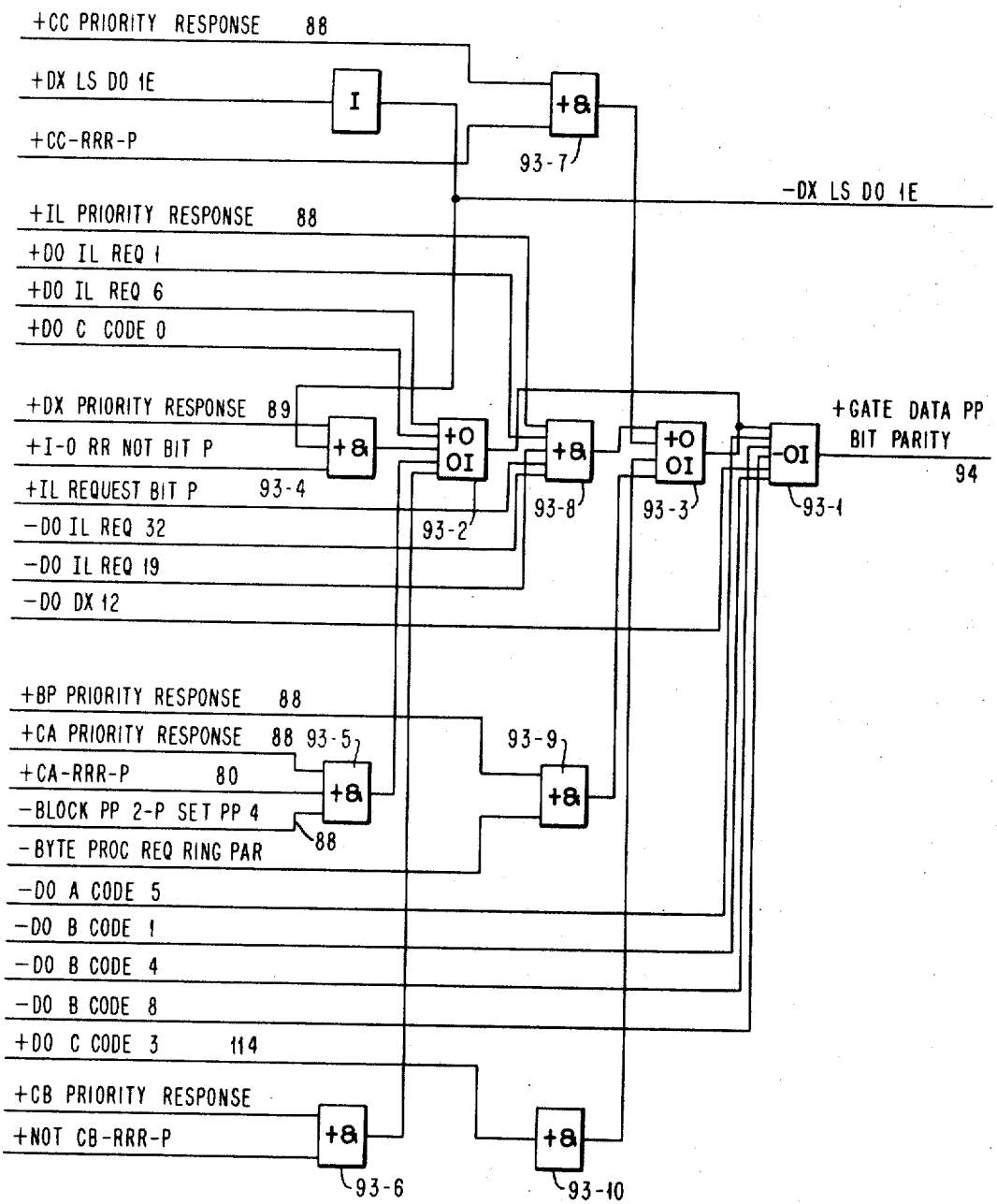

FIGURE 92 shows the logic circuits for passing data to priority pipe bits 1 and 2. FIGURE 93 shows similar circuits for passing bit P. Not shown are the circuits for passing bits 4, 8 and 16. These circuits correspond to encoder 1–17 of FIGURE 1. The —OI block 92–1 provides output signal +GATE DATA PP BIT 1 in response to each of several sets of conditions which require data bit 1 at the priority pipe. One such condition produces an output from +& block 92–2 in response to the combination of signals +CC PRIORITY RESPONSE and +CC RRR–1 together with the complement of signal —DO C CODE 0. This occurs when the CC request ring has priority and has a 1 bit except in the particular case of "do" C code 0.

Another condition provides output from +& block 92–3 in response to the coincidence of signals +DX PRIORITY RESPONSE and +I–O RR BIT 1. Other sets of conditions provide output signals from +& blocks 92–4, 92–5, 92–6 and 92–7. These signals are collected at +OI blocks 92–8 and 92–9 for entry into —OI block 92–1. The —OI block 92–10 provides signals +GATE DATA PP BIT 2 in response to signals —SET PP 3 and —SET PP 10 PER COUPLE FE 2 as well as to the outputs of either of +OI blocks 92–11 or 82–12. The +OI block 92–11 responds to the output of +& blocks 92–13 to 92–16, each of which responds to its own set of conditioning signals. +& blocks 92–17 and 92–18 respond to their sets of signals to condition individual inputs of +OI block 92–12.

FIGURE 92 is simply an encoding circuit for the signals indicating the need for gating data onto the respective bits of the priority pipe. It accomplishes this function using simple gating techniques.

Logic blocks 92–1 to 92–18 respond to the various priority responses and do codes to develop the bit values for the priority pipe. For example, +& block 92–2 responds to a CC priority response, a 1 bit from the CC RRR 1 position, and the absence of signal —DO code 0 from FIGURE 114 to condition blocks 92–9 and 92–1 for providing output signal +GATE DATA PP BIT 1 to 94.

FIGURE 93 is an encoding circuit for the signals which require a data bit on the parity position of the priority pipe. It is similar to FIGURE 92 and further illustrates encoder 1–17 of FIGURE 1. The —OI block 93–1 responds to the outputs of +OOI blocks 93–2 and 93–3 as well as responding directly to each of signals —DO DX 12, —DO A CODE 5, —DO B CODE 1, —DO B CODE 4 and —DO B CODE 8.

The +OOI block 93–2 collects the output from +& blocks 93–4, 93–5 and 93–6 as well as responding directly to signals +DO IL REQUEST 6 and + DO C CODE 0. The +OOI block 93–3 responds to the outputs of +& blocks 93–7, 93–8, 93–9 and 93–10, which respond in turn to their related sets of conditions.

Data for each of the various bits of the priority pipe are encoded in a fashion similar to the collection of bits for priority pipe positions 1, 2 and 3 as shown in FIGURES 92 and 93. Priority pipe codes have been previously identified in the chart entitled "Request Rings—Specifications," which constitutes Section I of this patent application.

Figure 94:
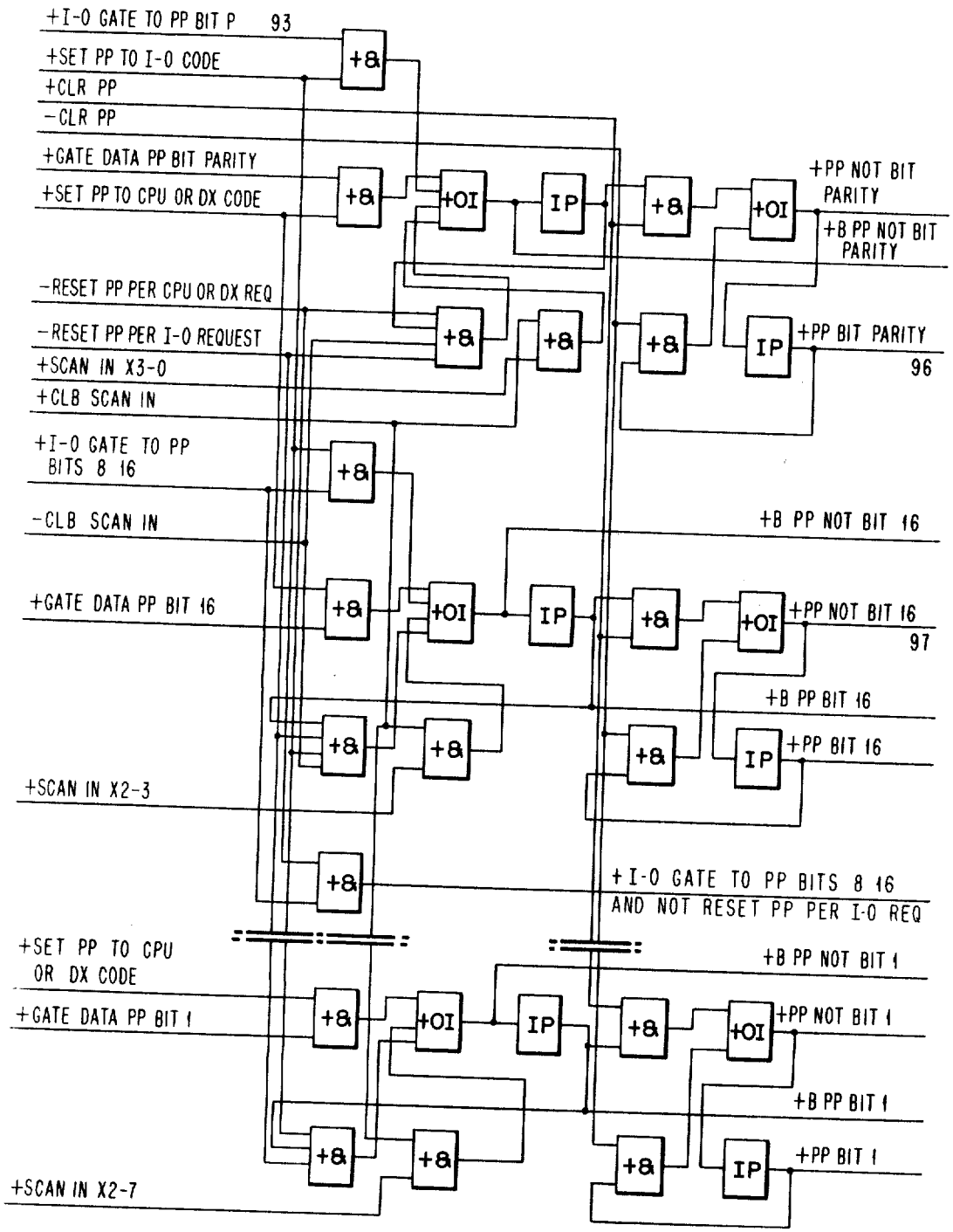

FIGURE 94 illustrates circuits for priority pipe bits parity, 16 and 1. Bits 8, 4 and 2 are, of course, included in the actual priority pipe but their handling and makeup is similar to that of the three bits shown. The function of the priority pipe is to delay the job code for one cycle so that the proper out and in gates can be controlled in the late cycle.

Each bit position in the priority pipe includes a B latch and an R latch. Blocks 94–1 to 94–3 form the R latch for the parity position; blocks 94–5 to 94–7 form the B latch for the same position. These latches are fed from the logic of FIGURE 93.

The latches for the other bit positions are similar. The latch for the bit 16 position, for example, includes +OI block 94–8, and the latch for the 1 bit position includes +OI block 94–9.

M1. *Priority pipe prefix (FIGURE 95)*

The function of the priority pipe is to retain the necessary information to perform the late job of each request. Since the request is no longer available, the priority pipe must have all the information necessary to perform the late job. This information includes an identification of the request ring from which the job originated. The prefix latches are set to code values indicative of the request rings from which the jobs originated.

Figure 95:
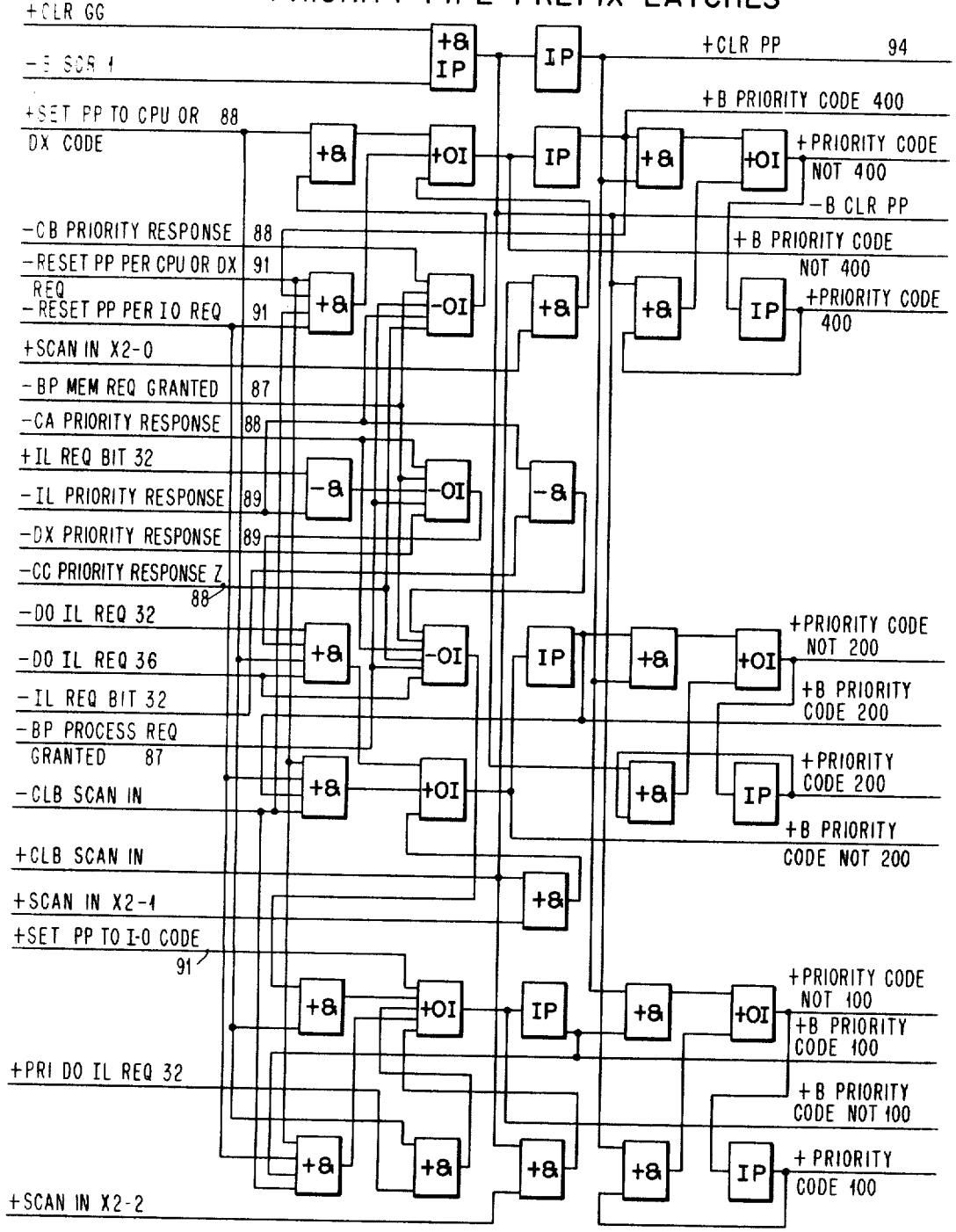

FIGURE 95 shows the priority pipe prefix latches. The function of the prefix latches is to identify with a three bit code in the priority pipe which ring had made the request.

The three prefix latches are each made up of three logic blocks. Blocks 95–1 to 95–6 and their input logic form the "400" bit; blocks 95–9 and related logic forms the "200" bit; blocks 95–10 and related logic forms the "100" bit. In combination, the three latches provide values "000" to "700" as prefix values for the priority pipe code. The outputs of the latches are combined to give values 000, 100, 200, 300, 400, 500, 600 and 700, by logic not shown, and pass to the priority pipe decode logic of FIGURE 96.

For example, the CB request ring may be controlling an operation. Signal —CB PRIORITY RESPONSE passes —OI block 95–7 and conditions +& block 95–8 to set the 400 latch. The same signal passes —OI block 95–11 to set the 100 latch. The prefix for the CB ring, as explained supra at Section I, under subhead. REQUEST RINGS—SPECIFICATION, is 500. The prefix for the CA ring is 300; signal CA PRIORITY RESPONSE provides outputs from +OI blocks 95–9 and 95–10. Signal +SET PP TO I–O CODE provides the 100 output.

Signal —DX PRIORITY RESPONSE provides the 200 output; signal —IL PRIORITY RESPONSE provides the 600 output in the form of 400 and 200, which are combined by simple logic not shown.

Signal —BP PROCESS REQUEST GRANTED provides the 700 output as does its related signal —BP MEMORY REQUEST GRANTED.

M2. *Late decoder*

Figure 96:
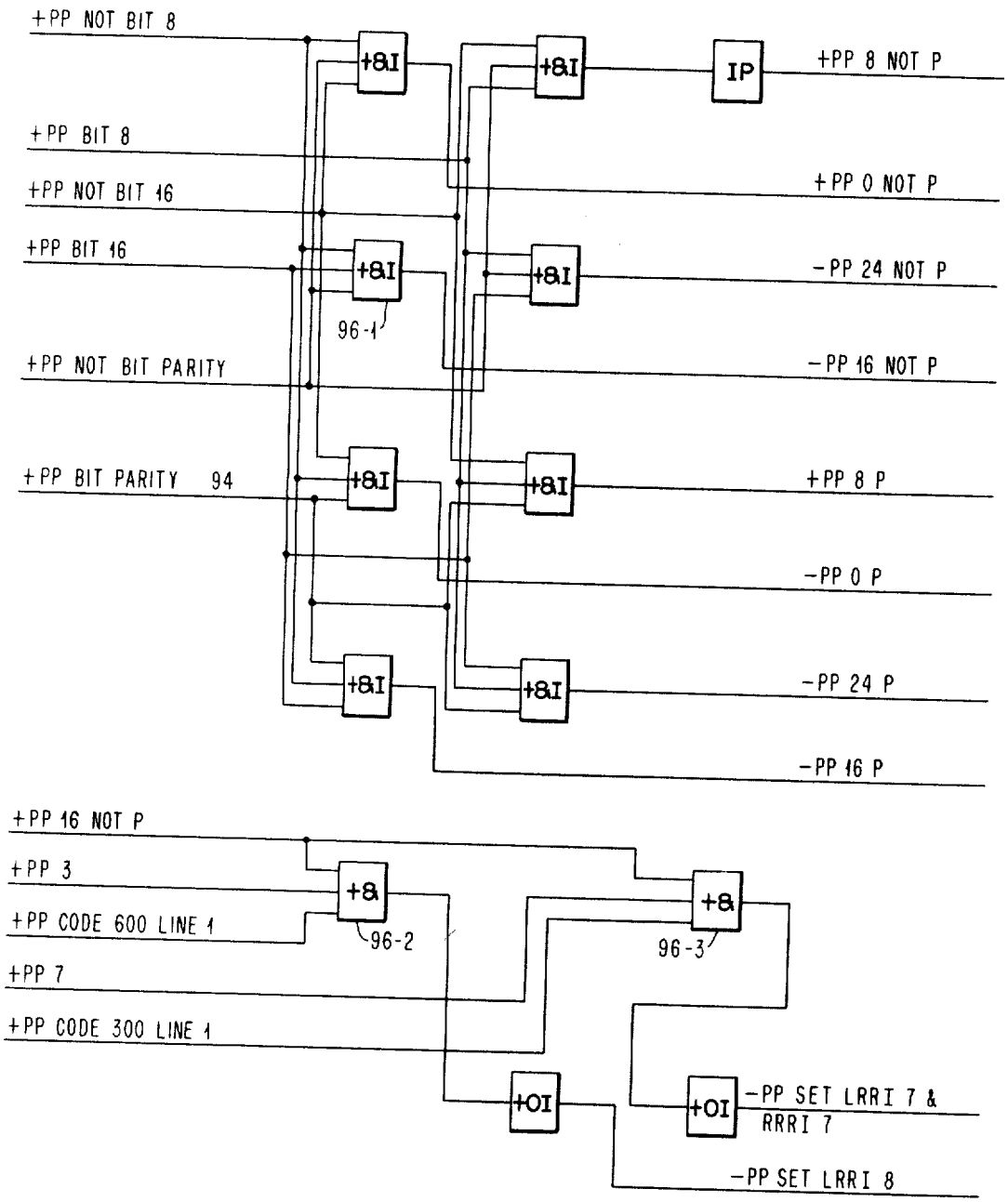

FIGURE 96 illustrates the priority pipe decode logic, which is a part of late decoder 1–24 of FIGURE 1. The function of the late decoder 1–24 of FIGURE 1 is to transform priority pipe codes to signals for operating machine gates. The late decoder controls second and subsequent jobs for a given operation request. The function of the priority pipe decode logic is to provide intermediate signals indicative of priority pipe code combinatons. These intermediate signals are used in developing gate control signals. One intermediate signal, —PP16 NOT P, is produced by +&I block 96–1, combining the 16 bit with the absence of the parity bit.

The intermediate signals are combined with prefix signals at logic such as +& blocks 96–2 and 96–3 to provide gate control signals. Block 96–2, for example, provides gate control signal —PP SET LRRI8.

The gate control signals pass as necessary to the operating gates of the machine to control the late job of the operation, according to the needs of the priority pipe code. The chart at Section I, entitled "Request Rings—Specifications," indicates the priority pipe codes and the effect of the gating controlled by them.

The priority pipe in the preferred embodiment includes one cycle of delay. If additional cycles of delay should be required, the decoder could be used to simplify the pipe code for the subsequent cycle.

FIGURE 97 illustrates logic for PRIORITY PIPE B DECODE. The function of this logic is to help form late decoder 1–24 of FIGURE 1, to control gates for the second and subsequent jobs of an operation request. The +& I blocks, such as 97–1, respond to sets of conditioning signals to provide their respective output signals for further use. Block 97–1, for example, responds to the coincidence of signals +NOT LATE READ IN, +B PP BIT 16 and +B PP BIT 8 to provide output signals —PP 16 8 NOT LRI.

The —& I blocks 97–2 and 97–3 respond to their combination of input signals to provide output signals respectively labeled +B IL REQ 2 LRO and +IL REQ 44 LRO. These signals are useful in developing gate control signals for late read out.

The signals of FIGURE 97 are useful in the logic of FIGURE 98 to help in the formation of gate control signals.

Other signals developed by the priority pipe B decode logic are as follows:

A CODE 10 LRO
READ CH 8 DATA BC LRO
READ CH 9 DATA BC LRO
READ CH 10 DATA BC LRO
A CODE 20 LRO
READ CH 11 DATA BC LRO
B CODE 8 LRO
B CODE 17 LRO
IL REQ 36 LRO

FIGURE 98 illustrates the priority pipe read in circuits. The function of these circuits is to provide the proper controls for reading into a register during the late cycle.

Suitable combinations of input signals from FIGURES 96 and 97 condition —&I blocks 98–1 to 98–4 to provide respectively signals +B CODE 20 ERI, +B CODE 6 ERI, +BP REQ 4 ERI and +SEL BYTE CH 11 BC ERI. Similar circuits including 98–5 to 98–14 react to suitable inputs to provide other read in gate control signals as required.

Signal +RESET CTRL LATCHES is provided by —OI block 98–5 upon receipt of a conditioning signal from any one of —& blocks 98–6, 98–7, 98–8, which respond to specific sets of conditions which require the control latches. It is necessary to reset the control latches when the late job of a final request has been completed; if the control latches were reset directly from the request rings, the priority pipe would not have sufficient indicators with which to make necessary decisions.

M3. *Read out ORS (FIGURE 99)*

The function of Read out ORS is to combine gating control signals from the various sources and supply actual gating signals to the gates.

FIGURES 99a illustrates the first stage readout ORS. Logic including —AI block 99–1 simply combines all the DO signals requiring a particular gating function onto a single wire, once the proper priority response is available.

M4. *Second stage read out ORS (FIGURE 99b)*

FIGURE 99b shows the 2nd stage read out ORS including OI blocks 99–51 to 99–55. The function of these OR circuits is to control machine gating. They correspond to ORS 1–18 and 1–19 of FIGURE 1. The logic of FIGURE 99b also includes a portion of the logic of job conflict box 1–27 of FIGURE 1. Signal "late bus use" serves to inhibit certain gating functions to prevent conflicts.

The readout ORS respond to the various conditions required for their respective outputs. The —OI block 99–51, for example, provides via a power inverter its output signal —GATE CA0 to W0. This controls gating of the content of the CA register byte 0 to the byte 0 position of the W bus.

N. INSTRUCTION LOAD REQUEST RING (FIGURES 100–107)

The instruction load request ring controls the machine gates to ensure the existence of a stored program of instructions. The IL ring resembles the other request rings, conforming to the block diagram of FIGURE 5a and the map of FIGURE 59. The IL ring includes sequencing control logic, FIGURE 100, which identifies the types of instructions; IL request sequencing mechanism, FIGURE 101–102, which controls actual gating by producing "do" signals; the IL request ring register FIGURE 103–104; the IL request decoder, FIGURE 105–106; and a set of control latches, FIGURE 107.

N1. *Squencing control logic (FIGURE 100)*

FIGURE 100a includes the sequencing control logic necessary to determine the existence of an invalid address. The +OOI blocks 100–1 and 100–2 provide output signal —INVALID ADDR INDICATOR 8 whenever either of them is conditioned with a positive signal. The +& blocks such as 100–3 respond to the individual situations involving invalid addresses. +& block 100–3, for example, responds to the combination of four signals as follows: +DO IL REQ 36, +CLB B, +LATE BUS USE and +255 CARRY LATCH. If, during IL REQ 36, there is a requirement for late bus use and the carry latch is on at +CLB B time, this combination of signals indicates an invalid address because late bus use is not proper during IL request 36.

Figure 23:
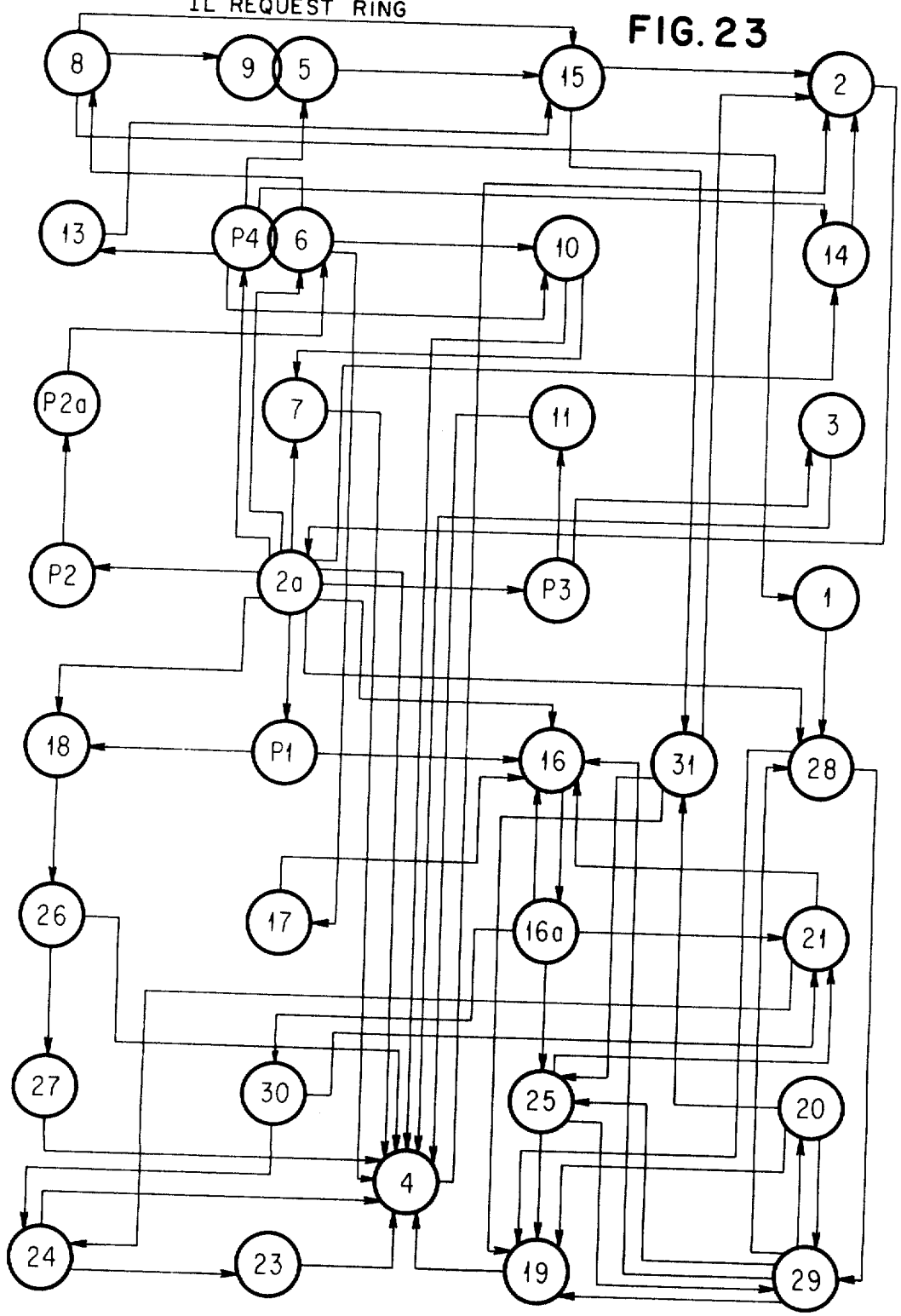
Figure 24:
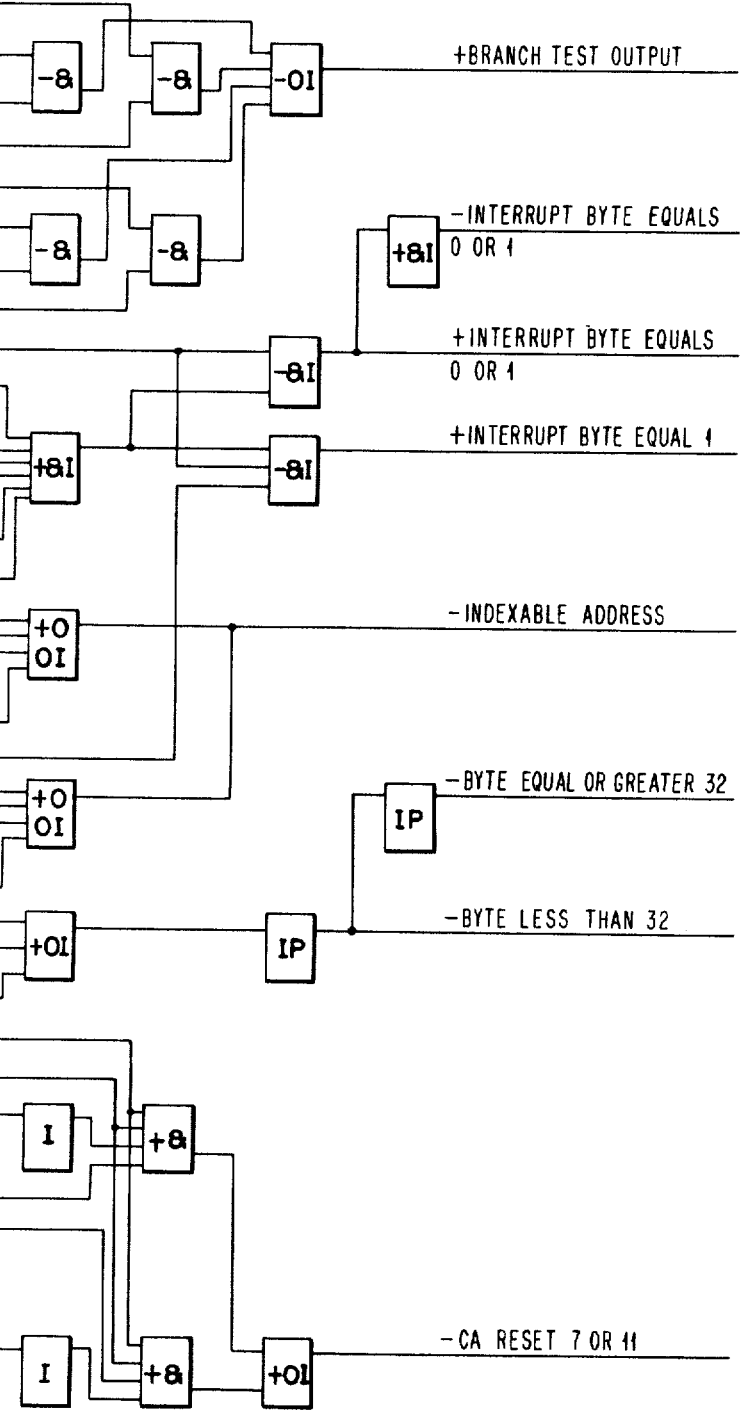

The IL ring is shown in map form in FIGURE 23, and discussed generally supra at Section J12. The IL ring is also described in Section I, under subhead "Request Rings—Specifications."

FIGURE 100b shows the sequencing control logic for determining instruction type. The +& I blocks 100–10 to 100–16 respond to sets of conditions indicative of particular types of instructions. The +& I block 100–13, for example, identifies a branch type instruction by recognizing the coincidence of signals —NOT P0, —NOT P2 and —NOT P3. Coding in such that this combination identifies a branch type instruction. The —& I block 100–13 provides signal +BRANCH TYPE INSTRUCTIONS and via an inverter signal —BRANCH TYPE INSTRUC- TIONS. In similar fashion and other +& I blocks provide their appropriate instruction type determination. The +& I blocks 100–17 and 100–18 identify situations where it is necessary to relocate the byte stored in A0 or the byte stored in B0.

The output of −& I block 100–13 passes through an inverter and passes as signal −BRANCH TYPE INSTRUCTIONS to the control latches of FIGURE 107. One output of the control latches, signal +BRANCH, is useful in the logic of FIGURE 100a to help set the invalid address indicator under a certain set of conditions.

FIGURE 100c illustrates sequencing control logic for starting the C ring, for starting the B ring and for performing other sequencing control functions. These functions are controlled by signals delivered by +& I and +& IP blocks 100–20 to 100–30. These blocks respond to the combinations of inputs requiring their respective output signals. For example, +& I block 100–20 provides output signal −IL START B RING in response to the combination of signals +LATE BUS USE X, +IL HIGHEST AREA X, and the positive output of +O block 100–31. The output of +O block 100–31 is positive upon receipt of signals +DO IL REQ 32 STEP TO 23, +DO IL REQ 5 STEP TO 23, +DO IL REQ= STEP TO 5 and the positive complement of signal −NO-OP. The signal −IL START B RING thus is developed by +& I block 100–20 during those steps which do not require late bus use, in which the IL ring is not the highest area, in which it is not desired to no-op and in which it is desired to do one of the IL requests 32, 5 or 6 followed by a step to 23 or a step to 5.

FIGURE 100d illustrates sequencing control logic for floating point instructions, for branch or transmit instructions, and for some other instructions. The +& IP blocks 100–40 to 100–49 respond to individual conditions requiring their output signals. For example, −& I block 49 at the bottom of the figure provides output signal +DO COUNT upon receipt of signals −ARITH INSTR and −COUNT.

N2. *IL request sequencing (FIGURE 101)*

FIGURE 101 shows the sequencing of the operations controlled by the IL REQ RING shown in FIGURE 1. As shown in the map of FIGURE 59, the IL ring does not necessarily step sequentially, but may change from, for example, request 2 selectively to requests 15, 11 or 7. The function of the IL request sequencing logic is to control the change of configuration of the IL request ring according to the present configuration, the instruction and certain indicators.

Logic blocks 101–1 to 101-10 are shown in FIGURE 101a. These blocks perform their appropriate individual functions in controlling the sequence of IL requests. IL requested 2, at different times, is followed by request 15, request 11, or request 7. The −&I block 101–1 provides output signal −DO IL REQ 2 STEP TO 15 in response to input signals −IL REQ CODE A–0, the −complement of signal +RELOCATE A, the output of +OI block 100–9 and signal −IL REQ CODE B2. Signal −IL REQ CODE B2 identifies IL REQ 2 and the other signals identify the appropriate situation for request 15 following request 2.

The −& I block 100–2 responds to a slightly different combination of inputs, including signals −RELOCATE B to provide output signal +DO IL REQ 2 STEP TO 11 where relocation is necessary. The −& I block 100–3 responds to signals −IL REQ CODE A–0 and −IL REQ CODE B–2 accompanied by the inverted output of +OI block 100–9 to provide output signal +DO IL REQ 2 STEP TO 7. This signal requires, in addition, a signal −RESET CONDITION BITS PER IL from +OI block 100–8. The reset condition bits requirement also occurs for IL requests 13, 3 and 30. IL request 7, at different times, is follower by IL requests 41, 25, 8, 32, 2, 15, 11 and 7. IL request code B7 accompanied by IL request code A0 and signal −DO SWAP at −& I block 100–5 provide output signal +DO IL REQ 7 STEP TO 41 for the swap operation. Similarly −& I block 100–7 provides output signal +DO IL REQ 7 STEP TO 25 for the DO transmit job during three address operation.

In FIGURE 101b, logic blocks 101–15 through 101–20 control the choice of IL request ring configuration to follow request 7. In certain other logic blocks 101–22 and 101–23 similarly control choice of configuration to follow request 7.

Request 7 is assigned priority pipe code 667 (see "Request Rings—Specifications," Section I) and serves to store the content of the B register in the CB register per prefix plus 1.

N3. *IL do lines (FIGURE 102)*

Figure 102:
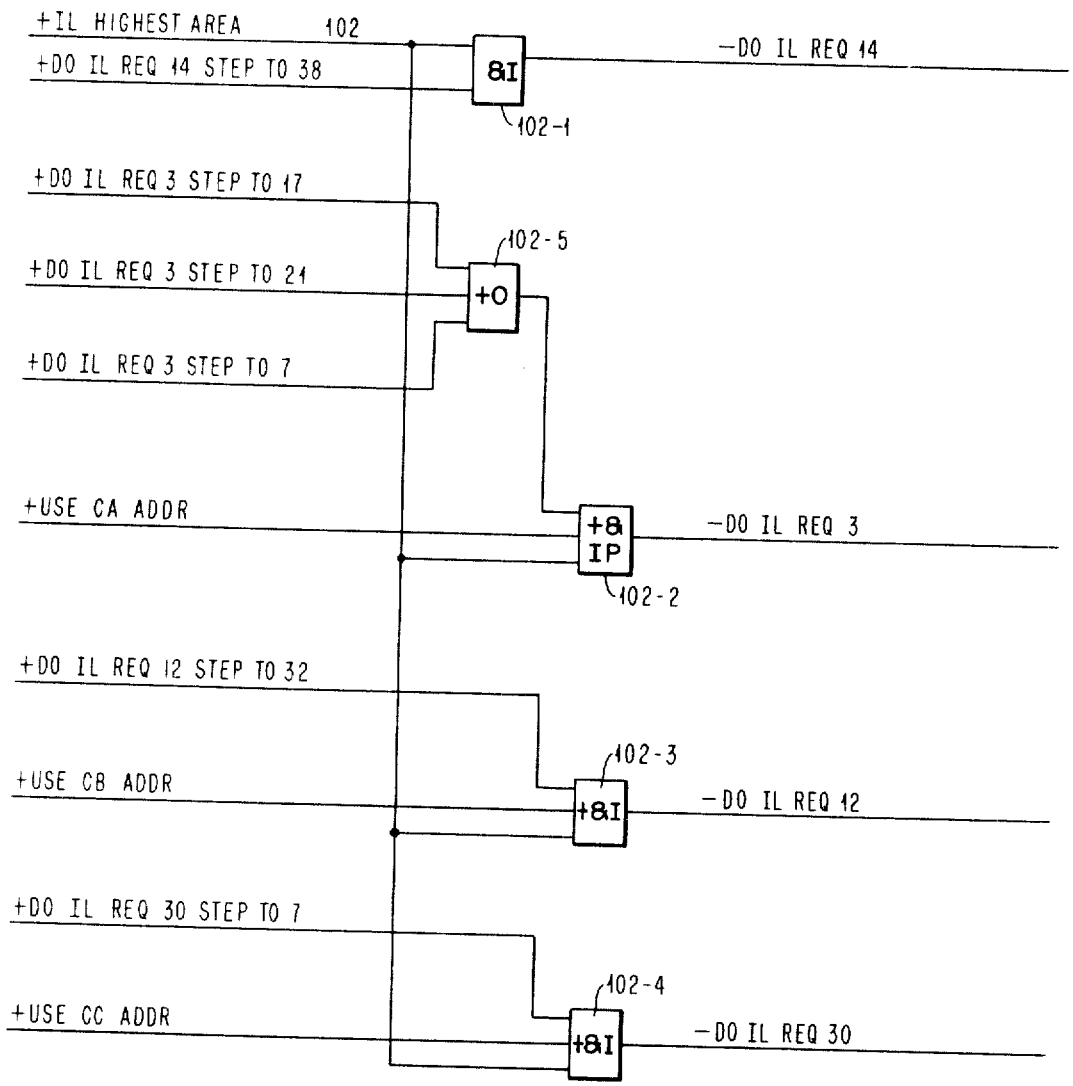

FIGURE 102 shows the "do" lines for the instruction load request ring. These 'do' lines are identified 1–16 in FIGURE 1, and function to provide gating control signals for the early job of the related operation request.

The +& I blocks 102–1 to 102–4 respond to appropriate individual situations to provide respective output signals −DO IL REQ 14, −DO IL REQ 3, −DO IL REQ 12 and −DO IL REQ 30. Similar logic not shown provides for doing other IL requests. The +& I block 102–1, for example, responds to input signals indicating that IL has priority and it is required to do IL request 14 to provide the output signal to DO IL request 14.

The "do" lines provide ORS 1–18 and 1–19 of FIGURE 1 with control signals necessary for gating the appropriate registers, logical units, buses and other functional units. The "do" line configurations coincide with the request ring codes identified in the chart entitled "Request Rings—Specification," Section I.

N4. *IL request ring (FIGURE 103–104)*

Figure 103:
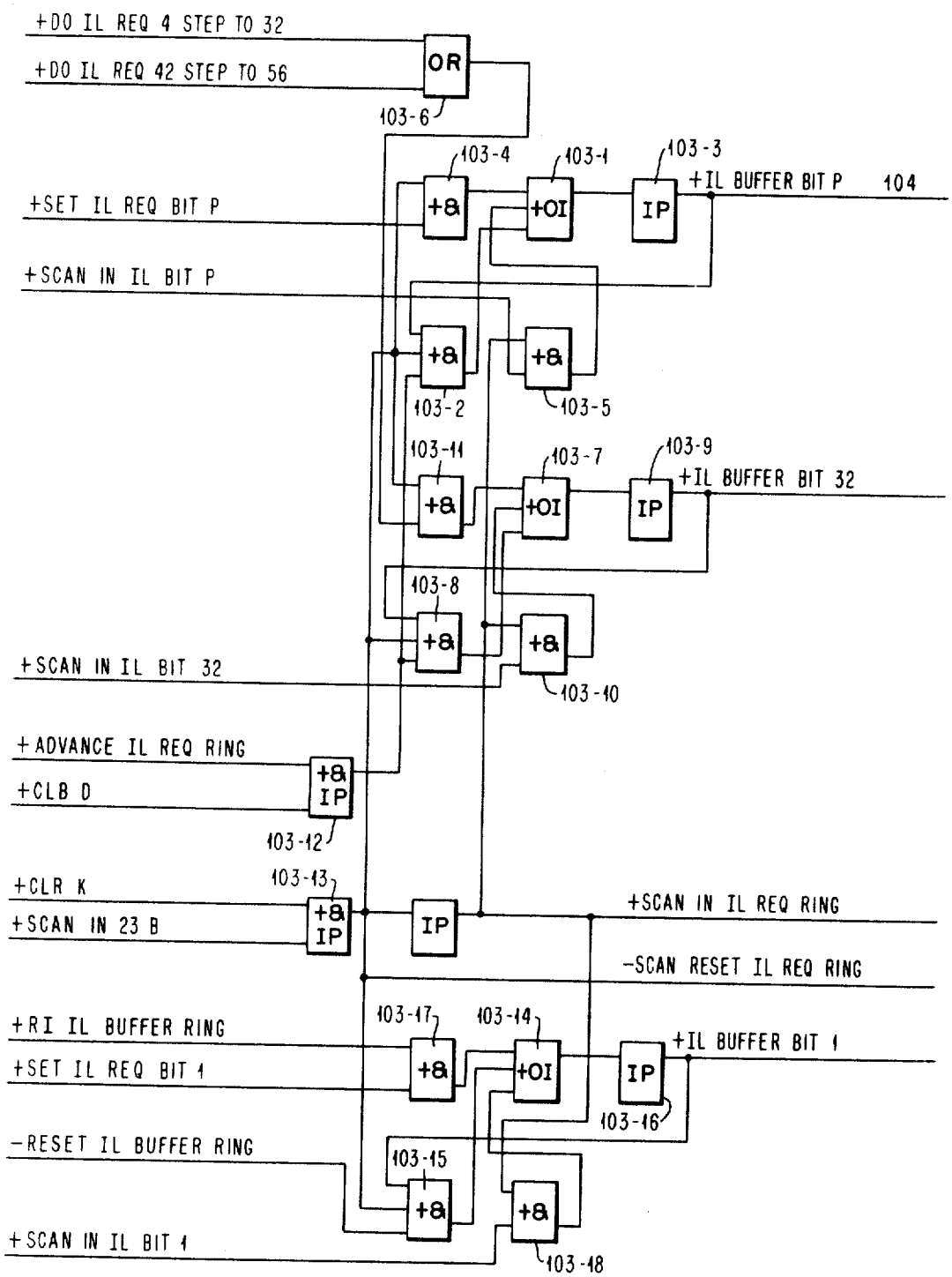

The IL request ring, like the other request rings, includes a double latch trigger for each bit position in its configuration. FIGURE 103 shows the buffer latches, which connect to the register latches in FIGURE 104. It is possible to make logical alterations between the buffer latches and the FIGURE 104 latches, a feature unique to the complex IL ring.

Logic blocks 103–1 to 103–5 form the buffer and its inputs for the parity position. Those configurations which are to have a parity bit, including 0, for example, directly control parity latch 103–1 to 103–3. Blocks 103–6 to 103–12 control the 32 bit; blocks 103–14 to 103–18 the 1 bit.

Figure 104:
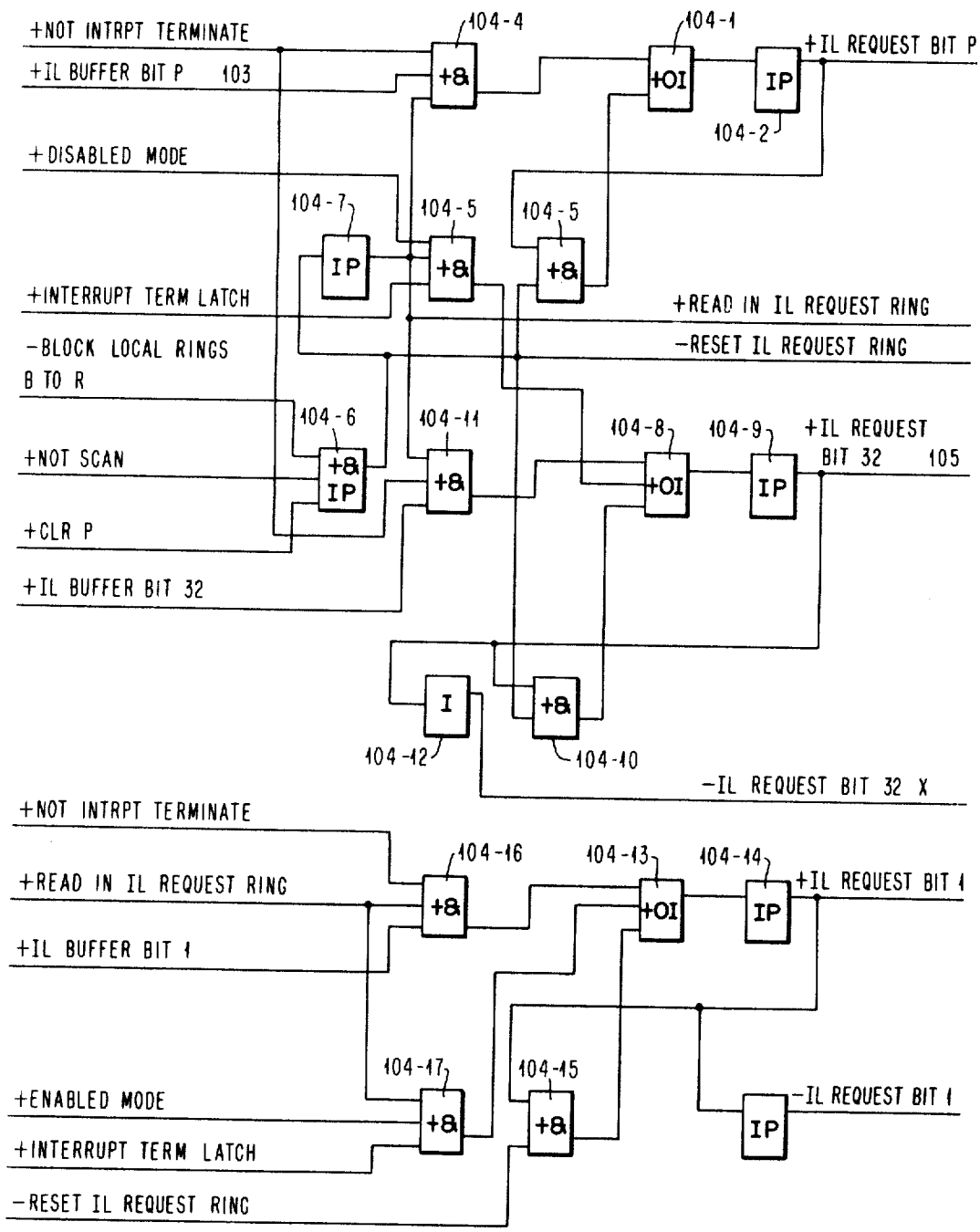

FIGURE 104 illustrates the R latches of the IL request ring. The latch made up of blocks 104–1 to 104–3 provides the parity bit, in response to an input from FIGURE 103 as modified at +& block 104–4. Logic blocks 104–5 to 104–12 provide the IL 32 bit. Logic blocks 104–13 to 104–17 provide the IL 1 bit.

Figure 105:
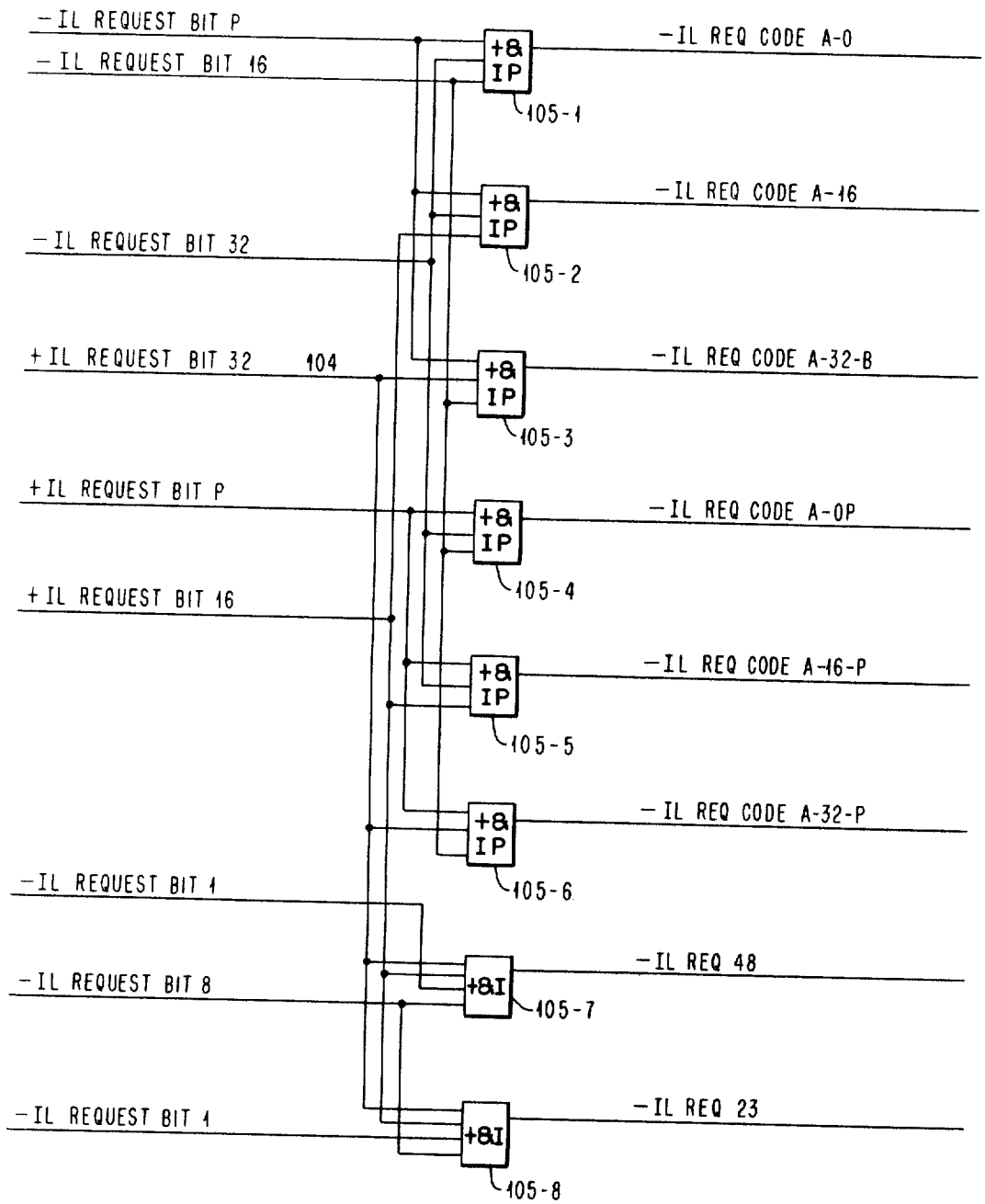

FIGURE 105 functions to decode the IL requests. A set of simple AND-INVERT circuits combines the IL request bit signals into IL request code signals which identify the IL request to the circuits which control gating functions.

N5. *IL sequence advance (FIGURE 106)*

FIGURE 106 illustrates circuits to perform sequence, advance for the instruction load ring. The function of these circuits is to perform the basic functions associated with the initial loading of an instruction, by advancing the IL ring and identifying the register supplying the address.

The +OI block 106–1 responds to each of the several situations where it is necessary to advance the IL request ring. Such situations are identified by signals +STEP TO IL REQ 19C, +DO FILL BUS STEP TO 48, +STEP TO IL REQ. 27, +BC ADVANCE IL RING, +PRIORITY ADV IL RING and the output of +AND circuit 106–2 upon coincidence of signals +DO DX 13A and +INSTRUCTION ACTIVE A. Signal −ADVANCE

47

IL REQUEST RING is used in FIGURE 103 to change the IL ring configuration to the next value.

The OI block 106-1 combines the signals, including the output of +& 105-2, identifying advance situations, and produces the advance signal.

The Logic blocks 106-3 to 106-6 identify situations for using respectively the CB address, the CA address and the CC address.

N6. *Control latches (FIGURE 107)*

FIGURE 107 shows the control latches for operating the machine. These control latches are bistable devices which are set to provide continuous signals for control functions. They serve as indicator triggers. The contral latches include an "enabled mode-disabled mode" latch, a "wait" latch, an "interrupt terminate" latch, a "no-op" latch, a "branch" latch and other latches as required.

Logic blocks 107-1 to 107-3 form the enabled mode-disabled mode latch. The output of this latch is useful in FIGURE 100 to determine whether to continue instruction loading to accept an interrupt.

Logic blocks 107-4 to 107-6 form the wait latch, useful during interrupts. Logic blocks 107-7 to 107-9 form the interrupt-terminate latch useful by the logic of FIGURES 104 and 115 to control IL request during configurations and CC requests.

Logic blocks 107-10 to 107-12 form the A count 1 latch, useful in FIGURE 101 to control the refill operation.

In FIGURE 107b, logic blocks 107-15 to 107-17 form the B count 1 latch. Other logic blocks including 107-20 forms the no-op latch, useful in FIGURE 100 for starting the A and B rings. Logic blocks 107-18 to 107-22 form the branch latch.

In FIGURE 107c, logic blocks 107-30 to 107-32 form the increment latch which is useful in FIGURE 27 to control gating of an incremented byte.

In FIGURE 107d, logic block 107-40 to 107-42 form the three address latch which is useful at the bottom of FIGURE 101a in controlling development of an IL DO and step function. Logic blocks 107-43 to 107-45 control the interrupt latch, which is also useful near the bottom of FIGURE 101a, to control development of an IL DO and STEP function. Logic blocks 107-46 to 107-48 form the block IO attention latch which is useful in controlling IO.

O. REQUEST RING CB (FIGURE 108)

FIGURE 108 shows representative circuits for the request ring CB. Request ring CB is similar to the other request rings and conforms to the block diagram of FIGURE 5a. The function of the CB request ring is to fetch or store operands to or from the associated B Register. The CB ring provides the values listed in Section I, under subhead "Request Rings—Specification."

Position 1 includes blocks 108-1 to 108-3 which form the B latch and produce signal +CB-BRR-1. This latch is settable by various combinations of signals including the output of +& block 108-4 which responds to the insert signal for bit 1. The B latch connects directly below to the R latch for the same position. The R latch for the CB request ring 1 bit includes blocks 108-5 to 108-7 and produces output signal +CB-RRR-1.

O1. *CB request ANDS (FIGURE 109)*

FIGURE 109 shows the CB request AND circuits which decode the outputs of request ring CB of FIGURE 108. The function of these circuits is to decode the encoded state of the CB ring and transmit these lines to the related early decoder and decide logic for a priority determination.

The +& I blocks 109-1 to 109-3, and other similar AND blocks as required, respond to the appropriate combinations of inputs to decode appropriate output signals.

48

For example, +& I block 109-3 provides output signal —CB-RRR DECODE 24 and P in response to the combination of inputs +CB-RRR 8, 16 and P.

O2. *CB request ring gen requests (FIGURE 110)*

Figure 110:
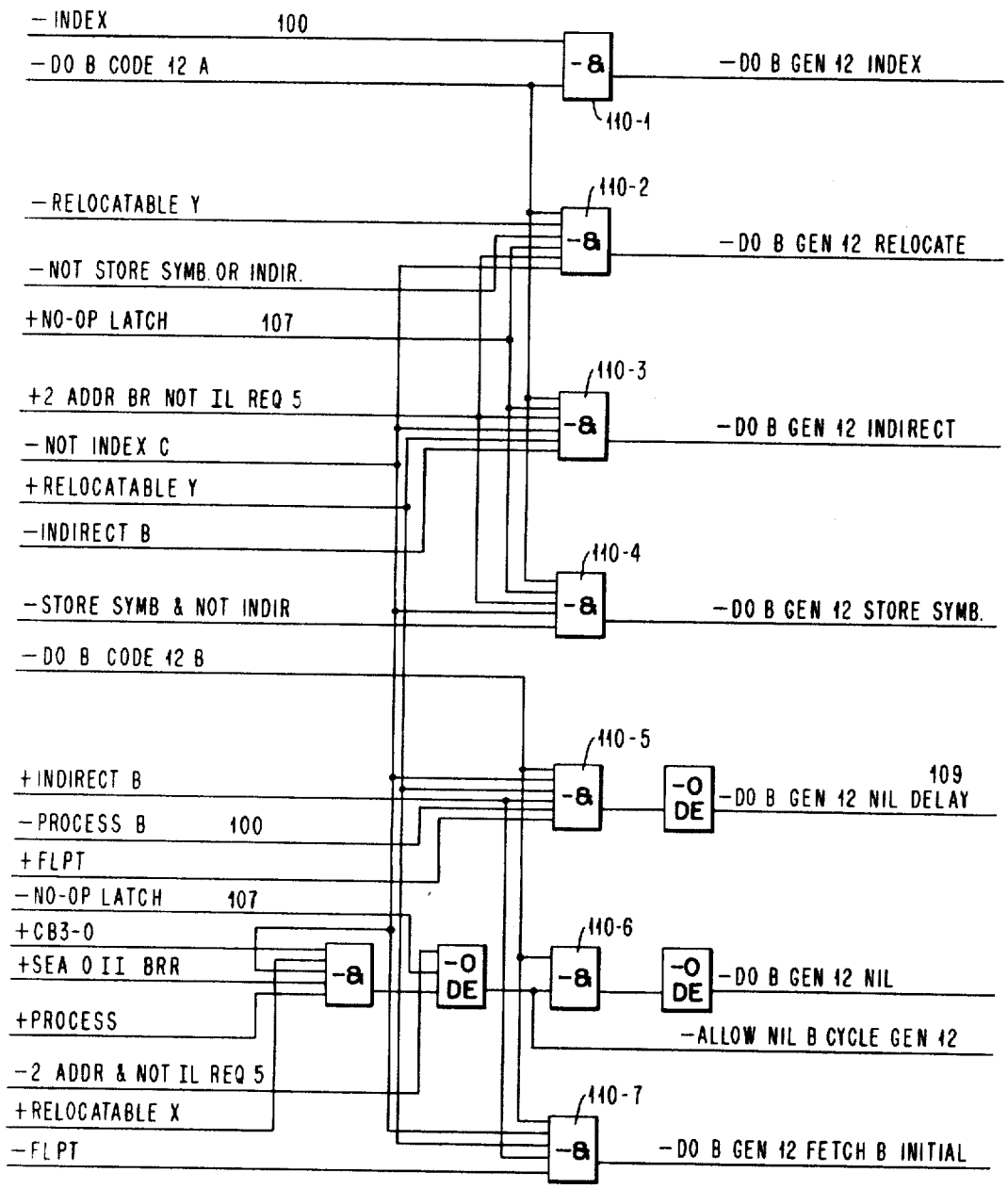

FIGURE 110 shows the general requests of the CB request ring. These requests perform the functions of address modification and initial fetch of the operand for the associated CB register, shown as register 3-10 of FIGURE 3. The requests are listed in Section I, supra, and discussed at Section H2 with FIGURE 5C.

The —& blocks 110-1 to 110-7 respond to the sets of conditions which require the "do" signal. For example, —& block 110-1 provides output signal —DO B GEN 12 INDEX in response to the combination of signals —INDEX AND —DO B CODE 12A.

O3. *Set B (FIGURE 111)*

Figure 111:
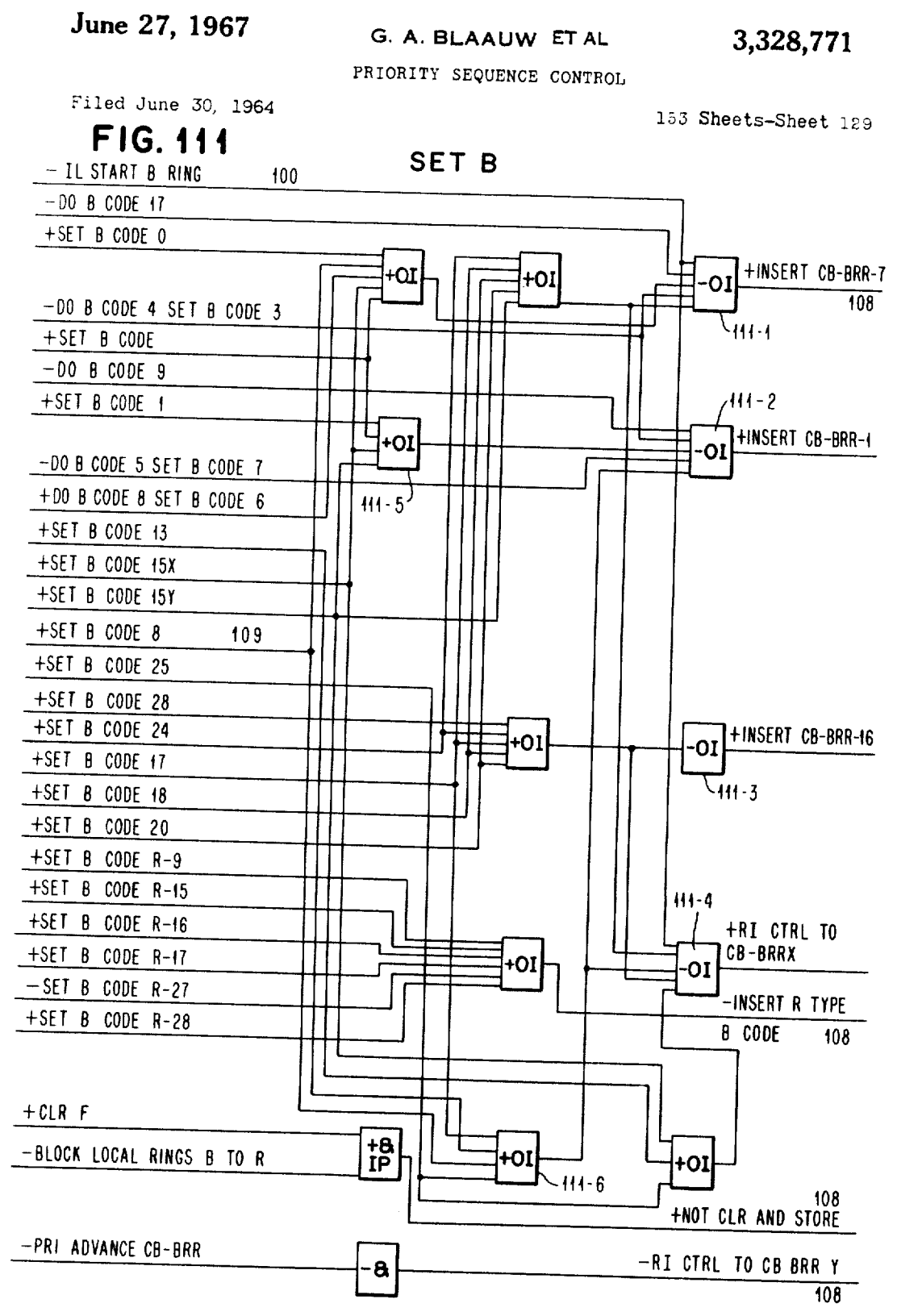

FIGURE 111 shows representative circuits to perform the function of encoding the proper bit configuration into the request ring for the next state of the ring.

Output circuits —OI blocks 111-1 to 111-4 respond to the various input signals which require their particular output, to set the next logical state of the CB request ring, and provide insert signals to FIGURE 108. As shown in the map at FIGURE 5c, the CB ring steps from configuration to configuration in random fashion, as dictated by conditions.

O4. *Increment CB word address (FIGURE 112)*

Figure 112:
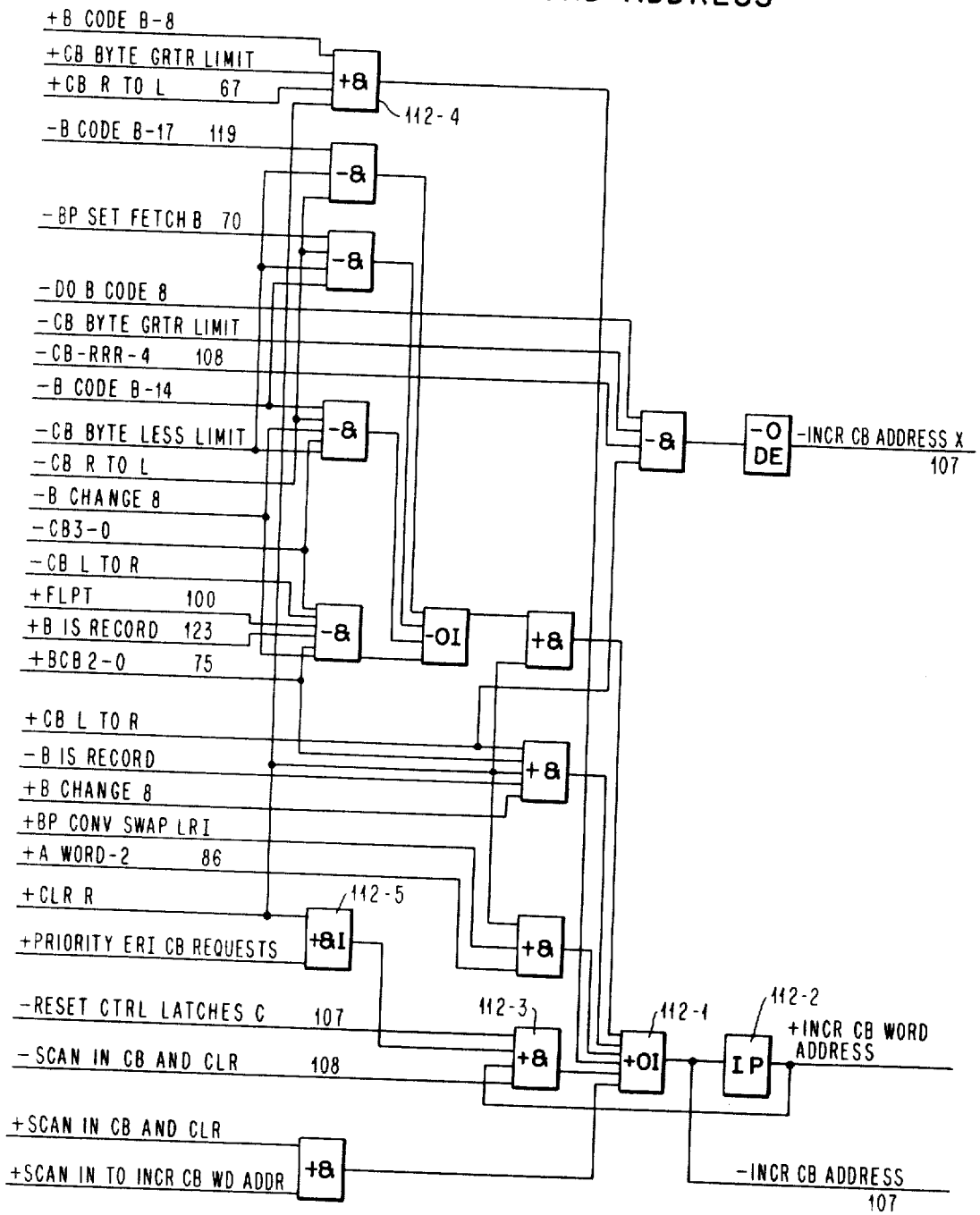

FIGURE 112 shows the circuitry to control the incrementing of the word address in register CB. This circuit performs the function of informing the +1 circuit on the W bus (bytes 0 and 1) that the address coming from the CB register is to be incremented.

The operative signal +INCR CB WORD ADDRESS is developed by a latch made up of +OI block 112-1, IP block 112-2 and —& block 112-3. This latch is set upon the detection of any one of the several conditions which require CB word address to be incremented. One such condition is indicated by +& block 112-4 which, at the top of the figure, responds to the combination of signals +B CODE B-8, +CB BYTE GRTR LIMIT, +CB R TO L and +CLR R. This condition, the byte greater than limit condition requires that the CB word address be incremented and accordingly provides a + signal to +OI block 112-1. This signal is inverted to the—and provides directly output signal —INCR CB ADDRESS. This same signal is again inverted by IP block 112-2 to provide output signal +INCR CB WORD ADDRESS and a feedback signal to complete conditioning of +& block 112-3 which has all its other inputs at the positive level as a result of +& I block 112-4 being deconditioned by the lack of signal +CLR R and its other inputs at the + level due to the absence of signals —RESET CTRL LATCHES C and —SCAN IN CB AND CLR. This positive signal from IP block 112-2 passing through +& block 112-3 maintains latch 112-1 on until the latch is cleared by one or more —signals applied to +& block 112-3.

P. REQUEST RING CC (FIGURE 113)

Figure 113:
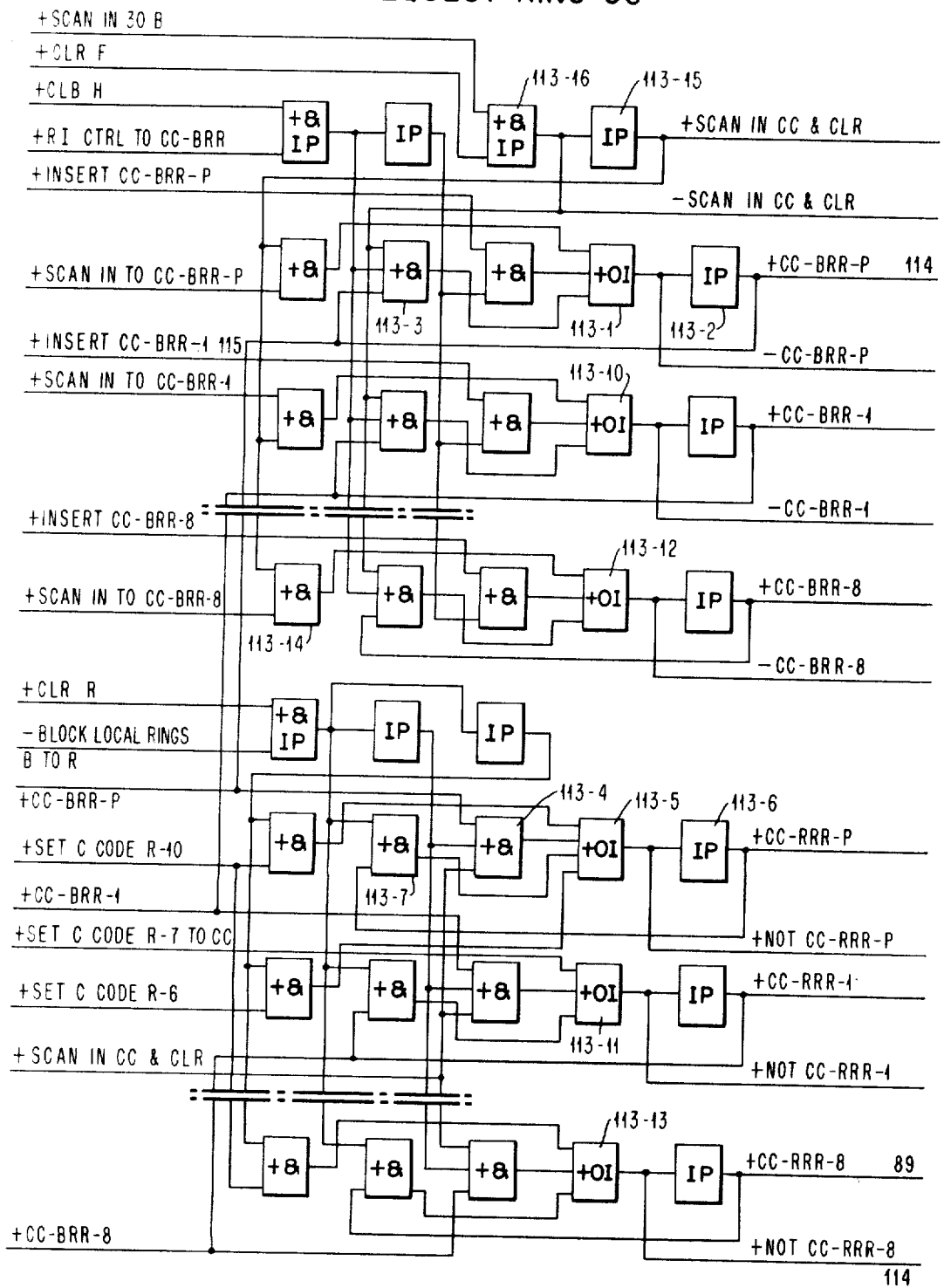

FIGURE 113 illustrates the CC request ring 1-5 in FIGURE 1. The function of the CC ring is to provide as coded configurations the necessary request for obtaining the third operand in three address type instructions. The CC ring is described at Section H3 in connection with FIGURE 5d. The requests of the CC ring are listed in Section I under Subhead "Request Rings—Specification."

The CC request ring, like the other rings, includes several twin-latch triggers which provide the necessary bit configurations.

For the P position, logic blocks 113-1 to 113-3 form the B latch, and blocks 113-4 to 113-6 form the R latch. Blocks. 113-10 and 113-11 help form the 1 position; blocks 113–12 and 113–13 serve in the 8 position.

Since the request ring includes two sets of latches in tandem for operation during bus time and register time, each bus latch connects directly to its associated register latch. For the parity position, output signal +CC–BRR–P from IP block 113–2 connects via the feedback connection to +& block 113–3 and also down into +& block 113–4 in the register latch. +& block 113–4 responds to signal +CC–BRR–P to set the register latch parity position. The output of +& block 113–4 passes via +O block 113–5 to IP block 113–6 and via a feedback path to +& block 113–7 to maintain the latch in the on condition. In the on condition, the latch provides output signals +CC–RRR–P and +NOT CC–RRR–P.

Similar sets of latches for each of the other positions in the request ring are included. The logic for positions 1 and 8 is shown in FIGURE 113. Position 1 includes +OI block 113–10 for the bus half of the cycle and 113–11 for the register half of the register half of the cycle. The 8 position includes +OI block 113–12 for the bus half of the cycle and +OI block 113-13 for the register half of the cycle.

Each latch is provided with scan in controls. For example, the 8 position of request ring C is settable by the combination of scan in control signals +SCAN IN CC & CLR and +SCAN IN TO CC–BRR–8 at +& block 113–14 to the output of +& block 113–14 sets the latch via +OI block 113–12. Signal +SCAN IN CC & CLR is delivered at the top of FIGURE 113 by IP block 113–15 upon conditioning of +& IP block 113–16 which itself responds to the combination of signals +SCAN IN 30 B and +CLR F.

P1. *CC decode (FIGURE 114)*

Figure 114:
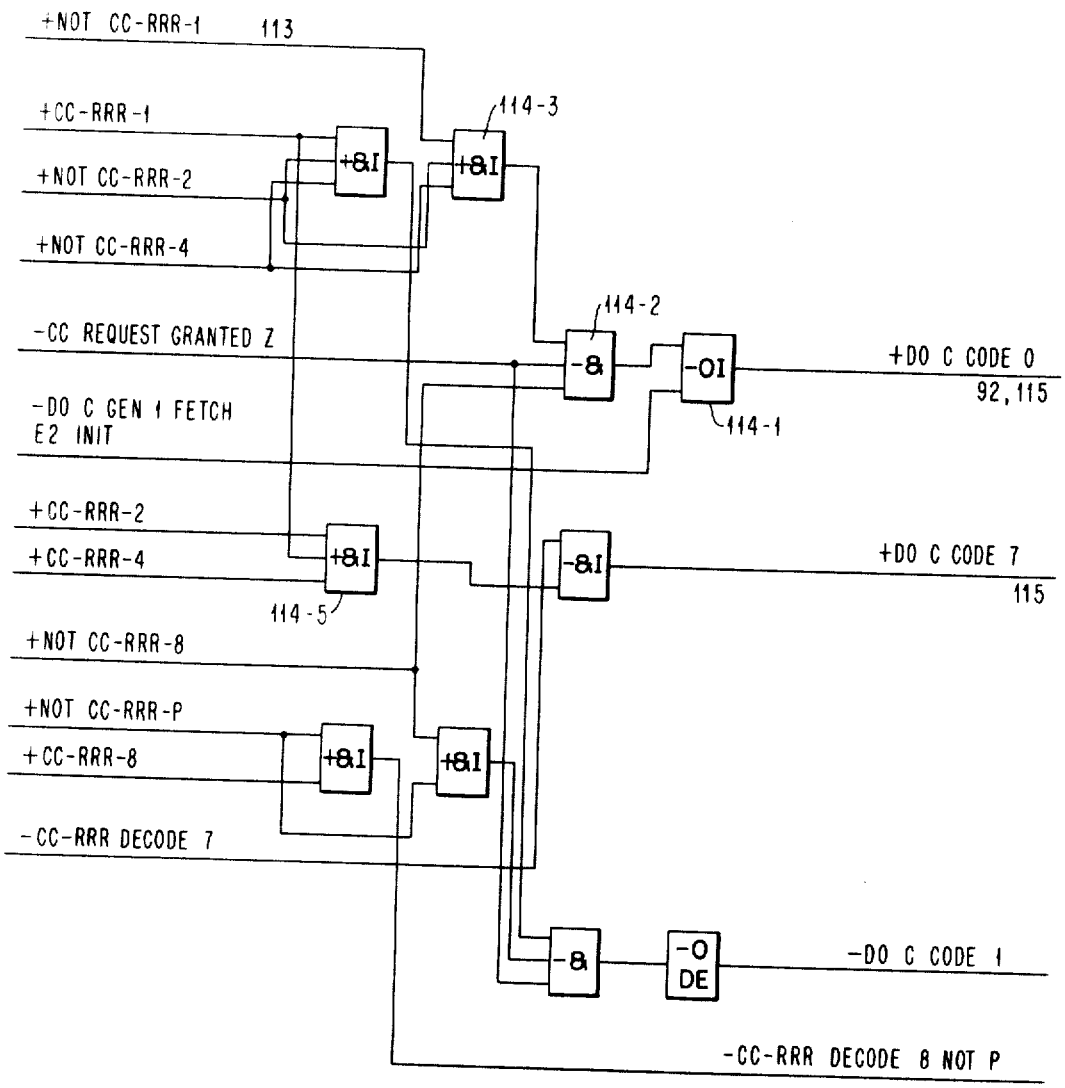

FIGURE 114 illustrates the C ring decode circuits which deliver DO signals for the CC ring. The circuit is shown in abbreviated detail, since other decoding circuits can operate in similar fashion to do the C codes which are required. The −OI block 114–1 provides output signal +DO C CODE 0 in response to each of two situations where the 0 DO code is required. These situations are upon occurrence of signal −DO C GEN 1 FETCH E2 INIT at its lower input and the combination at −& block 114–2 of signals −CC REQUEST GRANTED Z and the complement of signal +NOT CC–RRR–8 from the bottom of FIGURE 113 together with a −output from +& I block 114–3. Such a minus output will be available when the request ring C positions 1, 2, and 4 are all at the 0 value. The −OI block 114–1 thus responds to the combination of priority in the form of signal −CC REQUEST GRANTED Z and the absence of bits 1, 2, 4 and 8 in the C request ring to do C code 0. The −& I block 114–4 similarly responds to the values of the C request register to provide output signal +DO C CODE 7 upon detection of the existence of bits 1, 2 and 4 by +& I block 114–5 at the same time that signal −CC–RRR DECODE 7 is presented to −& I block 114–4.

P2. *CC request ANDS (FIGURE 115)*

FIGURE 115 illustrates the circuits which respond to CC requests by providing bit values for entry into the CC register. The −& circuits 115–1 to 115–7 respond to appropriate combinations of signals to control −OI blocks 115–8 to 115–12 to provide suitable signals for entry into the CC register in FIGURE 113. These signals are used to perform address modification and initial fetch of the operand for the associated CC register, shown as register 3–11 in FIGURE 3.

P3. *Increment CC word address (FIGURE 116)*

FIGURE 116 illustrates the increment CC word address latch made up of +OOI block 116–1, IP block 116–2 and +& block 116–3. This latch is set upon detection of any of the several conditions requiring the CC word address to be incremented. These conditions occur generally when the field crosses a word boundary when processing bytes from left to right.

The +& blocks 116–4 to 116–9 serve to identify individual incrementing situations. Block 116–4, for example, causes an increment when the byte address becomes greater than the limit.

The +OOI block 116–10 serves merely to extend +OOI block 116–1. The 2& block 116–11 serves to increment the CC address without setting the increment latch. The +& I block 116–12 served during right to left operations.

P4. *ALF MF field (FIGURE 117)*

FIGURE 117 illustrates circuits which control the length of field in an operand. Long fields and multiple fields which require special handling are identified.

These circuits include MFC latch made up of +OI block 117–1, IP block 117–2 and the +& block 117–3. The MFC latch controls multiple field operations.

FIGURE 117 also includes the byte process terminate latch which is made up of +OI block 117–4, IP block 117–5 and +& block 117–6. The +B terminate latch controls exit from the program sequence controlled by the type process ring, 1–7 of FIGURE 1.

P5. *Decrement update latches (FIGURE 118)*

FIGURE 118 illustrates the decrement update latches. The function of these latches is to control the decrement circuit 3–18. The decrement function is described at Section J15.

The first decrement update latch is made up of +OI blocks 118–1, IP block 118–2 and +& block 118–3. The second decrement update latch is made up of OI block 118–4, IP block 118–5 and +& block 118–6. These latches control simple logic to relate their condition to the arithmetic operation and to control the decrement function.

FIGURE 119 decodes the CC ring during but time to provide intermediate signals for quick use. The +& I block 119–1, for example, provides signal C CODE B–11 which is useful in FIGURE 120 to control the byte counter. Logic blocks 119–2 and 119–3 typify other bus time decoders which provide similar signals.

P6. *Byte equal zero (FIGURE 120)*

FIGURE 120 illustrates the circuitry to determine when the CB byte equals 0 and to determine when the CA byte equals 0. The function of this circuit is to provide information upon which control changes may be based when the CA and CB bytes equal 0 or when the C RDY FOR BP latch is set.

Signal +CB BYTE EQ 0 is delivered by −& I block 120–1 upon the presentation at each of its inputs of the complement of each of its four input signal +CB2–0, +CB2–1, signal +CB2–2 and signal +CB2–3. Signal +CA BYTE EQ 0 is similarly provided by −& I block 120–2 upon receipt of the complement of its inputs.

The latch is made up of +OI block 120–3, IP block 120–4 and +& block 120–5. It serves as the C RDY FOR BP latch. The function of this latch is to provide a control signal, byte processing control, for use in starting byte processing. The signal indicates that the data has been replenished in each of the data registers participating in the instruction. This circuit indicates when data in the A and B registers is ready for byte processing.

P7. *Miscellaneous logic (FIGURE 121)*

FIGURE 121 illustrates miscellaneous logic, which provides miscellaneous signals required during operation of the machine. Basic logic is provided by +& I blocks 121–1 to 121–6 which respond to their related sets of inputs to provide outputs upon coincidence. These outputs serve the multiple functions of:

(1) Gating the address field of CA register to the address field of the CC register.

(2) Provide additional status logic to the stepping functions of the operand control request rings.

P8. *Mask (FIGURE 122)*

FIGURE 122 illustrates the logic which provides a —MASK signal when any bit in the mask matches a corresponding bit in the program indicators to control an interrupt operation.

Signal —MASK is delivered by either of +OOI blocks 122–1 or 122–2 upon presentation of the outputs of any one of +& blocks 122–3 to 122–9. For example, +& block 122–3 responds to the inputs signal +D3–1 and signal +E1–1 to condition +OOI block 122–1 to provide output signal —MASK, which sets a latch in FIGURE 124b.

P9. *Preserve register (FIGURE 123)*

FIGURE 123 illustrates the preserve register, identified by reference character 3–25 in FIGURE 3. The function of the preserve register is to save instruction operation code bits which would otherwise have been lost when indirect addressing occurs.

The nature of byte processing by the priority sequence control of this invention makes it mandatory to be able to resume an operation after temporarily halting it for some other operation. The preserve register makes this possible. It retains the instruction during ordinary operations. When a fault is discovered, and a scan out operation occurs, the preserve register is useful in accepting indicators of machine state and preserving them for further use.

The preserve register is intimately involved in instruction sequencing, since it retains the instruction identifiers necessary in switching from ring configuration to configuration.

FIGURE 123a shows preserve register positions P0, P1, P2 and P3. Position P0 includes a latch made up of +OI block 123–1, IP block 123–2, +& block 123–3 and "scan in" logic including +& block 123–4 and +& IP block 123–5. The P0 position is set upon presentation at +& IP block 123–5 of signals +INDIRECT OR REFILL CB LRI, +ARITH INSTRS and +CLR H. These signals occur at CLR H time during arithmetic instructions, at a time when an indirect or a refill instruction occurs. If the negative signal output of +& IP block 123–5 is inverted to the positive signal and applied to +& block 123–4 along with signal +X3–2, +& block 123–4 provides a positive output signal for input to +OI block 123–1. This signal sets the latch and provides output signal +P0 which is maintained via +& block 123–3 indefinitely until +& block 123–3 is deconditioned by signal —RESET STRL LATCHES A on its lower input. The P0 latch can also be set via +& IP blocks 123–6 and —OI block 123–7 during scan in operations and certain instruction load requests.

Position 1 of the preserve register latch including +OI block 123–8, IP block 123–9 and +& block 123–10. This stage of the P register is effective to retain signal X3–3P.

Position 2 is set by signal +X3–4 applied via a +& block to +OI block 123–11.

Position 3 is set by signal 2X3–5, applied via a +& block to +OI block 123–12.

Figure 123B:
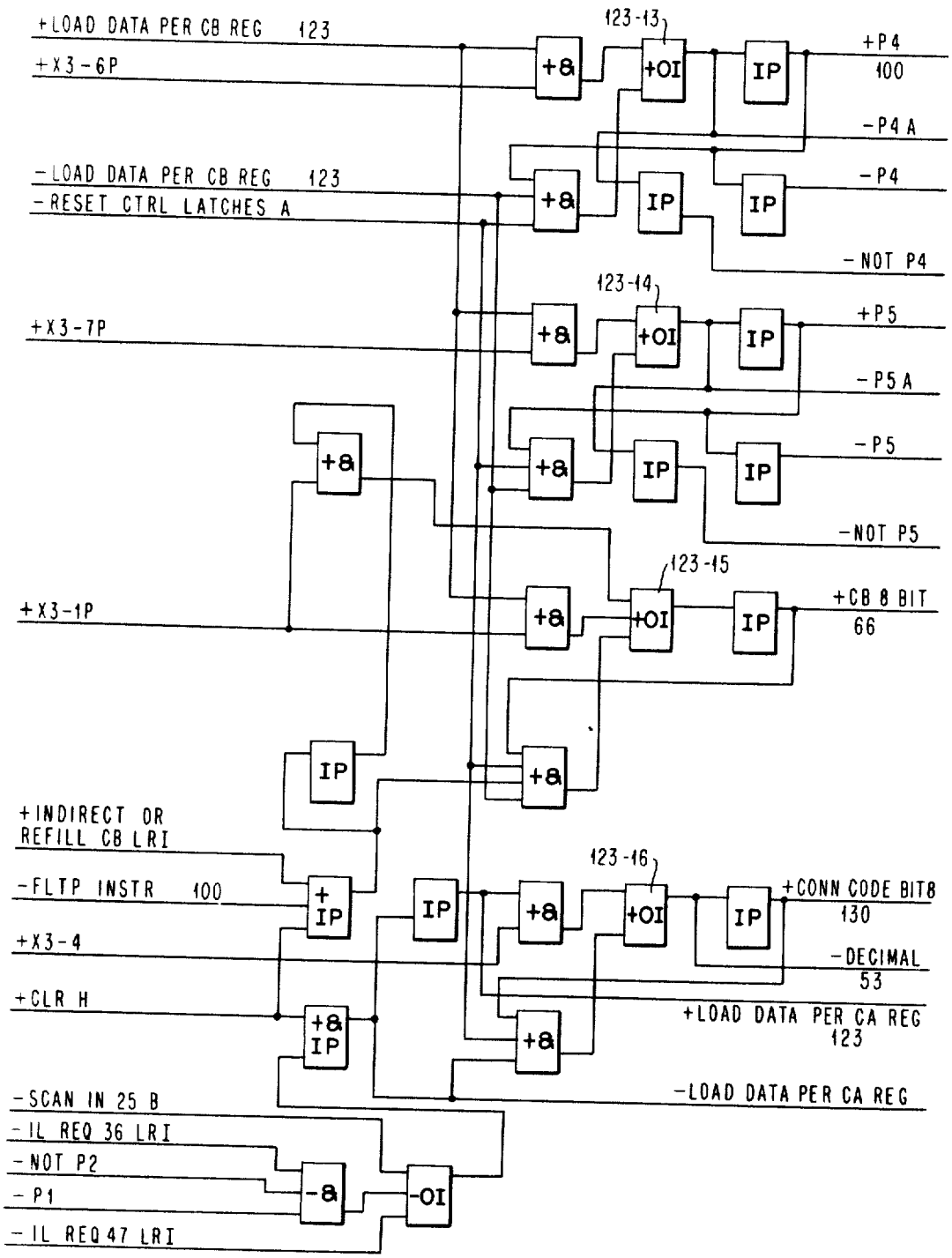
Figure 123C:
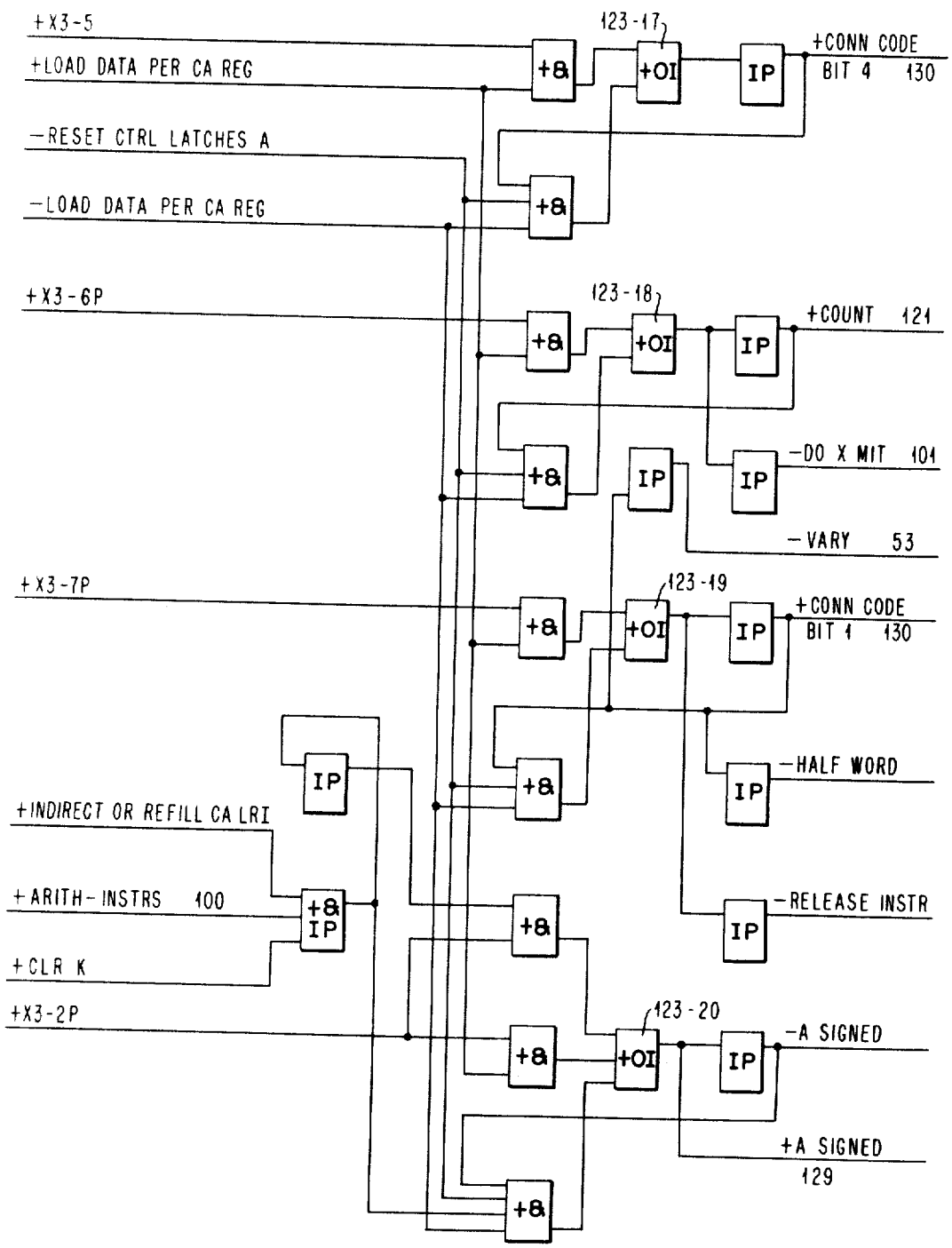
Figure 123E:
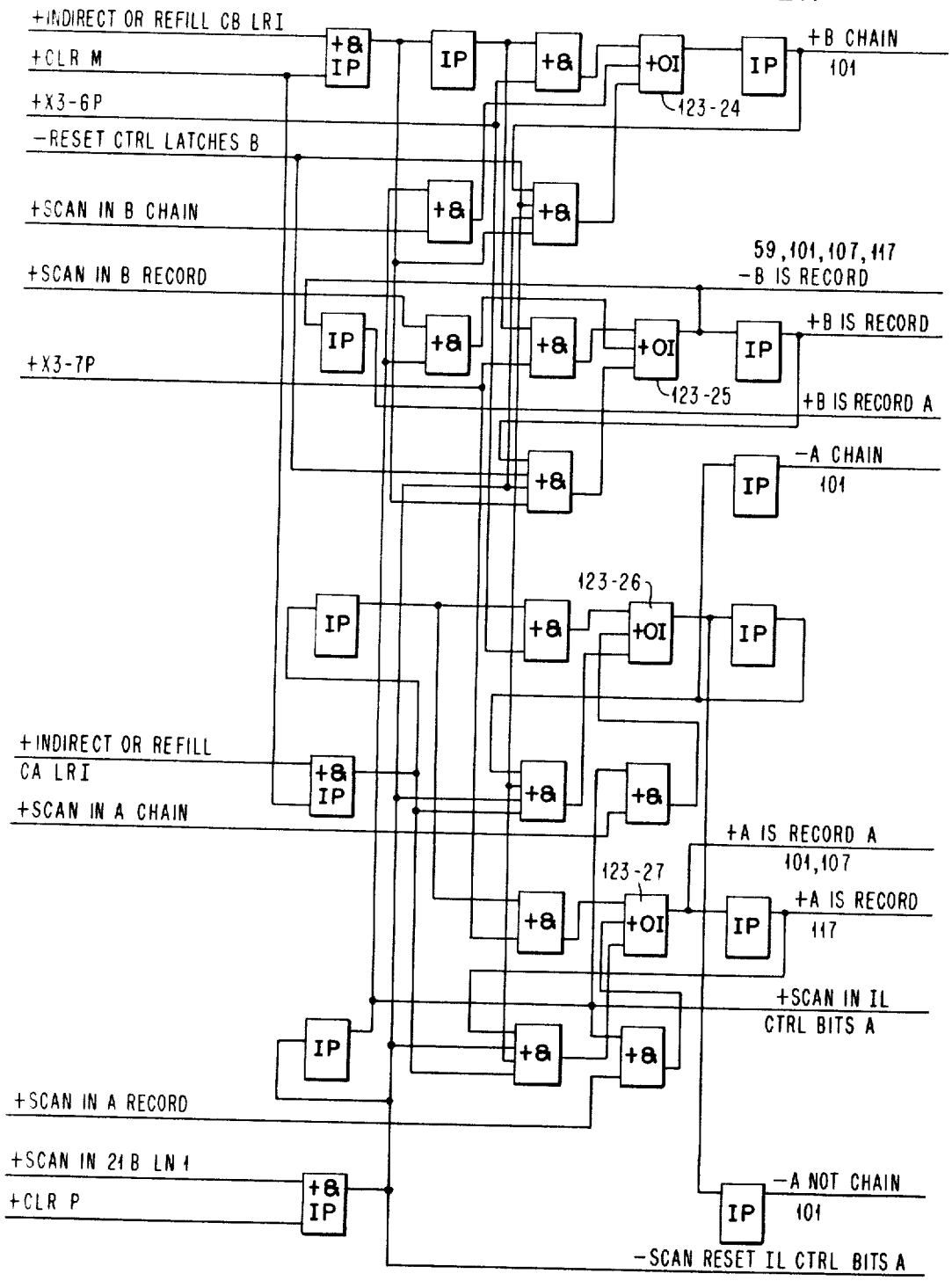

Positions 4 and 5 involve latches including +OI blocks 123–13 and 123–14 in FIGURE 123b. Other +OI blocks 15–16 in FIGURE 123b, and 123–17 to 123–27 in FIGURES 123c to 123e perform storage functions for separate machine functions identified by their respective inputs.

FIGURE 124 illustrates indicator latches for use in controlling machine functions. The indicator latches are of particular importance when used with the request rings because the indicators serve important functions in determining which configuration of the request ring is to follow the current operation request.

FIGURE 124a illustrates three indicator latches, the latches for IO alarm, for invalid op code and for instruction count signal. The IO alarm indicator includes +OI block 124–1, IP block 124–2 and +& block 124–3. The +OI block 124–1 is conditioned by the output of +& block 124–4 by an alarm such as signal +IL REQ 36 ERI or the output of —& I block 124–5, which responds to preserve register positions 0–5 in configuration 1 10011.

Other logic blocks 124–6 to 124–8 form an indicator latch for invalid op codes. The latch based on +OI block 124–9 identifies an instruction count signal.

Other similar latches can indicate such conditions as "invalid address," or "invalid data" as required by FIGURE 107, when the condition occurs.

Figure 124B:
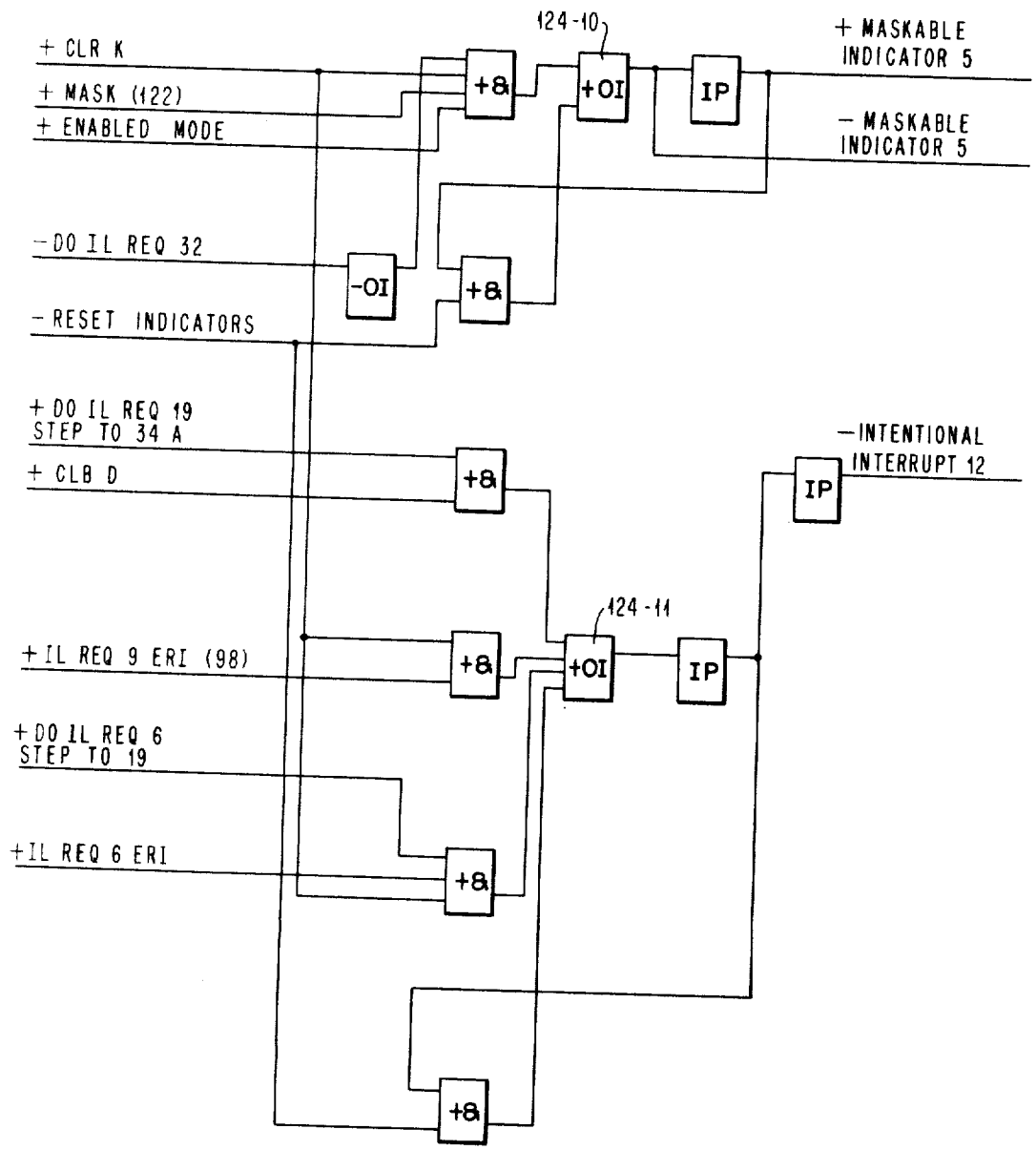

FIGURE 124b illustrates the "maskable indicator" latch, based upon +OI block 124–10, and the "intentional interrupt" latch, based upon +OI block 124–11. The intentional interrupt condition occurs during IL requests 19 (step 34), 9, and 6 (step to 19 with 6 ERI).

P10. *Equals 0 (FIGURE 125)*

Figure 125:
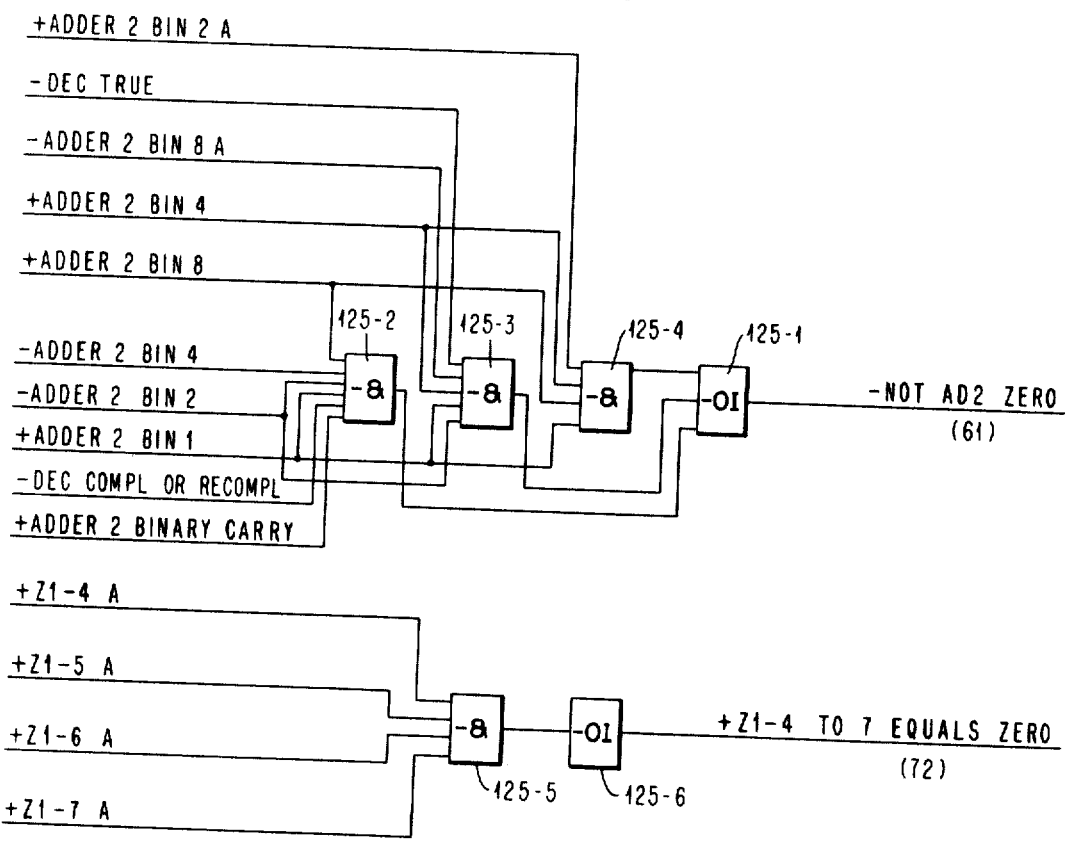

FIGURE 125 illustrates the circuitry to determine where the particular sets of inputs indicate at 0. The 0 determination is useful in divide operations and multiply operations to identify situations where speedup techniques can be used.

Blocks 125–1 to 125–4 identify the 0 state of adder 2 respectively during complementing, true operation with 8 and 2 bits, and ordinary operation with all 0 bits. The outputs pass to FIGURES 61 and 72 for use in controlling the HRR register and the byte controls.

Figure 126:
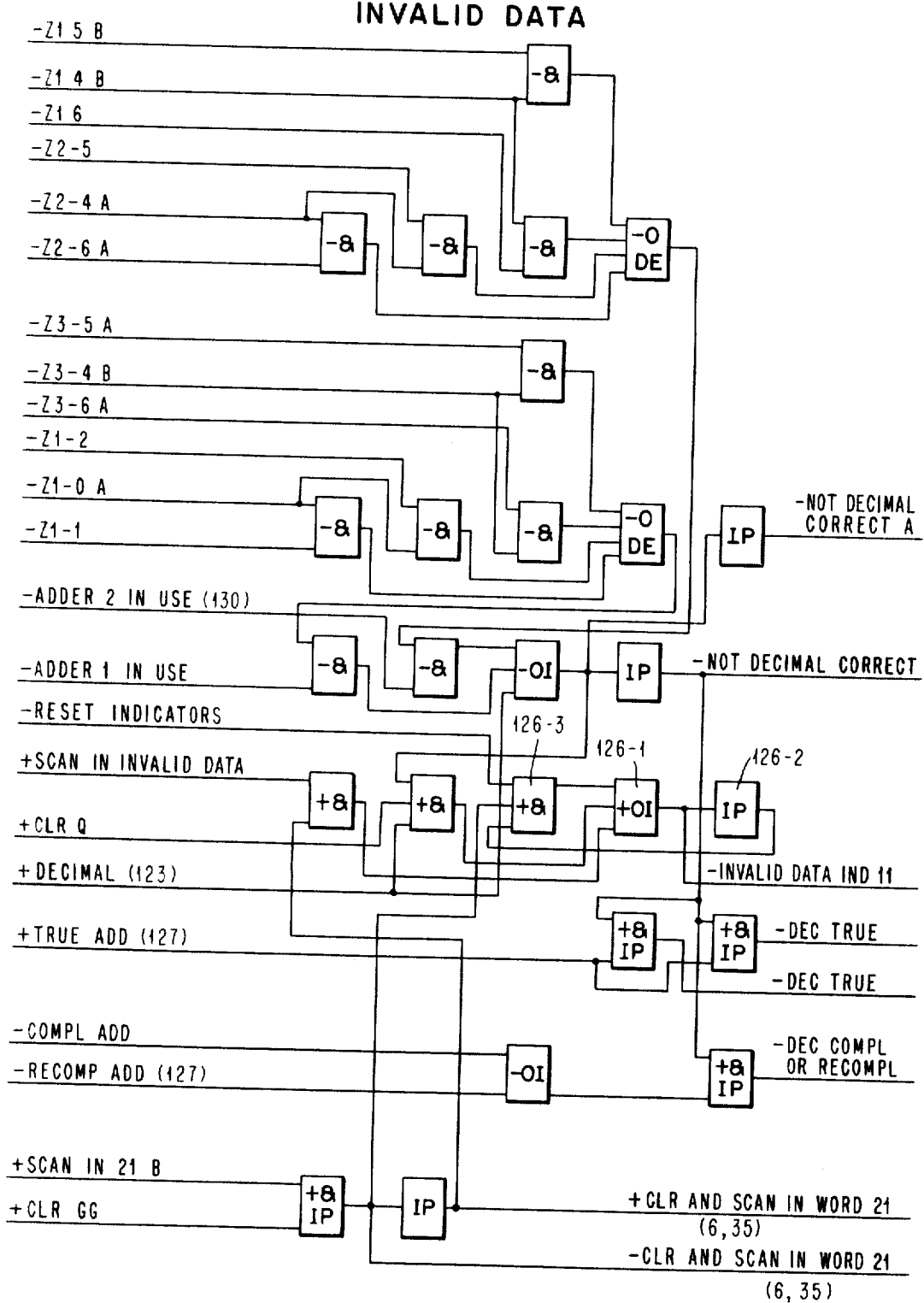

P11. *Invalid data (FIGURE 126)*

FIGURE 125 illustrates circuitry to determine the existence of invalid data. Invalid data might possibly occur during a decimal correction cycle in which decimal values greater than 10 might be attempted. Invalid data occurrence causes setting of an invalid data latch including +OI block 126–1, IP block 126–2 and +& block 126–3.

As shown in FIGURE 4, the preferred embodiment includes two hexidecimal adders, identified as adder 1 (4–17a) and adder 2 (4–17b). The details of these adders may correspond to the details described in U.S. patent application Ser. No. 223,431, originally filed Sept. 13, 1962, by Robert W. Keslin, entitled "Adder."

Q. ADDERS (FIGURES 127–131)

Q1. *Adder controls (FIGURE 127)*

FIGURE 127 illustrates controls for the true and complement operation of the adders. These controls include several double latch trigger circuits for indicating true complement, complement add, recomplement add and recomplement.

The true, not true trigger includes as its B latch —OI blocks 127–1 and 127–2 which are interconnected in the standard flip-flop fashion.

The complement add trigger includes —OI blocks 127–3 and 127–4 which are similarly interconnected in flip-flop fashion. The recomp trigger R latch is made up of —OI blocks 127–5 and 127–6. The recomp trigger B latch is made up of —OI blocks 127–7 and 127–8.

Q2. *Adder 2 to A trigger (FIGURE 128)*

FIGURE 128 illustrates the adder 2 to A trigger logic, which controls gating of adder 2 to the A register during certain multiply and swap operations. The adder 2 to A trigger B latch is made up of —OI blocks 128–1 and 128–2 which are interconnected in flip-flop fashion. Adder 2 trigger 128–1, 128–2 supplies output signal +AD2 to A.

Trigger scan M11 is made up of —OI blocks 128–3 and 128–4 which are interconnected and directly connected via —& blocks 128–5 and 128–6 to the inputs of the adder 2 to A trigger 128–1, 128–2. The scan operation depends upon logic blocks 128–7 to 128–9.

Q3. *Adder 2 gating (FIGURE 129)*

Figure 129:
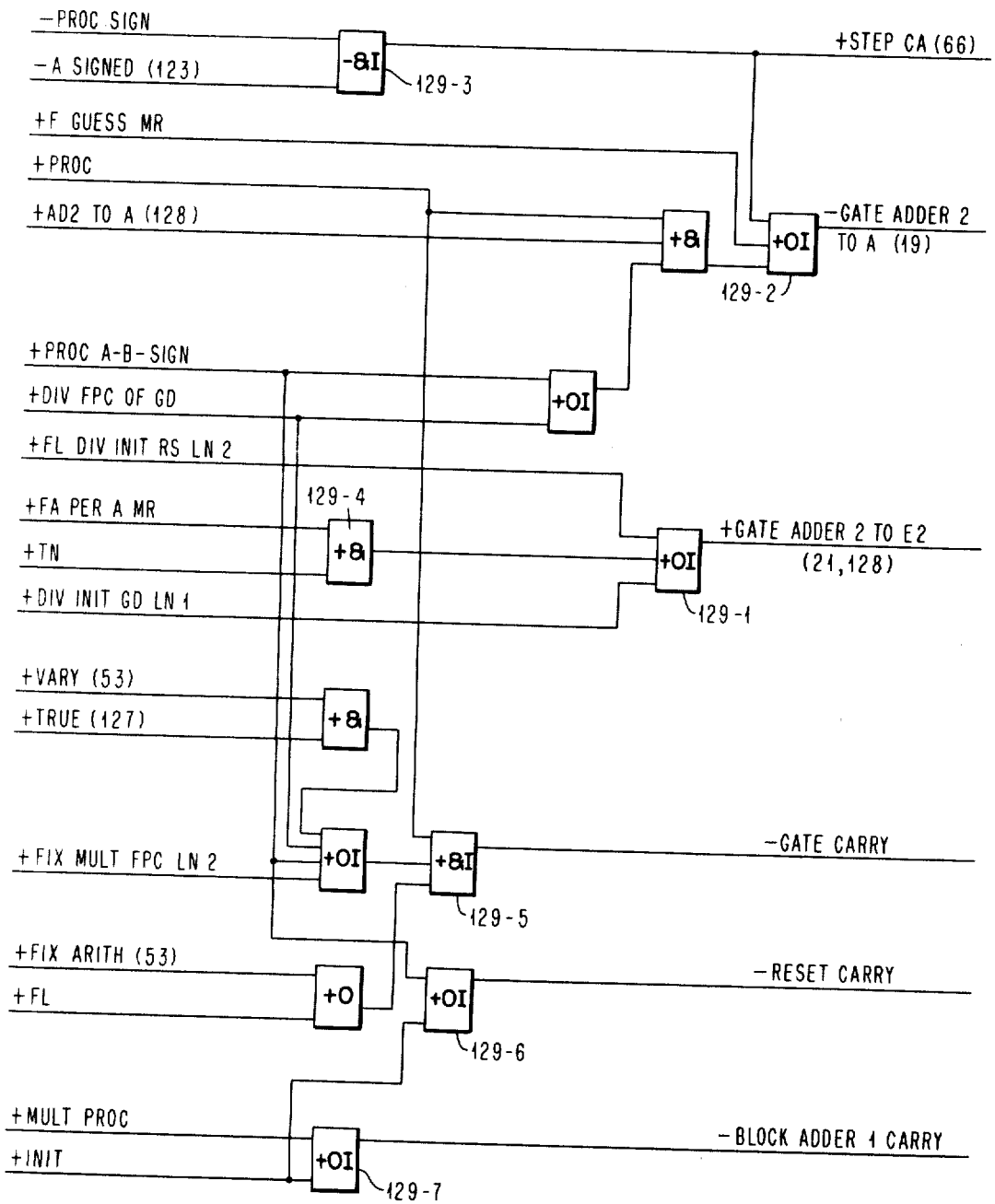

FIGURE 129 shows the gating controls for passing data to and from adder 2. The gating control is a logical matrix for deriving at AND circuits the combinations of signals which indicate the need for a particular type of gating and directing these signals via suitable OR circuits to the gates themselves.

The +OI block 129–2 responds to the various situations which require output signal —GATE ADDER 2 to A which signals are provided via the appropriate one of its three inputs. Signal —GATE ADDER 2 to A, for example, is required upon coincidence of signals —PROC SIGN and —A SIGNED at —&I block 129–3. The output of —&I block 129–3 is used directly as signal +STEP CA and via +OI block 129–2 as signal —GATE ADDER 2 TO A. The +OI block 129–1 provides output signal +GATE ADDER 2 TO E2 upon occurrence of the conditions indicated by signals +FL DIV INIT RS LN 2, signal +DIV INIT GD LN 1 or the output of +& block 129–4. Blocks 129–5 to 129–7 similarly provide signals —GATE CARRY, —RESET CARRY and —BLOCK ADDER 1 CARRY, as required.

Q4. *Adder controls (FIGURE 130)*

FIGURE 130 illustrates further adder controls which include two triggers T1 and T4. Other similar triggers are not shown.

Trigger T1 is made up of —OI blocks 130–1 and 130–2. This trigger and T2, T3, T4 control the logical connect function which is on the input to the adder. Triggers T1–T4 control the logical connect operation in the manner described in the abovementioned U.S. patent application Ser. No. 223,431, filed Sept. 13, 1962, by Robert W. Keslin, entitled "Adder."

Logic blocks 130–5 and 130–6 identify the condition of use of adders 1 and 2 respectively.

Upon receipt of signals indicating that such is the case, +&I blocks 130–5 and 130–6 indicate that adders 1 and 2 respectively are in use. For example, adder 1 is in use as indicated by signal —ADDER 1 IN USE from +&I block 130–5 upon occurrence coincidently of the functions indicated by signals +PROC LN I, +3 ADDRESS and signal +E1 to Z1 TGR. The adder in use signals are used to denote which of the 2 adders are being used in a particular operation.

Q5. *Sign logic (FIGURE 131)*

FIGURE 131 illustrates the circuitry necessary to control the signs for adders 1 and 2. The +OI blocks 131–1, 131–2 and 131–3 respond to any of their several inputs to provide output signal —INSERT SIGN when such a function is appropriate. For example, it is required to insert the sign when the output of +& is positive. This occurs upon coincidence of signal +NOT INT SIGN TGR, +PROC SIGN and +DO RECOMP applied to +& block 131–4.

There are certain occasions when it is required to change the sign. Signal +CHG SIGN B developed by +OI block 131–5 performs this function upon occurence of any of the sets of conditions which require the function. For example, +& block 131–6 responds to the coincidence of signal +NOT Z1–7, +PROC FL 12, +NOT INVALID and +NOT B SIGNED conditioning +OI block 131–5 to provide output signal +CHG SIGN B.

R. VARIATIONS

The preferred embodiment generally operates with two cycle operation requests. The invention operates with three or more cycle operation requests through the expedient of lengthening the priority pipe and adding to the job conflict logic. For operation requests involving more than three cycles, the increasing possibility of job conflict requires a more complex logic, and a point of diminishing advantage is approached.

The preferred embodiment uses seven request rings. A greater or lesser number might be employed.

The proferred embodiment uses four main buses. A greater number might be employed, or, in the interests of original cost reduction, a lesser number might be employed.

The preferred embodiment operates with a computer of the byte processing type. Each instruction controls several request rings to enter and position each of several operands, and thereafter to process them under control of other request rings, including one each for IO and for instruction loading. The invention, however, can be applied to other types of data processing systems including those that process full words.

S. FINAL SUMMARY OF INVENTION (SEE FIGURES 1 AND 3)

The invention is a control technique for a data processing system, which technique provides for maximum usage of the buses and registers of the system.

Each instruction initiates a series of operations in each of a plurality of requests rings, which control operations within related categories. The request rings generally operate asynchronously with respect to each other, but are ranked according to priority so that when more than one request ring seeks access to the data paths the proper one can be accepted.

A priority mechanism responds to request signals from the rings by permitting a selected ring to control the data paths for a short sequence of cycles. The need for data paths varies with the various requests, so that it is often possible for a second request to have its access to the data paths for its first job during the same time that the previous request is having access to the data paths for a subsequent job.

The subsequent jobs of the respective requests occur under control of a priority pipe code, which code is delayed in a series of latches in order to be available on the proper cycles. The priority pipe code includes a set of bits indicative of the request ring from which the request originated.

On each cycle, all bus positions on two major buses are loaded, either with actual data or with a forced zero, to maintain parity. Control logic is thus checked indirectly, since a fault in the control logic will fail to gate proper parity to the buses.

The entire machine is equipped with circuits to scan out its condition when required, and to scan in a set of values to restore the machine to its pre-scan conditions. The values are preserved in a special register.

T. INDEX TO CLAIMS (1) Priority sequence control.
(2) Claim 1 and overlap.
(3) Claim 2 and delay of overlap in conflict situations.
(4) Claim 3 and identification of two memory in and two out buses.
(5) Claim 2 and limitation of requests of two data manipulations.
(6) Claim 2 and details of request ring.
(7) Claim 6 and decoder details.
(8) Claim 6 and details of step control.
(9) Priority sequence control corresponding to FIGURE 1.
(10) Claim 9 and details of encoder to provide for bus conflicts.
(11) Claim 10 and gate control register.
(12) Claim 11 and data paths.
(13) Claim 12 and control of cycle duration.
(14) Data processing system including priority sequence control.
(15) Data processing system including details of priority sequence control.
(16) Priority sequence control including details of ring stepping.
(17) Priority sequence control with details of priority pipe.
(18) Priority sequence control with details of priority pipe prefix.
(19) Priority sequence control with byte address delay.

(20) Data processing system with priority sequence control and preserve register.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Priority sequencing control for a data processing system having memory means, logical means and bus means interconnecting said memory means and said logical means, characterized by:
   (a) a plurality of request rings, each being arranged to provide a sequence of operation requests, each request being arranged, upon grant, to control a short sequence of data manipulations involving at least one of said memory means and logical means and said bus means, said request rings being assigned rank for priority purposes; and
   (b) means to provide selective request grant signals to the highest rank request ring currently requesting.

2. Priority sequencing control according to claim 1, wherein each request is arranged to control a short sequence of data manipulations including early and late, and wherein said means to provide selective request grant signals is arranged to overlap the early data manipulation of a current request with the late data manipulation of a previous request.

3. Priority sequencing control according to claim 2 wherein said bus means includes a plurality of buses wherein an operation request controls data manipulations each involving usage of one or more of said buses, and wherein said means to provide selective request grant signals includes means to delay the highest rank request ring currently requesting in situations where conflicting bus use requirements exist.

4. Priority sequencing control according to claim 3 wherein said bus means includes first and second memory in buses and first and second memory out buses.

5. Priority sequencing control according to claim 2 wherein certain of said plurality of request rings each control a sequence of two data manipulations and wherein said means to provide selective request grant signals includes means to delay the current request in situations where the early data manipulations of the current request produces conflicting demand for bus usage with the late data manipulation of the previous request.

6. Priority sequencing control according to claim 2 wherein each of said plurality of request rings includes:
   multibit register means;
   means, connected to said register means, for delivering the operation request associated with the data content of said register means; and
   means connected to said register means to control the sequence of requests.

7. Priority sequencing control according to claim 6 wherein said means for delivering the operation request includes decoding means for producing gate control signals in response to the data content of said register means.

8. Priority sequencing control according to claim 6 wherein said data processing system includes instruction register means and indicator means, and wherein said request rings include logic to control the data content in said register means according to the current data content, the current instruction and the current condition of said indicators.

9. Priority sequencing control mechanism for a data processing system, characterized by:
   (a) a plurality of request rings, each request ring including a multibit register and logic to control a sequence of requests according to an instruction, a set of indicators and the current configuration of bits within said register, each request being arranged to control a short sequence of data manipulations including early and late; said request rings having assigned rank for priority purposes;
   (b) means connected to each of said request rings, to provide a priority response for the highest rank request ring currently making a request;
   (c) a plurality of early decoders, each connected to a related request ring and to said priority means (b), and responsive to said priority means, to decode the operation request from said request ring;
   (d) means connected to each of said early decoders to provide gate control signals during the current cycle upon receipt of a priority response;
   (e) encoder means connected to all of said early decoders and responsive to the output of the early decoder which receives a priority response to provide an encoded signal for controlling the late data manipulation of the requested operation;
   (f) delay means, connected to said encoder means, for delaying the encoded signal for controlling the late data manipulation for a fixed delay period, equivalent to the time required to perform the early data manipulation and any intervening data manipulations;
   (g) means connected to said delay means and said priority means for providing said priority means with a recognition of bus conflict situations if certain types of requests are given a priority response during the current operation; and
   (h) a late decoder, connected to said delay means, to provide gate signals for the late data manipulation.

10. Priority sequencing control mechanism according to claim 9, wherein said encoder means (e) includes means to provide signals identifying the currently requesting request ring, as part of the encoded signal passed to said delay means (f), and wherein said means for providing recognition of bus conflicts (f) includes means responsive to the encoded signal including ring identification signals to recognize bus conflicts.

11. Priority sequencing control mechanism according to claim 10, further characterized by:
   (i) a gate control register means for receiving signals from the one of said early decoder (c) which receives a priority response, and from said later decoder (h), and
   (j) individual gates connecting various functional units including memory means, logical means and bus means and connected to and controlled by said gate control register means.

12. A data processing system priority sequencing control mechanism according to claim 11 characterized by:
   (i) memory means;
   (j) register means;
   (k) bus means;
   (l) gating means interconnecting said memory means with said bus means and logical means; and
   (m) means connected to said early decoders to provide gate control signals during the current cycle and said late decode means connected to said delay means to provide gate control signals for the second and subsequent jobs of the previously granted operation request to said gating means to control data processing operation among said memory means and said logical means along said bus means.

13. A data processing system according to claim 12 wherein at least one of said plurality of request rings includes means to control the duration of the cycle of said data processing system according to the requirements of its current operation requests.

14. A data processing system comprising:
   (a) memory means;
   (b) memory in bus means;
   (c) validity check means connected to said memory in bus means;
   (d) memory out bus means;
   (e) logical means;
   (f) register means;

(g) gating means interconnecting said memory means, memory in bus means, validity check means, memory out bus means, logical means and register means, whereby under suitable gating control said combinations of means functions as a data processing system;

(h) a plurality of request rings, each being arranged to provide a sequence of operation requests, each request being arranged, upon grant, to control a short sequence of data manipulations involving at least one of said memory means and logical means and said bus means, said request rings being assigned rank for priority purposes, and (i) means to provide selective request grant signals to the highest rank request ring currently requesting.

15. A data processing system comprising:
(a) memory means;
(b) memory in bus means;
(c) validity check means connected to said memory in bus means;
(d) memory out bus means;
(e) logical means;
(f) register means;
(g) gating means interconnecting said memory means, memory in bus means, validity check means, memory out bus means, logical means and register means, whereby under suitable gating control said combination of means functions as a data processing system;
(h) a plurality of request rings, each request ring including a multibit register and logic to control a sequence of requests according to an instruction, each request being arranged to control a short sequence of data manipulations including early and late, a set of indicators and the current configuration of bits within said register; said request rings having assigned rank for priority purposes;
(i) means connected to each of said request rings, to provide a priority response for the highest rank request ring currently making a request;
(j) a plurality of early decoders, each connected to a related request ring and to said priority means (i), and responsive to said priority means, to decode the operation request from said request ring;
(k) means connected to each of said early decoders to provide gate control signals during the current cycle upon receipt of a priority response;
(l) encoder means connected to all of said early decoders and responsive to the output of the early decoder which receives a priority response to provide an encoded signal for controlling the late data manipulation of the requested operation;
(m) delay means, connected to said encoder means, for delaying the encoded signal for controlling the late data manipulation for a fixed delay period, equivalent to the time required to perform the early data manipulation and any intervening data manipulations;
(n) means connected to said delay means and said priority means for providing said priority means with a recognition of bus conflict situations if certain types of requests are given a priority response during the current operation; and
(o) a late decoder, connected to said delay means, to provide gate signals for the late data manipulations.

16. Priority sequencing control for a data processing system, comprising:
(a) a plurality of request ring means, each request ring means including means to request a priority response, means including a register having a present bit configuration to control an operation including a plurality of jobs to be performed in sequence and means to set its register to a new configuration according to the present configuration, the instruction value and a set of indicators, said request ring means being assigned a standard rank of priority;
(b) means connected to said request ring means for assigning priority to the operation requests of said request ring means;
(c) means for controlling performance of the plurality of jobs required by the requesting request ring means;
(d) means for assigning priority response signals to said request ring means in a fashion permitting overlap of the late jobs of certain operations with the early jobs of previous operations;
(e) and means selectively delaying priority response signals in situations where bus conflicts would occur.

17. Priority sequencing control according to claim 16, wherein said means (c) for controlling a plurality of jobs includes priority pipe means for retaining information required to control jobs subsequent to the first even after the operation request has been changed, said priority pipe means including means to store a plural-bit code during a fixed number cycles of delay.

18. Priority sequencing control according to claim 17, wherein said means (c) controlling priority pipe means includes means to store a plurality of code digits in addition to said plural-bit code, the additional digits being a prefix identifying the source request ring; and wherein said request ring means (a) includes encoding means connected to said prefix portion of said priority pipe means and arranged to supply code values indicative of said ring.

19. Priority sequencing control means for a data processing system in which individual control signals control a plurality of jobs over a short plurality of time periods, characterized by:
(a) memory word and byte addressing means;
(b) means to control word addressing on the first of said plurality of time periods, according to code values in said memory addressing means, whereupon the code values in said memory addressing means may be changed for addressing a second word during a subsequent time period; and
(c) means connected to said memory word and byte addressing means to receive the byte address and retain it during a fixed number of time periods so that the word addressed during the time period becomes available for byte addressing at the same time that the delayed byte address becomes available.

20. Priority sequencing control for a data processing system having memory means, logical means and bus means interconnecting said memory means and said logical means, characterized by:
(a) a plurality of request rings, each being arranged to provide a sequence of operation requests, each request being arranged, upon grant, to control a short sequence of data manipulations involving at least one of said memory means and logical means and said bus means, said request rings being assigned rank for priority purposes;
(b) means to provide selective request grant signals to the highest rang request ring currently requesting;
(c) a register connected to said bus means to receive and preserve the instruction information during normal operations; and
(d) means connecting said register to critical indicators within the system during scan out and scan in operations.

References Cited
UNITED STATES PATENTS
3,226,694   12/1965   Wise _____ 340—172.5

ROBERT C. BAILEY, *Primary Examiner.*

R. ZACHE, *Assistant Examiner.*